(12) United States Patent
Cerri et al.

(10) Patent No.: US 12,503,484 B2
(45) Date of Patent: Dec. 23, 2025

(54) ANDROSTANE DERIVATIVES WITH ACTIVITY AS PURE OR PREDOMINANTLY PURE STIMULATORS OF SERCA2A FOR THE TREATMENT OF HEART FAILURE

(71) Applicant: Seismic Pharmaceuticals, Warrington, PA (US)

(72) Inventors: Alberto Cerri, Milan (IT); Patrizia Ferrari, Varese (IT); Mara Ferrandi, Milan (IT); Paolo Barassi, Castelvaccana (IT); Giusseppe Bianchi, Milan (IT); Shih-Che Hsu, Taipai (TW); Francesco Peri, Milan (IT); Antonio Zaza, Milan (IT); Marcella Rocchetti, Brugherio (IT); Andrea Luraghi, Cerrro Maggiore (IT); Eleonora Torre, Desio (IT); Carlotta Ronchi, Milan (IT)

(73) Assignee: Seismic Pharmaceuticals, Warrington, PA (US)

( * ) Notice: Subject to any disclaimer, the term of this patent is extended or adjusted under 35 U.S.C. 154(b) by 766 days.

(21) Appl. No.: 17/640,294

(22) PCT Filed: Oct. 8, 2020

(86) PCT No.: PCT/EP2020/078253
§ 371 (c)(1),
(2) Date: Mar. 3, 2022

(87) PCT Pub. No.: WO2021/069570
PCT Pub. Date: Apr. 15, 2021

(65) Prior Publication Data
US 2023/0009312 A1 Jan. 12, 2023

(30) Foreign Application Priority Data
Oct. 9, 2019 (EP) ..................... 19202257

(51) Int. Cl.
*C07J 1/00* (2006.01)
*A61K 45/06* (2006.01)

(52) U.S. Cl.
CPC ............. *C07J 1/0011* (2013.01); *A61K 45/06* (2013.01)

(58) Field of Classification Search
CPC .............................. C07J 1/0011; A61K 45/06
See application file for complete search history.

(56) References Cited

U.S. PATENT DOCUMENTS

| | | | |
|---|---|---|---|
| 3,580,905 A | 5/1971 | Brown et al. | |
| 4,534,899 A | 8/1985 | Sears | |
| 5,605,674 A | 2/1997 | Purewal et al. | |
| 5,716,928 A | 2/1998 | Benet et al. | |
| 5,846,743 A | 12/1998 | Janmey et al. | |
| 5,858,401 A | 1/1999 | Bhalani et al. | |
| 5,874,268 A | 2/1999 | Meyer | |
| 6,007,839 A | 12/1999 | Mayhew et al. | |
| 6,063,400 A | 5/2000 | Geho et al. | |
| 6,261,815 B1 | 7/2001 | Meyer | |
| 6,358,530 B1 | 3/2002 | Eljamal et al. | |
| 6,509,006 B1 | 1/2003 | Platz et al. | |
| 6,589,503 B1 | 7/2003 | Piwnica-Worms | |
| 6,592,904 B2 | 7/2003 | Platz et al. | |
| 7,097,827 B2 | 8/2006 | Platz et al. | |
| 7,109,034 B2 | 9/2006 | Orwar et al. | |
| 7,306,783 B2 | 12/2007 | Piwnica-Worms | |
| 2004/0028670 A1 | 2/2004 | Carlson et al. | |

(Continued)

FOREIGN PATENT DOCUMENTS

| | | |
|---|---|---|
| CN | 103315968 B | 4/2015 |
| EP | 0 576 915 A2 | 1/1994 |

(Continued)

OTHER PUBLICATIONS

Kaneko et al. European Journal of Pharmacology. 2017; 814: 1-8 (Year: 2017).*

(Continued)

*Primary Examiner* — Clinton A Brooks
*Assistant Examiner* — Jerica Katlynn Wilson
(74) *Attorney, Agent, or Firm* — Howson & Howson, LLP; Kathleen D. Rigaut; Richard F. Kane

(57) ABSTRACT

Compounds and compositions for the activation of SERCA2a are disclosed. In particular, provided are compounds that act as predominantly pure or pure SERCA2a activators while only moderately inhibiting the Na+/K+ ATPase. In general, the disclosed compounds are derivatives of androstane having the formula (I). Also disclosed herein are pharmaceutical compositions comprising one or more of the compounds of formula (I) for use for the treatment of heart failure.

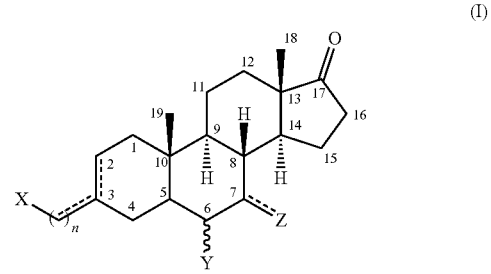

(I)

21 Claims, 2 Drawing Sheets

(56) References Cited

U.S. PATENT DOCUMENTS

| | | | |
|---|---|---|---|
| 2004/0151766 | A1 | 8/2004 | Monahan et al. |
| 2005/0136121 | A1 | 6/2005 | Kershman et al. |
| 2006/0083737 | A1 | 4/2006 | Minomi et al. |
| 2007/0042031 | A1 | 2/2007 | MacLachlan et al. |
| 2007/0077286 | A1 | 4/2007 | Ishihara et al. |
| 2007/0082042 | A1 | 4/2007 | Park et al. |
| 2007/0110798 | A1 | 5/2007 | Drummond et al. |

FOREIGN PATENT DOCUMENTS

| | | |
|---|---|---|
| EP | 0825197 B1 | 10/2000 |
| WO | WO 2007/118830 A1 | 10/2007 |
| WO | WO 2007/118832 A2 | 10/2007 |
| WO | WO 2020/180356 A1 | 9/2020 |

OTHER PUBLICATIONS

Kho et al. Nature Communications. 2015; 1-11 (Year: 2015).*

Abraham, "In-hospital mortality in patients with acute decompensated heart failure requiring intravenous vasoactive medications: an analysis from the Acute Decompensated Heart Failure National Registry (ADHERE)" J Am Coll Cardiol 46:57-64 (2005).

Afifi, "Neurological, respiratory and cardiac effects of cardiac glycosids administered intracerebrally to conscious mice" Pharmacological Research Communications. 6:417-425 (1974).

Alemanni, "Role and mechanism of subcellular Ca2+ distribution in the action of two inotropic agents with different toxicity" J Mol Cell Cardiol 50:910-8 (2011).

Al-Muhammed, "In-vivo studies on dexamethasone sodium phosphate liposomes" J. Microencapsul. 13:293-306 (1996).

Altomare, "Ikr Impact on Repolarization and its Variability Assessed by Dynamic Clamp" Circulation A&E 8:1265-1275 (2015).

Ashkar, "Dobutamine" Island (FL): StatPearls Publishing, updated 2020 (available at https://www.ncbi.nlm.nih.gov/books/NBK470431/).

Baheti, "Excipients used in lyophilization of small molecules" J. Excipients and Food Chemistry 1(1):41-54 (2010).

Bers, "Regulation of Ca2+ and Na+ in Normal and Falling Cardia Myocytes" Annals of the NY Academy of Sciences 1080:165-177 (2006).

Bers, "Calcium Cycling and Signaling in Cardiac Myocytes" Ann. Rev Physiol. 70:23-49 (2008).

Braunwald, "The war against heart failure: the Lancet lecture" Lancet 385:812-24 (2015).

Brophy, "Bioavailability of oral dexamethasone during high dose steroid therapy in neurological patients" Eur. J. Clin. Pharmacol. 24:103-108 (1983).

Butler et al., "Past, present, and future of acute heart failure clinical trials-a high-risk population in search of a strategy" Eur J Heart Fail.20(5):839-841 (2018).

Byrne, "Recirculating cardia delivery of AAV2/TSERCAZa improves myocardial function in an experimental model of heart failure in large animals" Gene Therapy 15:1550-1557 (2008).

Campia et al. "Acute Heart Failure with Low Cardia Output: Can We Develop a Short-term Inotropic Agent that Does Not Increase Adverse Events?" Curr. Heart Fall. Rep. 7:100-109 (2010).

Cerri, "Synthesis, Cardiotonic Activity, and Structure-Activity Relationships of 17 [beta]-Guanylhydrazone Derivatives of 5[beta]-Androstane-3[beta], 14[beta]-diol Acting on the Na+,K+-ATPase Receptor" J. Med. Chem. 40(21):3484-3488 (1997).

Chonn, "Recent advances in liposomal drug-delivery systems" Curr. Opin. Biotechnol. 6:698-708 (1995).

Courault, "Partialsynthesen von Cardenoliden und Cardenolid-Analogen XIII. Synthese substituierter 12,21-Epoxy-5beta, 14beta-card-20(22)-enoli de" J. Fur Praktische Chemie 330:445-452 (1988).

Dec, "Istaroxime in heart failure new hope or more hype" J Am Coll Cardiol 51:2286-88 (2008).

De Munari, "Structure-based design and synthesis of novel potent Na+,K+ -ATPase inhibitors derived from a 5alpha, 14alpha-androstane scaffold as positive inotropic compounds" J. Med. Chem, 46:3644-3654 (2003).

Eyles. "Oral Delivery and Fate of Poly(lactic acid) Microsphere—encapsulated Interferon in Rats" J. Pharm. Pharmacol. 49:669-674 (1997).

Fernandez-Tenorio & Niggli, "Stabilization of Ca 2+ signaling in cardiac muscle by stimulation of SERCA" J Mol Cell Cardiol. 119:87-95 (2018).

Ferrandi et al., "Renal Na,K-ATPase in genetic hypertension" Hypertension 28 (6):1018-25 (1996).

Ferrandi, "Istaroxime stimulates SERCAZa and accelerales calcium cycling in heart failure by relieving phospholamban inhibition" Br J Pharmacol 169:1849-61 (2013).

Flaherty. "Acute heart failure syndromes in patients with coronary artery disease early assessment and treatment" J Am Coll Cardiol. 53(3):254-63 (2009).

Fotherby, "Bioavailability of orally administered sex steroids used in oral contraception and hormone replacement therapy" Contraception 54:59-69 (1996).

Gao, "Controlled Release of a Contraceptive Steroid from Biodegradable and Injectable Gel Formulations: In Vitro Evaluation" Pharm. Res. 12:857-863 (1995).

Gheorghiade, "Hemodynamic, Echocardiographic, and Neurohormonal Effects of Istaroxime, a Novel Intravenous Inotropic and Lusitropic Agent" J Am Coll Cardiol 51:2276-85 (2008).

Gobbini, "An Expeditious Route to 3ß,14ß-Dihydroxy-5ß-androstane-17ß-carboxaldehyde" Synth Comm 27(6):1115-1122 (1997).

Gong, "Levosimendan Treatment for Heart Failure: A Systematic Review and Meta-Analysis" J Cardiothorac Vasc Anesth 29:1415-25 (2015) (accepted author version retrieved at http://dx.doi.org/10.1053/j.jvca.2015.03.023).

Größl, "A Novel Artificial MicroRNA Expressing AAV Vector for Phospholamban Silencing in Cardiomyocytes Improves Ca2+ Uptake into the Sarcoplasmic Reticulum" PLoS One 9:e92188 (2014).

Guzman, "Replacement of the butanolide moiety of digitoxigenin by cyclic Michael acceptor Systems" Can. J. Chem. 59(23):3241-3247 (1981).

Hasenfuss, "Cardiac inotropes: current agents and future directions" Eur Heart J. 32(15):1838-45 (2011).

Heineke, "Regulation of cardiac hypertrophy by intracellular signalling pathways" Nat Rev 7:589-600 (2006).

Hidalgo-Aragones, "Pharmacokinetics of oestrone-3-O-sulphamate" J. Steroid Biochem. Mol. Biol. 58:611-617 (1996).

Hoshijima, "Chronic suppression of heart-failure progression by a pseudophosphorylated mutant of phospholamban via cardiac rAAV gene delivery" Nat. Med. 8:864-871 (2002).

Hulot, "Effect of intracoronary administration of AAV1/SERCA2a on ventricular remodelling in patients with advanced systolic heart failure: results from the AGENT-HF randomized phase 2 trial" Eur Heart J 19:1534-1541 (2016).

Johnson, "Permeation of Steroids through Human Skin" J. Pharm. Sci. 84:1144-1146 (1995).

Jørgensen, "Purification of Na+,K+-ATPase: enzyme sources, preparative problems, and preparation from mammalian kidney" Methods Enzymol. 156:29-43 (1988).

Kaneko, "A pyridone derivative activates SERCA2a by attenuating the inhibitory effect of phospholamban" Eur J Pharmacol 814:1-7 (2017) (accepted author version retrieved at http://dx.doi.org/10.1016/j/ejphar.2017.07.035).

Kaye, "Percutaneous Cardiac Recirculation-Mediated Gene Transfer of an Inhibitory Phospholamban Peptide Reverses Advanced Heart Failure in Large Animals" J. Am. Coll. Cardiol. 50:253-260 (2007).

Lang, "Recommendations for chamber quantification" Eur J Echocardiography 7:79-108 (2006).

Lipskaia, "Sarcoplasmic reticulum Ca2+ ATPase as a therapeutic target for heart failure" Expert Opin Biol Ther 10:29-41 (2010).

Lloyd-Jones, "Lifetime Risk for Developing Congestive Heart Failure" Circulation 106:3068-3072 (2002).

Lohse, "What is the Role of B-Adrenergic Signaling in Heart Failure?" Circ Res 93:896-906 (2003).

(56) References Cited

OTHER PUBLICATIONS

MacLennan, "Phospholamban: a Crucial Regulator of Cardiac Contractility" Nat Rev Mol Cell Biol 4(7): 566-577 (2003).
Metra, "Heart Failure" Lancet 390:1981-1995 (2017).
Micheletti, "Pharmacological profile of the novel inotropic agent (E,Z)-3-((2-aminoethoxy) imino)androstane-6, 17-dione hydrochloride (PST2744)" J Pharmacol Exp Ther 303:592-600 (2002).
Micheletti, "Istaroxime, a stimulator of sarcoplasmic reticulum calcium adenosine triphosphatase isoform 2a activity, as a novel therapeutic approach to heart failure" Am J Card 99:24A-32A (2007).
Nakayama, "Ca2+ and Mitochondrial-Dependent Cardiomyocyte Necrosis as a Primary Mediator of Heart Failure" J Clin Invest 117:2431-44 (2007).
Nediani, "Stimulation of cardiac sarcoplasmic reticulum calcium pump by acylphosphatase. Relationship to phospholamban phosphorylation" J Biol Chem. 271:19066-73 (1996).
Ostro, "Use of liposomes as injectable-drug delivery systems" Am. J. Hosp. Pharm. 46:1576-1587 (1989).
Packer, "The Room Where It Happens: A Skeptic's Analysis of the New Heart Failure Guidelines" Journal of Cardiac Failure 22:726-730 (2016) (accepted author version retrieved at http://dx.doi.org/doi:10.1016/j.cardfail.2016.07.433).
Packer, "Why is the use of digitalis withering? Another reason that we need medical heart failure specialists" Eur J Heart Failure 20:851-852 (2018).
Pati, "Synthesis of 17b-(3'thiophanyl)-5b-androstane-3b, 14b-diol 3-d-glucopyranoside, an anti-inotropic cardiac glucoside" Steroids 55(2):65-68 (1990).
Rao, "Recent developments of collagen-based materials for medical applications and drug delivery systems" J. Biomater Sci. Polym. Ed. 7:623-645 (1995).
Revill et al., "Isaroxime" in Drugs of the Future 32(7):595-600 (2007).
Rocchetti, "Modulation of Sarcoplasmic Reticulum Function by Na+/K+ Pump Inhibitors with Different Toxicity: Digoxin and PST2744 [(E,Z)-3-((2-Aminoethoxy)imino) androstane-6,17-dione Hydrochloride]" J Pharmacol Exp Ther 313:207-15 (2005).
Rocchetti, "Modulation of sarcoplasmic reticulum function by PST2744 [istaroxime; (E,Z)-3-((2-aminoethoxy)imino) androstane-6,17-dione hydrochloride)] in a pressure-overload heart failure model" J Pharmacol Exp Ther. 326:957-65 (2008).
Rohatagi, "Pharmacokinetic and pharmacodynamic evaluation of triamcinolone acetonide after intravenous, oral, and inhaled administration" J. Clin. Pharmacol. 35:1187-1193 (1995).
Sato, "Rescue of contractile parameters and myocyte hypertrophy in calsequestrin overexpressing myocardium by phospholamban ablation" JBC 276:9392-9 (2001).
Shah, "Effects of istaroxime on diastolic stiffness in acute heart failure syndromes" Results from the Hemodynamic, Echocardiographic, and Neurohormonal Effects of Istaroxime, a Novel Intravenous Inotropic and Lusitropic Agent: a Randomized Controlled Trial in Patients Hospitalized with Heart Failure (HORIZON-HF) trial Am Heart J 157:1035-41 (2009).
Solomon, "Influence of nonfatal hospitalization for heart failure on subsequent mortality in patients with chronic heart failure" Circulation 116:1482-87 (2007).
Suckau, "Long-term cardiac-targeted RNA interference for the treatment of heart failure restores cardiac function and reduces pathological hypertrophy" Circulation 119:1241-1252 (2009).
Tamargo et al. "Investigational Positive Inotropic Agents for Acute Heart Failure" Cardiovasc. & Haematolog. Disorders-Drug Targets 9:193-205 (2009).
Teneggi et al., "Drugs' development in acute heart failure: what went wrong?" Heart Failure Rev 23:667-691 (2018).
Villaescusa, "Steroids and related natural products. Synthesis of 10(22)-dihydro-23-deoxodigitoxigenin" J. Organic Chem. 37(4) (1972).
Wolff, "Modified cardenolides. V. Replacement of the C-17 lactone substituent by alkylating groups" J. Med. Chem. 13(4):657-663 (1970).
Wagner, "Role of sodium and calcium dysregulation in tachyarrhythmias in sudden cardiac death" Circ Res 2015, 116:1956-1970 (2015).
Zaza, "Calcium Store Stability as an Antiarrhythmic Endpoint" Curr Pharm Des 21:1053-1061 (2015).
Zaza & Rocchetti, "Calcium store stability as an antiarrhythmic endpoint" Curr Pharm Des 21:1053-1061 (2015).
International Search Report and Written Opinion in counterpart International Application No. PCT/EP2020/078253 mailed Jan. 22, 2021.

* cited by examiner

ANDROSTANE DERIVATIVES WITH ACTIVITY AS PURE OR PREDOMINANTLY PURE STIMULATORS OF SERCA2A FOR THE TREATMENT OF HEART FAILURE

FIELD

The present invention relates to the field of pharmaceuticals, in particular, to androstane derivatives for use in the treatment of acute heart failure.

BACKGROUND OF THE INVENTION

The prevalence of heart failure (HF) is age-dependent, ranging from less than 2% of people younger than 60 years to more than 10% of individuals older than 75 years (Metra M & Teerlink J R, Lancet 2017, 390:1981-1995). Most patients with HF have a history of hypertension, coronary artery disease, cardiomyopathies, valve disease, or a combination of these disorders (Metra M & Teerlink J R, Lancet 2017, 390:1981-1995). The calculated lifetime risk of developing HF is expected to increase, and those with hypertension are at higher risk (Lloyd-Jones D M et al., Circulation 2002, 106:3068-3072). Patients with HF have a poor prognosis with high rates of hospital admission and mortality.

Clinical symptoms in HF are caused by a cardiac double pathological feature that consists in an inotropic abnormality, resulting in diminished systolic emptying (systolic dysfunction), and a compliance abnormality in which the ability of the ventricles to suck blood from the venous system is impaired (diastolic dysfunction). This, in turn, causes a reduction in the amount of blood available for systolic contraction (impairment of left ventricle (LV) filling). The impaired contractility and relaxation are the consequence of an abnormal distribution of intracellular $Ca^{2+}$, resulting from reduced $Ca^{2+}$ uptake by the sarcoplasmic reticulum (SR), which is the intracellular $Ca^{2+}$ store (Bers D M et al., Ann N.Y. Acad Sci 2006, 1080:165-177). The latter is operated by the $Ca^{2+}$ ATPase of the SR membrane (SERCA2a), which is an active membrane transport. SERCA2a activity is physiologically limited by its interaction with phospholamban (PLN) (Bers D M., Annu Rev Physiol 2008, 70:23-49; MacLennan DH & Kranias E G, Nat Rev Mol Cell Biol 2003, 4(7): 566-577); such a restriction is normally relieved by PLN phosphorylation by protein kinase A (PKA), which is a signaling pathway that is severely depressed as a consequence of HF remodeling (Lohse M et al., Circ Res 2003, 93:896-906). Thus, SERCA2a function is impaired in the failing myocardium (Bers D M et al., Ann N.Y. Acad Sci 2006, 1080:165-177) and is thus primarily responsible for reduced $Ca^{2+}$ uptake by the SR. In addition to its consequences on myocyte contractility and relaxation, abnormal $Ca^{2+}$ distribution also facilitates cardiac arrhythmias (Zaza & Rocchetti, Curr Pharm Des 2015, 21:1053-1061) and, on the long term, it accelerates myocytes loss by apoptosis (Nakayama H et al., J Clin Invest 2007, 117:2431-44). Reduced SERCA2a function also increases the energy cost of contraction because it requires a compensatory increase in $Ca^{2+}$ extrusion through the Na—Ca exchanger (NCX), which is less energy efficient (Lipskaya L et al., Expert Opin Biol Ther 2010, 10:29-41). Substantial evidence indicates that normalization of SERCA2a function restores intracellular $Ca^{2+}$ homeostasis and improves contractility and relaxation of cardiomyocytes and of the heart in situ (Byrne M J et al., Gene Therapy 2008, 15:1550-1557; Sato et al., JBC 2001, 276:9392-99). To summarize, recovery of SERCA2a function in HF may improve cardiac relaxation and, possibly, contractility while minimizing arrhythmias, myocardial oxygen consumption, and myocyte death (Lipskaya L et al., Expert Opin Biol Ther. 2010, 10:29-41). This highlights a need for "pure" SERCA2a activators. Indeed, SERCA2a activation, because of improved $Ca^{2+}$ sequestration, can elevate the intra-SR threshold for the generation of $Ca^{2+}$ waves exerting a negative feedback on the $Ca^{2+}$-induced-$Ca^{2+}$ release sustaining the waves (Fernandez-Tenorio M & Niggli E J, Mol Cell Cardiol 2018, 119:87-95). Hence, a pure or predominantly pure SERCA2a activation might afford a reduced arrhythmogenic risk and, therefore, justifies an interest for compounds with SERCA2a-stimulating action.

In conclusion, novel molecules able to enhance SERCA2a function alone might improve overall cardiac function in HF. This provides a strong motivation for the search of new compounds with such a pharmacodynamic profile.

Current long-term therapy of HF is aimed at prevention of "myocardial remodeling" (e.g., beta-blockers, ACE inhibitors, and aldosterone antagonists), which is a chronic maladaptive response to reduced contractility that amplifies the initial damage and underlies disease evolution (Heineke J & Molkentin D, Nat Rev 2006, 7:589-600). While this approach has indisputable merit, it does not target impaired "contractility" and "relaxation", which are the functional derangements that define HF and are responsible for its symptoms. Indeed, particularly in the advanced disease stages, drugs that increase myocardial contractility/relaxation ("inotropic/lusitropic agents") are still widely used and crucial for patient's management (Metra M & Teerlink J R, Lancet 2017, 390:1981-1995). These include sympathomimetic amines (dobutamine) and levosimendan, which is a $Ca^{2+}$-sensitizer with a strong vasodilator effect. Unfortunately, these agents act by mechanisms with potentially harmful components, such as facilitation of life-threatening arrhythmias, increased myocardial oxygen consumption, and impairment of an already insufficient coronary blood flow due to the fall in blood pressure caused by vasodilation (Ashkar H, Makaryus A N StatPearls. Treasure Island (FL): StatPearls Publishing, 2018 January-2017 Dec. 19 (https://www.ncbi.nlm.nih.gov/books/NBK470431/); Gong B. et al., J Cardiothorac Vasc Anesth 2015, 29: 1415-25 EDITORIAL). This limits the use of inotropic agents to late disease stages, thus losing the potential benefits of increasing contractility early in the disease course. Furthermore, these agents do not improve patient's prognosis and survival, and their therapeutic use must be carefully monitored (Ashkar H & Makaryus A N, StatPearls. Treasure Island (FL): StatPearls Publishing, 2018 January-2017 Dec. 19) (Gong B. et al., J Cardiothorac Vasc Anesth 2015, 29: 1415-25 EDITORIAL).

Among positive inotropes, the cardiac glycoside Digoxin, an inhibitor of the $Na^+/K^+$ ATPase enzymatic activity, has been one of the most commonly prescribed medications in the past. However, its use has been decreasing over the last few decades because of the difficulty in maintaining Digoxin within serum concentration ranges (0.5-0.7 ng/ml) at which Digoxin displays its beneficial effects without reaching the threshold level of 0.9 ng/ml, above which increased risk of death, mainly due to arrhythmias, has been observed (Packer M, Journal of Cardiac Failure 2016, 22:726-730; Packer M, Eur J Heart Failure 2018, 20:851-852).

Intensive research is also in progress for the development of HF drugs with mechanisms of action other than positive inotropy. Among many, the agents most investigated and under clinical development are: SERELAXIN-recombinant relaxin 2 mediator; ULARITIDE-recombinant natriuretic peptide; OMECAMTIV MECARBIL-cardiac myosin activator; BMS986231-NO donor; ADRECIZUMAB-Adrenomedullin inhibitor; ANX-042-spliced variant of NP; TD1439-Neprylisin (NEP) inhibitor. However, when evaluated in clinical phase 2-3 trials, none of these new agents has met the primary end-point without safety concern.

The clinical course and prognosis of a patient with chronic HF (CHF) is much worse after an episode of acute HF (AHF) (Solomon S D et al., Circulation 2007, 116:1482-87). AHFS can be defined as the new onset or recurrence of symptoms and signs of HF, requiring urgent evaluation and treatment and resulting in unscheduled care or hospital admission. Half of the patients with AHFS have reduced systolic function (HFrEF), representing a target for potential future therapies (Braunwald E. Lancet 2015; 385:812-24). Therapies for AHFS in patients with reduced ejection fraction (rEF) have focused on alleviating congestion with vasodilators, diuretics, or ultrafiltration or by increasing cardiac output with positive inotropes. Although this therapeutic strategy has reduced the risk of sudden cardiac death, the post-discharge event rate remains unacceptably high in patients hospitalized for AHFS. Many unwanted cardiovascular side effects can be caused by the available therapy, such as myocardial ischemia, cardiac injury, and arrhythmias consequent to the inotropic therapy, particularly in patients with coronary artery disease (CAD) (Abraham W T et al., J Am Coll Cardiol 2005, 46:57-64; Flaherty J D et al., J Am Coll Cardiol. 2009, 53(3):254-63), hypotension, and low perfusion of the peripheral organs (kidney) caused by vasodilators, particularly in HF patients with low blood pressure. Accordingly, the main goal during hospitalization is to improve cardiac output without causing cardiac and/or kidney injury. Moreover, there has been little focus on examining or treating an impaired left ventricular (LV) diastolic relaxation that, in the remaining 50% of patients with HF but preserved EF, is responsible for the symptoms of HF. In addition, patients with AHFS with reduced EF also have an impairment of ventricular relaxation that contributes to the overall failure of cardiac function. A variety of echocardiographic indexes have been developed to measure the cardiac relaxation capacity both in animal models and patients with HF (e.g., decreased early mitral annular tissue velocity [e'] and decreased early mitral inflow [E] deceleration time [DT]), along with echocardiographic parameters of increased LV filling pressure (e.g., E/e' ratio). Even though the correspondence of the single index changes is not perfectly superimposable in some animal models and patients, their overall changes in animal models of ventricular relaxation impairment are certainly translatable to the human condition and used to study the drug effect in AHFS (Shah S A et al., Am Heart J 2009, 157:1035-41).

Various therapeutic approaches that increase SERCA2a function have been recently investigated. These include SERCA2a overexpression by gene transfer (Byrne et al., Gene Therapy 2008, 15:1550-1557), PLN inactivation through expression of mutants with negative dominance (Hoshijima M et al., Nat. Med. 2002, 8: 864-871; Iwanaga Y et al., J Clin Investig 2004, 113: 727-736), AdV-shRNA (Suckau L et al., Circulation 2009, 119: 1241-1252), microRNA (Größl et al., PLoS One 2014, 9: e92188), or antibodies (Kaye D M et al., J. Am. Coll. Cardiol. 2007, 50:253-260). As highlighted by the negative results of the largest phase IIb clinical trial applying SERCA2a gene delivery in HF (CUPID 2), these approaches suffer from major problems in construct delivery (viral vectors etc.) and dose adjustment that are far from being solved (Hulot J S, Eur Heart J 2016, 19:1534-1541). A small-molecule (pyridone derivative) inhibiting PLN, which is structurally different from Istaroxime, has been recently described (Kaneko M. et al., Eur J Pharmacol 2017, 814:1-7).

Hence, the development of a small-molecule SERCA2a activator would be advantageous for treating HF and still represents a very promising strategy.

Istaroxime is a new small-molecule drug under clinical development for the treatment of AHFS. Istaroxime is disclosed in EP0825197 and in S. De Munari et al. (J. Med. Chem. 2003, 64:3644-3654) and is compound (3Z,5a)-3-[(2-aminoethoxy)imino]androstane-6,17-dione. Istaroxime is endowed of the double mechanism of action of inhibiting the $Na^+/K^+$ pump (Micheletti et al., J Pharmacol Exp Ther 2002, 303:592-600) while activating SERCA2a (Rocchetti M et al., J Pharmacol Exp Ther. 2005, 313:207-15). At the same level of inotropy, the proarrhythmic effect of Istaroxime is considerably lower than that of Digoxin, which is a pure $Na^+/K^+$ pump inhibitor (Rocchetti M et al., J Pharmacol Exp Ther. 2005, 313:207-15). This suggests that by improving $Ca^{2+}$ clearance from the cytosol (Alemanni, J Mol Cell Cardiol 2011, 50:910-8), SERCA2a stimulation may also minimize the proarrhythmic effect of $Na^+/K^+$ pump blockade (Rocchetti M et al., J Pharmacol Exp Ther. 2005, 313:207-15; Zaza & Rocchetti, Curr Parm Des 2015, 21:1053-1061) while preserving its inotropic effect. The reduction of the proarrhythmic effect by Istaroxime has been confirmed in clinical studies (Gheorghiade M et al., J Am Coll Cardiol 2008, 51:2276-85).

In HF patients, Istaroxime infusion improved both systolic and diastolic functions (Horizon study) (Gheorghiade M et al., J Am Coll Cardiol 2008, 51:2276-85; Shah S A et al., Am Heart J 2009, 157:1035-41). Amelioration of systolic function was detected as an increase in systolic tissue velocity (s') and in the slope of end-systolic elastance (ESPVR slope); increased diastolic compliance was revealed by an increment in diastolic tissue velocity (e'); and decreased end-diastolic elastance (EDPVR slope) (Shah S A et al., Am Heart J 2009, 157:1035-41).

While it is endowed with an excellent pharmacodynamic profile, Istaroxime is not optimal for chronic administration because of its poor gastrointestinal (GI) absorption and high clearance rate. Istaroxime, therefore, has been developed for intravenous infusion in hospitalized patients with AHFS only, and its administration requires well-trained medical personnel (Dec G W, J Am Coll Cardiol. 2008, 51:2286-88; Shah S A et al., Am Heart J 2009, 157:1035-41).

Accordingly, there is a long-felt need for a compound for use in the treatment of HF endowed with a positive lusitropic effect and that can be administered preferably by oral route (Butler J et al., Eur J Heart Failure 2018, 20:839-841; Wagner S et al., Circ Res 2015, 116:1956-1970; Hasenfuss G & Teerlink J R., Eur Heart J. 2011, 32(15):1838-45).

It is possible that an improved diastolic function may be achieved by a "pure" SERCA2a activator. However, notwithstanding the intense research on discovering small molecules or gene therapy aimed at selectively activating SERCA2a, no promising clinical outcomes have been reached so far.

The present invention satisfies the above needs and overcomes the problem of prior art.

SUMMARY OF THE INVENTION

It has now been found that certain androstane derivatives exhibit pure or predominantly pure SERCA2a activation. In other words, the androstane derivatives provided herein significantly activate SERCA2a, but do not, or only moderately, inhibit the Na+/K+ ATPase pump. In general, these androstane derivatives contain a functional group attached through a carbon linker at Carbon-3 (C3) and functional groups at C6 and/or C7. The structure of these pure or predominantly pure SERCA2a activators has the general formula (I) as shown here:

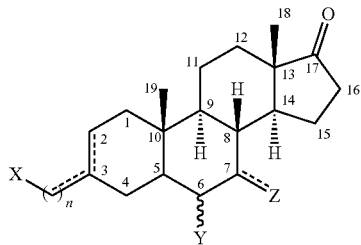

Wherein X is any one of a carboxylic acid, carboxylic ester and their bioisosters (sulfate, sulfonic acid, phosphate, phosphonate, or nitrogen-containing etherocyclic rings such as triazoles and tetrazoles), primary alcohol, ethers, or an amine group (e.g., primary amine, secondary amine, or cyclic amine);

n is 1, 2, 3, 4, or 5;

the C3-C1' dashed line represents an optional exocyclic double bond C=C at position C3-C1';

the C2-C3 dashed line represents an optional endocyclic double bond C=C;

Y at C6 is a hydroxyl (OH) in the α- or β-configuration or a hydroxymethyl (CH$_2$OH) in the α-configuration;

Z at C7 could be either —H or —OH in an α-configuration or a ketone. The dashed line represents an optional carbonyl group (C=O) in such position.

The compounds disclosed herein may include enantiomeric and/or diastereomeric mixtures; their pharmaceutically acceptable salts, solvates, or hydrates; or their metabolite and metabolic precursors.

In the context of the present invention, metabolite and metabolic precursor means a compound of formula (I) which has been transformed by a metabolic reaction, but substantially maintains or increases the pharmacological activity.

Examples of metabolites or metabolic precursors are hydroxylated, carboxylated, sulphonated, glycosylated, methylated or demethylated, acetylated, covalently linked to glucuronic acid, glycine and other amino acids, glutathione, oxidized or reduced derivatives of the compounds of formula (I).

Some compounds of formula (I), especially esters, can also be prodrugs of the active forms.

Where the compounds of formula (I) can exhibit tautomerism, the formula is intended to cover all tautomers; the invention includes within its scope all the possible stereoisomers, Z and E isomers, optical isomers, enantiomers and their mixtures.

Also the pharmaceutical acceptable salts are included in the scope of the invention. Pharmaceutical acceptable salts are salts which retain the biological activity of the base compound and are derived from such known pharmacologically acceptable acids such as, e. g., hydrochloric, hydrobromic, sulfuric, phosphoric, nitric, fumaric, succinic, oxalic, malic, tartaric, maleic, citric, methanesulfonic or benzoic acid and others commonly used in the art, see for example Pharmaceutical Salts and Co-crystals, Editors: Johan Wouters, Luc Quéré, RSC Publishing, 2011.

Further object of the present invention are the said compounds of general formula (I) for use as medicaments, in particular for the treatment of HF.

In some embodiments, the compound of claim 1 is selected from the group consisting of: (E)-4-(6alpha-hydroxy-17-oxoandrostane-3-yliden)butyric acid; (Z)-4-(6alpha-hydroxy-17-oxoandrostane-3-yliden) butyric acid; (E)-4-(6beta-hydroxy-17-oxoandrostane-3-yliden) butyric acid; (Z)-4-(6beta-hydroxy-17-oxoandrostane-3-yliden) butyric acid; (E)-3-[2-(azetidin-3-yl)ethyliden]-6alpha-hydroxyandrostane-17-one; (Z)-3-[2-(azetidin-3-yl)ethyliden]-6alpha-hydroxyandrostane-17-one; (E)-3-(4-aminobutyl)-6alpha-hydroxyandrost-2-ene-17-one hydroiodide; 3-[2-(piperidin-4-yl)ethyl]-6alpha-hydroxyandrost-2-ene-17-one hydroiodide; (EZ)-3-(4-aminobutyliden)-6alpha-hydroxyandrostane-17-one; (E)-3-[2-(piperidin-4-yl)ethyliden]-6alpha-hydroxyandrostane-17-one; (Z)-3-[2-(piperidin-4-yl)ethyliden]-6alpha-hydroxyandrostane-17-one; 3beta-[2-(piperidin-4-yl)ethyl]-6alpha-hydroxyandrostane-17-one; Ethyl (6alpha-hydroxy-17-ketoandrostane-3beta-yl) acetate; 4-(6alpha-hydroxy-17-oxoandrostane-3-yl) butyric acid; 4-(6beta-hydroxy-17-oxoandrostane-3-yl) butyric acid; 2-(6beta-hydroxy-17-oxoandrostane-3-yl) acetic acid; 4-(6alpha-hydroxy-17-oxoandrostane-3-yl) ethylbutiroate; 4-(6alpha-hydroxy-17-oxoandrostane-3-yl) ethylcaproate; 4-(6beta-hydroxy-17-oxoandrostane-3-yl) caproic acid; (EZ)-3-(5-N-methylaminopentyliden]-6alpha-hydroxymethylandrostane-7,17-dione; (EZ)-3-[2-(pirrolidin-3yl)ethyliden]-6alpha-hydroxymethylandrostane-7,17-dione; (EZ)-3-[2-(azetidin-2-yl)ethyliden]-6alpha-hydroxymethylandrostane-7,17-dione; (EZ)-3-[2-(piperidin-4-yl)ethyliden]-6alpha-hydroxymethylandrostane-7,17-dione; (EZ)-3-(5-N-methylaminopentyliden)-6alpha-hydroxymethyl-7alpha-hydroxyandrostane-17-one; 3beta-[2-(azetidin-2-yl)ethyl]-6alpha-hydroxymethylandrostane-7,17-dione; 3beta-[2-(azetidin-2-yl)ethyl]-6alpha-hydroxymethyl-7alpha-hydroxyandrostane-17-one; 3beta-[2-(pirrolidin-3yl)ethyl]-6alpha-hydroxymethylandrostane-7,17-dione; 3beta-[2-(pirrolidin-3yl)ethyl]6alpha-hydroxymethyl-7alpha-hydroxyandrostane-17-one; 3beta-[2-(piperidin-4-yl)ethyl]-6alpha-hydroxymethylandrostane-7,17-dione; and 3beta-[2-(piperidin-4-yl)ethyl]-6alpha-hydroxymethyl-7alpha-hydroxyandrostane-17-one.

A further object of the present invention are pharmaceutical compositions comprising one or more of the compounds of formula (I), optionally in combination with other therapeutically active ingredients. In turn, these pharmaceutical compositions may be formulated for oral administration, intravenous or intramuscular injection, inhalation, intravitreal injection, and the like. In particular embodiments, the pharmaceutical compositions disclosed herein are used in treating HF.

The above and other objects of the present invention will be now disclosed in detail also by means of examples and Figures.

DETAILED DESCRIPTION OF THE INVENTION

Figure 1:
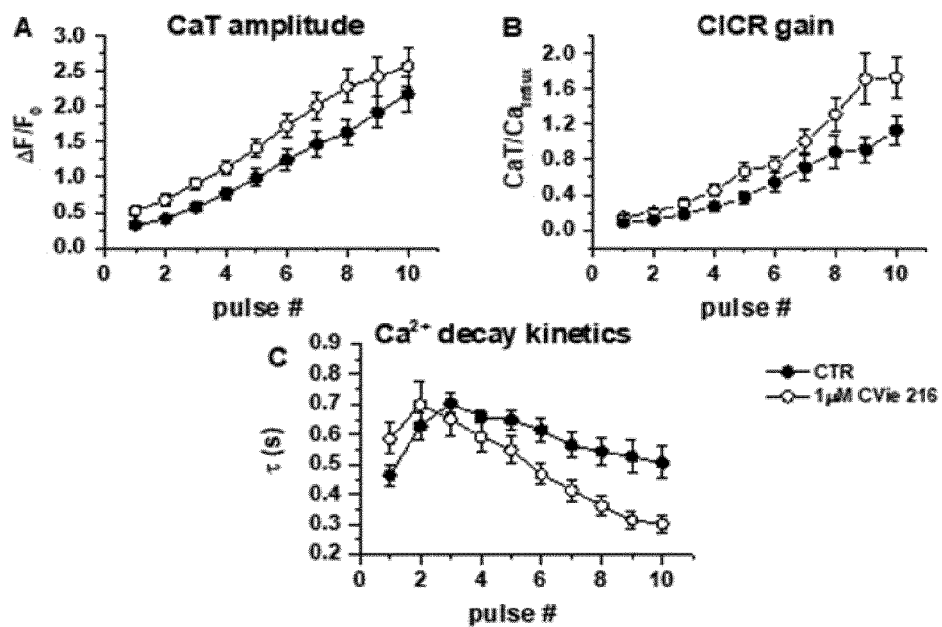
FIG. 1 shows the effects of 1 μM CVie216 on sarcoplasmic reticulum (SR) Ca$^{2+}$ uptake parameters in rat ventricular myocytes isolated from STZ rats (loading protocol). The SR Ca$^{2+}$ uptake parameters included Ca$^{2+}$ transient (CaT) amplitude (Panel A); Ca$^{2+}$-induced Ca$^{2+}$ release (CICR) gain (Panel B) and the time constant (τ) of Ca$^{2+}$ decay (Panel C). Differences between curves in control (N=16-18) and CVie216 (N=20-23) were statistically significant (p<0.05, two-way ANOVA) in panels A-C.

Disclosed herein are compositions and methods useful for the treatment of heart failure. In particular, provided herein are compositions comprising novel androstane derivatives. Further, there is one group of novel androstane derivatives described herein that activate SERCA2a, while only moderately inhibiting the $Na^+/K^+$ ATPase pump. This group of androstane derivatives, referred to as "predominantly pure" SERCA2a stimulators, have the general formula (I) with an amine-containing functional group at the C3 carbon. Another group of novel androstane derivatives described herein exhibit strong SERCA2a activation without any significant $Na^+/K^+$ ATPase pump inhibition. This group of androstane derivatives, referred to as "pure" SERCA2a stimulators, have the general formula (I) with a carboxylic acid/ester-containing functional group lined through a spacer at the C3 carbon. In other embodiments, the predominantly pure or pure SERCA2a stimulators of general formula (I) may include an alcohol-, sulphate-, or phosphate-containing functional group at the C3 carbon. As such, these compositions are endowed with positive lusitropic characteristics and can be used to selectively activate SERCA2a while avoiding the proarrhythmic effect of $Na^+/K^+$ ATPase pump inhibition. The compositions and methods disclosed herein will now be described in more detail below.

Definitions

Unless defined otherwise, all technical and scientific terms used herein have the same meaning as those commonly understood by one of ordinary skill in the art to which this invention belongs. Standard techniques are used unless otherwise specified. Although methods and materials similar or equivalent to those described herein can be used in the practice or testing of the present disclosure, suitable methods and materials are described below. The materials, methods and examples are illustrative only, and are not intended to be limiting. All publications, patents and other documents mentioned herein are incorporated by reference in their entirety.

As used herein, the singular forms "a," "an," and "the" include the plural referents unless the context clearly indicates otherwise.

The term "about" refers to the variation in the numerical value of a measurement, e.g., volume, time, pressure, concentration, etc., due to typical error rates of the device used to obtain that measure. In one embodiment, the term "about" means within 5% of the reported numerical value, preferably, the term "about" means within 3% of the reported numerical value.

The term "heart failure" refers to a clinical syndrome characterized by typical symptoms (e.g., breathlessness, ankle swelling and fatigue) that may be accompanied by signs (e.g., elevated jugular venous pressure, pulmonary crackles and peripheral edema) caused by a structural and/or functional cardiac abnormality, resulting in a reduced cardiac output and/or elevated intracardiac pressures at rest or during stress.

The terms "acute heart failure" or "AHF" are used interchangeably herein and refer generally to a rapid onset or worsening of symptoms and/or signs of HF requiring immediate treatment and hospitalization. The current definition of "acute heart failure" is rather nonspecific and may include a broad spectrum of conditions with several phenotypes characterized by different clinical presentation, etiology, precipitating factors, therapeutic approach, and prognosis. In addition, a large proportion of patients have a subacute course of the disease with a progressive worsening of signs and symptoms of HF which could develop days before hospital admission.

The terms "chronic heart failure" or "CHF" are used interchangeably herein and refer to the current clinical classification of chronic HF based on the presence of signs and symptoms of HF and left ventricular ejection fraction (LVEF), recognizing three categories: "heart failure with reduced ejection fraction" or "HFrEF," which is characterized by an LVEF of less than about 40%; "heart failure with mid-range ejection fraction" or "HFmEF" or "HFmrEF," which is characterized by an LVEF from about 40% to about 49%; and "heart failure with preserved ejection fraction" or "HFpEF," which is characterized by an LVEF of equal to or greater than about 50%. The terms "HFmrEF" and "HFpEF"

include two additional criteria; namely, increased natriuretic peptides levels (BNP>35 pg/ml and/or NT-proBNP>125 pg/mL) associated with the evidence of structural and/or functional heart disease (left ventricular hypertrophy and/or left atrium enlargement and/or evidence of diastolic dysfunction). The efficacy of HF evidence-based medications have been confirmed only in patients with "HFrEF," whereas in "HfpEF" no treatment demonstrated a significant improvement of outcomes.

The terms "metabolite" and "metabolic precursor" refer to compounds that have been transformed/modified by a metabolic reaction, but which substantially maintain or exhibit an increase in their pharmacological activity.

The term "treating" refers to any indicia of success in the treatment or amelioration of the disease or condition. Treating can include, for example, reducing or alleviating the severity of one or more symptoms of the disease or condition, or it can include reducing the frequency with which symptoms of a disease, defect, disorder, or adverse condition, and the like, are experienced by an individual, such as a human patient.

The term "preventing" refers to the prevention of the disease or condition, e.g., acute heart failure, in an individual, such as a human patient. For example, if an individual at risk of developing heart failure is treated with the methods of the present invention and does not later develop heart failure, then the disease has been prevented in that individual.

The term "treat or prevent" is sometimes used herein to refer to a method that results in some level of treatment or amelioration of the disease or condition, and contemplates a range of results directed to that end, including, but not restricted to, prevention of the condition entirely.

As used herein, the term "pharmaceutically acceptable carrier" means a chemical composition with which an active compound, such as an androstane derivative having the general formula (I) or a metabolite of thereof, may be combined and which, following the combination, can be used to administer the compound to a mammal.

As used herein, the term "pharmaceutically acceptable" salt, solvate, hydrate, or ester means a salt, solvate, hydrate, or ester form of the active ingredient which is compatible with any other ingredients of the pharmaceutical composition, which is not deleterious to the subject to which the composition is to be administered. The term "pharmaceutical acceptable salt" further refers to a salt form of a compound which retains the biological activity of the base compound and which is derived from a pharmacologically acceptable acid.

The term "parameter" as used herein to refer to measuring heart function means any heart function that is observable or measurable using suitable measuring techniques available in the art. A non-limiting list of exemplary "parameters" of heart function include calcium transient amplitude (CaT), calcium-induced calcium release (CICR), time constant of calcium decay, rate-dependency of action potential duration at 90% repolarization ($APD_{90}$), diastolic membrane potential ($E_{diast}$), maximum depolarization velocity ($dV/dt_{max}$), heart rate, blood pressure, diastolic relaxation, systolic contraction, left ventricular ejection fraction (LVEF), diastolic blood pressure, systolic blood pressure, cardiac output, stroke volume, contraction velocity (s'), early relaxation velocity (e'), late relaxation velocity (a'), index of left ventricular filling pressure (E/e'), deceleration time of E wave (DT), mitral deceleration index (DT/E), deceleration slope (E/DT), cardiac index, mitral inflow velocity, and the like. As one having ordinary skill in the art will appreciate, measuring one or more "parameters" of heart function can be used to detect heart dysfunction as compared to the average normal "parameters" and can also be used to determine whether heart function has improved following or during treatment.

The term "predominantly pure" as it relates to SERCA2a activation or stimulation refers to a compound, such as an androstane derivative, that has the ability to stimulate in a statistically significant way SERCA2a activity in a cell-free system (SR cardiac microsomes from guinea pig, dog, rat, etc.) while only moderately inhibiting the purified dog kidney Na+/K+ ATPase in the cell-free system (i.e., having an $IC_{50}$ greater than about 0.5 µM, preferably greater than about 1 µM).

The term "pure" as it relates to SERCA2a activation or stimulation refers to a compound, such as an androstane derivative, that has the ability to stimulate in a statistically significant way SERCA2a activity in a cell-free system (SR cardiac microsomes from guinea pig, dog, rat, etc.) without exhibiting significant inhibition of the Na+/K+ ATPase pump (i.e., having an $IC_{50}$ greater than about 100 µM).

The terms "therapeutically active" or "active" ingredient or compound refer to a substance that provides a beneficial effect to the individual to whom the substance is administered. A "therapeutically effective amount" or "therapeutically effective dose" is the amount of a composition or active ingredient sufficient to provide a beneficial effect to the individual to whom the composition or active ingredient is administered.

Androstane Derivatives with Predominantly Pure or Pure SERCA2a Stimulatory Activity The present invention is based on the discovery of androstane derivatives with predominantly pure or pure SERCA2a stimulatory activity. In other words, these are derivatives that exhibit stimulation of SERCA2a with only moderate or no $Na^+/K^+$ ATPase pump inhibition.

These novel androstane derivatives are functionalized at the C-3 carbon with a carbon linker bearing a variety of functional groups, such as amine-containing or carboxylic acid/ester-containing functional group. Further, these novel androstane derivatives are also functionalized at the C-6 and/or C-7 carbons, such as with a hydroxyl, hydroxymethyl, or ketone group. Preferably, each of the novel androstane derivatives suitable for use herein will have the general formula (I):

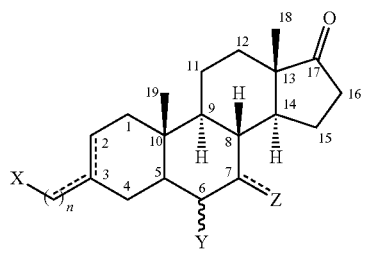

Wherein X is any one of a carboxylic acid, carboxylic ester and their bioisosters (sulfate, sulfonic acid, phosphate, phosphonate, or nitrogen-containing etherocyclic rings such as triazoles and tetrazoles), primary alcohol, ethers, or an amine group (e.g., primary amine, secondary amine, or cyclic amine);

the carbon linker at C6 will have one or more carbons represented by n, which is an integer between 1 and 5 (e.g., 1, 2, 3, 4, or 5);

the dashed line represents an optional double bond (C=C at C3-C1' or C2-C3) and C=O at C7;

the Y group at C6 is a hydroxyl (OH) in the alpha- or beta-configuration or a hydroxymethyl (CH$_2$OH) in the alpha-configuration; and the Z group at C7 could be either —H or —OH in an α-configuration or a ketone (C=O).

In certain embodiments, a predominantly pure SERCA2a stimulator may be desired. As such, the androstane derivatives suitable for use herein may include those having the general formula (I) wherein X is an amine functional group (e.g., primary amine, secondary amine, or cyclic amine). However, in some embodiments, it may be desirable to select a pure SERCA2a stimulator. As such, the androstane derivatives suitable for use may include those having the general formula (I), except that the X is not an amine function group (e.g., primary amine, secondary amine, or cyclic amine). In a preferred embodiment, the pure SERCA2a stimulator will have the general formula (I) with a carboxylic acid or a carboxylic ester at X.

It is preferable that the androstane derivatives disclosed herein contain an oxygen-containing functional group at either Z or Y or both.

Also suitable for use herein are the enantiomeric and/or diastereomeric mixtures of the compounds represented by general formula (I) as well as their pharmaceutically acceptable salts, solvates, and/or hydrates and their metabolite and/or metabolic precursors. Examples of metabolites or metabolic precursors include the hydroxylated, carboxylated, sulfonated, acetylated, glycosylated, glucuronated, methylated or demethylated, covalently linked to glutathione, glycine or other amino acids, oxidized or reduced derivatives of the compounds of formula (I). Moreover, some compounds of formula (I), especially esters, can also be prodrugs of the active forms. Examples of pharmaceutical acceptable salts include, but are not limited to, hydrochloric, hydrobromic, sulfuric, phosphoric, nitric, fumaric, succinic, oxalic, malic, tartaric, maleic, citric, methanesulfonic or benzoic acid and others commonly used in the art (see, for example, Pharmaceutical Salts and Co-crystals, Editors: Johan Wouters, Luc Quéré, RSC Publishing, 2011, the entire content of which is hereby incorporated by reference).

Where the compounds of formula (I) can exhibit tautomerism, the formula is intended to cover all tautomers, including, but not limited to, all the possible stereoisomers, Z and E isomers, optical isomers, enantiomers and their mixtures.

Particular androstane derivatives suitable for use herein include:

(E)-4-(6alpha-hydroxy-17-oxoandrostane-3-yliden) butyric acid (CVie201)

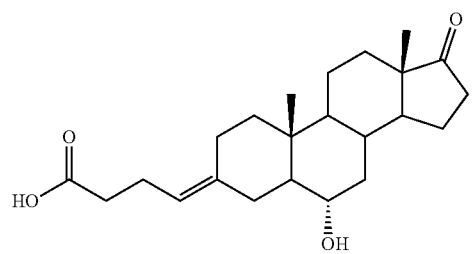 [SMILES: C[C@]12CC/C(=C\CCC(=O)O)CC1[C@@H](O)CC1C2CC[C@]2(C)C(=O)CCC12]

(Z)-4-(6alpha-hydroxy-17-oxoandrostane-3-yliden) butyric acid (CVie202)

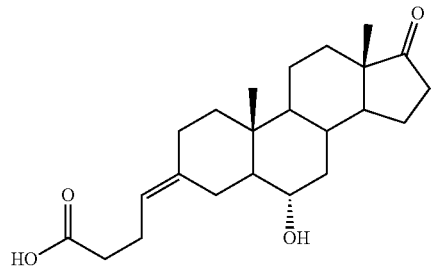 [SMILES: C[C@]12CC/C(=C/CCC(=O)O)CC1[C@@H](O)CC1C2CC[C@]2(C)C(=O)CCC12]

(E)-4-(6beta-hydroxy-17-oxoandrostane-3-yliden) butyric acid (CVie203)

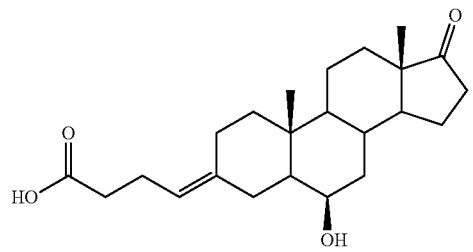 [SMILES: C[C@]12CC/C(=C\CCC(=O)O)CC1[C@H](O)CC1C2CC[C@]2(C)C(=O)CCC12]

(Z)-4-(6beta-hydroxy-17-oxoandrostane-3-yliden) butyric acid (CVie204)

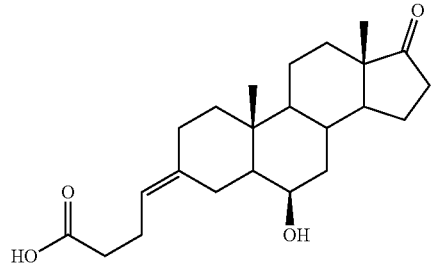 [SMILES: C[C@]12CC/C(=C/CCC(=O)O)CC1[C@H](O)CC1C2CC[C@]2(C)C(=O)CCC12]

(E)-3-[2-(azetidin-3-yl)ethyliden]-6alpha-hydroxy-androstane-17-one (CVie205)

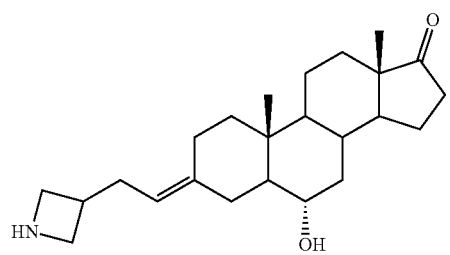 [SMILES: C[C@]12CC/C(=C\CC3CNC3)CC1[C@@H](O)CC1C2CC[C@]2(C)C(=O)CCC12]

13

(Z)-3-[2-(azetidin-3-yl)ethyliden]-6alpha-hydroxy-
androstane-17-one (CVie206)

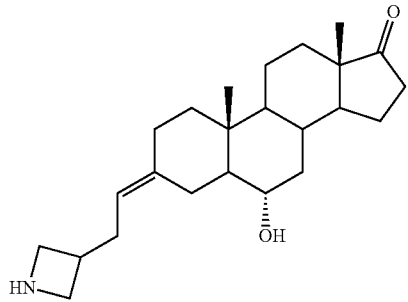 [SMILES: C[C@]12CC/C(=C/CC3CNC3)CC1[C@@H](O)CC1C2CC[C@]2(C)C(=O)CCC12]

(E)-3-(4-aminobutyl)-6alpha-hydroxyandrost-2-ene-
17-one hydroiodide (CVie207)

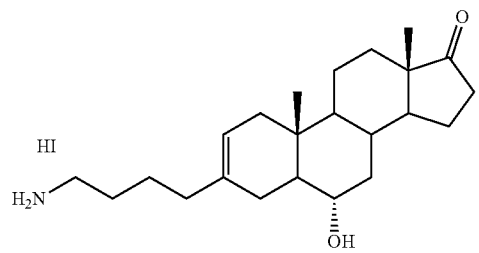

3-[2-(piperidin-4-yl)ethyl]-6alpha-hydroxyandrost-2-
ene-17-one hydroiodide (CVie208)

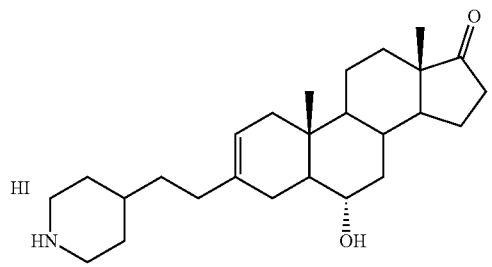

(EZ)-3-(4-aminobutyliden]-6alpha-hydroxyandros-
tane-17-one (CVie209)

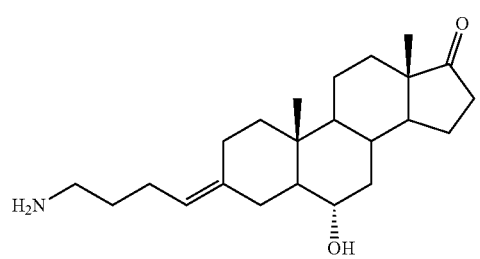 [SMILES: C[C@]12CC/C(=C\CCCN)CC1[C@@H](O)CC1C2CC[C@]2(C)C(=O)CCC12]

14

(E)-3-[2-(piperidin-4-yl)ethyliden]-6alpha-hydroxy-
androstane-17-one (CVie210)

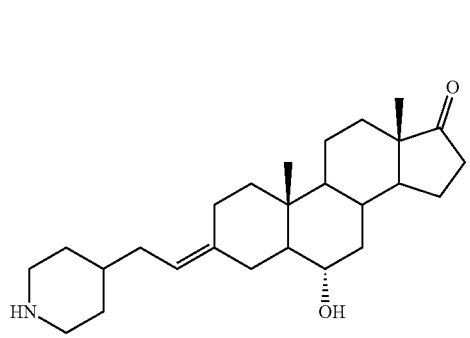 [SMILES: C[C@]12CC/C(=C\CC3CCNCC3)CC1[C@@H](O)CC1C2CC[C@]2(C)C(=O)CCC12]

(Z)-3-[2-(piperidin-4-yl)ethyliden]-6alpha-hydroxy-
androstane-17-one (CVie211)

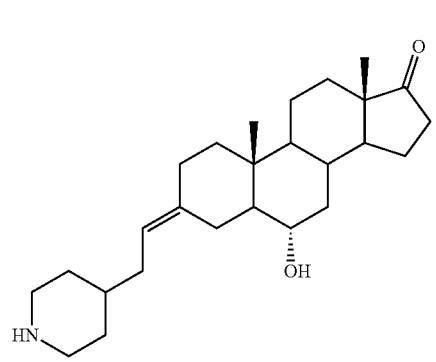 [SMILES: C[C@]12CC/C(=C/CC3CCNCC3)CC1[C@@H](O)CC1C2CC[C@]2(C)C(=O)CCC12]

3beta-[2-(piperidin-4-yl)ethyl]-6alpha-hydroxyan-
drostane-17-one (CVie212)

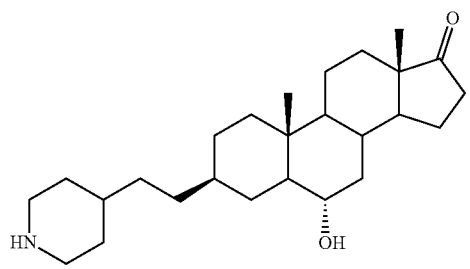 [SMILES: C[C@]12CC[C@H](CCC3CCNCC3)CC1[C@@H](O)CC1C2CC[C@]2(C)C(=O)CCC12]

15

Ethyl (6alpha-hydroxy-17-ketoandrostane-3beta-yl) acetate (CVie213)

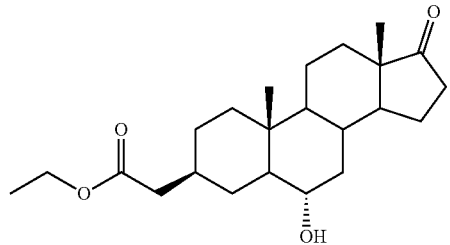 [SMILES: CCOC(=O)C[C@H]1CC[C@]2(C)C3CC[C@]4(C)C(=O)CCC4C3C[C@H](O)C2C1]

4-(6alpha-hydroxy-17-oxoandrostane-3-yl) butyric acid (CVie214)

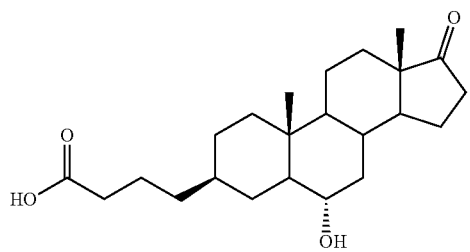 [SMILES: C[C@]12CC[C@H](CCCC(=O)O)CC1[C@@H](O)CC1C2CC[C@]2(C)C(=O)CCC12]

4-(6beta-hydroxy-17-oxoandrostane-3-yl) butyric acid (CVie215)

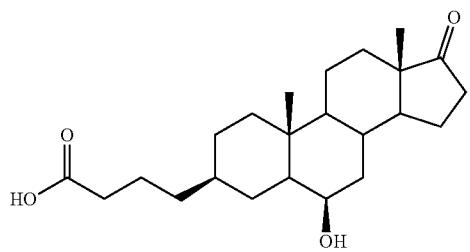 [SMILES: C[C@]12CC[C@H](CCCC(=O)O)CC1[C@H](O)CC1C2CC[C@]2(C)C(=O)CCC12]

2-(6beta-hydroxy-17-oxoandrostane-3-yl) acetic acid (CVie216)

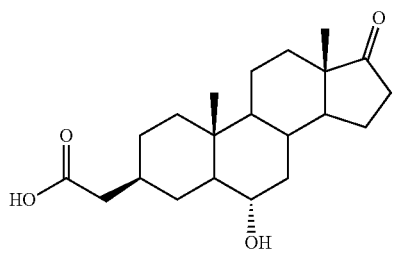 [SMILES: C[C@]12CC[C@H](CC(=O)O)CC1[C@@H](O)CC1C2CC[C@]2(C)C(=O)CCC12]

16

4-(6alpha-hydroxy-17-oxoandrostane-3-yl) ethylbutiroate (CVie217)

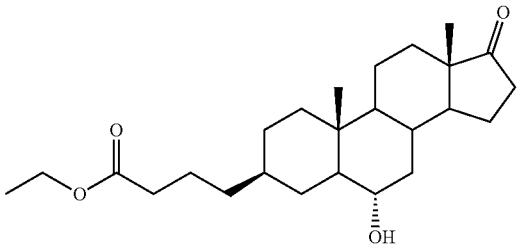 [SMILES: CCOC(=O)CCC[C@H]1CC[C@]2(C)C3CC[C@]4(C)C(=O)CCC4C3C[C@H](O)C2C1]

4-(6alpha-hydroxy-17-oxoandrostane-3-yl) ethylcaproate (CVie218)

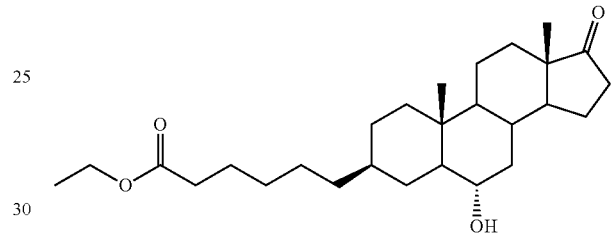

4-(6beta-hydroxy-17-oxoandrostane-3-yl) caproic acid (CVie219)

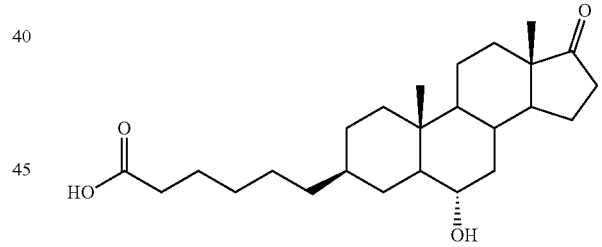 [SMILES: CCOC(=O)CCCCC[C@H]1CC[C@]2(C)C3CC[C@]4(C)C(=O)CCC4C3C[C@H](O)C2C1]

(E,Z)-3-(5-N-methylaminopentyliden]-6alpha-hydroxymethylandrostane-7,17-dione (CVie401)

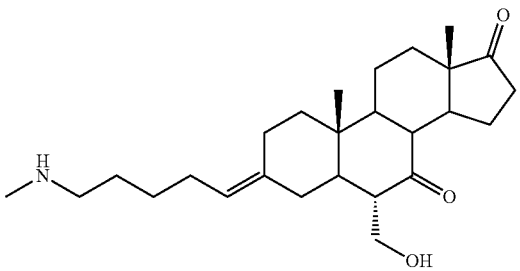 [SMILES: CNCCCC/C=C1\CC[C@]2(C)C3CC[C@]4(C)C(=O)CCC4C3C(=O)[C@H](CO)C2C1]

17

(E,Z)-3-[2-(pirrolidin-3yl)ethyliden]-6alpha-hydroxymethylandrostane-7,17-dione (CVie402)

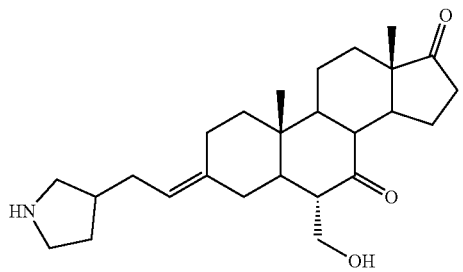 [SMILES: C[C@]12CC/C(=C\CC3CCNC3)CC1[C@@H](CO)C(=O)C1C2CC[C@]2(C)C(=O)CCC12]

(E,Z)-3-[2-(azetidin-2-yl)ethyliden]-6alpha-hydroxymethylandrostane-7,17-dione (CVie403)

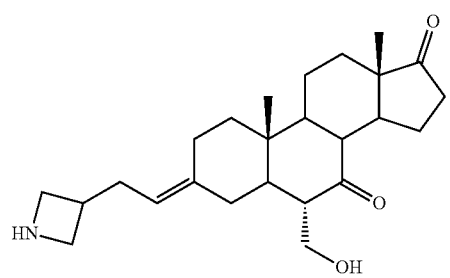 [SMILES: C[C@]12CC/C(=C\CC3CNC3)CC1[C@@H](CO)C(=O)C1C2CC[C@]2(C)C(=O)CCC12]

(E,Z)-3-[2-(piperidin-4-yl)ethyliden]-6alpha-hydroxymethylandrostane-7,17-dione (CVie405)

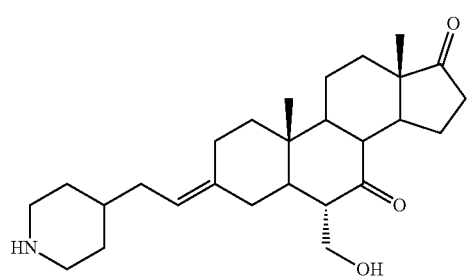 [SMILES: C[C@]12CC/C(=C\CC3CCNCC3)CC1[C@@H](CO)C(=O)C1C2CC[C@]2(C)C(=O)CCC12]

18

(E,Z)-3-(5-N-methylaminopentyliden)-6alpha-hydroxymethyl-7alpha-hydroxyandrostane-17-one (CVie406)

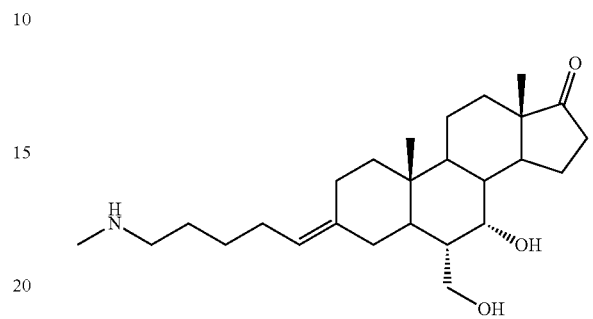

3beta-[2-(azetidin-2-yl)ethyl]-6alpha-hydroxymethylandrostane-7,17-dione (CVie407)

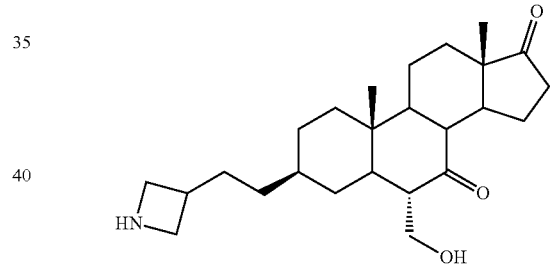

3beta-[2-(azetidin-2-yl)ethyl]-6alpha-hydroxymethyl-7alpha-hydroxyandrostane-17-one (CVie408)

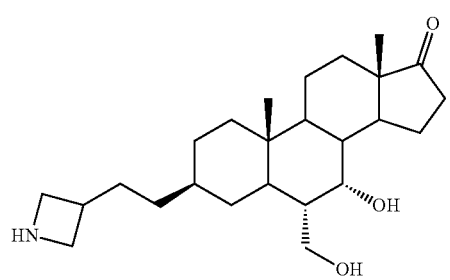 [SMILES: C[C@]12CC[C@H](CCC3CNC3)CC1[C@@H](CO)C(=O)C1C2CC[C@]2(C)C(=O)CCC12]

3beta-[2-(pirrolidin-3yl)ethyl]-6alpha-hydroxymethylandrostane-7,17-dione (CVie409)

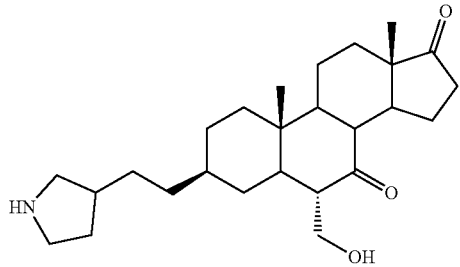 [SMILES: C[C@]12CC[C@H](CCC3CCNC3)CC1[C@@H](CO)C(=O)C1C2CC[C@]2(C)C(=O)CCC12]

3beta-[2-(pirrolidin-3yl)ethyl]6alpha-hydroxymethyl-7alpha-hydroxyandrostane-17-one (CVie410)

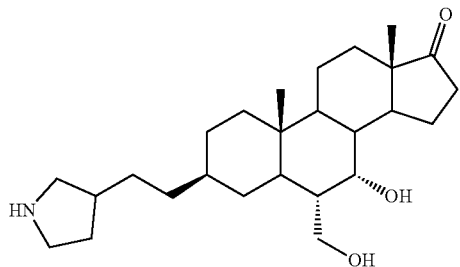 [SMILES: C[C@]12CC[C@H](CCC3CCNC3)CC1[C@@H](CO)[C@@H](O)C1C2CC[C@]2(C)C(=O)CCC12]

3beta-[2-(piperidin-4-yl)ethyl]-6alpha-hydroxymethylandrostane-7,17-dione (CVie411)

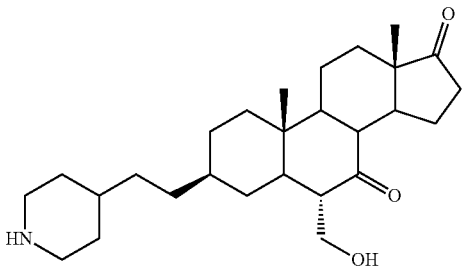 [SMILES: C[C@]12CC[C@H](CCC3CCNCC3)CC1[C@@H](CO)C(=O)C1C2CC[C@]2(C)C(=O)CCC12]

3beta-[2-(piperidin-4-yl)ethyl]-6alpha-hydroxymethyl-7alpha-hydroxyandrostane-17-one (CVie412)

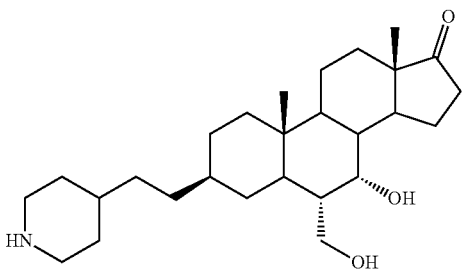 [SMILES: C[C@]12CC[C@H](CCC3CCNCC3)CC1[C@@H](CO)[C@@H](O)C1C2CC[C@]2(C)C(=O)CCC12]

It is also an object of the present invention to utilize the SERCA2a-activation properties of the compound of formula (I) for treating, ameliorating, reversing, or abating or diminishing the symptoms of, or preventing diseases associated with diminished SERCA2a activation, such as heart failure (AHF and/or CHF). Because defective intracellular $Ca^{2+}$ distribution has a role in the myocardial remodeling process, its correction by SERCA2a stimulation may counter it. Thus, evolution of an initial and compensated derangement in contractility to overt heart failure may be prevented.

As mentioned above, the androstane derivatives disclosed herein act as pure or predominantly pure SERCA2a activators. As shown in the examples below, these compounds exhibit SERCA2a activation. The pure SERCA2a activators, such as CVie201-204 and CVie213-219 do not significantly inhibit $Na^+/K^+$ ATPase. For instance, these compounds displayed $IC_{50}$ values of greater than 100 μM on isolated canine renal $Na^+/K^+$ ATPase (see Example 3). On the other hand, the predominantly pure SERCA2a activators, such as CVie205-212 and CVie401-412, only moderately inhibit $Na^+/K^+$ ATPase. For instance, these compounds display $IC_{50}$ values of at least 0.8 μM on isolated canine renal $Na^+/K^+$ ATPase; preferably, they will have $IC_{50}$ values of at least 1 μM on isolated canine renal $Na^+/K^+$ ATPase (Example 3). Moreover, the predominantly pure SERCA2a activators exhibit about 6-fold to about 170-fold less $Na^+/K^+$ ATPase inhibition as compared to istaroxime.

In some embodiments, the predominantly pure and pure SERCA2a activators can be differentiated by their respective functional groups attached to the C3 carbon linker (i.e., X in formula (I)). In some embodiments, the pure SERCA2a activators will have a carboxylic acid or a carboxylic ester at the C3 carbon linker. In other embodiments, the predominantly pure SERCA2a activators will have an amine functional group (e.g., primary amine, secondary amine, or cyclic amine) at the C3 carbon linker.

The pure or predominantly pure SERCA2a activator compounds provided herein can be used to treat heart failure. This ability to activate SERCA2a without significantly inhibiting the $Na^+/K^+$ ATPase allows these compounds to provide a lusitropic effect on the heart to improve heart function without increasing the risk of arrhythmias or cardiomyocyte damage associated with $Na^+/K^+$ ATPase inhibition. As such, these compounds can be used as a medicament for the treatment of heart failure (acute or chronic) and in methods of treatment or prevention of heart failure. As such, they can be included in pharmaceutical compositions formulated for different routes of administration using synthesis and formulation techniques well within the purview of one having ordinary skill in the art. The pharmaceutical compositions and methods of therapeutic treatment utilizing the pure or predominantly pure SERCA2a activators disclosed herein will now be discussed in further detail.

Pharmaceutical Compositions

The compounds of formula (I) as therapeutic agents can be administered alone or as a component of a pharmaceutical formulation (composition). As such, disclosed herein is a pharmaceutical composition comprising the compound of formula (I), or any of the particular derivatives disclosed herein, in an admixture with at least one pharmaceutically acceptable vehicle and/or excipient. The pharmaceutical composition may be formulated for administering to an individual parenterally, topically, subcutaneously, intramuscularly, orally or by local administration, such as by aerosol or transdermally. In a particular embodiment, the route of administration is oral.

The pharmaceutical compositions can be formulated in any way and can be administered in a variety of unit dosage forms depending upon the condition or disease and the degree of illness, the general medical condition of each patient, the resulting preferred method of administration and the like. Details on techniques for formulation and administration are well described in the scientific and patent literature, see, e.g., the latest edition of Remington's Pharmaceutical Sciences, Mack Publishing Co, Easton PA.

The compounds may be formulated for administration in any convenient way for use in human or veterinary medicine. Wetting agents, emulsifiers, and lubricants, such as sodium lauryl sulfate and magnesium stearate, as well as coloring agents, release agents, coating agents, sweetening, flavoring and perfuming agents, buffers, preservatives, and antioxidants can also be present in the compositions.

Formulations of the compositions according to the present invention include those suitable for oral, nasal, topical, parenteral—for example by intramuscular or intravenous injection—rectal, subcutaneous, and/or intravaginal administration. The formulations may conveniently be presented in unit dosage form and may be prepared by any methods well known in the art of pharmacy. The amount of active ingredient which can be combined with a carrier material to produce a single dosage form will vary depending upon the subject being treated and/or the particular mode of administration. The amount of active ingredient which can be combined with a carrier material to produce a single dosage form will generally be that amount of the compound which produces a therapeutic effect.

Pharmaceutical formulations as provided herein can be prepared according to any method known to the art for the manufacture of pharmaceuticals. Such formulations can contain sweetening agents, flavoring agents, coloring agents, and preserving agents. A formulation can be admixed with nontoxic pharmaceutically acceptable excipients which are suitable for manufacture. Formulations may comprise one or more diluents, emulsifiers, preservatives, buffers, excipients, etc. and may be provided in such forms as liquids, powders, emulsions, lyophilized powders, sprays, creams, lotions, controlled release formulations, tablets, pills, gels, on patches, in implants, etc.

Pharmaceutical formulations for oral administration can be formulated using pharmaceutically acceptable carriers well known in the art in appropriate and suitable dosages. Such carriers enable the pharmaceuticals to be formulated in unit dosage forms as tablets, gel tabs, pills, powder, dragees, capsules, liquids, lozenges, gels, syrups, slurries, suspensions, etc., suitable for ingestion by the patient. Pharmaceutical preparations for oral use can be formulated as a solid excipient, optionally grinding a resulting mixture, and processing the mixture of granules after adding suitable additional compounds, if desired, to obtain tablets or dragee cores. Suitable solid excipients are carbohydrate or protein fillers include, e.g., sugars, including lactose, sucrose, mannitol, or sorbitol; starch from corn, wheat, rice, potato, or other plants; cellulose, such as methyl cellulose, hydroxypropylmethyl-cellulose, or sodium carboxymethylcellulose; gums, including arabic and tragacanth; and proteins, such as gelatin and collagen. Disintegrating or solubilizing agents may be added, such as the cross-linked polyvinyl pyrrolidone, agar, alginic acid, or a salt thereof (e.g., sodium alginate).

Dragee cores are provided with suitable coatings, such as concentrated sugar solutions, which may also contain gum arabic, talc, polyvinylpyrrolidone, carbopol gel, polyethylene glycol, titanium dioxide, lacquer solutions, and/or suitable organic solvents or solvent mixtures. Dyestuffs or pigments may be added to the tablets or dragee coatings for product identification or to characterize the quantity of active compound (i.e., dosage). Pharmaceutical preparations used to practice the uses and methods as provided herein can also be used orally using, e.g., push-fit capsules made of gelatin, as well as soft, sealed capsules made of gelatin and a coating such as glycerol or sorbitol. Push-fit capsules can contain active agents mixed with a filler or binders such as lactose or starches, lubricants such as talc or magnesium stearate, and, optionally, stabilizers. In soft capsules, the active agents can be dissolved or suspended in suitable liquids, such as fatty oils, liquid paraffin, or liquid polyethylene glycol with or without stabilizers.

Aqueous suspensions can contain an active agent (e.g., a composition used to practice the uses and methods as provided herein) in admixture with excipients suitable for the manufacture of aqueous suspensions. Such excipients include a suspending agent, such as sodium carboxymethylcellulose, methylcellulose, hydroxypropyl-methylcellulose, sodium alginate, polyvinylpyrrolidone, gum tragacanth and gum acacia; and dispersing or wetting agents such as a naturally occurring phosphatide (e.g., lecithin), a condensation product of an alkylene oxide with a fatty acid (e.g., polyoxyethylene stearate), a condensation product of ethylene oxide with a long chain aliphatic alcohol (e.g., heptadecaethylene oxycetanol), a condensation product of ethylene oxide with a partial ester derived from a fatty acid and a hexitol (e.g., polyoxyethylene sorbitol mono-oleate), or a condensation product of ethylene oxide with a partial ester derived from fatty acid and a hexitol anhydride (e.g., polyoxyethylene sorbitan mono-oleate). The aqueous suspension can also contain one or more preservatives such as ethyl or n-propyl p-hydroxybenzoate, one or more coloring agents, one or more flavoring agents, and one or more sweetening agents, such as sucrose, aspartame or saccharin, or erythritol, or rebaudioside A. Formulations can be adjusted for osmolarity.

Oil-based pharmaceuticals are particularly useful for administering hydrophobic active agents suitable in the uses and methods as provided herein. Oil-based suspensions can be formulated by suspending an active agent in a vegetable oil, such as *arachis* oil, olive oil, sesame oil or coconut oil, or in a mineral oil such as liquid paraffin; or a mixture of these. See, e.g., U.S. Pat. No. 5,716,928 describing using essential oils or essential oil components for increasing bioavailability and reducing inter- and intra-individual variability of orally administered hydrophobic pharmaceutical compounds; see also U.S. Pat. No. 5,858,401. The oil suspensions can contain a thickening agent, such as beeswax, hard paraffin, or cetyl alcohol. Sweetening agents can be added to provide a palatable oral preparation, such as glycerol, sorbitol or sucrose, erythritol, or rebaudioside A. These formulations can be preserved by the addition of an antioxidant, such as ascorbic acid. As an example of an injectable oil vehicle, see Minto J., Pharmacol. Exp. Ther. 1997, 281:93-102. The pharmaceutical formulations as provided herein can also be in the form of oil-in-water emulsions. The oily phase can be a vegetable oil or a mineral oil, as described above, or a mixture of these. Suitable emulsifying agents include naturally-occurring gums, such as gum acacia and gum tragacanth; naturally occurring phosphatides, such as soybean lecithin; esters; or partial esters derived from fatty acids and hexitol anhydrides, such as sorbitan mono-oleate, and condensation products of these partial esters with ethylene oxide, such as polyoxyethylene sorbitan mono-oleate. The emulsion can also contain sweetening agents and flavoring agents, as in the formulation of syrups and elixirs. Such formulations can also contain a demulcent, a preservative, or a coloring agent.

According to the present invention, the pharmaceutical compounds can also be administered by intranasal, intraocular and intravaginal routes including suppositories, insufflation, powders and aerosol formulations (for examples of steroid inhalants, see Rohatagi, J. Clin. Pharmacol. 1995, 35:1187-1193; Tjwa, Ann. Allergy Asthma Immunol. 1995, 75:107-111, the contents of each of which are incorporated herein by reference in their entireties). Suppositories formulations can be prepared by mixing the drug with a suitable non-irritating excipient which is solid at ordinary temperatures but liquid at body temperatures and will therefore melt in the body to release the drug. Such materials are cocoa butter and polyethylene glycols.

According to the present invention, the pharmaceutical compounds can be delivered by transdermally, by a topical route, formulated as applicator sticks, solutions, suspensions, emulsions, gels, creams, ointments, pastes, jellies, paints, powders, and aerosols.

According to the present invention, the pharmaceutical compounds of formula (I) can be delivered by inhalation; for example, in alternative embodiments the compounds of formula (I) for inhalation are prepared for dry dispersal, for example, by spray drying a solution containing the active ingredient, i.e. the compound of formula (I), e.g., using methods as described in U.S. Pat. Nos. 6,509,006; 6,592,904; 7,097,827; and 6,358,530, the contents of each of which are incorporated herein by reference in their entireties. Exemplary dry powder excipients include a low molecular weight carbohydrates or polypeptides to be mixed with the compound of formula (I) to aid in dispersal. In alternative embodiments, types of pharmaceutical excipients that are useful as carriers for dry powder dispersal include stabilizers such as human serum albumin (HSA), that is also a useful dispersing agent, bulking agents such as carbohydrates, amino acids and polypeptides; pH adjusters or buffers; salts such as sodium chloride; and the like. These carriers may be in a crystalline or amorphous form or may be a mixture of the two. Devices that can be used to deliver powder or aerosol formulations include those as described e.g., in U.S. Pat. Nos. 5,605,674 and 7,097,827.

According to the present invention, the pharmaceutical compounds can also be delivered as nanoparticles or microspheres for slow release in the body. For example, nanoparticles or microspheres can be administered via intradermal or subcutaneous injection of drug which slowly release subcutaneously; see Rao J., Biomater, Sci. Polym. Ed. 1995, 7:623-645; as biodegradable and injectable gel formulations, see, e.g., Gao, Pharm. Res. 1995, 12:857-863; or, as microspheres for oral administration, see, e.g., Eyles, J. Pharm. Pharmacol. 1997, 49:669-674, the entire contents of each of which are incorporated herein by reference in their entireties.

According to the present invention, the pharmaceutical compounds of formula (I) can be parenterally administered, such as by intramuscular (IM) or intravenous (IV) administration or administration into a body cavity or lumen of an organ. These formulations can comprise a solution of active agent dissolved in a pharmaceutically acceptable carrier. Acceptable vehicles and solvents that can be employed are water, dextrose in water, and Ringer's solution, which is an isotonic sodium chloride. In addition, sterile fixed oils can be employed as a solvent or suspending medium. For this purpose, any bland fixed oil can be employed including synthetic mono- or diglycerides. In addition, fatty acids such as oleic acid can likewise be used in the preparation of injectables. These solutions are sterile and generally free of undesirable matter. These formulations may be sterilized by conventional, well known sterilization techniques. The formulations may contain pharmaceutically acceptable auxiliary substances as required to approximate physiological conditions such as pH adjusting and buffering agents, toxicity adjusting agents, e.g., sodium acetate, sodium chloride, potassium chloride, calcium chloride, sodium lactate, and the like. The concentration of active agent in these formulations can vary widely, and will be selected primarily based on fluid volumes, viscosities, body weight, and the like, in accordance with the particular mode of administration selected and the patient's needs. For IV administration, the formulation can be a sterile injectable preparation, such as a sterile injectable aqueous or oleaginous suspension. This suspension can be formulated using those suitable dispersing or wetting agents and suspending agents. The sterile injectable preparation can also be a suspension in a nontoxic parenterally-acceptable diluent or solvent, such as a solution of 1,3-butanediol. The administration can be by bolus or continuous infusion (e.g., substantially uninterrupted introduction into a blood vessel for a specified period of time).

The pharmaceutical compounds and formulations as provided herein can be lyophilized. Provided are a stable lyophilized formulation comprising a composition as provided herein, which can be made by lyophilizing a solution comprising a pharmaceutical as provided herein and a bulking agent, e.g., mannitol, trehalose, raffinose, and sucrose or mixtures thereof. There are many other conventional lyophilizing agents. Among the sugars, lactose is the most common. Also used are citric acid, sodium carbonate, EDTA, benzyl alcohol, glycine, sodium chloride, etc. (see, for example, Journal of Excipients and Food Chemistry Vol. 1, Issue 1 (2010) pp 41-54; U.S. patent app. pub. no. 20040028670).

Methods of Treatment

According to the present invention, the compounds of formula (I) as provided herein can be for use for prophylactic and/or therapeutic treatments. In therapeutic applications, the pharmaceutical compositions are administered to a subject already suffering from a condition or disease in a therapeutically effective amount. In other embodiments, the pharmaceutical compositions provided herein are administered in an amount sufficient to treat, prevent, or ameliorate the condition or disease in an individual in need thereof. The dosage schedule and amounts effective for this use, i.e., the "dosing regimen," will depend upon a variety of factors, including the stage of the disease or condition, the severity of the disease or condition, the general state of the patient's health, the patient's physical status, age, and the like. In calculating the dosage regimen for a patient, the mode of administration also is taken into consideration.

In particular embodiments, the compounds of formula (I) are for use for the treatment of an individual with heart failure. In preferred embodiments, the individual exhibits symptoms of, or has been diagnosed with, acute heart failure. While the individual can be a non-human animal, in a preferred embodiment, the individual is a human patient, such as a human patient suffering from heart failure. In other embodiments, the compounds provided herein are for use for the stimulation of SERCA2a in an individual.

In general, the compounds of formula (I) and pharmaceutical compositions described herein can be for use for the treatment of heart failure or acute heart failure. A method of therapy includes providing or presenting the individual having heart failure or acute heart failure. In some cases, a measuring step is first carried out to determine the baseline heart function of the individual. The measuring step may include measuring one or more parameters of heart function, such as, but not limited to, heart rate, blood pressure, diastolic relaxation, systolic contraction, left ventricular ejection fraction (LVEF), diastolic blood pressure, systolic blood pressure, cardiac output, stroke volume, deceleration slope (E/DT), contraction velocity (s'), early relaxation velocity (e'), late relaxation velocity (a'), index of left ventricular filling pressure (E/e'), E/Ea or E/A ratios, Ea ratio, deceleration time of E wave (DT), mitral deceleration index (DT/E), deceleration slope (E/DT), cardiac index, mitral inflow velocity, and the like. In an individual with heart failure or impaired heart function, the measured parameters may include one or more of decreased heart rate, decreased heart pressure, decreased systolic and/or diastolic blood pressure, reduced left ventricular end-diastolic/systolic volume and function (LVEF), or increased E/Ea or E/A ratios reduced Ea ratio decreased stroke volume. The measuring step can also be used to determine the effectiveness of the administration of the pharmaceutical compositions (i.e., restoration or partial restoration of heart function) and/or to monitor the individual's condition during treatment. As such, the measuring step can be performed prior to, during, or subsequent to the administering of the pharmaceutical composition. As one having ordinary skill in the art will appreciate, any suitable measuring technique available in the art at the time of the measuring step is suitable for use herein, and it is well within the purview of such skilled artisan to select an appropriate measuring technique corresponding to the parameter of interest. A non-limiting list of suitable measuring equipment/techniques includes blood test, echocardiography (including tissue doppler imaging), cardiac catheterization, nuclear stress test, CAT scan, radionuclide ventriculography scan, stethoscope, sphygmomanometer, and the like. For instance, the diastolic relaxation can be measured by echocardiography or PCWP.

The methods disclosed herein also include administering to the individual a therapeutically effective amount of a compound of general formula (I). In preferred embodiments, the compound is in a pharmaceutical composition, such as any one of the combinations discussed above. The compound is administered in a therapeutically effective dose as disclosed elsewhere herein, e.g., between about 1 mg/kg and about 20 mg/kg. In a more preferred embodiment, the route of administration is oral. The measuring step can be performed before, during, or after the administering step. For instance, it may be desired to continually monitor one or more of the parameters of heart function during treatment and for a period of time thereafter.

The dosage regimen also takes into consideration pharmacokinetics parameters well known in the art, i.e., the active agents' rate of absorption, bioavailability, metabolism, clearance, and the like (see, e.g., Hidalgo-Aragones (1996) J. Steroid Biochem. Mol. Biol. 58:611-617; Groning (1996) Pharmazie 51:337-341; Fotherby (1996) Contraception 54:59-69; Johnson (1995) J. Pharm. Sci. 84:1144-1146; Rohatagi (1995) Pharmazie 50:610-613; Brophy (1983) Eur. J. Clin. Pharmacol. 24:103-108; the latest Remington's, supra). The state of the art allows the clinician to determine the dosage regimen for each individual patient, active agent and disease or condition treated. Guidelines provided for similar compositions used as pharmaceuticals can be used as guidance to determine the dosage regimen, i.e., dose schedule and dosage levels, administered practicing the methods as provided herein are correct and appropriate.

Single or multiple administrations of formulations can be given depending on the dosage and frequency as required and tolerated by the patient. The formulations should provide a sufficient quantity of active agent to effectively treat, prevent, or ameliorate a conditions, diseases or symptoms as described herein. For example, an exemplary pharmaceutical formulation for oral administration of compositions used to practice the methods and uses as provided herein can be in a daily amount of between about 1 to about 20, 50, 100 or 1000 or more pg/kg of body weight per day or an equivalent of a pharmaceutically acceptable salt, solvate or hydrate thereof.

In alternative embodiments, an effective amount of a compound of formula (I) or an equivalent of a pharmaceutically acceptable salt, solvate or hydrate thereof, administered to an individual in need thereof comprises use of various dosaging schedules, e.g.: A) in case of AHFS, to rescue hospitalized patient, a compound of formula (I) can be administered by intravenous infusion over 12 h, 24 h, 48 h, 72 h, or more, and at doses ranging from 0.1 to 0.5 to about 10, 50 or 100 or more pg/kg of body weight per minute; B) in patients rescued from AHFS and discharged from the hospital, the dosage schedule for the maintenance of the therapeutic effect can be in the daily amount of between 1, 10, 50 or 100 or 1000 or more pg/kg of body weight.

The compounds of formula (I) useful for practicing the invention may be administered to deliver a dose of between 1 ng/kg and 50 mg/kg body weight as a single bolus, or an oral or intravenous dose of between 1 µg and about 20 mg, or in a repeated regimen, or a combination thereof as readily determined by the skilled artisan. In certain embodiments, the dosage comprises at least 0.05 mg/kg, 0.1 mg/kg, or at least 0.2 mg/kg, or at least 0.3 mg/kg, or at least 0.4 mg/kg, or at least 0.5 mg/kg, or at least 0.6 mg/kg, or at least 0.7 mg/kg, or at least 0.8 mg/kg, or at least 0.9 mg/kg, or at least 1 mg/kg, or at least 2 mg/kg, or at least 3 mg/kg, or at least 4 mg/kg, or at least 5 mg/kg, or at least 6 mg/kg, or at least 7 mg/kg, or at least 8 mg/kg, or at least 9 mg/kg, or at least 10 mg/kg, or at least 15 mg/kg, or at least 20 mg/kg, or at least 25 mg/kg, or at least 30 mg/kg, or at least 35 mg/kg, or at least 40 mg/kg, or at least 45 mg/kg, or at least 50 mg/kg, on a daily basis or on another suitable periodic regimen.

In one embodiment, the invention envisions intravenous or subcutaneous administration of a compound of general formula (I), as described herein, at a therapeutically effective dose that is between about 0.125 mg/kg and about 10 mg/kg, e.g., 0.125 mg/kg, 0.25 mg/kg, 0.5 mg/kg, 0.75 mg/kg, 1 mg/kg, 1.25 mg/kg, 1.5 mg/kg, 1.75 mg/kg, 2 mg/kg, 2.25 mg/kg, 2.5 mg/kg, 2.75 mg/kg, 3 mg/kg, 3.25 mg/kg, 3.5 mg/kg, 3.75 mg/kg, 4 mg/kg, 4.25 mg/kg, 4.5 mg/kg, 4.75 mg/kg, 5 mg/kg, 5.25 mg/kg, 5.5 mg/kg, 5.75 mg/kg, 6 mg/kg, 6.25 mg/kg, 6.5 mg/kg, 6.75 mg/kg, 7 mg/kg, 7.25 mg/kg, 7.5 mg/kg, 7.75 mg/kg, 8 mg/kg, 8.25 mg/kg, 8.5 mg/kg, 8.75 mg/kg, 9 mg/kg, 9.25 mg/kg, 9.5 mg/kg, 9.75 mg/kg, or 10 mg/kg. In a preferred embodiment, the compound is administered via intravenous or subcutaneous delivery (e.g., injection or infusion) at a therapeutically effective dose that is between about 0.25 mg/kg and about 5 mg/kg. In another embodiment, the therapeutically effective dose is between about 0.5 mg/kg and about 5 mg/kg. In yet another embodiment, the therapeutically effective dose is between about 0.5 mg/kg and 4 mg/kg or between about 0.5 mg/kg and about 3 mg/kg.

In another embodiment, the invention envisions intramuscular administration of a compound with general formula (I), as described herein, at a therapeutically effective dose that is between about 0.25 mg/kg and about 50 mg/kg, e.g., 0.25 mg/kg, 0.5 mg/kg, 1 mg/kg, 1.5 mg/kg, 2 mg/kg, 2.5 mg/kg, 3 mg/kg, 3.5 mg/kg, 4 mg/kg, 4.5 mg/kg, 5 mg/kg, 5.5 mg/kg, 6 mg/kg, 6.5 mg/kg, 7 mg/kg, 7.5 mg/kg, 8 mg/kg, 8.5 mg/kg, 9 mg/kg, 9.5 mg/kg, 10 mg/kg, 10.5 mg/kg, 11 mg/kg, 11.5 mg/kg, 12 mg/kg, 12.5 mg/kg, 13 mg/kg, 13.5 mg/kg, 14 mg/kg, 14.5 mg/kg, 15 mg/kg, 15.5 mg/kg, 16 mg/kg, 16.5 mg/kg, 17 mg/kg, 17.5 mg/kg, 18 mg/kg, 18.5 mg/kg, 19 mg/kg, 19.5 mg/kg, 20 mg/kg, 20.5 mg/kg, 21 mg/kg, 21.5 mg/kg, 22 mg/kg, 22.5 mg/kg, 23 mg/kg, 23.5 mg/kg, 24 mg/kg, 24.5 mg/kg, 25 mg/kg, 26 mg/kg, 27 mg/kg, 28 mg/kg, 29 mg/kg, 30 mg/kg, 31 mg/kg, 32 mg/kg, 33 mg/kg, 34 mg/kg, 35 mg/kg, 36 mg/kg, 37 mg/kg, 38 mg/kg, 39 mg/kg, 40 mg/kg, 41 mg/kg, 42 mg/kg, 43 mg/kg, 44 mg/kg, 45 mg/kg, 46 mg/kg, 47 mg/kg, 48 mg/kg, 49 mg/kg, or 50 mg/kg. In a preferred embodiment, the androstane derivative is administered via intramuscular delivery (e.g., injection) at a therapeutically effective dose that is between about 0.25 mg/kg and about 35 mg/kg. In another embodiment, the therapeutically effective dose is between about 0.25 mg/kg and 30 mg/kg. In yet another embodiment, the therapeutically effective dose is between about 0.25 mg/kg and 10 mg/kg. In still other embodiments, the therapeutically effective dose is between about 0.25 mg/kg and 5 mg/kg.

In yet another embodiment, the invention envisions intravitreal administration of a compound with general formula (I), as described herein, at a therapeutically effective dose that is between about 1 µg and about 10 mg, e.g., 1 µg, 1.25 µg, 1.5 µg, 1.75 µg, 2 µg, 2.25 µg, 2.5 µg, 2.75 µg, 3 µg, 3.25 µg, 3.5 µg, 3.75 µg, 4 µg, 4.25 µg, 4.5 µg, 4.75 µg, 5 µg, 5.25 µg, 5.5 µg, 5.75 µg, 6 µg, 6.25 µg, 6.5 µg, 6.75 µg, 7 µg, 7.25 µg, 7.5 µg, 7.75 µg, 8 µg, 8.25 µg, 8.5 µg, 8.75 µg, 9 µg, 9.25 µg, 9.5 µg, 9.75 µg, 10 µg, 20 µg, 30 µg, 40 µg, 50 µg, 60 µg, 70 µg, 80 µg, 90 µg, 100 µg, 150 µg, 200 µg, 250 µg, 300 µg, 350 µg, 400 µg, 450 µg, 500 µg, 550 µg, 600 µg, 650 µg, 700 µg, 750 µg, 800 µg, 850 µg 900 µg, 950 µg, 1 mg, 1.1 mg, 1.2 mg, 1.3 mg, 1.4 mg, 1.5 mg, 1.6 mg, 1.7 mg, 1.8 mg, 1.9 mg, 2 mg, 2.1 mg, 2.2 mg, 2.3 mg, 2.4 mg, 2.5 mg, 2.6 mg, 2.7 mg, 2.8 mg, 2.9 mg, 3 mg, 3.5 mg, 4 mg, 4.5 mg, 5 mg, 5.5 mg, 6 mg, 6.5 mg, 7 mg, 7.5 mg, 8 mg, 8.5 mg, 9 mg, 9.5 mg, or 10 mg; preferably, the dose is between about 1 µg and about 2,000 µg, e.g., about 1 µg to about 2,000 µg or about 100 µg to about 1,500 µg, or about 500 µg to about 1,200 µg, or about 500 µg to about 1,000 µg. In some embodiments, the therapeutically effective dose of the compound is delivered via intravitreal administration is at least about 0.02 mg, e.g., at least about 0.02 mg, 0.03 mg, 0.04 mg, 0.05 mg, 0.06 mg, 0.07 mg, 0.08 mg, 0.09 mg, 0.1 mg, 0.15 mg, 0.2 mg, 0.25 mg, 0.3 mg, 0.35 mg, 0.4 mg, 0.45 mg, 0.5 mg, 0.55 mg, 0.6 mg, 0.65 mg, 0.7 mg, 0.75 mg, 0.8 mg, 0.85, mg, 0.9 mg, 0.95 mg, or 1 mg.

In another embodiment, the invention envisions oral administration of a compound with general formula (I), as described herein, at a therapeutically effective dose that is between about 1 mg/kg and about 20 mg/kg, e.g., 1 mg/kg, 1.5 mg/kg, 2 mg/kg, 2.5 mg/kg, 3 mg/kg, 3.5 mg/kg, 4 mg/kg, 4.5 mg/kg, 5 mg/kg, 5.5 mg/kg, 6 mg/kg, 6.5 mg/kg, 7 mg/kg, 7.5 mg/kg, 8 mg/kg, 8.5 mg/kg, 9 mg/kg, 9.5 mg/kg, 10 mg/kg, 10.5 mg/kg, 11 mg/kg, 11.5 mg/kg, 12 mg/kg, 12.5 mg/kg, 13 mg/kg, 13.5 mg/kg, 14 mg/kg, 14.5 mg/kg, 15 mg/kg, 15.5 mg/kg, 16 mg/kg, 16.5 mg/kg, 17 mg/kg, 17.5 mg/kg, 18 mg/kg, 18.5 mg/kg, 19 mg/kg, 19.5 mg/kg, or 20 mg/kg. In a preferred embodiment, the compound is administered via oral delivery at a therapeutically effective dose that is between about 1 mg/kg and about 10 mg/kg. For instance, in one particular embodiment, a compound with general formula (I) is delivered orally to a human at a dose of about 1 and 5 mg/kg. In some embodiments, the oral dose described herein is administered once. In other embodiments, it is administered daily.

In another embodiment, a therapeutically effective amount of a compound with general formula (I), as described herein, is administered to an individual by infusion according to dosing schedules, such as, from about 0.1 from about 0.1 µg/kg/min to about 5.0 µg/kg/min, e.g., 0.1 µg/kg/min, 0.2 µg/kg/min, 0.3 µg/kg/min, 0.4 µg/kg/min, 0.5 µg/kg/min, 0.6 µg/kg/min, 0.7 µg/kg/min, 0.8 µg/kg/min, 0.9 µg/kg/min, 1.0 µg/kg/min, 1.1 µg/kg/min, 1.2 µg/kg/min, 1.3 µg/kg/min, 1.4 µg/kg/min, 1.5 µg/kg/min, 1.6 µg/kg/min, 1.7 µg/kg/min, 1.8 µg/kg/min, 1.9 µg/kg/min, 2.0 µg/kg/min, 2.1 µg/kg/min, 2.2 µg/kg/min, 2.3 µg/kg/min, 2.4 µg/kg/min, 2.5 µg/kg/min, 2.6 µg/kg/min, 2.7 µg/kg/min, 2.8 µg/kg/min, 2.9 µg/kg/min, 3.0 µg/kg/min, 3.1 µg/kg/min, 3.2 µg/kg/min, 3.3 µg/kg/min, 3.4 µg/kg/min, 3.5 µg/kg/min, 3.6 µg/kg/min, 3.7 µg/kg/min, 3.8 µg/kg/min, 3.9 µg/kg/min, 4.0 µg/kg/min, 4.1 µg/kg/min, 4.2 µg/kg/min, 4.3 µg/kg/min, 4.4 µg/kg/min, 4.5 µg/kg/min, 4.6 µg/kg/min, 4.7 µg/kg/min, 4.8 µg/kg/min, 4.9 µg/kg/min, or 5.0 µg/kg/min. For instance, in some embodiments, the compound is administered by infusion at an effective dose from about 0.2 µg/kg/min to about 2.0 µg/kg/min, or from about 0.2 µg/kg/min to about 1.5 µg/kg/min, or from about 0.25 µg/kg/min to about 1.0 µg/kg/min, or from about 0.5 µg/kg/min to about 1.0 µg/kg/min.

In alternative embodiments, an effective amount of a compound of formula (I), or an equivalent of a pharmaceutically acceptable salt, solvate, or hydrate thereof, administered to an individual in need thereof is individualized based on monitoring of Pulmonary Capillary Wedge Pressure (PCWP), Tissue Doppler Imaging (TDI) measurements, dyspnea, peripheral and pulmonary venous congestion, urinary volume, exercise capacity, serum biomarkers such as NT-proBNP, and high sensitive cardiac Troponin (hs-cTnT).

In alternative embodiments, a compound of formula (I), or an equivalent of a pharmaceutically acceptable salt, solvate, or hydrate thereof, administered to an individual in need thereof is an amount sufficient to maintain normal exercise tolerance without breathlessness.

In alternative embodiments, an effective amount is demonstrated by reduction of PCWP, orthopnea, paroxysmal nocturnal dyspnea, increase of exercise tolerance, reduction of peripheral and pulmonary venous congestion, such as pulmonary crepitations or rales, reduction of ankle swelling, reduction of biomarkers urinary output such as NT-proBNP, and high sensitive cardiac Troponin (hs-cTnT).

In alternative embodiments, lower dosages of a compound of formula (I), or an equivalent of a pharmaceutically acceptable salt, solvate, or hydrate thereof, are used when administered in the bloodstream or IV or IM (in contrast to administration e.g., orally, by inhalation or subcutaneously) e.g., as an IV or an IM administration, or into a body cavity or into a lumen of an organ. Substantially higher dosages can be used in topical, spray, inhalation or oral administration or administering by powders, spray or inhalation. Actual methods for preparing parenterally or non-parenterally administrable formulations will be known or apparent to those skilled in the art and are described in more detail in such publications as Remington's (see Remington's Pharmaceutical Sciences, Mack Publishing Co, Easton PA).

In particular embodiments, a compound of formula (I), or an equivalent of a pharmaceutically acceptable salt, solvate or hydrate thereof, are given chronically, e.g., from day of diagnosis and until the last day of a patient's life or until the disease has abated. In alternative embodiments, dose adjustments are required moving from a treatment phase to a maintenance period through the periodic monitoring of specific, conventionally known biomarkers or clinical signs of the disease.

In alternative embodiments, in evaluating the efficacy of a treatment, a treatment regimen or a particular dosage, or to determine if a treatment versus a maintenance dosage should be given, individuals, e.g., patients affected by AHF or CHF, are subject to regular periodic screening for the presence and extent of organ and tissue involvement or damage, e.g., heart (ventricle dilatation, third heart sound cardiac hypertrophy), fatigue, tiredness, reduced exercise tolerance, increased time to recover after exercise, kidney (renal insufficiency, oliguria), lung (orthopnea, paroxysmal nocturnal dyspnea, tachypnea), ankle swelling, elevated jugular venous pressure. A thorough physical examination should be done at a time interval chosen by those experts in the treatment of a cardiovascular disease, in particular AHF or CHF which would concentrate on cardiac, pulmonary and peripheral circulation functions. Accordingly, in alternative embodiments, therapy with a compound of formula (I), or an equivalent of a pharmaceutically acceptable salt, solvate or hydrate thereof, is instituted as early as possible, preferably in emergency, to prevent the rapid evolution of symptoms and continued after patient's discharge for years, preferably during the whole life of the patient or at least a period consistent with the way other drugs are used in HF.

According to the present invention, uses and methods as provided herein can further comprise co-administration with other drugs or pharmaceuticals. In fact, the present invention selectively corrects a depressed cardiac biochemical function (namely the SERCA2a activity). This certainly contributes to relieving the existing HF clinical symptoms, with less unwanted side effects than those of the available therapies (just because the selectivity mentioned above). However, as CHF and AHF are complex clinical syndromes the present invention is potentially associable to existing and future drug classes and/or specific drugs such as: a) drug classes such as, ACE inhibitors, AIRBs, diuretics, $Ca^{2+}$ channel blockers, β-blockers, digitalis, NO donors, vasodilators, SERCA2a stimulators, neprilysin (NEP) inhibitors, myosin filament activators, recombinant relaxin-2 mediators, recombinant NP protein, activators of the soluble guanylate cyclase (sGC), beta-arrestin ligand of angiotensin II receptor; b) specific drugs: hydrochlorothiazide, furosemide, verapamil, diltiazem, carvedilol, metoprolol, hydralazine, eplerenone, spironolactone, lisinopril, ramipril, nitroglycerin, nitrates, digoxin, valsartan, olmesartan, telmisartan, candesartan, losartan, entresto, omecamtiv, sacubitril, serelaxin, ularitide, levosimendan, cinaciguat.

The compounds of the present invention, as used as therapeutic agents, in particular for treating HF, can be combined with other therapeutic agents used in the treatment of the same disease. Exemplary other therapeutic agents are diuretics, for example furosemide, bumetanide, and torasemide. Metolazone, an aldosterone antagonist, such as spironolactone or eplerenone; thiazide diuretics, such as hydrochlorothiazide, metolazone, and chlorthalidone. Other agents are ACE inhibitors, for example lisinopril and ramipril. Also Angiotensin II receptor blockers (ARBs), such as valsartan, candesartan and losartan can be taken into consideration. Angiotensin receptor/neprilysin inhibitor (ARNI), sacubitril for example, are comprised. Other agents can be selected from beta-blockers, such as carvedilol and metoprolol for example, or vasodilators, for example hydralazine, optionally combined with isosorbide dinitrate, hydralazine, nitrates, as nitroglycerin, amlodipine and felodipine nondihydropyridines such as diltiazem or verapamil. The compounds of the present invention can also be combined with digoxin, if needed. Other drugs, as ivabradine and other anticoagulant may be considered. Still, other drugs may include OMECAMTRIV MECARBIL.

The compounds of the present invention can be combined with other therapeutic agents, in particular agents useful for treating cardiovascular diseases, more in particular in the combination therapy of HF. The combined active ingredients can be administered according to different protocols, decided by the medical doctor. According to an embodiment of the present invention, combination therapy can be carried out by administering the compounds of formula (I) both at the same time or at different time of the further therapeutically active ingredient or ingredients. In case of concomitant administration, the compound of the present invention and the further active ingredient or ingredients can be each formulated in a respective pharmaceutical composition. In this case, the present invention provides a kit, in particular for the treatment of heart failure, comprising separate pharmaceutical compositions containing the compound of the present invention and the further active ingredient or ingredients, respectively. In another embodiment, the present invention provides a pharmaceutical unit dosage form kit, in particular for the treatment of HF, comprising compound of the present invention and the further active ingredient or ingredients.

Nanoparticles, Nanolipoparticles and Liposomes.

Also provided are nanoparticles, nanolipoparticles, vesicles, and liposomal membranes comprising the compounds provided herein, e.g., to deliver pharmaceutically active compounds and compositions as provided herein (a compound of formula (I) or an equivalent of a pharmaceutically acceptable salt, solvate or hydrate thereof) to a subject in need thereof. In alternative embodiments, these compositions are designed to target specific molecules, including biologic molecules, such as polypeptides, including cell surface polypeptides, e.g., for targeting a desired cell type, e.g., a myocyte or heart cell, an endothelial cell, and the like.

Provided are multilayered liposomes comprising compounds used to practice the methods of the present disclosure, e.g., as described in Park et al., U.S. Pat. Pub. No. 20070082042, the content of which is incorporated by reference herein in its entirety. The multilayered liposomes can be prepared using a mixture of oil-phase components comprising squalene, sterols, ceramides, neutral lipids or oils, fatty acids and lecithins, to about 200 to 5000 nm in particle size, to entrap a composition used to practice uses and methods as provided herein.

Liposomes can be made using any method, e.g., as described in U.S. Pat. No. 4,534,899; U.S. Pat. Pub. No. 20070042031, including method of producing a liposome by encapsulating an active agent according to the present invention (or a combination of active agents), the method comprising providing an aqueous solution in a first reservoir; providing an organic lipid solution in a second reservoir, and then mixing the aqueous solution with the organic lipid solution in a first mixing region to produce a liposome solution, where the organic lipid solution mixes with the aqueous solution to substantially instantaneously produce a liposome encapsulating the active agent; and immediately then mixing the liposome solution with a buffer solution to produce a diluted liposome solution.

In one embodiment, liposome compositions used to practice uses and methods as provided herein comprise a substituted ammonium and/or polyanions, e.g., for targeting delivery of a compound a compound of formula (I) or an equivalent of a pharmaceutically acceptable salt, solvate or hydrate thereof used to practice methods as provided herein to a desired cell type, as described e.g., in U.S. Pat. Pub. No. 20070110798.

Provided are nanoparticles comprising compounds according to the present invention used to practice uses and methods as provided herein in the form of active agent-containing nanoparticles (e.g., a secondary nanoparticle), as described, e.g., in U.S. Pat. Pub. No. 20070077286. In one embodiment, provided are nanoparticles comprising a fat-soluble active agent used to practice a use and method as provided herein or a fat-solubilized water-soluble active agent to act with a bivalent or trivalent metal salt.

In one embodiment, solid lipid suspensions can be used to formulate and to deliver compositions used to practice uses and methods as provided herein to mammalian cells in vivo, in vitro, or ex vivo, as described, e.g., in U.S. Pat. Pub. No. 20050136121.

The compositions and formulations used to practice the uses and methods as provided herein can be delivered by the use of liposomes or nanoliposomes. By using liposomes, particularly where the liposome surface carries ligands specific for target cells, or are otherwise preferentially directed to a specific organ, one can focus the delivery of the active agent into target cells in vivo. See, e.g., U.S. Pat. Nos. 6,063,400; 6,007,839; AI-Muhammed, J. Microencapsul. 1996, 13:293-306; Chonn, Curr. Opin. Biotechnol. 1995, 6:698-708; Ostro, Am. J. Hosp. Pharm. 1989, 46:1576-1587.

Delivery Vehicles

In alternative embodiments, any delivery vehicle can be used to practice the uses and methods provided herein, e.g., to deliver the compounds provided herein to a subject in need thereof. For example, delivery vehicles comprising polycations, cationic polymers and/or cationic peptides, such as polyethyleneimine derivatives, can be used as described, e.g., in U.S. Pat. Pub. No. 20060083737.

In one embodiment, a dried polypeptide-surfactant complex is used to formulate a composition used to practice a use and method as provided herein as described, e.g., in U.S. Pat. Pub. No. 20040151766.

In one embodiment, a composition used to practice uses and methods as provided herein can be applied to cells using vehicles with cell membrane-permeant peptide conjugates, e.g., as described in U.S. Pat. Nos. 7,306,783; 6,589,503. In one aspect, the composition to be delivered is conjugated to a cell membrane-permeant peptide. In one embodiment, the composition to be delivered and/or the delivery vehicle are conjugated to a transport-mediating peptide, e.g., as described in U.S. Pat. No. 5,846,743, describing transport-mediating peptides that are highly basic and bind to polyphosphoinositides.

In one embodiment, electro-permeabilization is used as a primary or adjunctive means to deliver the composition to a cell using any electroporation system as, for example, as described in U.S. Pat. Nos. 7,109,034; 6,261,815; 5,874,268.

Preparation of the Compounds of Formula (I)

The compounds of the present invention can be synthesized by many methods available to those skilled in the art of organic chemistry. General and exemplary synthetic schemes for preparing compounds of the present invention are described below. These schemes are illustrative and are not meant to limit the possible techniques one skilled in the art may use to prepare the compounds disclosed herein. Different methods to prepare the compounds of the present invention will be evident to those skilled in the art. Additionally, the various steps in the synthesis may be performed in an alternate sequence in order to give the desired compound or compounds.

Examples of compounds of the present invention prepared according to methods described in the general schemes are given in the examples section set out hereinafter.

The compounds of the present invention can be synthesized using the methods described below, together with synthetic methods known in the art of synthetic organic chemistry, or by variations thereon as appreciated by those skilled in the art. The reactions are performed in a solvent or solvent mixture appropriate to the reagents and materials employed and suitable for the transformations being effected. It will be understood by those skilled in the art of organic synthesis that the functionality present on the molecule should be consistent with the transformations proposed.

Also, the skilled in the art can easily alter the reagents and reaction conditions exemplified in the schemes below to include any combination of substituents as defined above. Also, the skilled artisan can easily use interchangeable steps for each synthetic process and incorporate isolation and/or purification steps as deemed necessary.

Starting materials and intermediates useful for preparing compounds of the invention are commercially available or can be prepared by well known synthetic procedures.

The final products obtained by the synthesis described below may be purified using techniques commonly known to one skilled in the art such as preparatory chromatography, thin-layer chromatography, HPLC, or crystallization.

Exemplary processes for the synthesis of the compounds of the invention are herein described.

In the following preparations, chemical compounds, solvents, reactants and any other material are from commercial sources, except where otherwise stated. Generally, compounds of formula (I) can be prepared by multistep synthesis starting from dehydroepiandrosterone (prasterone). Dehydroepiandrosterone is a commercial product or can be prepared according to well-known methods starting from 4-androsten-3,17-dione (androstenedione).

Preparation of 5α-Androstane-3β,6α,17β-triol

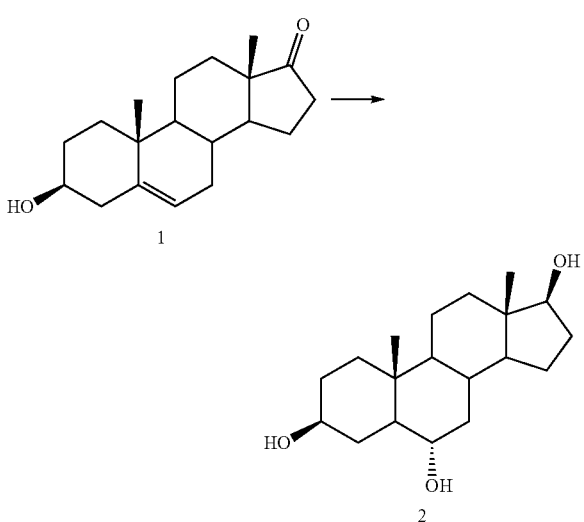

A suitable intermediate for the synthesis of 6-α-3,17 androstanedione (2) was produced from dehydroepiandrosterone 1 by hydroboration followed by oxidation as described in De Munari, et al. (J. Med. Chem., 2003, 46(17):3644-54). Briefly, a solution of dehydroepiandrosterone 1 (5 g, 17.5 mmol, 1 eq.) in THF (85 mL) was stirred at −20° C. under Ar. Then, 1M BH$_3$·THF complex in THF was added to the stirred solution (44 mL, 44 mmol, 2.5 eq.), and stirring was continued at room temperature for 3 hours. H$_2$O (85 mL) was cautiously added dropwise and followed by the dropwise addition of NaBO$_3$·4H$_2$O (5.4 g, 35 mmol, 2 eq). After stirring at room temperature overnight, the mixture was filtered. The solid was washed with THF and then discarded. The liquors were saturated with NaCl and extracted with THF (3×40 mL). The combined organic extracts were dried over NaCl and Na$_2$SO$_4$, filtered, and evaporated to dryness. The crude 5α-Androstane-3β,6α,17β-triol 2 product was crystallized from EtOAc/MeOH (2/1, 10 mL/g) to give a white solid (3.8 g, 70%).

Preparation of 6α-Hydroxyandrostane-3,17-dione

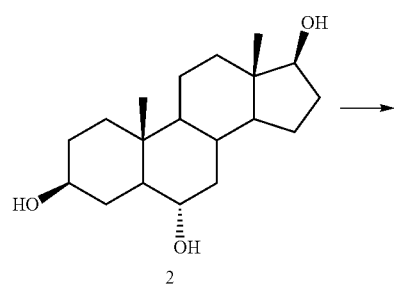

2

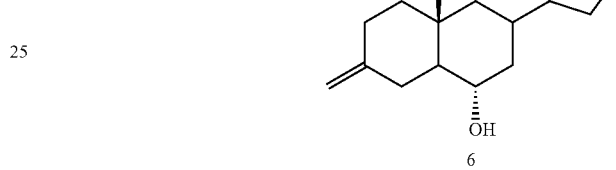

3

Intermediate 3 was obtained from 2 by selective oxidation at C3 and C17 positions. NBS (3.4 g, 19.5 mmol, 3 eq) was added to a stirred solution of 5α-Androstane-3β,6α,17β-triol 2 (2 g, 6.5 mmol, 1 eq) in dioxane/H2O/pyridine (54/10/1 mL) at 0° C. After the addition, the mixture was allowed to warm to room temperature and was stirred overnight. The orange solution was diluted with water (50 mL) and quenched with Na$_2$S$_2$O$_3$ (350 mg). The organic solvent was evaporated under vacuum until a white solid appears. The solid was filtered and washed with water. After drying at 40° C., 6α-hydroxyandrostane-3,17-dione 3 was obtained as a white solid (1.3 g, 70%).

Synthesis of adrostan-3-methylene-17-one

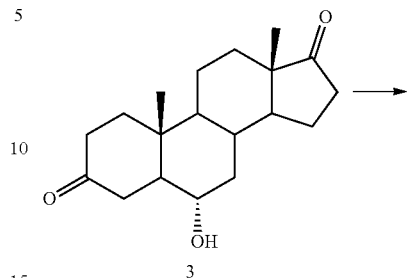

3

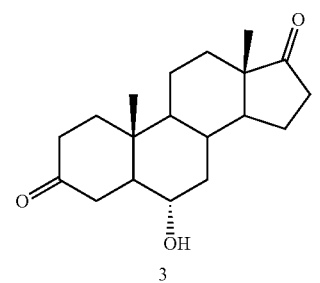

6

6-α-3,17 androstanedione 3 was then converted to the exo-methane derivative 6 (adrostan-3-methylene-17-one) via a Wittig reaction selective on the C3 carbonyl followed by the cross-metathesis coupling with 5-pentenoic acid. t-BuOK (670 mg, 6 mmol, 4 eq.) was added to a suspension of methyltriphenylphosphonium bromide (1.66 g, 6 mmol, 4 eq.) in THF (10 mL) at −5° C. The solution immediately changed colour to bright orange. After 10 minutes, 6α-hydroxy androstane-3,17-dione 3 (450 mg, 1.5 mmol, 1 eq.) was added while the temperature was kept below 0° C. Immediately after the addition, the reaction was quenched by the addition of aq. 1M HCl (15 mL) and extracted with EtOAc (3×20 mL). The combined organic phases were dried over Na$_2$SO$_4$ and evaporated to dryness. The crude extracts were purified over column chromatography (eluent EtOAc: Petroleum spirit 4:6) to produce 376 mg (83%) of adrostane-3-methylene-17-one 6 as a white foam.

Direct Synthesis of CVie 201 and 202 from Precursor 6 by Cross-Metathesis

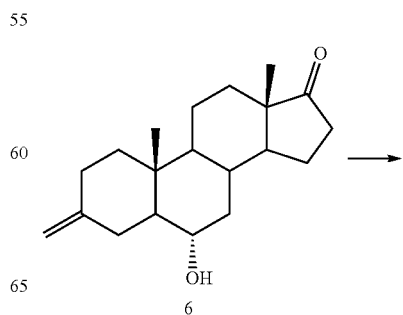

6

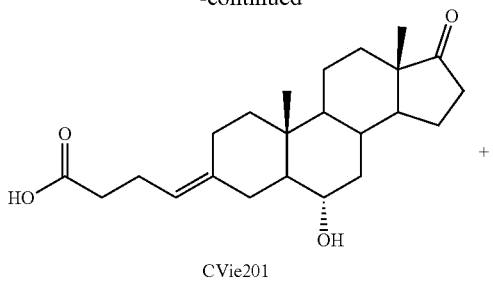

CVie201

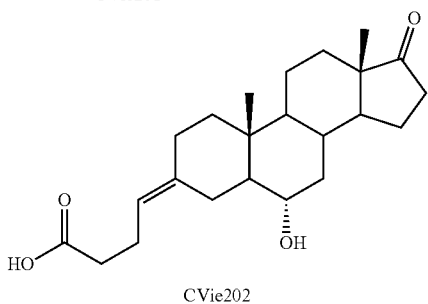

CVie202

Hoveyda-Grubbs $2^{nd}$ generation catalyst (12 mg, 0.015 mmol, 0.05 eq.) was added to a solution of androstan-3-methylene-17-one 6 (100 mg, 0.33 mmol, 1 eq) in DCM (1 mL). The solution was then heated at reflux and treated with 10 μL of 4-pentenoic acid every 20 minutes (total 330 μL, 3.3 mmol, 10 eq.). After the end of the addition, the mixture was refluxed for additional 2 h. The reaction mixture was concentrated in vacuo and purified by flash chromatography (Eluent Acetone:petroleum spirit 3:7+0.1% $HCO_2H$) to obtain two different white solids (E)-4-(6alpha-hydroxy-17-oxoandrostane-3-yliden)butyric acid (4.8 mg, 4%) (CVie201) and (Z)-4-(6alpha-hydroxy-17-oxoandrostane-3-yliden)butyric acid (7.2 mg, 6%) (CVie202).

Alternatively, CVie201 and CVie202 were obtained by varying the Wittig reaction. In one method (Route A), a betaine intermediate was stabilized by the use of a polar solvent, such as DMSO, and a base, such as NaH. The second approach (Route B) allowed for the stabilization of a cyclo-oxaphosphetane intermediate using an aprotic solvent, such as THF, as the base. Route A produced a mixture of diastereomers (60% of Z/syn CVie202; 30% E/anti CVie201), whereas Route B provided CVie202 derived from the cyclo-oxaphosphate intermediate. Either procedure requires the production of diastereomers 7 and/or 8 as described below.

Alternative Synthesis of CVie 201 and 202 Via Wittig Reaction

Route A

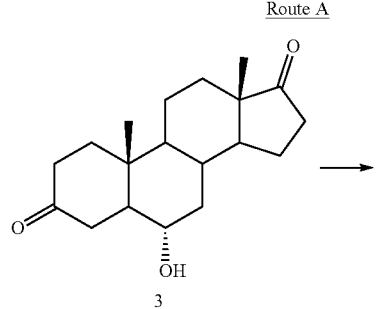

3

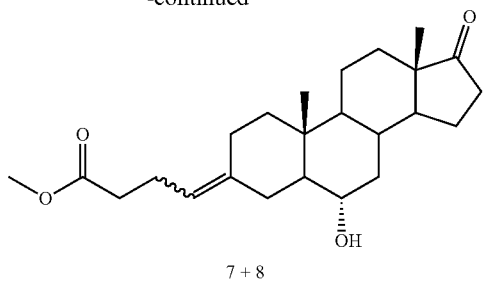

7 + 8

NaH 60% in mineral oil (100 mg, 2.56 mmol, 8 eq.) was carefully added to dry DMSO (1 mL) under Ar atmosphere. The resulting solution was stirred at 60° C. for 20 minutes. After cooling at room temperature, (3-carboxypropyl)triphenylphosphonium bromide (550 mg, 1.28 mmol, 4 eq.) was added. A bright orange color appeared immediately. The solution was stirred for 2 h. Then, 6α-hydroxyandrostane-3,17 dione 3 (100 mg, 0.32 mmol, 1 eq.) was added to the mixture. The resulting solution was allowed to stir at room temperature for additional 4 h. The reaction mixture diluted with EtOAc (25 mL) was washed with aq. 1M HCl (3×30 mL). The organic layer dried over $Na_2SO_4$ was evaporated to dryness obtaining 25 mg of crude material.

The crude material was first dissolved in MeOH (1.5 mL), followed by the addition of EDC hydrochloride (115 mg, 0.6 mmol, 2 eq.) and DMAP (5 mg, 0.03 mmol, 0.1 eq.). The solution was stirred at room temperature for 3 h. After concentration in vacuo. The crude solid was dissolved in EtOAc (15 mL) and washed with aq. 1M HCl (3×10 mL). The crude product was purified by flash chromatography over silica gel (Acetone:Pet.Sp 3:7) to obtain 25 mg of a clear oil (20%) comprising a mixture of diastereoisomers 7 and 8.

Route B

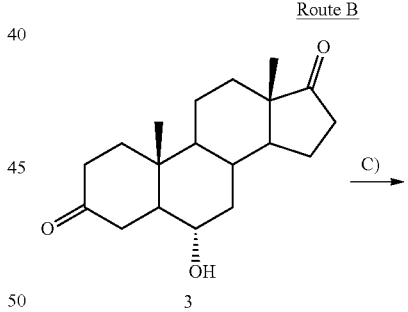

3

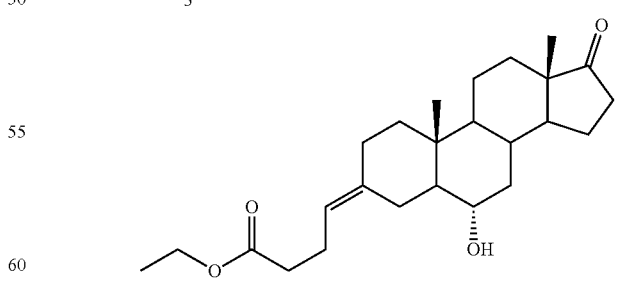

8

LiHMDS 1M solution in THF (40 mL, 40 mmol, 12 eq.) was carefully added to a dry THF (33 mL) suspension of (3-carboxypropyl)triphenylphosphonium bromide (8.5 g, 20 mmol, 6 eq.) under Ar atmosphere at −40° C. The solution was stirred at −40° C. until a bright orange color appears. Then, 6α-hydroxyandrostane-3,17 dione 3 (1 g, 3.3 mmol, 1 eq.) was added to the solution at −40° C. after stirring at room temperature overnight the reaction mixture quenched with aq. 1M HCl (300 mL) was extracted with EtOAc (3×3 50 mL). The combined organic layers were dried over $Na_2SO_4$ and evaporated to dryness.

The crude material was dissolved in absolute EtOH (17 mL) then EDC hydrochloride (1.26 mg, 6.6 mmol, 2 eq.) and DMAP (50 mg, 0.3 mmol, 0.1 eq.) were added. The mixture was allowed to stir at room temperature for 3 h. The reaction diluted in EtOAc (150 mL) was washed with aq. 1M HCl (3×100 mL). The crude product was purified by flash chromatography over silica gel (Acetone:Pet.Sp 3:7) to obtain 910 mg (72%) of compound 8.

Final Hydrolysis of Methyl (or Ethyl) Esters

An aqueous solution of 1M LiOH (150 µL, 2.5 eq.) was added to a solution of the methyl esters 7 and 8 (25 mg, 0.06 mmol, 1 eq.) in THF (600 µL) and water (200 µL). After 2 h, the reaction was diluted with water (10 mL) and quenched by the addition of 1M HCl until the solution reached pH 1. The aqueous phase was extracted with EtOAc (3×15 mL). The combined organic layers were dried over $Na_2SO_4$ and evaporated to dryness. Crude was purified over flash chromatography (AcOEt:Pet.Sp. 7:3 1% HCOOH). Two white solid were obtained corresponding to the E (7 mg, 31%) and Z (12 mg, 54%) diastereoisomers (CVie201 and CVie202, respectively).

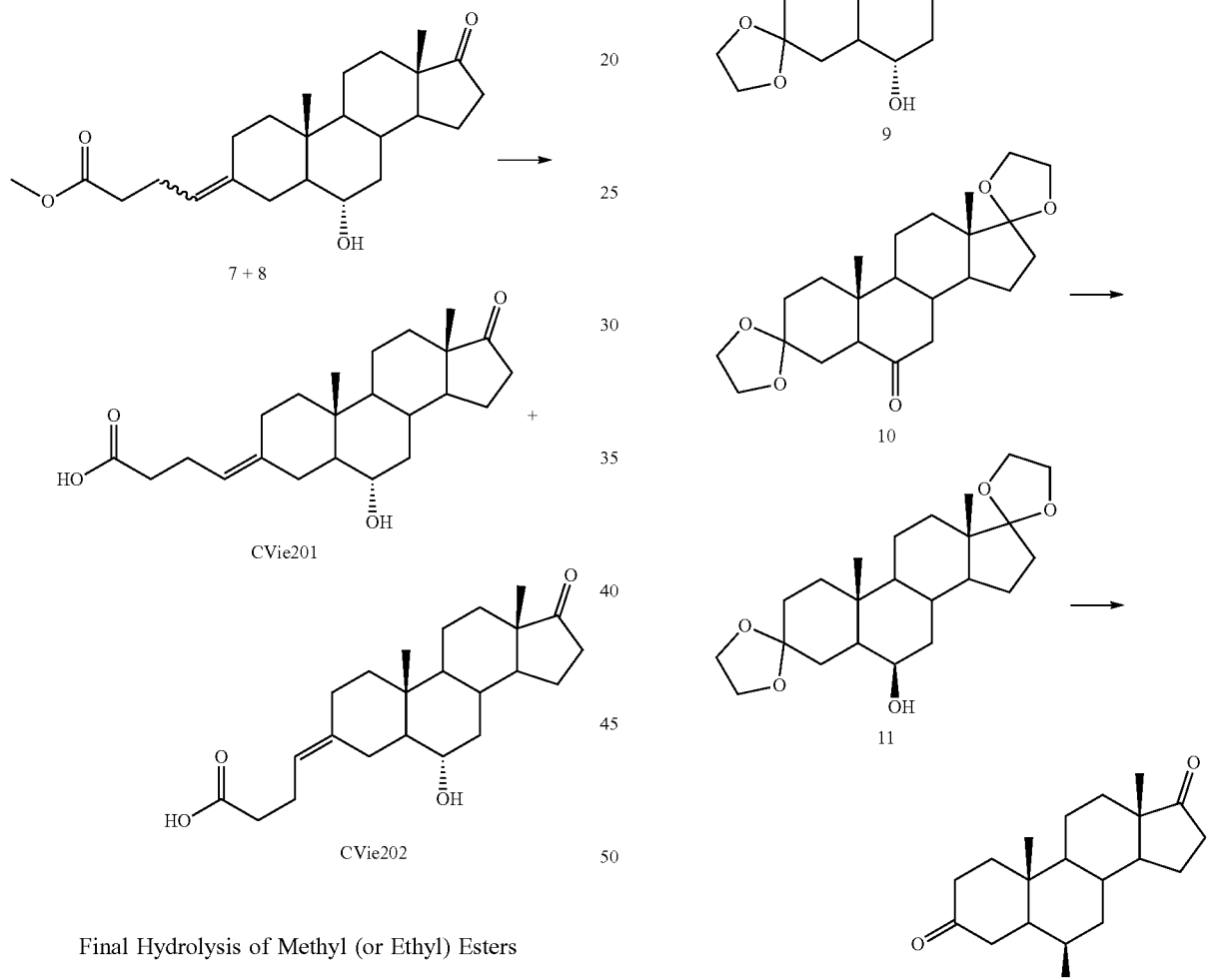

Synthetic Way to CVie 203 and 204: Synthesis of Intermediate Compound 12

To prepare CVie203 and CVie204, the precursor 12 was first produced from 6-α-3,17 androstanedione 3. The carbonyls of 6-α-3,17 androstanedione 3 were protected as diketals by reaction with ethylene glycol in combination with acid catalysis (p-tSA or camphosulfonic acid) in toluene, obtaining compound 9. Oxidation of compound 9 with PCC or other oxidants gave compound 10, which was then reduced with NaBH4 or KBH4 to produce the protected alcohol 11 with the C6-hydroxyl group selectively in the β-configuration. Final cleavage of the cyclic diketals by acidic treatment as described in De Munari et al. (J. Med. Chem., 2003, 46(17):3644-54) in acetone afforded precursor 12.

Briefly, a solution of 6α-hydroxyandrostane-3,17-dione (1.5 g, 4.9 mmol, 1 eq), ethylene glycol (10.5 mL, 88 mmol, 36 eq) and PTSA (561 mg, 2.9 mmol, 0.6 eq) in toluene (160 mL) was stirred at reflux for 12 h with a Dean-Stark trap. After cooling to room temperature, the mixture was neutralized with aq. 5% NaHCO$_3$ solution. The organic layer was separated and washed with H$_2$O (2×40 mL), dried over Na$_2$SO$_4$, and evaporated to dryness to produce 3,3:17,17-Bis(ethylendioxy)androstane-6α-ol 9 as a white solid compound (1.9 g, 98%).

PCC (148 mg, 0.69 mmol, 4 eq) was added to a solution of 3,3:17,17-bis(ethylendioxy)androstane-6α-ol (3 g, 14 mmol, 1 eq) 9 and sodium ascorbate (1.2 g, 14 mmol, 4 eq.) in dry CH$_2$Cl$_2$ (87 mL) at 0°. The mixture was stirred overnight at room temperature. The mixture was washed with aq. 1M HCl (3×30 mL) and water (3×30 mL). The organic layer was dried over Na$_2$SO$_4$ and evaporated to dryness. Crude was purified by flash chromatography over a column of silica gel (eluent acetone:petroleum spirit 2:8). 3,3:17,17-Bis(ethylendioxy)androstane-6-one 10 was obtained as a white solid (1.53 g (96%)).

NaBH$_4$ (144 mg, 3 mmol, 1.2 eq) was added to a stirred suspension of 3,3:17,17-bis(ethylendioxy)androstane-6-one 10 (1 g, 2.5 mmol, 1 eq) in MeOH (13 mL) at 0° C. After 2 h at 0° C., H$_2$O (40 mL) was added dropwise. The mixture was extracted with EtOAc (3×40 mL). The combined organic extracts were dried over Na$_2$SO$_4$, filtered, and evaporated to dryness to give a white solid, which was 3,3:17,17-Bis(ethylendioxy)androstane-6β-ol 11 (915 mg, 92%).

PTSA (2.26 g, 11.5 mmol, 5 eq) was added in small portion over 5 minutes to a solution of 3,3:17,17-bis(ethylendioxy)androstane-6β-ol 11 (910 mg, 2.3 mmol, 1 eq) in acetone (46 mL). After stirring at room temperature for 1 h, the solution was quenched by addition of aq. 5% NaHCO$_3$ until pH 7. After stirring for 5 minutes, a white solid appeared. The volatiles were removed in vacuo. The suspension was extracted with CH$_2$Cl$_2$ (3×30 mL) and the combined organic extracts were washed with brine (40 mL), dried over Na$_2$SO$_4$, filtered, and evaporated. The obtained solid was stirred with n-hexane/EtOAc 8/2 (10 mL) for 45 minutes and then collected by filtration. The solid was dried 45° C. for 3 hours. 568 mg (81%) of a white solid was obtained (i.e., 6β-hydroxyandrostane-3,17-dione 12).

Conversion of 12 into Final CVie 203 and 204

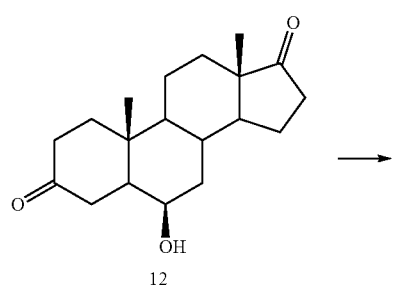

12

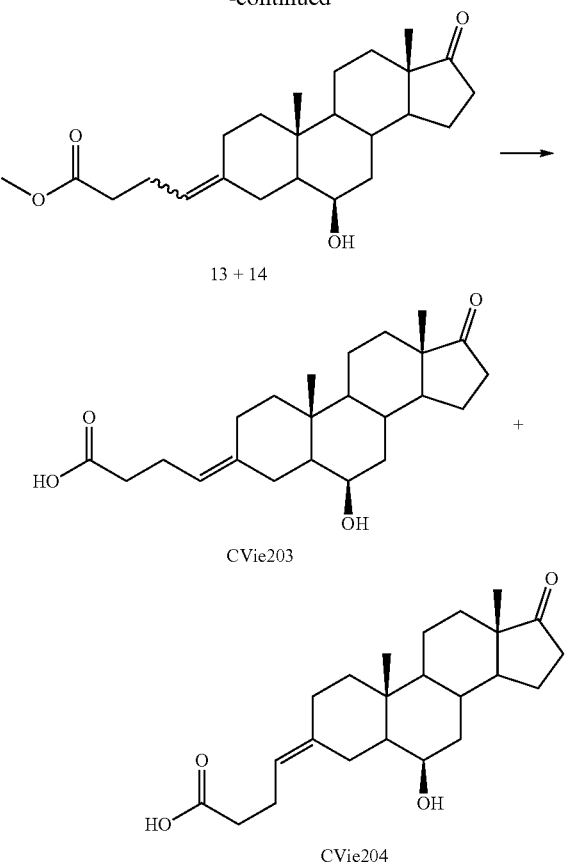

13 + 14

CVie203

CVie204

CVie203 and CVie204 were then obtained from precursor 12 via the Wittig reaction using the same procedures described above for CVie201 and CVie202. The configurations at the C3-C1' double bond were identified in the two isomers by means of NOESY experiments.

Briefly, NaH 60% in mineral oil (100 mg, 2.56 mmol, 8 eq.) was carefully added to dry DMSO (1 mL) under Ar atmosphere. The resulting solution was stirred at 60° C. for 20 minutes. After cooling at room temperature, (3-carboxypropyl)triphenylphosphonium bromide (550 mg, 1.28 mmol, 4 eq.) was added. A bright orange color appeared immediately. The solution was stirred for 2 h. Then, 6β-hydroxyandrostane-3,17-dione 12 (100 mg, 0.32 mmol, 1 eq.) was added to the mixture. The resulting solution was allowed to stir at room temperature for additional 4 h. The reaction mixture was diluted with EtOAc (25 mL) and washed with aq. 1M HCl (3×30 mL). The organic layer was dried over Na$_2$SO$_4$ and evaporated to dryness to obtain 25 mg of crude material.

The crude material was then dissolved in MeOH (1.5 mL). EDC hydrochloride (115 mg, 0.6 mmol, 2 eq.) and DMAP (5 mg, 0.03 mmol, 0.1 eq.) were added. The solution was stirred at room temperature for 3 h. After concentration in vacuo. The crude solid was dissolved in EtOAc (15 mL) and washed with aq. 1M HCl (3×10 mL). The crude product was purified by flash chromatography over silica gel (Acetone:Pet.Sp 3:7) to obtain a mixture of diastereoisomers 13 and 14 at 17% yield and 30% yield, respectively.

The reaction mixture was concentrated in vacuo and purified by flash chromatography (Eluent Acetone:petroleum spirit 3:7+0.1% HCO$_2$H) to obtain two different white solids (E)-4-(6beta-hydroxy-17-oxoandrostane-3-yliden)butyric acid (CVie203) and (Z)-4-(6beta-hydroxy-17-oxoandrostane-3-yliden)butyric acid (CVie204).

Production of CVie214, CVie215, and CVie217 Via Hydrogenation and Ester Hydrolysis

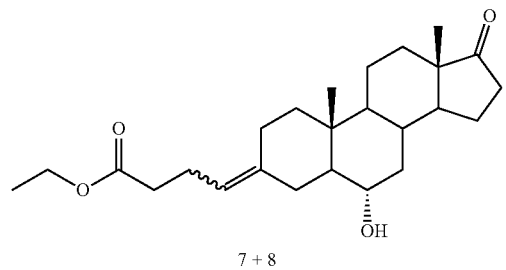

7 + 8

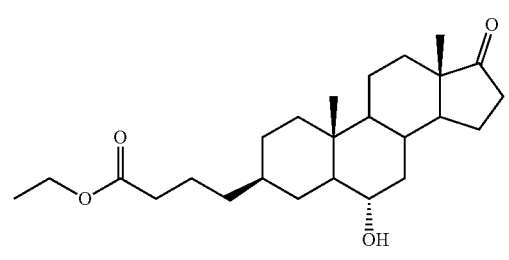

CVie217

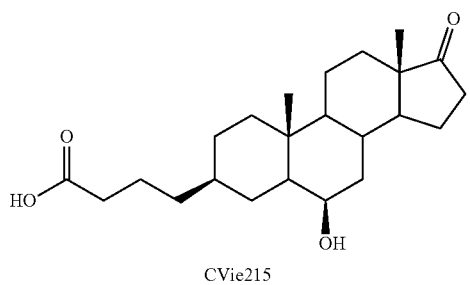

CVie215

Compound CVie217 was produced from the mixture of diastereomers 7+8 described above. Briefly, hydrogenation of the C3-C1' double bonds of the diastereomers was carried out in EtOAc using Pd—C catalysis. The resulting compound was CVie217. The configuration of the stereogenic center formed at C3 was identified by NOESY experiments. Compound CVie217 was then hydrolyzed with 1M LiOH or NaOH in THF to produce CVie214. Similarly, diastereomers 13+14 were hydrogenated in EtOAc using Pd—C catalysis to produce the ester compound 19, which was then hydrolyzed with 1M LiOH or NaOH in THF to produce CVie215.

Production of CVie213 and CVie216 by Via Wittig Reaction Followed by C=C Hydrogenation and Ester Hydrolysis

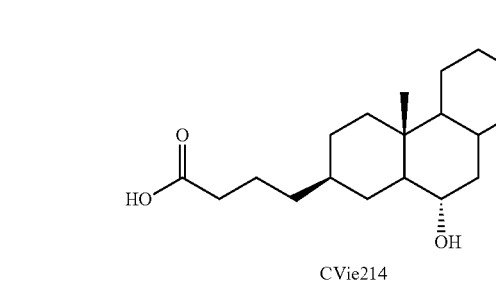

CVie214

3

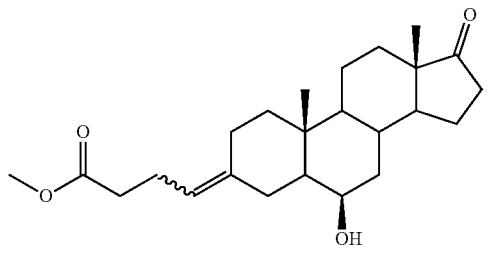

13 + 14

21

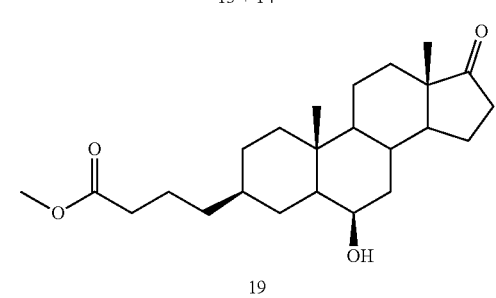

19

CVie213

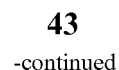
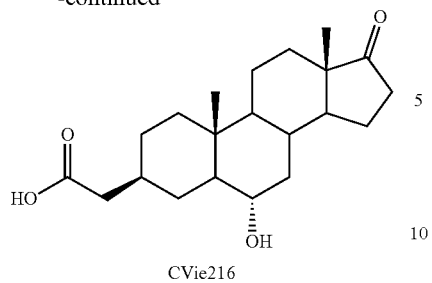

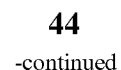
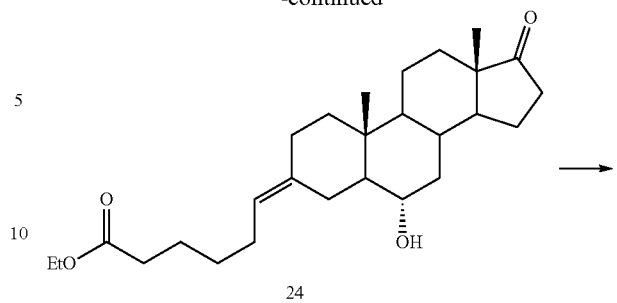

Compound 6-α-3,17 androstanedione 3 was also used as the starting point for the synthesis of CVie213 and CVie216 via a Horner-Emmons reaction. First, triethylphosphonoacetate (6.5 mL, 33 mmol, 5 eq) was added carefully to a suspension of NaH 60% in mineral oil (1.3 g, 33 mmol, 5 eq) in DMF (200 mL) under Ar atmosphere at 0° C. The resulting solution was warmed at room temperature and stirred for 20 minutes. Then, 6-α-3,17 androstanedione 3 (2 g, 6.5 mmol, 1 eq) was added at 0° C. After stirring overnight at room temperature, the reaction was quenched by careful addition of $H_2O$ (100 mL) and extracted with $Et_2O$ (3×150 mL). The combined organic layers were dried over $Na_2SO_4$ and evaporated in vacuo. Crude was purified by flash chromatography over a column of silica gel (acetone:petroleum spirit 3:7) to produce 2.1 g (86%) of a clear oil mixture of two diastereoisomers (compounds 21).

While under Ar atmosphere, 10% Pd—C (700 mg) was added to a degassed solution of diastereoisomer compounds 21 (2 g, 5.3 mmol, 1 eq) in EtOAc (200 mL). After three cycles of vacuum/hydrogen, the reaction was allowed to stir at room temperature overnight under $H_2$ atmosphere. After removal of hydrogen by vacuum/Ar cycle, the reaction mixture was filtered over CELITE®. The filtered solution was evaporated to dryness. The CVie213 product was obtained without purification at 1.8 g (90%). Further hydrolysis of CVie213 with 1M LiOH or NaOH in THF produced CVie216.

Production of CVie218 and CVie219 Via Wittig Reaction Followed by C=C Hydrogenation and Ester Hydrolysis

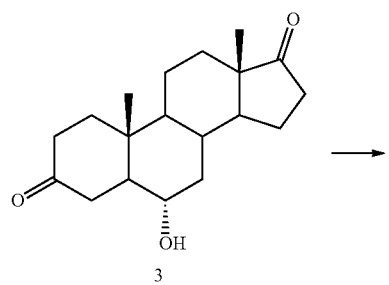

Similarly, reacting 6-α-3,17 androstanedione 3 with the proper triphenylphosphonium salt (e.g., 5-carboxytriphenylphosphonium bromide, LiHMDS, THF then EtOH (or MeOH)) produced compound 24. Next, catalytic hydrogenation of compound 24 using Pd—C catalysis in the presence of hydrogen produced CVie218, which included a $C_6$ chain at the C-3 position. Hydrolysis of CVie218 with 1M LiOH or NaOH in THF produced CVie219.

Synthesis of Derivatives with Primary Amine Groups from Precursor 6 by Metathesis Reaction with Boc-Protected Amines Followed by Boc Deprotection

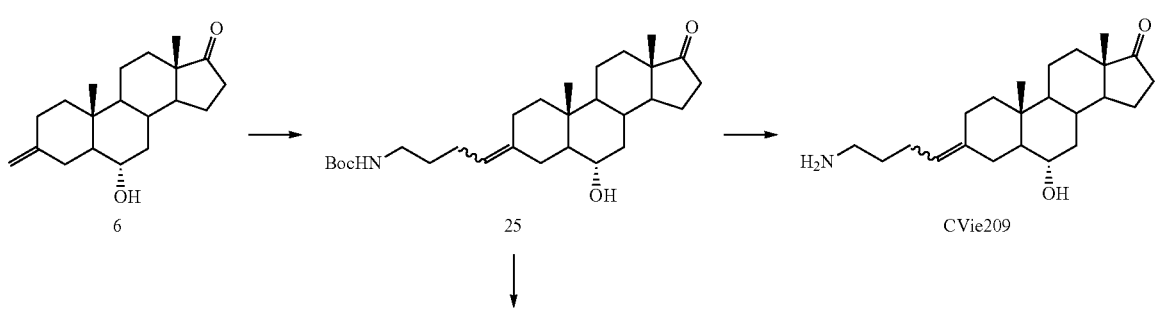

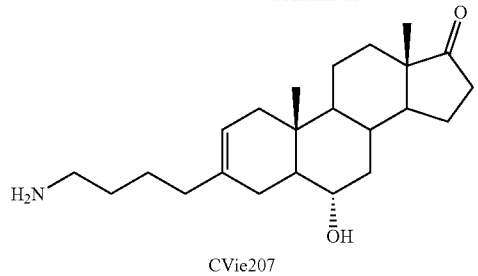

CVie207

For the synthesis of the derivatives with a primary amine group as the X substituent in formula (I), a cross metathesis reaction was carried out on precursor 6 using the same experimental conditions described above for the synthesis of CVie201 and CVie202.

Briefly, a Hoveyda-Grubbs $2^{nd}$ generation catalyst was added to a solution of androstan-3-methylene-17-one 6 in DCM. Androstan-3-methylene-17-one 6 was then combined with an exo-methylene group with the appropriate Boc-protected amine (e.g., tert-butyl pent-4-en-1-yl carbamate or N-Boc-4-pentyne-1-amine) to produce diastereoisomers 25 (25% yield). Compound 25 (50 mg, 0.1 mmol, 1 eq) was treated with 500 μL of a 1:1 mixture TFA/DCM trifluoroacetic acid in DCM) and then stirred at room temperature to directly cleave the Boc group. After stirring at room temperature for 1 minute, the reaction was diluted with EtOAc (50 mL) and washed with saturated aq. NaHCO₃ (3×30 mL). The organic phase was dried over Na₂SO₄, filtered, and evaporated to dryness to produce (EZ)-3-(4-aminobutyl-iden]-6alpha-hydroxyandrostane-17-one (CVie209) as white solid (28 mg, 75%)

Alternatively, reacting compound 25 with trimethylsilyl iodide in alcoholic solvent (e.g., MeOH) resulted in Boc cleavage accompanied by migration of the exocyclic double bond to produce CVie207, which has an endocyclic double bond between C2 and C3. Briefly, 1M TMSI in DCM (100 μL, 0.1 mmol, 1 eq.) was added to a solution of diastereoisomers 25 (50 mg, 0.1 mmol, 1 eq.) at room temperature. After stirring 2 h at the same temperature, the solvent was removed in vacuo. Methanol (2 mL) was added to the residue and left for 1 h at room temperature. After removal of the solvent in vacuo, CVie207 was obtained without further purification.

Synthesis of Cyclic Amine Derivatives with Exocyclic Insaturations: CVie205, CVie206, CVie210 and CVie211

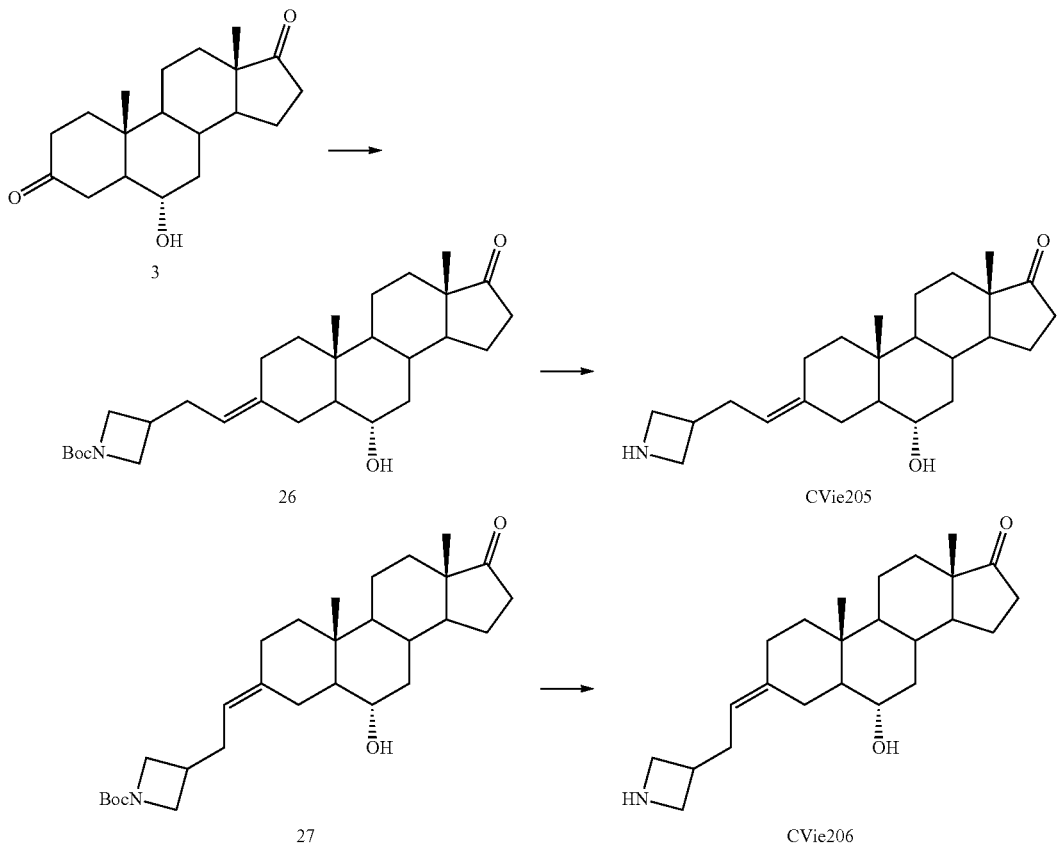

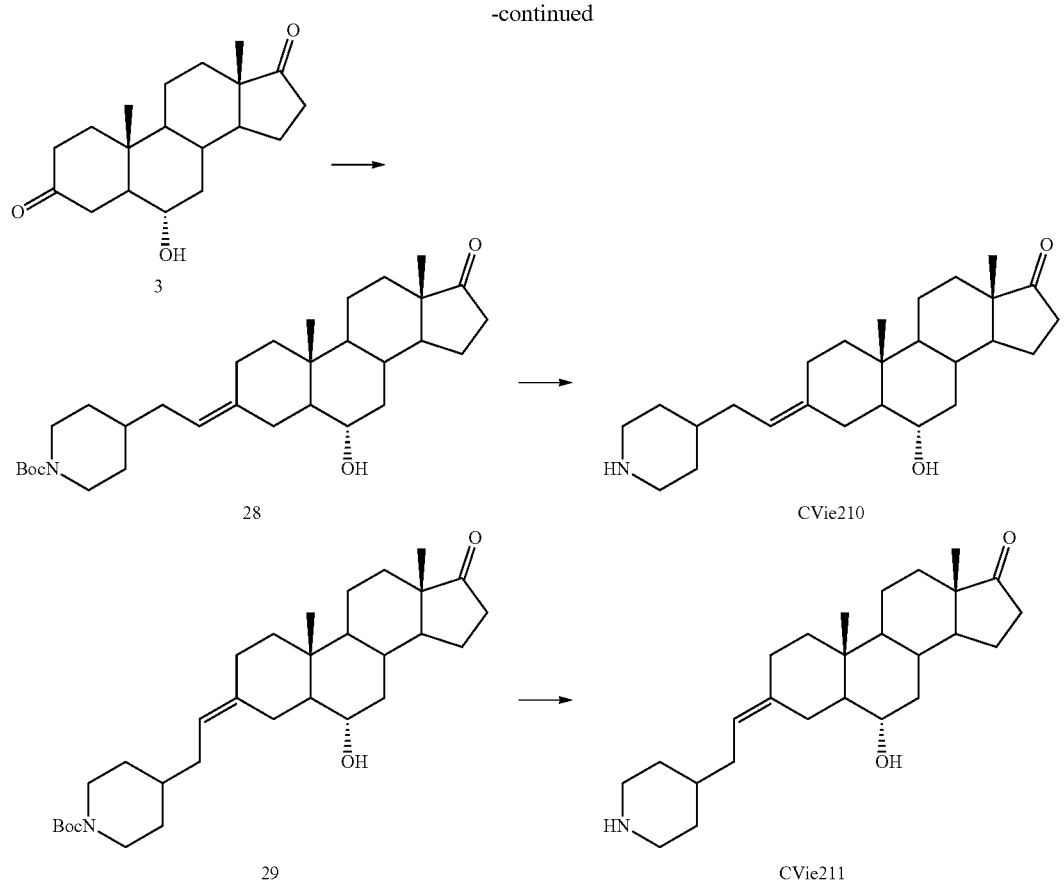

Cyclic amine derivatives were synthesized by a sodium hydride (NaH)-DMSO Wittig reaction as described above for CVie203 and CVie204 while utilizing an appropriate N-protected phosphonium salt, such as N-Boc-4-(2-triphenylphosphoniumethyl)azetidine iodide to produce compounds 26 and 27 or N-Boc 3-(2-triphenylphosphoniumethyl)piperidin iodide to produce compounds 28 and 29. After purification of the diastereoisomeric mixture, the N-Boc group was cleaved by acidic hydrolysis with TFA to produce CVie205, CVie206, CVie210 and CVie211.

Synthesis of CVie208 with an Endocyclic Insaturation (C=C Double Bond Migration During Boc Deprotection)

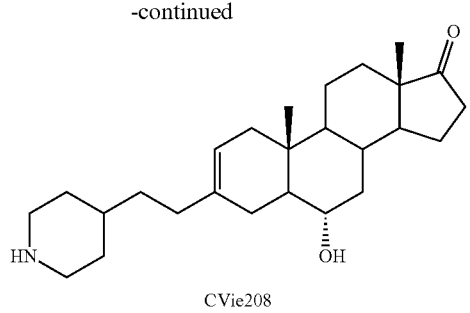

Further treatment of compounds 28 and 29 with TMSI as described above for the synthesis of CVie207 produced CVie208.

Hydrogenation and Boc-Cleavage with TFA to Produce CVie212

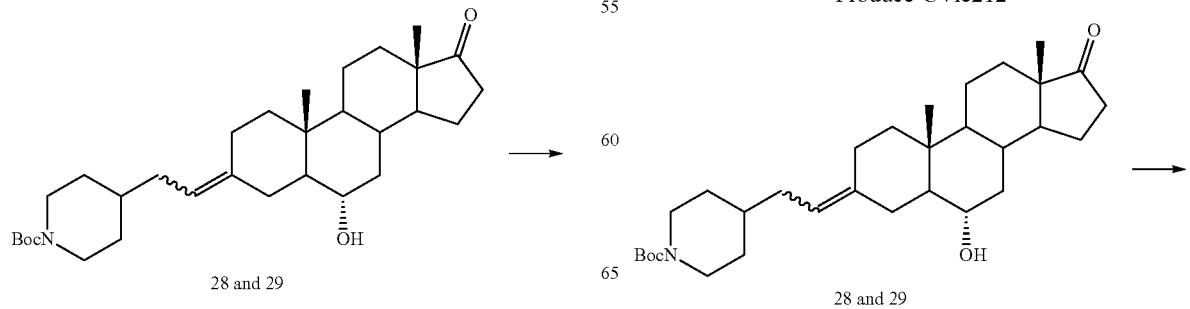

-continued

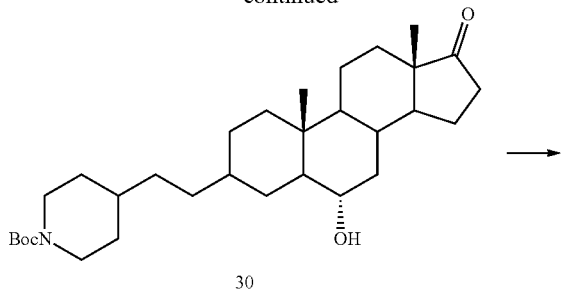
30

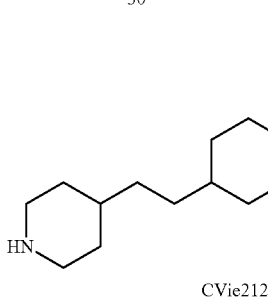
CVie212

Alternatively, catalytic hydrogenation (H₂, Pd—C, EtOAc) of the double bonds of compounds 28 and 29 to synthesize compound 30 followed by Boc cleavage with TFA in DCM produced CVie212.

Synthesis of compounds bearing a 6alpha-hydroxymethylandrostane-7,17-dione was achieved starting from the common intermediate 37. Compound 37 itself was synthesized starting from 4-androsten-3,17-dione 31, by protection of the two ketone moiety by cyclic acetal 32 and simultaneous migration of the double bond, oxidation of the allylic position by sodium dichromate 33, formation of the silyl enol ether 35, hydroxymethylation with Me₃Al and formaldehyde (36), and final cleavage of acetals in acidic conditions. The synthesis is described in more detail in the following passages.

Synthesis of Compound 32: (20S,7R)-7,20-dimethyldispiro[1,3-dioxolane-2,5'-tetracyclo[8.7.0.0<2,7>0.0<11,15>]heptadecane-14',2''-1,3-dioxolane]-12-ene

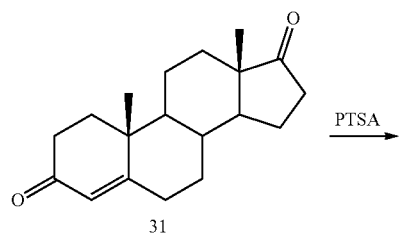
31

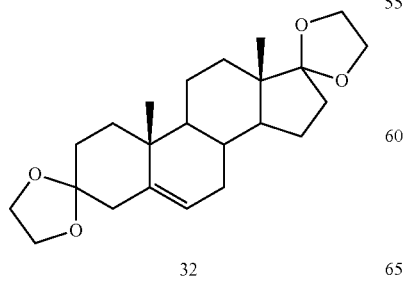
32

A mixture of androst-4-ene-3,17-dione 31 (400.0 g, 1.4 mol) and PTSA·H₂O (13.3 g, 70.0 mmol) in ethylene glycol (8.0 L) was stirred at 100° C. until the reaction was clear. About 5.0 L of glycol was distilled under vacuum so that the boiling temperature was around 80-85° C. The mixture was cooled down to room temperature. The mixture was adjusted to pH~9. Then, the mixture was poured into ice-water. The mixture was filtered, and the solid was washed with water, collected, and triturated with acetone to get crude compound 32 (469.0 g, 89%) as a yellow solid.

Synthesis of Compound 33: (20S,7R)-7,20-dimethyldispiro[1,3-dioxolane-2,5'-tetracyclo[8.7.0.0<2,7>0.0<11,15>]heptadecane-14',2''-1,3-dioxolane]-12-en-14-one

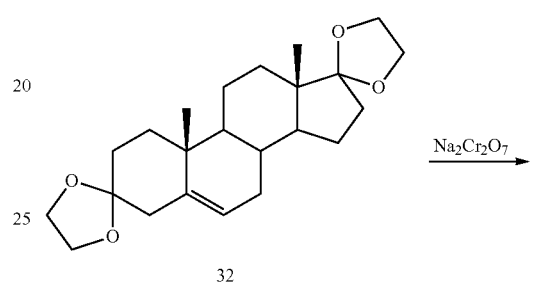
32

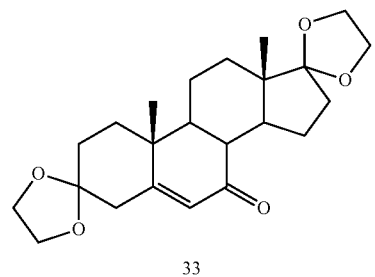
33

A mixture of compound 32 (440.0 g, 1.2 mol), HOSU (541.2 g, 4.7 mol) and Na₂Cr₂O₇·H₂O (527.5 g, 1.8 mol) in acetone (8.0 L) was vigorously stirred at 50° C. for 2 days. After cooling down to room temperature, the mixture was quenched with aq. Na₂SO₃ and stirred for 20 min. The mixture was poured into ice-water. The resulting mixture was stirred for 20 min and then filtered. The solid filtrate was washed with water, collected, and dried in vacuum to get crude compound 33 (390.0 g, 85%) as a yellow solid.

Synthesis of Compound 34: (7S,20S)-7,20-dimethyldispiro[1,3-dioxolane-2,5'-tetracyclo[8.7.0.0<2,7>0.0<11,15>]heptadecane-14',2''-1,3-dioxolane]-14-one

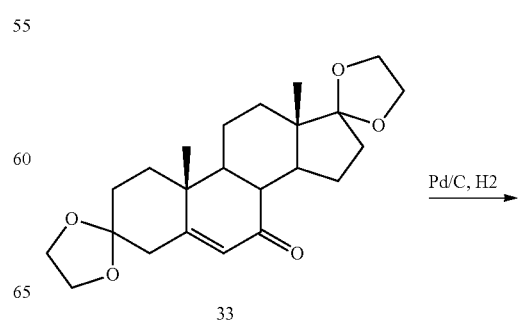
33

-continued

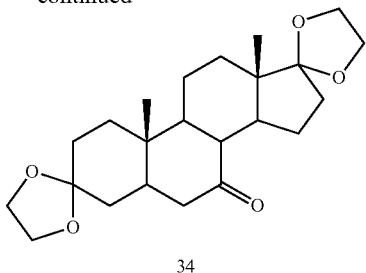
34

A mixture of compound 33 (50.0 g, 128.9 mmol) in EtOAc (1250 mL) was added to Pd/C (16.0 g). Then the mixture was stirred at room temperature overnight under $H_2$. TLC showed the reaction was completed. The mixture was filtered, concentrated, and purified by flash chromatography (PE/EA=2/1) to obtain compound 34 (25.0 g, 50.0%) as a white solid.

Synthesis of Compound 35: 1-((20S,7R)-7,20-dimethyldispiro[1,3-dioxolane-2,5'-tetracyclo[8.7.0.0<2,7>0.0<11,15>]heptadecane-14',2''-1,3-dioxolane]-13-en-14-yloxy)-1,1-dimethyl-1-silaethane

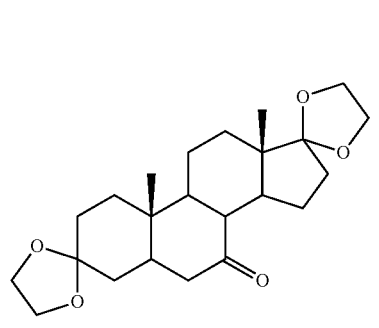
34

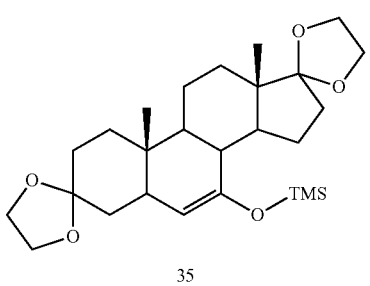
35

A mixture of compound 34 (20.0 g, 51.3 mmol) in dry THF (100.0 mL) was stirred at −78° C., and then 1.5 M LDA in toluene (205.2 mL, 307.8 mmol) was added dropwise. After stirring at the same temperature for 1 hr, Me₃SiCl (50.0 mL, 400.1 mmol) was added dropwise. After stirring at −70° C. for 3 hrs, the temperature was raised to −30° C. and triethylamine (33.5 g, 331.5 mmol) was added. After stirring at the same temperature for 1 hr, the mixture was warmed up to room temperature and water (200.0 mL) and EtOAc (100.0 mL) were added. The separated aqueous phase was extracted with EtOAc. The combined organic layers were washed with brine, dried over $Na_2SO_4$, filtered, and evaporated to dryness. The residue was purified by flash chromatography (PE/EA=2/1) to obtain compound 35 (14.3 g, 60.3%) as a white solid.

Synthesis of Compound 36: (13S,20S,7R)-13-(hydroxymethyl)-7,20-dimethyldispiro[1,3-dioxolane-2,5'-tetracyclo[8.7.0.0<2,7>0.0<11,15>]heptadecane-14',2''-1,3-dioxolane]-14-one

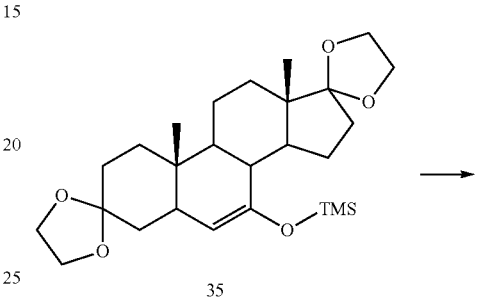
35

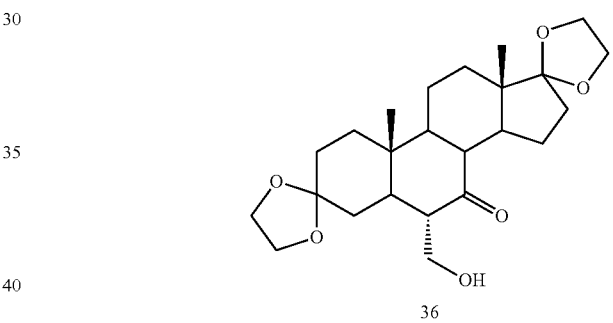
36

A mixture of 2,6-diphenylphenol (10.0 g, 27.6 mmol) in dry DCM (450.0 mL) was added dropwise to a solution of Me₃Al in toluene (41.4 mL, 82.9 mmol) while cooling with a ice/water bath so that the temperature did not exceed room temperature. After stirring at room temperature for 1 hr, the solution was cooled at 0° C., and a solution of trioxane (24.8 g, 276.0 mmol) in dry DCM (100.0 mL) was added dropwise. The light yellow solution was stirred for another 1 hr at 0° C. and then the temperature was cooled down to −78° C. A solution of compound 35 (10.0 g, 27.6 mmol) in dry DCM (125 mL) was added. After stirring at −78° C. for 1 h, the temperature was raised to −20° C. and the reaction mixture was stirred at that temperature overnight. 5% aq. NaHCO₃ (85.0 mL) was added at room temperature. The jelly mixture was filtered through a CELITE® pad washing thoroughly with DCM. The separated organic layer was washed with water and evaporated. About 1M TBAF in THF (24.0 mL) was added to the residue and the solution was stirred at room temperature for 1.5 h. The solution was washed with water, dried over $Na_2SO_4$, filtered, and evaporated to dryness. The residue was purified by flash chromatography to give compound 36 (6.5 g, 71.4%) as a yellow solid.

Synthesis of Compound 37: (6S,10R,13S)-6-(hydroxymethyl)-10,13-dimethyldecahydro-1H-cyclopenta[a]phenanthrene-3,7,17(2H,4H, 8H)-trione

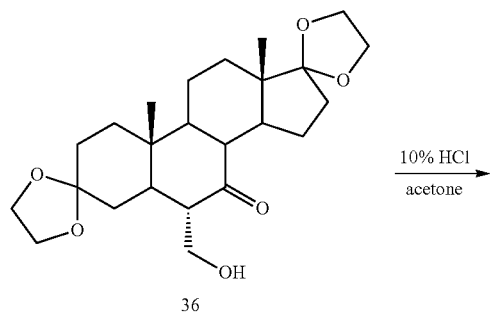

36

10% HCl / acetone →

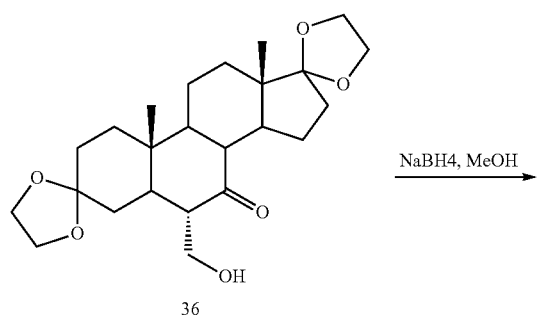

37

A mixture of compound 36 (8.0 g, 19.0 mmol) in acetone (100.0 mL) was added to 10% aq. HCl (50.0 mL). Then the mixture was heated to 70° C. for 1 h. TLC showed the reaction was completed. The mixture was quenched with 5% aq. NaOH and extracted with DCM (50.0 mL*2). The combined organic phases were washed with brine (50.0 mL), dried over $Na_2SO_4$, filtered, concentrated, and purified by flash chromatography (DCM/EA=4/1) to get the crude product, which was triturated with ether to get the pure product 37 (3.3 g, 52.4%) as a white solid.

Synthesis of Compound 38: (13S,14S,20S,7R)-13-(hydroxymethyl)-7,20-dimethyldispiro[1,3-dioxolane-2,5'-tetracyclo[8.7.0.0<2,7>0.0<11,15>]heptadecane-14',2''-1,3-dioxolane]-14-ol

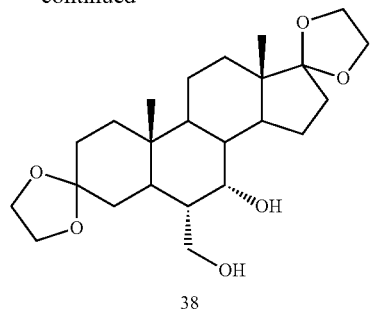

36

NaBH4, MeOH →

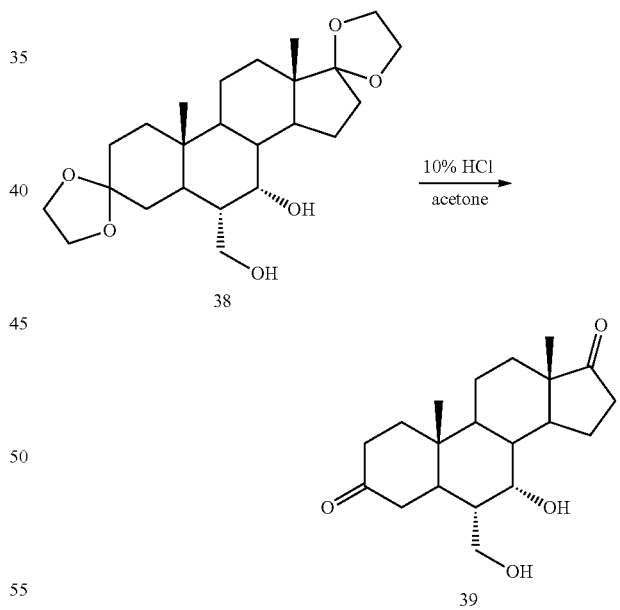

NaBH$_4$ (4.0 g, 104.8 mmol) was added slowly to a mixture of compound 36 (22.0 g, 52.4 mmol) in MeOH (1000.0 mL) at 0° C. Then the mixture was stirred at rt for 1 h. TLC showed the reaction was completed. The mixture was quenched with 5% aq. NaH$_2$PO$_4$ (220.0 mL) and extracted with DCM (300.0 mL*3). The combined organic phases were washed with brine (200.0 mL), dried over Na$_2$SO$_4$, filtered, concentrated, and purified by flash chromatography (DCM/EA=4/1) to get the crude product, which was triturated with ether to obtain the compound 38 (7.5 g, 34.1%) as a white solid.

Synthesis of Compound 39: (8S,9S,15S,2R)-9-hydroxy-8-(hydroxymethyl)-2,15-dimethyltetracyclo [8.7.0.0<2,7>0.0<11,15>]heptadecane-5,14-dione 10% aq. HCl (35.0 mL) was added to a mixture of compound 38 (5.7 g, 13.5 mmol) in acetone (70.0 mL). Then, the mixture was heated to 70° C. for 1 h. TLC showed the reaction was completed. The mixture was quenched with 5% aq. NaOH and extracted with DCM (50.0 mL*2). The combined organic phases were washed with brine (50 mL), dried over Na$_2$SO$_4$, filtered, and concentrated. The residue was purified by flash chromatography (DCM/EA=4/1) to get the crude product, which was triturated with ether to obtain the pure product 39 (1.8 g, 40.0%) as a white solid.

Synthesis of Compound 40: tert-butyl-(2-((6S,10R, 13S)-6-(hydroxymethyl)-10,13-dimethyl-7,17-dioxododecahydro-1H-cyclopenta[a]phenanthren-3(2H, 4H,10H)-ylidene)ethyl)azetidine-1-carboxylate

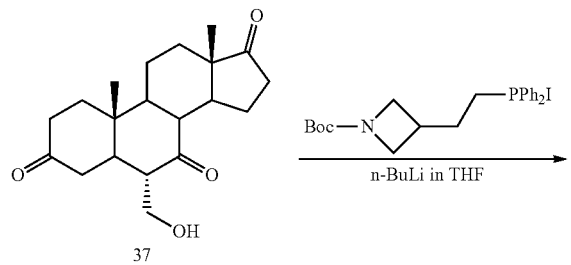

To a solution of phosphonium salt (2.57 g, 4.5 mmol) in THF (25 mL), a solution of n-BuLi in THF (2.5 M, 3.6 mL, 9.0 mmol) was added at −78° C. The mixture was stirred at 30° C. for 1 hour. Next, the compound 37 (500 mg, 1.5 mmol) was added to the mixture at −20° C. and then warmed to 30° C. for 2 hours. The mixture was quenched with sat.NH₄Cl (25 mL) and extracted with EtOAc (25 mL*3). The combined organic layers were concentrated and the residue was purified by column chromatography on silica gel (hexane/EtOAc=1/1) to give the crude compound. The compound was purified by reverse column to obtain pure compound 40 (60 mg, 8%) as a white solid.

Synthesis of Compound 41: tert-butyl-3-(2-((3S,6S, 10R,13S)-6-(hydroxymethyl)-10,13-dimethyl-7,17-dioxohexadecahydro-1H-cyclopenta[a]phenanthren-3-yl)ethyl)azetidine-1-carboxylate

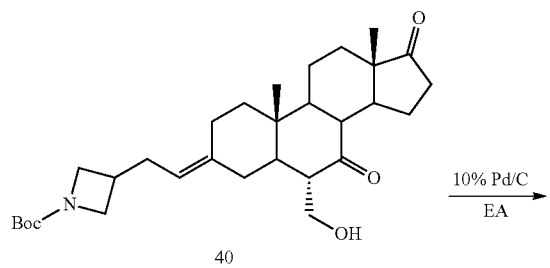

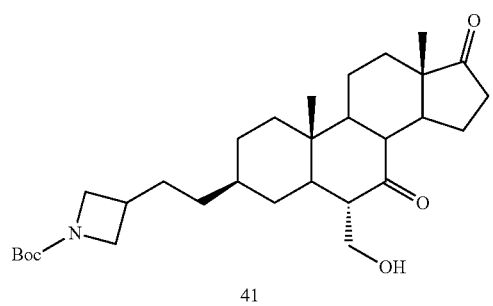

Pd/C (60 mg) was added to the solution of compound 40 (60 mg, 0.12 mmol) in EA (3 mL). Then, the mixture was stirred at room temperature overnight under H₂. The mixture was filtered and the filtrate was concentrated to produce compound 41 (52 mg, 86%) as a white solid.

Synthesis of CVie407: (3S,6S,10R,13S)-3-(2-(azetidin-3-yl)ethyl)-6-(hydroxymethyl)-10,13-dimethyl-dodecahydro-1H-cyclopenta[a]phenanthrene-7,17 (2H,8H)-dione

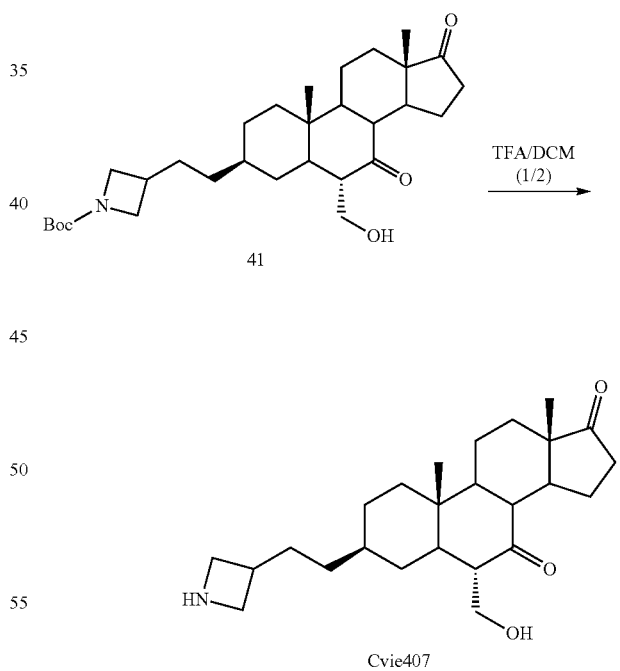

A solution of compound 41 (52 mg, 0.10 mmol) in TFA/DCM (1 mL/2 mL) was stirred at room temperature for 1 hour. The mixture was diluted with sat.NaHCO₃ to adjust to pH 8-9. The mixture was extracted with DCM (25 mL*3). The combined organic layers were concentrated and the residue was purified by prep-HPLC to produce compound Cvie407 (13 mg, 32%) as a white solid.

Synthesis of Compound 42: tert-butyl-3-((E)-2-((6S,10R,13S)-6-(hydroxymethyl)-10,13-dimethyl-7,17-dioxododecahydro-1H-cyclopenta[a]phenanthren-3(2H,4H,10H)-ylidene)ethyl)azetidine-1-carboxylate

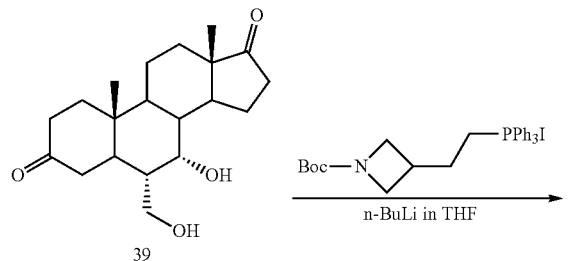

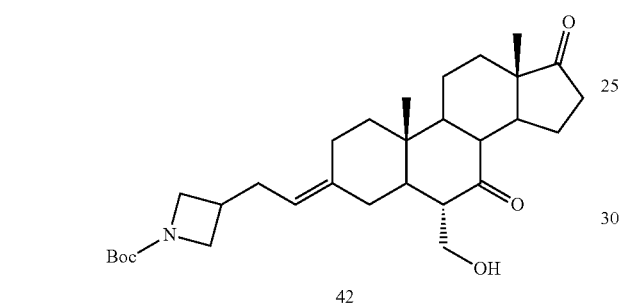

A solution of n-BuLi in THF (2.5 M, 0.7 mL, 1.80 mmol) was added to a solution of compound phosphonium salt (514 mg, 0.90 mmol) in THF (5 mL) at −78° C. The mixture was stirred at 40° C. for 1 hour. Then, compound 39 (100 mg, 0.30 mmol) was added to the mixture at 0° C. and then warmed to 40° C. overnight. The reaction was repeated for nine times. The mixture was quenched with sat.NH$_4$Cl (80 mL) and extracted with EtOAc (100 mL*3). The combined organic layers were concentrated and the residue was purified by prep-HPLC to produce compound 42 (20 mg, 1%) as a yellow solid.

Synthesis of CVie403: (6S,10R,13S)-3-(2-(azetidin-3-yl)ethylidene)-6-(hydroxymethyl)-10,13-dimethyl-dodecahydro-1H-cyclopenta[a]phenanthrene-7,17(2H,8H)-dione

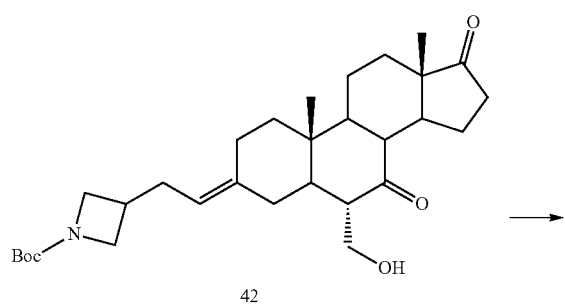

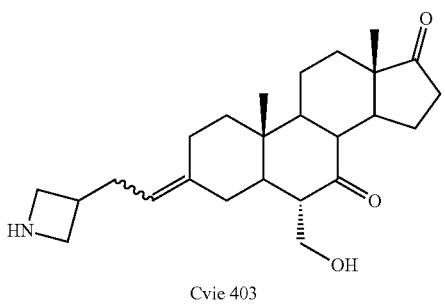

The solution of compound 40 (130 mg, 0.26 mmol) in TFA/DCM (1 mL/2 mL) was stirred at room temperature for 1 hour. The mixture was basified with sat.NaHCO$_3$ to pH 8-9. The mixture was extracted with DCM (30 mL*3). The combined organic layer was concentrated and the residue was purified by prep-HPLC to produce compound CVie403 (13 mg, yield 13%) as a yellow solid.

Synthesis of Compound 43: 3-(2-((6S,7S,10R,13S)-7-hydroxy-6-(hydroxymethyl)-10,13-dimethyl-17-oxohexadecahydro-1H-cyclopenta[a]phenanthren-3-yl)ethyl)azetidine-1-carboxylate

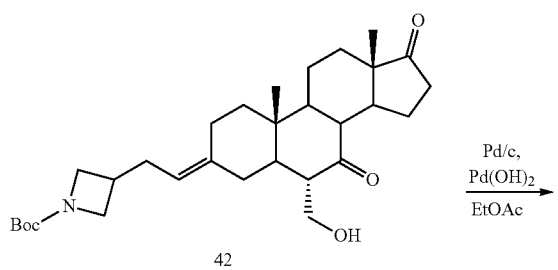

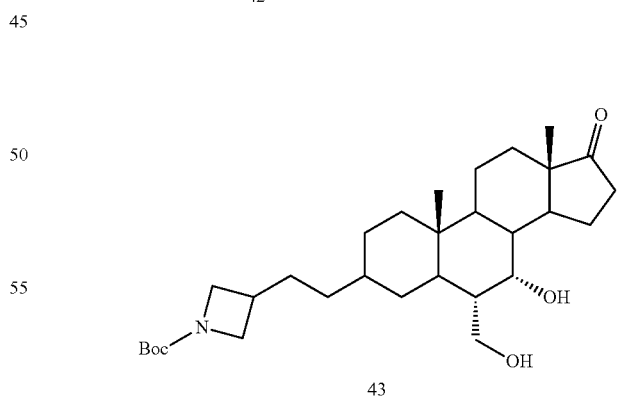

A mixture of compound 42 (20 mg, 0.04 mmol), Pd/C (10%, 20 mg), and Pd(OH)$_2$ (20%, 20 mg) in EtOAc (2 mL) was stirred at room temperature overnight under H$_2$ (in balloon). The mixture was filtered and the filtrate was concentrated to give the crude compound 43 (20 mg, 100%) as a brown solid.

Synthesis of CVie408: (6S,7S,10R,13S)-3-(2-(azetidin-3-yl)ethyl)-7-hydroxy-6-(hydroxymethyl)-10,13-dimethyltetradecahydro-1H-cyclopenta[a]phenanthren-17(2H)-one

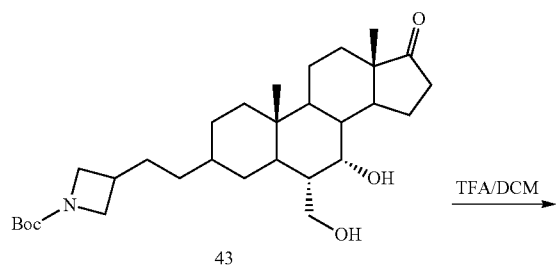

A mixture of compound 43 (20 mg, 0.04 mmol) in TFA/DCM (1:1, 2 mL) was stirred at 0° C. for 30 minutes. The mixture was diluted with sat.NaHCO$_3$ to adjust to pH 8-9. The mixture was extracted with DCM (25 mL*3). The combined organic layers were dried over Na$_2$SO$_4$, filtered and concentrated. The residue was purified by prep-HPLC to produce compound CVie408 (6.4 mg, 40%) as a yellow solid.

Synthesis of Compound 44: tert-butyl-3-(2-((6S, 10R,13S)-6-(hydroxymethyl)-10,13-dimethyl-7,17-dioxododecahydro-1H-cyclopenta[a]phenanthren-3(2H,4H,10H)-ylidene)ethyl)pyrrolidine-1-carboxylate

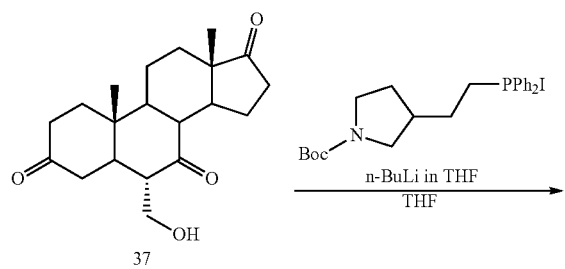

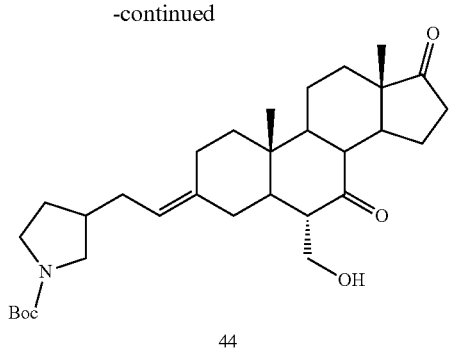

A solution of n-BuLi in THF (2.5M, 1.57 mL, 3.94 mmol) was added to a solution of compound phosphonium salt (1.5 g, 2.62 mmol) in THF (15 mL) at −78° C. The reaction mixture was stirred at 35° C. for 1 hour. Then, a solution of compound 37 (350 mg, 1.05 mmol) was added to the mixture at −20° C. and warmed to room temperature for 2 hours. The mixture was quenched with sat.NH$_4$Cl (25 mL) and extracted with EtOAc (25 mL*3). The combined organic layers were concentrated and the residue was purified by flash chromatography (hexane:EA=1:1) to give crude compound. Then the compound was purified by reverse column to obtain pure compound 44 (53 mg, 10%) as a white solid.

Synthesis of CVie402: (6S,10R,13S)-6-(hydroxymethyl)-10,13-dimethyl-3-(2-(pyrrolidin-3-yl)ethylidene)dodecahydro-1H-cyclopenta[a]phenanthrene-7,17(2H,8H)-dione A solution of compound 44 (89 mg, 0.173 mmol) in TFA/DCM (1 mL/2 mL) was stirred at room temperature for 1 hour. The mixture was diluted with sat.NaHCO$_3$ to adjust pH=8-9. The mixture was extracted with DCM (25 mL*3). The combined organic layer was concentrated and the residue was purified by prep-HPLC to produce compound CVie402 (38 mg, 53%) as a white solid.

Synthesis of Compound 45: tert-butyl-3-(2-((3S,6S,10R,13S)-6-(hydroxymethyl)-10,13-dimethyl-7,17-dioxohexadecahydro-1H-cyclopenta[a]phenanthren-3-yl)ethyl)pyrrolidine-1-carboxylate

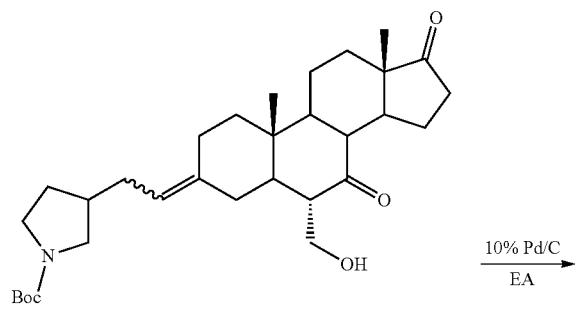

A solution of compound 44 (53 mg, 0.103 mmol) in EA (3 mL) was added to Pd/C (60 mg). Then, the mixture was stirred at room temperature overnight under H₂. The mixture was filtered and the filtrate was concentrated to produce compound 45 (50 mg, 94%) as a white solid.

Synthesis of CVie409: (3S,6S,10R,13S)-6-(hydroxymethyl)-10,13-dimethyl-3-(2-(pyrrolidin-3-yl)ethyl)dodecahydro-1H-cyclopenta[a]phenanthrene-7,17(2H,8H)-dione A solution of compound 45 (50 mg, 0.09 mmol) in TFA/DCM (1 mL/2 mL) was stirred at room temperature for 1 hour. The mixture was diluted with sat.NaHCO₃ to adjust to pH 8-9. The mixture was extracted with DCM (25 mL*3). The combined organic layers were concentrated and the residue was purified by prep-HPLC to produce compound CVie409 (12 mg, 32%) as a white solid.

Synthesis of Compound 46: tert-butyl-3-(2-((6S,7S,10R,13S)-7-hydroxy-6-(hydroxymethyl)-10,13-dimethyl-17-oxododecahydro-1H-cyclopenta[a]phenanthren-3(2H,4H,10H)-ylidene)ethyl)pyrrolidine-1-carboxylate A solution of n-BuLi in THF (2.5M, 0.7 mL, 1.80 mmol) was added to a solution of compound phosphonium salt (527 mg, 0.90 mmol) in THF (5 mL) at −78° C. The reaction mixture was stirred at 35° C. for 1 hour. Then compound 39 (100 mg, 0.30 mmol) was added to the mixture at 0° C. and then warmed to 35° C. overnight. The reaction was repeated for four times. The mixture was quenched with sat. NH₄Cl (80 mL) and extracted with EtOAc (100 mL*3). The combined organic layers were concentrated and the residue was purified by prep-HPLC to give compound 46 (26 mg, 3%) as a white solid.

63

Synthesis of Compound 47: tert-butyl-3-(2-((6S,7S,10R,13S)-7-hydroxy-6-(hydroxymethyl)-10,13-dimethyl-17-oxohexadecahydro-1H-cyclopenta[a]phenanthren-3-yl)ethyl)pyrrolidine-1-carboxylate

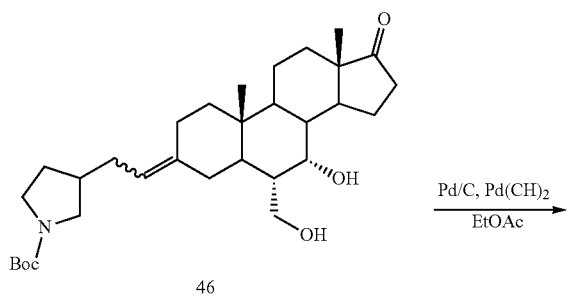

A mixture of compound 46 (26 mg, 0.05 mmol), Pd/C (10%, 30 mg), and Pd(OH)₂ (20%, 30 mg) in EtOAc (3 mL) was stirred at room temperature overnight under Hz (in balloon). The mixture was filtered and filtrate was concentrated to give the crude compound 47 (26 mg, 100%) as a yellow solid.

Synthesis of CVie410: (6S,7S,10R,13S)-7-hydroxy-6-(hydroxymethyl)-10,13-dimethyl-3-(2-(pyrrolidin-3-yl)ethyl)tetradecahydro-1H-cyclopenta[a]phenanthren-17(2H)-one

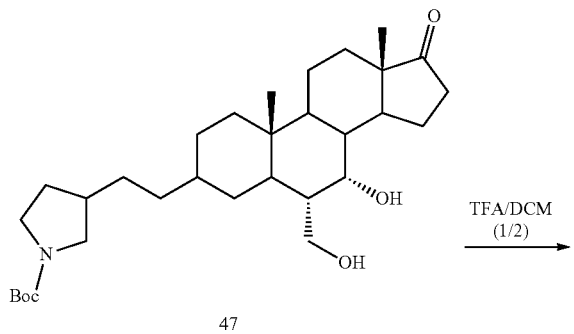

64

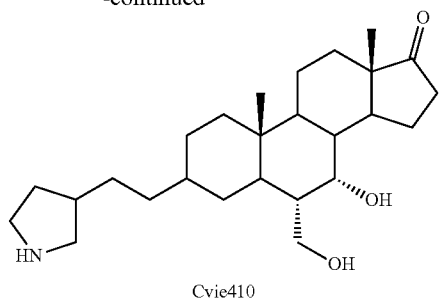

A solution of compound 47 (26 mg, 0.05 mmol) in TFA/DCM (1:2, 2 mL) was stirred at 0° C. for 1 hour. The mixture was diluted with sat.NaHCO₃ to adjust to pH 8-9. The mixture was extracted with DCM (20 mL*3). The combined organic layers were dried over Na₂SO₄, filtered and concentrated. The residue was purified by prep-HPLC to produce compound CVie410 (9 mg, 43%) as a yellow solid.

Synthesis of Compound 48: tert-butyl-4-(2-((6S,10R,13S)-6-(hydroxymethyl)-10,13-dimethyl-7,17-dioxododecahydro-1H-cyclopenta[a]phenanthren-3(2H,4H,10H)-ylidene)ethyl)piperidine-1-carboxylate

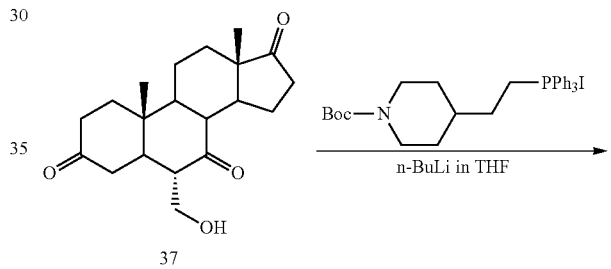

A solution of n-BuLi in THF (2.5 M, 2.90 mL, 7.20 mmol) was added to a mixture of compound phosphonium salt (2.16 g, 3.60 mmol) in THF (16 mL) at −78° C. The reaction mixture was stirred at 30° C. for 1 hour. Then compound 37 (400 mg, 1.20 mmol) was added to the mixture at −20° C. The mixture was stirred at −20° C. for 30 minutes and then warmed to 30° C. for 2 hours. The mixture was quenched with sat.NH₄Cl (15 mL) and extracted with EtOAc (30 mL*3). The combined organic layers were concentrated and the residue was purified by prep-HPLC to give the compound 48 (28 mg, 4%) as a yellow solid.

Synthesis of CVie405: (6S,10R,13S)-6-(hydroxymethyl)-10,13-dimethyl-3-(2-(piperidin-4-yl)ethylidene)dodecahydro-1H-cyclopenta[a]phenanthrene-7,17(2H,8H)-dione

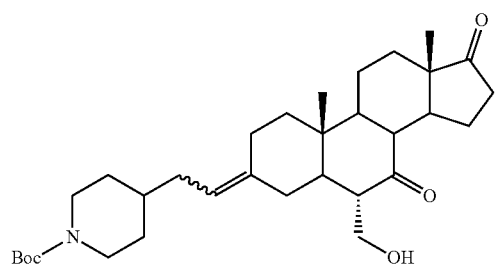

46

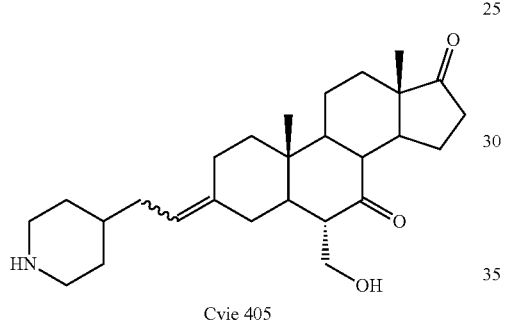

Cvie 405

A solution of compound 46 (80 mg, 0.152 mmol) in TFA/DCM (1 mL/2 mL) was stirred at room temperature for 30 minutes. The mixture was basified with sat.NaHCO₃ to pH=8-9. The mixture was extracted with DCM (25 mL*3). The combined organic layer was dried over Na₂SO₄, filtered and concentrated. The residue was purified by prep-HPLC to produce compound CVie405 (30 mg, 46%) as a yellow solid.

Synthesis of Compound 49: tert-butyl-4-(2-(((6S,10R,13S)-6-(hydroxymethyl)-10,13-dimethyl-7,17-dioxohexadecahydro-1H-cyclopenta[a]phenanthren-3-yl)ethyl)piperidine-1-carboxylate

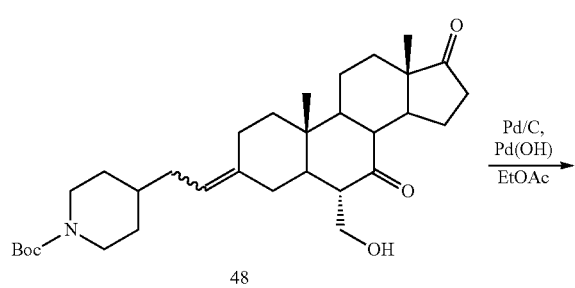

48

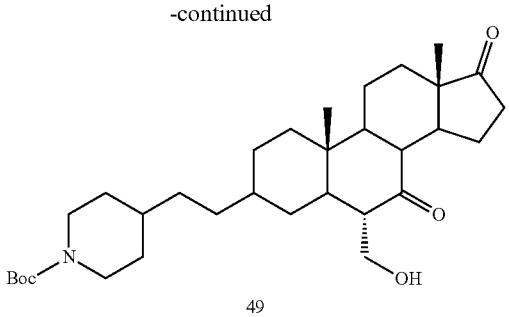

49

A mixture of compound 48 (28 mg, 0.05 mmol) and Pd/C (10%, 50 mg) in EtOAc (2 mL) was stirred at room temperature overnight under Hz (in balloon). The mixture was filtered and the filtrate was concentrated to give the crude compound 49 (28 mg, 100%) as a yellow solid.

Synthesis of CVie411: (6S,10R,13S)-6-(hydroxymethyl)-10,13-dimethyl-3-(2-(piperidin-4-yl)ethyl)dodecahydro-1H-cyclopenta[a]phenanthrene-7,17(2H,8H)-dione

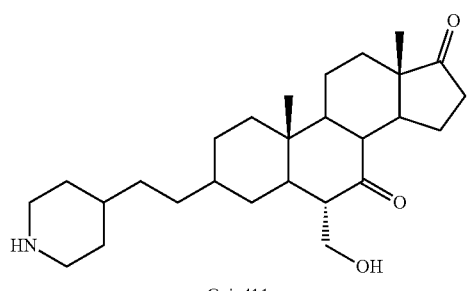

49

Cvie411

A solution of compound 49 (28 mg, 0.05 mmol) in TFA/DCM (1 mL/2 mL) was stirred at room temperature for 30 minutes. The mixture was diluted with sat. NaHCO₃ to adjust to pH 8-9. The mixture was extracted with DCM (25 mL*3). The combined organic layers were dried over Na₂SO₄, filtered and concentrated. The residue was purified by prep-HPLC to produce compound CVie411 (10 mg, 43%) as a yellow solid.

Synthesis of Compound 50: tert-butyl-4-(2-((6S, 10R,13S)-6-(hydroxymethyl)-10,13-dimethyl-7,17-dioxododecahydro-1H-cyclopenta[a]phenanthren-3(2H,4H,10H)-ylidene)ethyl)piperidine-1-carboxylate

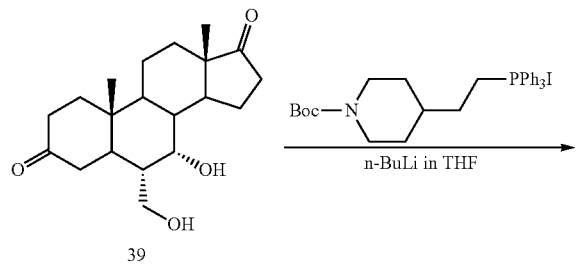

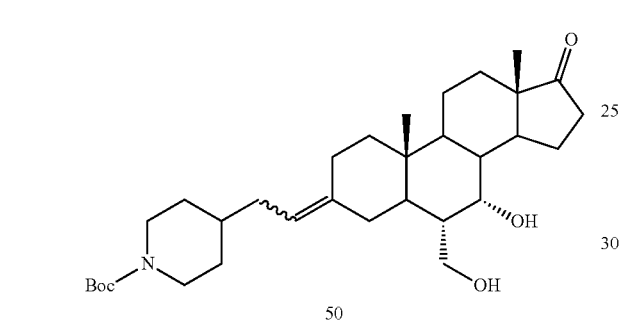

n-BuLi in THF (2.5 M, 0.70 mL, 1.80 mmol) was added to a solution of phosphonium salt (540 mg, 0.90 mmol) in THF (5 mL) at −78° C. The reaction mixture was stirred at 40° C. for 1 hour. Then, compound 39 (100 mg, 0.30 mmol) was added to the mixture at 0° C. and then warmed to 40° C. for 2 hours. The reaction was repeated for five times. The mixture was quenched with sat.NH$_4$Cl (80 mL) and extracted with EtOAc (100 mL*3). The combined organic layers were concentrated and the residue was purified by prep-HPLC to give the crude compound 50 (35 mg, 4%) as a white solid.

Synthesis of Compound 51: tert-butyl-4-(2-((6S,7S, 10R,13S)-7-hydroxy-6-(hydroxymethyl)-10,13-dimethyl-17-oxohexadecahydro-1H-cyclopenta[a]phenanthren-3-yl)ethyl)piperidine-1-carboxylate

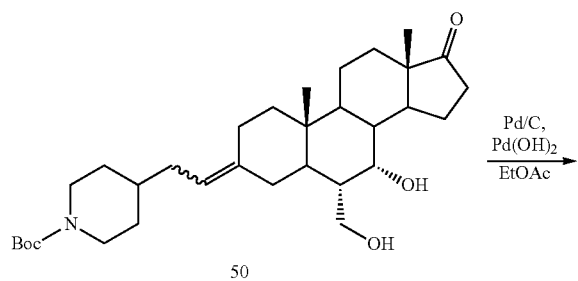

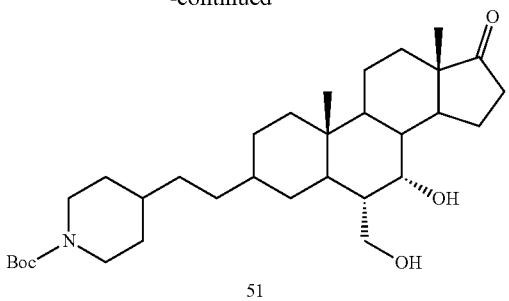

A mixture of compound 50 (35 mg, 0.07 mmol), Pd/C (10%, 40 mg), and Pd(OH)$_2$ (20%, 40 mg) in EtOAc (2 mL) was stirred at room temperature overnight under H$_2$ (in balloon). The mixture was filtered and the filtrated was concentrated to give the crude compound 51 (35 mg, 100%) as a brown solid.

Synthesis of CVie412: (6S,7S,10R,13S)-7-hydroxy-6-(hydroxymethyl)-10,13-dimethyl-3-(2-(piperidin-4-yl)ethyl)tetradecahydro-1H-cyclopenta[a]phenanthren-17(2H)-one

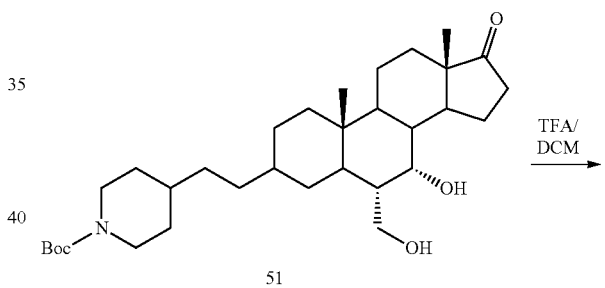

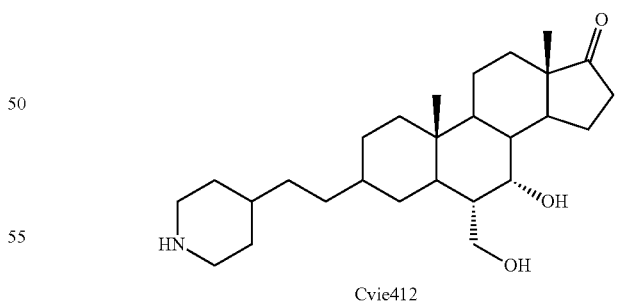

The solution of compound 51 (35 mg, 0.07 mmol) in TFA/DCM (1:2, 2 mL) was stirred at room temperature for 30 minutes. The mixture was diluted with sat. NaHCO$_3$ to adjust to pH 8-9. The mixture was extracted with DCM (25 mL*3). The combined organic layers were dried over Na$_2$SO$_4$, filtered and concentrated. The residue was purified by prep-HPLC to produce compound CVie412 (13 mg, 46%) as a yellow solid.

Synthesis of Compound 52: tert-butyl((E)-5-((6S,10R,13S)-6-(hydroxymethyl)-10,13-dimethyl-7,17-dioxododecahydro-1H-cyclopenta[a]phenanthren-3(2H,4H,10H)-ylidene)pentyl)(methyl)carbamate

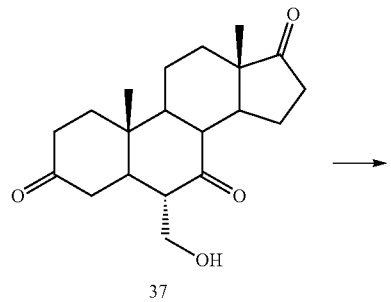

37

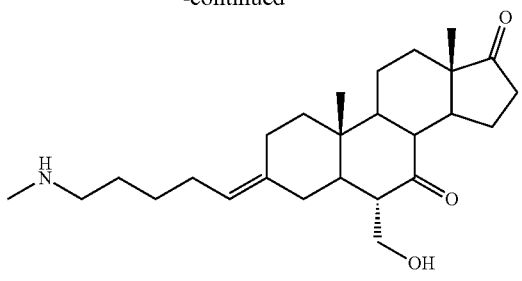

Cvie 401

A mixture of compound 52 (60 mg, 0.116 mmol) in TFA/DCM (1 mL/2 mL) was stirred at room temperature overnight. Then, the mixture was concentrated and diluted with EtOAc, washed with sat.Na$_2$CO$_3$, dried over Na$_2$SO$_4$, filtered, and concentrated to produce compound CVie401 (38 mg, 79%) as yellow oil.

Synthesis of Compound 53: tert-butyl(5-((6S,7S,10R,13S)-7-hydroxy-6-(hydroxymethyl)-10,13-dimethyl-17-oxododecahydro-1H-cyclopenta[a]phenanthren-3(2H,4H,10H)-ylidene)pentyl)(methyl)carbamate

52

To a mixture of N-Boc-N-methyl-5-triphenylphosphoniumpentenamine iodide (4.26 g, 7.23 mmol) in THF (50 mL), n-BuLi (3.18 mL, 7.95 mmol) was added dropwise at –78° C. The mixture was stirred at 0° C. for 20 mi. Then, the mixture was cooled to –30° C. Compound 37 (800 mg, 2.41 mmol) was then added to the reaction mixture. The mixture was stirred at r.t overnight. The reaction mixture was quenched with H$_2$O and concentrated. The residue was purified by column chromatography on silica gel (PE/EtOAc=1/2) and then purified by prep-HPLC to produce compound 52 (36 mg, 200 mg) as colorless oil.

Synthesis of CVie401: (6S,10R,13S,E)-6-(hydroxymethyl)-10,13-dimethyl-3-(5-(methylamino)pentylidene)dodecahydro-1H-cyclopenta[a]phenanthrene-7,17(2H,8H)-dione

39

53

52

To a mixture of N-Boc-N-methyl-5-triphenylphosphoniumpentenamine iodide (4.39 g, 7.45 mmol) in THF (45 mL), a solution of nBuLi in THF (4.46 mL, 2.5 N, 11.16 mmol) was added dropwise at –78° C. Then, the mixture was stirred at 0° C. for 20 min. The mixture was cooled to –50° C. and compound 39 (830 mg, 2.48 mmol) was added. The mixture was stirred at r.t overnight. The mixture was quenched with H$_2$O, concentrated and purified by column chromatography (PE/EtOAc=1/1) and then purified by prep-HPLC to give compound 53 (80 mg, 300 mg) as white solid.

Synthesis of CVie406: (6S,7S,10R,13S)-7-hydroxy-6-(hydroxymethyl)-10,13-dimethyl-3-(5-(methylamino)pentylidene)tetradecahydro-1H-cyclopenta[a]phenanthren-17(2H)-one

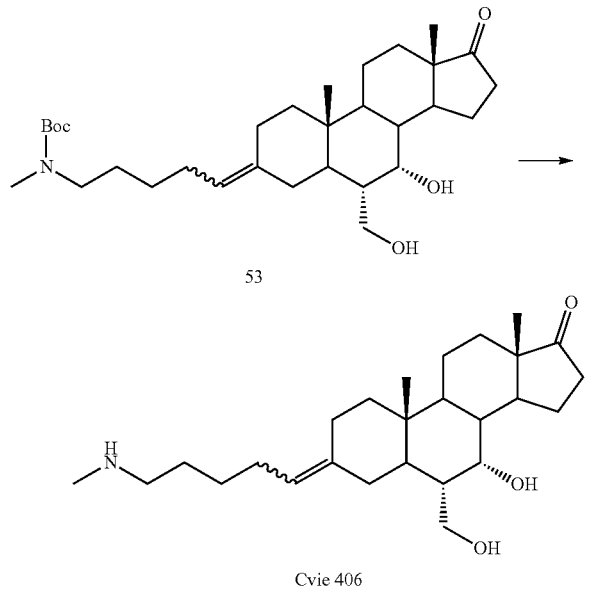 [SMILES: CN(CCCCC=C1CC[C@]2(C)C3CC[C@]4(C)C(=O)CCC4C3[C@H](O)[C@H](CO)C2C1)C(=O)OC(C)(C)C ; CNCCCCC=C1CC[C@]2(C)C3CC[C@]4(C)C(=O)CCC4C3[C@H](O)[C@H](CO)C2C1]

A solution of compound 53 (80 mg, 0.155 mmol) in TFA/DCM (1 mL/2 mL) was stirred at room temperature for 10 minutes. The mixture was basified with sat.NaHCO$_3$ to pH=8-9. The mixture was extracted with DCM (25 mL*2). The combined organic layer was dried over Na$_2$SO$_4$, filtered and concentrated. The residue was purified by prep-HPLC to give the compound CVie406 (60 mg, 94%) as a yellow solid.

The present invention can be described in one or more of the following aspects or combinations thereof:

Aspect 1: A compound having a formula (I)

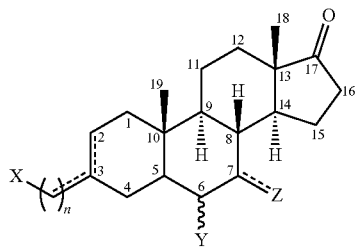

Wherein X is any one of a carboxylic acid, carboxylic ester and their bioisosters (sulfate, sulfonic acid, phosphate, phosphonate, or nitrogen-containing etherocyclic rings such as triazoles and tetrazoles), primary alcohol, ethers, or an amine group (e.g., primary amine, secondary amine, or cyclic amine);

n is 1, 2, 3, 4, or 5;

the C3-C1' dashed line represents an optional exocyclic double bond C=C at position C3-C1';

the C2-C3 dashed line represents an optional endocyclic double bond C=C;

Y at C6 is a hydroxyl (OH) in the α- or β-configuration or a hydroxymethyl (CH$_2$OH) in the α-configuration;

Z at C7 could be either —H or —OH in an α-configuration or a ketone. The dashed line represents an optional carbonyl group (C=O) in such position.

or a pharmaceutically acceptable salt, solvate, or hydrate thereof.

Aspect 2: The compound of aspect 1, wherein X is selected from the group consisting of a carboxylic acid, carboxylic ester, primary amine, secondary amine, and cyclic amine.

Aspect 3: The compound of aspect 1, wherein X is a carboxylic acid or a carboxylic ester.

Aspect 4: The compound of aspect 1, wherein X is not a primary amine, secondary amine, or cyclic amine.

Aspect 5: The compound of aspect 1, selected from the group consisting of: (E)-4-(6alpha-hydroxy-17-oxoandrostane-3-yliden) butyric acid; (Z)-4-(6alpha-hydroxy-17-oxoandrostane-3-yliden) butyric acid; (E)-4-(6beta-hydroxy-17-oxoandrostane-3-yliden)butyric acid; (Z)-4-(6beta-hydroxy-17-oxoandrostane-3-yliden) butyric acid; (E)-3-[2-(azetidin-3-yl)ethyliden]-6alpha-hydroxyandrostane-17-one; (Z)-3-[2-(azetidin-3-yl)ethyliden]-6alpha-hydroxyandrostane-17-one; (E)-3-(4-aminobutyl)-6alpha-hydroxyandrost-2-ene-17-one hydroiodide; 3-[2-(piperidin-4-yl)ethyl]-6alpha-hydroxyandrost-2-ene-17-one hydroiodide; (EZ)-3-(4-aminobutyliden)-6alpha-hydroxyandrostane-17-one; (E)-3-[2-(piperidin-4-yl)ethyliden]-6alpha-hydroxyandrostane-17-one; (Z)-3-[2-(piperidin-4-yl)ethyliden]-6alpha-hydroxyandrostane-17-one; 3beta-[2-(piperidin-4-yl)ethyl]-6alpha-hydroxyandrostane-17-one; Ethyl (6alpha-hydroxy-17-ketoandrostane-3beta-yl) acetate; 4-(6alpha-hydroxy-17-oxoandrostane-3-yl) butyric acid; 4-(6beta-hydroxy-17-oxoandrostane-3-yl) butyric acid; 2-(6beta-hydroxy-17-oxoandrostane-3-yl) acetic acid; 4-(6alpha-hydroxy-17-oxoandrostane-3-yl) ethylbutiroate; 4-(6alpha-hydroxy-17-oxoandrostane-3-yl) ethylcaproate; 4-(6beta-hydroxy-17-oxoandrostane-3-yl) caproic acid; (E,Z)-3-(5-N-methylaminopentyliden]-6alpha-hydroxymethylandrostane-7,17-dione; (E,Z)-3-[2-(pirrolidin-3yl)ethyliden]-6alpha-hydroxymethylandrostane-7,17-dione; (E,Z)-3-[2-(azetidin-2-yl)ethyliden]-6alpha-hydroxymethylandrostane-7,17-dione; (E,Z)-3-[2-(piperidin-4-yl)ethyliden]-6alpha-hydroxymethylandrostane-7,17-dione; (E,Z)-3-(5-N-methylaminopentyliden)-6alpha-hydroxymethyl-7alpha-hydroxyandrostane-17-one; 3beta-[2-(azetidin-2-yl) ethyl]-6alpha-hydroxymethylandrostane-7,17-dione; 3beta-[2-(azetidin-2-yl) ethyl]-6alpha-hydroxymethyl-7alpha-hydroxyandrostane-17-one; 3beta-[2-(pirrolidin-3yl) ethyl]-6alpha-hydroxymethylandrostane-7,17-dione; 3beta-[2-(pirrolidin-3yl)ethyl] 6alpha-hydroxymethyl-7alpha-hydroxyandrostane-17-one; 3beta-[2-(piperidin-4-yl) ethyl]-6alpha-hydroxymethylandrostane-7,17-dione; and 3beta-[2-(piperidin-4-yl) ethyl]-6alpha-hydroxymethyl-7alpha-hydroxyandrostane-17-one.

Aspect 6: The compound of aspect 1, selected from the group consisting of: (E)-4-(6alpha-hydroxy-17-oxoandrostane-3-yliden) butyric acid; (Z)-4-(6alpha-hydroxy-17-oxoandrostane-3-yliden) butyric acid; (E)-4-(6beta-hydroxy-17-oxoandrostane-3-yliden) butyric acid; (Z)-4-(6beta-hydroxy-17-oxoandrostane-3-yliden) butyric acid; Ethyl (6alpha-hydroxy-17-ketoandrostane-3beta-yl) acetate; 4-(6alpha-hydroxy-17-oxoandrostane-3-yl) butyric acid; 4-(6beta-hydroxy-17-oxoandrostane-3-yl) butyric acid; 2-(6beta-hydroxy-17-oxoandrostane-3-yl) acetic acid; 4-(6alpha-hydroxy-17-oxoandrostane-3-yl) ethylbutiroate; 4-(6alpha-hydroxy-17-oxoandrostane-3-yl) ethylcaproate; and 4-(6beta-hydroxy-17-oxoandrostane-3-yl) caproic acid.

Aspect 7: The compound of aspect 1, selected from the group consisting of 4-(6alpha-hydroxy-17-oxoandrostane-3-yl) butyric acid and 2-(6beta-hydroxy-17-oxoandrostane-3-yl) acetic acid.

Aspect 8: The compound of any one of aspects 1-7, wherein the pharmaceutically acceptable salt is selected from chloride, bromide, sulfate, phosphate, nitrate, fumarate, succinate, oxalate, malate, tartrate, maleate, citrate, methanesulfate, and benzoate.

Aspect 9: A pharmaceutical composition for use in a method for the treatment of heart failure comprising a therapeutically effective amount of one or more of the compounds of any one of aspects 1-8, in combination with at least one pharmaceutically acceptable vehicle and/or excipient.

Aspect 10: The pharmaceutical composition of aspect 9, formulated for enteral administration, parenteral administration, or inhalation.

Aspect 11: The pharmaceutical composition of aspect 10, formulated for oral administration.

Aspect 12: The pharmaceutical composition of aspect 11, administered at a dose of between about 1 mg/kg and about 20 mg/kg, optionally, the dose is between about 1 mg/kg and about 10 mg/kg.

Aspect 13: The pharmaceutical composition of aspect 9, formulated for intravenous injection.

Aspect 14: The pharmaceutical composition of aspect 13, administered at a dose of between about 0.125 mg/kg and about 10 mg/kg, optionally, the dose is between about 0.25 mg/kg and about 5 mg/kg.

Aspect 15: The pharmaceutical composition of aspect 9, formulated for intramuscular injection.

Aspect 16: The pharmaceutical composition of aspect 15, administered at a dose of between about 0.25 mg/kg and about 50 mg/kg, optionally, the dose is between about 0.25 mg/kg and about 35 mg/kg.

Aspect 17: The pharmaceutical composition of any one of aspects 9-16, administered at least once per day.

Aspect 18: The pharmaceutical composition of any one of aspects 9-17, further comprising one or more additional therapeutically active ingredients.

Aspect 19: The pharmaceutical composition of aspect 18, wherein said one or more additional therapeutically active ingredients are selected from the group consisting of ACE inhibitors, AIRBs, diuretics, $Ca^{2+}$ channel blockers, p blockers, digitalis, NO donors, vasodilators, SERCA2a stimulators, neprilysin (NEP) inhibitors, myosin filament activators, recombinant relaxin-2 mediators, recombinant NP protein, activators of the soluble guanylate cyclase (sGC), and beta-arrestin ligand of angiotensin II receptor.

Aspect 20: The pharmaceutical composition of aspect 19, wherein said diuretic is selected from the group consisting of furosemide, bumetanide, torasemide, metolazone, an aldosterone antagonist, thiazide diuretics.

Aspect 21: The pharmaceutical composition of aspect 19, wherein said ACE inhibitor is lisinopril or ramipril.

Aspect 22: The pharmaceutical composition of aspect 18, wherein said one or more additional therapeutically active ingredients are selected from the group consisting of valsartan, candesartan, olmesartan, telmisartan, losartan, sacubitril, carvedilol, omecamtiv, and metoprolol.

Aspect 23: A compound of any one of aspects 1-8 for use as a medicament.

Aspect 24: The compound of aspect 23, for use in treating heart failure.

Aspect 25: The compound of aspect 24, for use in treating acute heart failure.

Aspect 26: The compound of aspect 24, for use in treating chronic heart failure.

Aspect 27: A method of treating an individual having heart failure, the method comprising the steps of: (1) providing an individual having heart failure; (2) administering to the individual a therapeutically effective amount of a pharmaceutical composition comprising (i) a pharmaceutically acceptable carrier and (ii) a predominantly pure SERCA2a stimulator or a pharmaceutically acceptable salt, solvate, or hydrate thereof; and (3) measuring one or more parameters of heart function; wherein the administering of the pharmaceutical composition results in an improvement in heart function.

Aspect 28: The method of aspect 27, wherein the predominantly pure SERCA2a stimulator has the general formula (I):

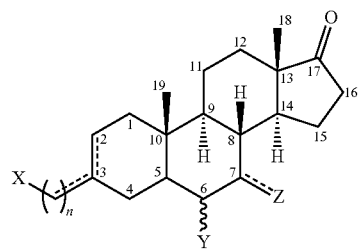

wherein:
X is selected from the group consisting of a carboxylic acid, carboxylic ester, bio-isoster of a carboxylic acid or carboxylic ester (e.g., sulfate, sulfonic acid, phosphate, phosphonate, and nitrogen-containing etherocyclic rings such as triazoles and tetrazoles), primary alcohol, ether, or an amine group (e.g., primary amine, secondary amine, or cyclic amine);
Y is a hydroxyl (OH) in an α-configuration, a hydroxyl (OH) in a β-configuration, or a hydroxymethyl ($CH_2OH$) in an α-configuration;
Z is selected from the group consisting of a hydrogen (H), a hydroxyl (OH) in an α-configuration, and a ketone (O);
n is between 1 and 5; and
a dotted line represents an optional double bond (C═C).

Aspect 29: The method of aspect 28, wherein X is selected from the group consisting of a carboxylic acid, carboxylic ester, primary amine, secondary amine, and cyclic amine.

Aspect 30: The method of aspect 28, wherein X is a carboxylic acid or a carboxylic ester.

Aspect 31: The method of aspect 28, wherein X is not a primary amine, secondary amine, or cyclic amine.

Aspect 32: The method of aspect 28, wherein the predominantly pure SERCA2a stimulator is selected from the group consisting of: (E)-4-(6alpha-hydroxy-17-oxoandrostane-3-yliden)butyric acid; (Z)-4-(6alpha-hydroxy-17-oxoandrostane-3-yliden) butyric acid; (E)-4-(6beta-hydroxy-17-oxoandrostane-3-yliden) butyric acid; (Z)-4-(6beta-hydroxy-17-oxoandrostane-3-yliden) butyric acid; (E)-3-[2-(azetidin-3-yl)ethyliden]-6alpha-hydroxyandrostane-17-one; (Z)-3-[2-(azetidin-3-yl)ethyliden]-6alpha-hydroxyandrostane-17-one; (E)-3-(4-aminobutyl)-6alpha-hydroxyandrost-2-ene-17-one hydroiodide; 3-[2-(piperidin-4-yl)ethyl]-6alpha-hydroxyandrost-2-ene-17-one hydroiodide; (E,Z)-3-(4-aminobutyliden)-6alpha-hydroxyandrostane-17-one; (E)-3-[2-(piperidin-4-yl)ethyliden]-6alpha-hydroxyandrostane-17-one; (Z)-3-[2-(piperidin-4-yl)

ethyliden]-6alpha-hydroxyandrostane-17-one; 3beta-[2-(piperidin-4-yl)ethyl]-6alpha-hydroxyandrostane-17-one; Ethyl (6alpha-hydroxy-17-ketoandrostane-3beta-yl) acetate; 4-(6alpha-hydroxy-17-oxoandrostane-3-yl) butyric acid; 4-(6beta-hydroxy-17-oxoandrostane-3-yl) butyric acid; 2-(6beta-hydroxy-17-oxoandrostane-3-yl) acetic acid; 4-(6alpha-hydroxy-17-oxoandrostane-3-yl) ethylbutiroate; 4-(6alpha-hydroxy-17-oxoandrostane-3-yl) ethylcaproate; 4-(6beta-hydroxy-17-oxoandrostane-3-yl) caproic acid; (E,Z)-3-(5-N-methylaminopentyliden]-6alpha-hydroxymethylandrostane-7,17-dione; (E,Z)-3-[2-(pirrolidin-3yl)ethyliden]-6alpha-hydroxymethylandrostane-7,17-dione; (E,Z)-3-[2-(azetidin-2-yl)ethyliden]-6alpha-hydroxymethylandrostane-7,17-dione; (E,Z)-3-[2-(piperidin-4-yl)ethyliden]-6alpha-hydroxymethylandrostane-7,17-dione; (E,Z)-3-(5-N-methylaminopentyliden)-6alpha-hydroxymethyl-7alpha-hydroxyandrostane-17-one; 3beta-[2-(azetidin-2-yl)ethyl]-6alpha-hydroxymethylandrostane-7,17-dione; 3beta-[2-(azetidin-2-yl)ethyl]-6alpha-hydroxymethyl-7alpha-hydroxyandrostane-17-one; 3beta-[2-(pirrolidin-3yl)ethyl]-6alpha-hydroxymethylandrostane-7,17-dione; 3beta-[2-(pirrolidin-3yl)ethyl]6alpha-hydroxymethyl-7alpha-hydroxyandrostane-17-one; 3beta-[2-(piperidin-4-yl)ethyl]-6alpha-hydroxymethylandrostane-7,17-dione; and 3beta-[2-(piperidin-4-yl)ethyl]-6alpha-hydroxymethyl-7alpha-hydroxyandrostane-17-one.

Aspect 33: The method of aspect 28, wherein the predominantly pure SERCA2a stimulator is selected from the group consisting of: (E)-4-(6alpha-hydroxy-17-oxoandrostane-3-yliden) butyric acid; (Z)-4-(6alpha-hydroxy-17-oxoandrostane-3-yliden) butyric acid; (E)-4-(6beta-hydroxy-17-oxoandrostane-3-yliden) butyric acid; (Z)-4-(6beta-hydroxy-17-oxoandrostane-3-yliden) butyric acid; Ethyl (6alpha-hydroxy-17-ketoandrostane-3beta-yl)acetate; 4-(6alpha-hydroxy-17-oxoandrostane-3-yl) butyric acid; 4-(6beta-hydroxy-17-oxoandrostane-3-yl) butyric acid; 2-(6beta-hydroxy-17-oxoandrostane-3-yl) acetic acid; 4-(6alpha-hydroxy-17-oxoandrostane-3-yl) ethylbutiroate; 4-(6alpha-hydroxy-17-oxoandrostane-3-yl) ethylcaproate; and 4-(6beta-hydroxy-17-oxoandrostane-3-yl) caproic acid.

Aspect 34: The method of aspect 28, wherein the predominantly pure SERCA2a stimulator is selected from the group consisting of 4-(6alpha-hydroxy-17-oxoandrostane-3-yl) butyric acid and 2-(6beta-hydroxy-17-oxoandrostane-3-yl) acetic acid.

Aspect 35: The method of any one of aspects 28-34, wherein the pharmaceutically acceptable salt is selected from chloride, bromide, sulfate, phosphate, nitrate, fumarate, succinate, oxalate, malate, tartrate, maleate, citrate, methanesulfate, and benzoate.

Aspect 36: The method of any one of aspects 28-35, wherein the pharmaceutical composition is administered orally.

Aspect 37: The method of aspect 36, wherein the pharmaceutical composition is administered at a dose of between about 1 mg/kg and about 20 mg/kg, optionally, the dose is between about 1 mg/kg and about 10 mg/kg.

Aspect 38: The method of any one of aspects 28-35, wherein the pharmaceutical composition is administered intravenously.

Aspect 39: The method of aspect 38, wherein the pharmaceutical composition is administered at a dose of between about 0.125 mg/kg and about 10 mg/kg, optionally, the dose is between about 0.25 mg/kg and about 5 mg/kg.

Aspect 40: The method of any one of aspects 28-35, wherein the pharmaceutical composition is administered intramuscularly.

Aspect 41: The method of aspect 40, wherein the pharmaceutical composition is administered at a dose of between about 0.25 mg/kg and about 50 mg/kg, optionally, the dose is between about 0.25 mg/kg and about 35 mg/kg.

Aspect 42: The method of any one of aspects 28-41, wherein the pharmaceutical composition comprises one or more additional therapeutically active ingredients.

Aspect 43: The method of aspect 42, wherein said one or more additional therapeutically active ingredients are selected from the group consisting of ACE inhibitors, AIRBs, diuretics, $Ca^{2+}$ channel blockers, p blockers, *digitalis*, NO donors, vasodilators, SERCA2a stimulators, neprilysin (NEP) inhibitors, myosin filament activators, recombinant relaxin-2 mediators, recombinant NP protein, activators of the soluble guanylate cyclase (sGC), and beta-arrestin ligand of angiotensin II receptor.

Aspect 44: The method of aspect 43, wherein said diuretic is selected from the group consisting of furosemide, bumetanide, torasemide, metolazone, an aldosterone antagonist, thiazide diuretics.

Aspect 45: The method of aspect 43, wherein said ACE inhibitor is lisinopril or ramipril.

Aspect 46: The method of aspect 42, wherein said one or more additional therapeutically active ingredients are selected from the group consisting of valsartan, candesartan, olmesartan, telmisartan, losartan, sacubitril, carvedilol, omecamtiv, and metoprolol.

Aspect 47: The method of any one of aspects 28-46, wherein the individual is human.

Aspect 48: The method of any one of aspect 28-47, wherein the one or more parameters of heart function are selected from the group consisting of $Ca^{2+}$ transient (CaT) amplitude, $Ca^{2+}$-induced $Ca^{2+}$ release (CICR), rate-dependency of action potential duration at 90% repolarization (APD90), diastolic membrane potential ($E_{diast}$), maximum depolarization velocity ($dV/dt_{max}$), heart rate, heart pressure, systolic blood pressure, diastolic blood pressure, LVEF, E/e' ration, E/Ea ratio, E/A ratio, and stroke volume.

Aspect 49: The method of any one of aspects 28-48, wherein the measuring step is carried out before, during, and/or after the administering step.

The following examples further illustrate the present invention.

Example 1: Preparation of the Compounds of Formula (I)

In the following examples, chemical compounds, solvents, reactants and any other material are from commercial sources, except where otherwise stated. Generally, compounds of formula (I) were prepared by multistep synthesis starting from dehydroepiandrosterone (prasterone). Dehydroepiandrosterone is a commercial product or can be prepared according to well-known methods starting from 4-androsten-3,17-dione (androstenedione).

Preparation of 5α-Androstane-3β,6α,17β-triol

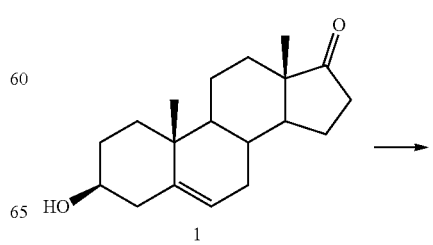

1

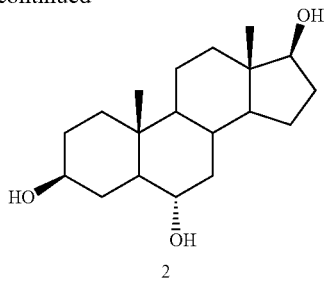

2

A suitable intermediate for the synthesis of 6-α-3,17 androstanedione (2) was produced from dehydroepiandrosterone 1 by hydroboration followed by oxidation as described in De Munari, et al. (J. Med. Chem., 2003, 46(17):3644-54), the entire content of which is incorporated by reference herein. Briefly, a solution of dehydroepiandrosterone 1 (5 g, 17.5 mmol, 1 eq.) in THF (85 mL) was stirred at −20° C. under Ar. Then, 1M $BH_3$·THF complex in THF was added to the stirred solution (44 mL, 44 mmol, 2.5 eq.), and stirring was continued at room temperature for 3 hours. $H_2O$ (85 mL) was cautiously added dropwise and followed by the dropwise addition of $NaBO_3$·$4H_2O$ (5.4 g, 35 mmol, 2 eq). After stirring at room temperature overnight, the mixture was filtered. The solid was washed with THF and then discarded. The liquors were saturated with NaCl and extracted with THF (3×40 mL). The combined organic extracts were dried over NaCl and $Na_2SO_4$, filtered, and evaporated to dryness. The crude 5α-Androstane-3β,6α,17β-triol 2 product was crystallized from EtOAc/MeOH (2/1, 10 mL/g) to give a white solid (3.8 g, 70%).

Spectroscopic Data for
5α-Androstane-3β,6α,17β-triol 2

$^1$H NMR (DMSO-d6) δ 4.44 (m, 1H, OH), 4.42 (m, 1H, OH), 4.24 (d, 1H, OH), 3.42 (dt, 1H, 16-Ha), 3.26 (m, 1H, 3-H), 3.12 (m, 1H, 6-H), 0.72 (s, 3H, $CH_3$), 0.60 (s, 3H, $CH_3$). mp 232-234° C.

Preparation of 6α-Hydroxyandrostane-3,17-dione

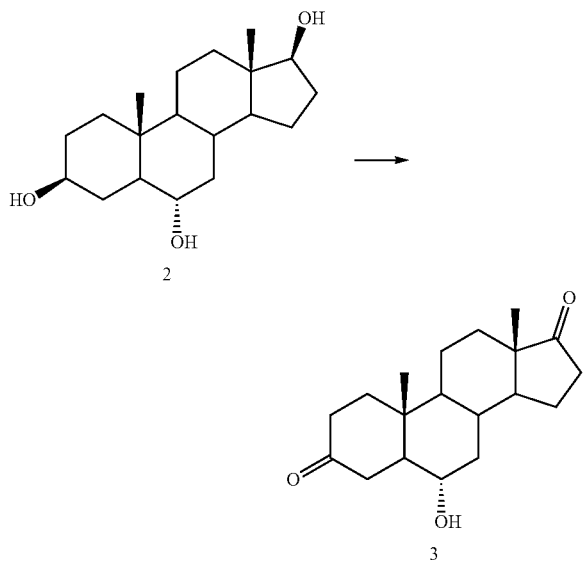 [SMILES: C[C@]12CC[C@H](O)CC1[C@@H](O)CC1C2CC[C@@]2(C)C1CC[C@@H]2O ; C[C@]12CCC(=O)CC1[C@@H](O)CC1C2CC[C@]2(C)C(=O)CCC12]

Intermediate 3 was obtained from 2 by selective oxidation at C3 and C17 positions. NBS (3.4 g, 19.5 mmol, 3 eq) was added to a stirred solution of 5α-Androstane-3β,6α,17β-triol 2 (2 g, 6.5 mmol, 1 eq) in dioxane/H2O/pyridine (54/10/1 mL) at 0° C. After the addition, the mixture was allowed to warm to room temperature and was stirred overnight. The orange solution was diluted with water (50 mL) and quenched with $Na_2S_2O_3$ (350 mg). The organic solvent was evaporated under vacuum until a white solid appears. The solid was filtered and washed with water. After drying at 40° C., 6α-hydroxyandrostane-3,17-dione 3 was obtained as a white solid (1.3 g, 70%).

Spectroscopic data for
6α-hydroxyandrostane-3,17-dione 3

$^1$H NMR (acetone-d6) δ 3.61 (d, 1H, OH), 3.48 (m, 1H, 6-H), 1.11 (s, 3H, $CH_3$), 0.86 (s, 3H, $CH_3$). mp 204-206° C. lit. 206-207 (Hammerschmidt & Spiteller, 1973)

Synthesis of adrostan-3-methylene-17-one

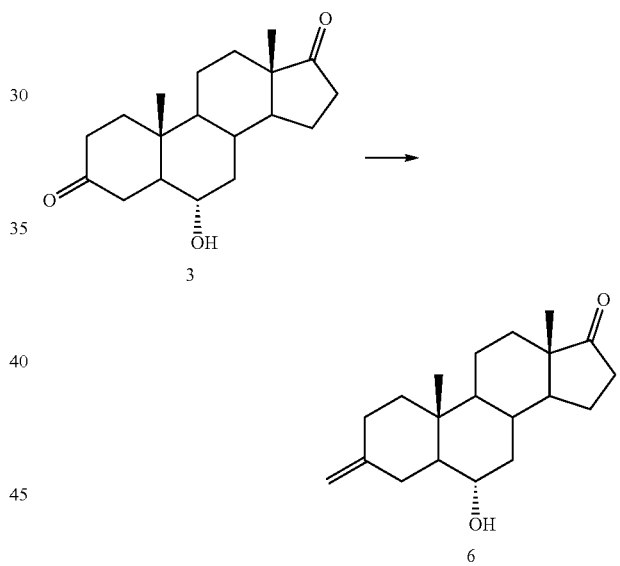

6-α-3,17 androstanedione 3 was then converted to the exo-methane derivative 6 (adrostan-3-methylene-17-one) via a Wittig reaction selective on the C3 carbonyl followed by the cross-metathesis coupling with 5-pentenoic acid. t-BuOK (670 mg, 6 mmol, 4 eq.) was added to a suspension of methyltriphenylphosphonium bromide (1.66 g, 6 mmol, 4 eq.) in THF (10 mL) at −5° C. The solution immediately changed colour to bright orange. After 10 minutes, 6α-hydroxy androstane-3,17-dione 3 (450 mg, 1.5 mmol, 1 eq.) was added while the temperature was kept below 0° C. Immediately after the addition, the reaction was quenched by the addition of aq. 1M HCl (15 mL) and extracted with EtOAc (3×20 mL). The combined organic phases were dried over $Na_2SO_4$ and evaporated to dryness. The crude extracts were purified over column chromatography (eluent EtOAc: Petroleum spirit 4:6) to produce 376 mg (83%) of adrostane-3-methylene-17-one 6 as a white foam.

Spectroscopic data for adrostane-3-methylene-17-one 6

$^1$H NMR (400 MHz, Chloroform-d) δ 4.63 (dt, 2H, 3α-CH$_2$), 3.47 (td, 1H, 6-H), 2.55 (ddd, 1H, 16Ha), 2.44 (ddd, 1H, 16-Hb), 0.89 (s, 3H, CH$_3$), 0.86 (s, 3H, CH$_3$), 0.80-0.70 (m, 1H, 5-H).

$^{13}$C NMR (101 MHz, Chloroform-d) δ 220.79 (17-C), 148.22 (3-C), 107.40 (3-CH$_2$), 69.85 (6-C), 13.79 (CH$_3$), 12.91 (CH$_3$).

Direct Synthesis of CVie 201 and 202 from Precursor 6 by Cross-Metathesis

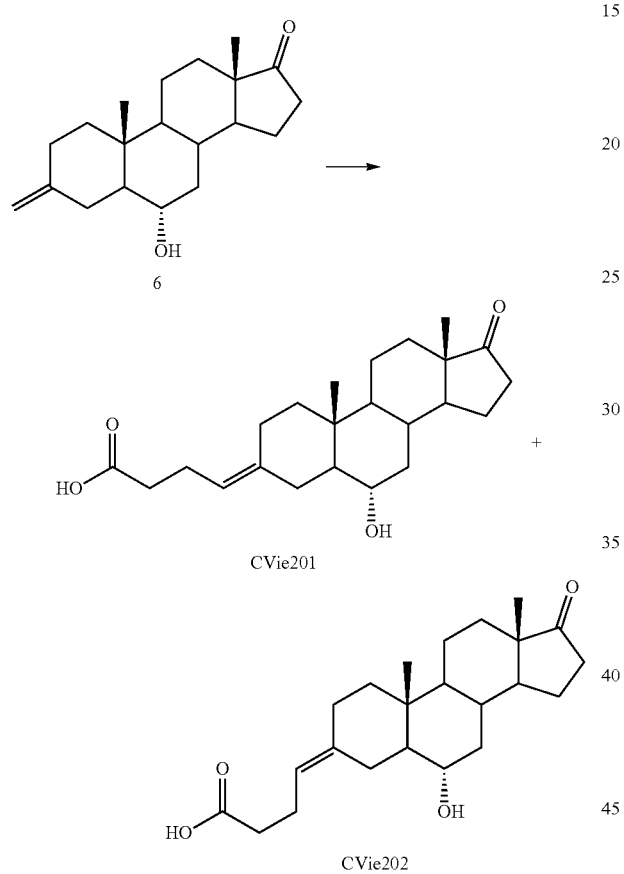

Hoveyda-Grubbs 2$^{nd}$ generation catalyst (12 mg, 0.015 mmol, 0.05 eq.) was added to a solution of androstan-3-methylene-17-one 6 (100 mg, 0.33 mmol, 1 eq) in DCM (1 mL). The solution was then heated at reflux and treated with 10 μL of 4-pentenoic acid every 20 minutes (total 330 μL, 3.3 mmol, 10 eq.). After the end of the addition, the reaction mixture was refluxed for additional 2 h. The reaction mixture was concentrated in vacuo and purified by flash chromatography (Eluent Acetone:petroleum spirit 3:7+0.1% HCO$_2$H) to obtain two different white solids (E)-4-(6alpha-hydroxy-17-oxoandrostane-3-yliden)butyric acid (4.8 mg, 4%) (CVie201) and (Z)-4-(6alpha-hydroxy-17-oxoandrostane-3-yliden)butyric acid (7.2 mg, 6%) (CVie202).

Spectroscopic Data for CVie201

$^1$H NMR (Chloroform-d) δ 5.10 (t, J=7.3 Hz, 1H, 3α-H), 3.50 (td, J=10.3, 9.8, 6.0 Hz, 1H, 6-H), 2.91 (d, 1H, 16-Ha), 0.89 (s, 3H, CH$_3$), 0.86 (s, 3H, CH$_3$), 0.73 (m, 1H, 5-H).

$^{13}$C NMR (101 MHz, Chloroform-d) δ 221.30 (17-C), 178.72 (CO$_2$), 139.71 (3-C), 119.89 (3α-C), 69.95 (6-C), 54.03 (5-C), 24.03 (16-C), 13.93 (CH$_3$), 13.06 (CH$_3$).

MS (ESI) calculated calculated for C$_{23}$H$_{33}$O$_4^-$[M$^-$] 373.2. Found: 373.4.

Spectroscopic data for CVie202:

$^1$H NMR (400 MHz, Chloroform-d) δ 5.10 (t, 1H, 3α-H), 3.50 (td, 1H, 6-H), 2.91 (d, 1H, 16-Ha), 0.89 (s, 3H, CH$_3$), 0.86 (s, 3H, CH$_3$), 0.73 (t, 1H, 5-H).

$^{13}$C NMR (101 MHz, Chloroform-d) δ 220.86 (17-C), 177.66 (CO$_2$), 139.84 (C-3), 119.47 (Ca), 70.08 (C-6), 13.78 (CH$_3$), 12.91 (CH$_3$).

Alternatively, CVie201 and CVie202 were obtained by varying the Wittig reaction. In one method (Route A), a betaine intermediate was stabilized by the use of a polar solvent, such as DMSO, and a base, such as NaH. The second approach (Route B) allowed for the stabilization of a cyclo-oxaphosphetane intermediate using an aprotic solvent, such as THF, as the base. Route A produced a mixture of diastereomers (60% of Z/syn CVie202; 30% E/anti CVie201), whereas Route B provided CVie202 derived from the cyclo-oxaphosphate intermediate. Either procedure requires the production of diastereomers 7 and/or 8 as described below.

Alternative Synthesis of CVie 201 and 202 Via Wittig Reaction

Route A

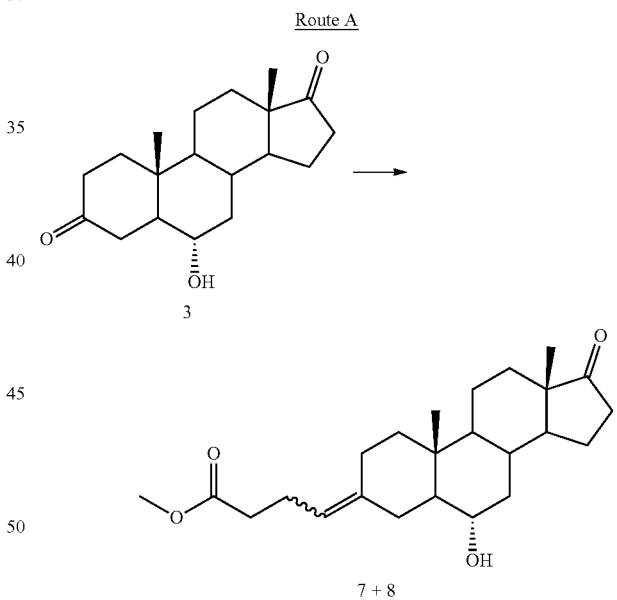

NaH 60% in mineral oil (100 mg, 2.56 mmol, 8 eq.) was carefully added to dry DMSO (1 mL) under Ar atmosphere. The resulting solution was stirred at 60° C. for 20 minutes. After cooling at room temperature, (3-carboxypropyl)triphenylphosphonium bromide (550 mg, 1.28 mmol, 4 eq.) was added. A bright orange color appeared immediately. The solution was stirred for 2 h. Then, 6α-hydroxyandrostane-3,17 dione 3 (100 mg, 0.32 mmol, 1 eq.) was added to the mixture. The resulting solution was allowed to stir at room temperature for additional 4 h. The reaction mixture diluted with EtOAc (25 mL) was washed with aq. 1M HCl (3×30 mL). The organic layer dried over Na$_2$SO$_4$ was evaporated to dryness obtaining 25 mg of crude material.

The crude material was first dissolved in MeOH (1.5 mL), followed by the addition of EDC hydrochloride (115 mg, 0.6 mmol, 2 eq.) and DMAP (5 mg, 0.03 mmol, 0.1 eq.). The solution was stirred at room temperature for 3 h. After concentration in vacuo. The crude solid was dissolved in EtOAc (15 mL) and washed with aq. 1M HCl (3×10 mL). The crude product was purified by flash chromatography over silica gel (Acetone:Pet.Sp 3:7) to obtain 25 mg of a clear oil (20%) comprising a mixture of diastereoisomers 7 and 8.

Spectroscopic Data for the Two Diastereoisomers 7 and 8:
$^1$H NMR (Chloroform-d) δ 5.16-4.96 (m, 1H, 3α-H), 3.66 (s, 3H, CH$_3$O), 3.47 (m, 1H, 6-OH), 0.89 (s, 3H, CH$_3$), 0.86 (s, 3H, CH$_3$), 0.74 (m, 1H, 5-H).

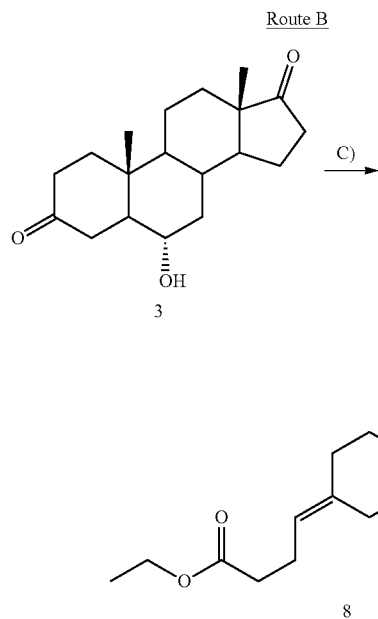

LiHMDS 1M solution in THF (40 mL, 40 mmol, 12 eq.) was carefully added to a dry THF (33 mL) suspension of (3-carboxypropyl)triphenylphosphonium bromide (8.5 g, 20 mmol, 6 eq.) under Ar atmosphere at −40° C. The solution was stirred at −40° C. until a bright orange color appears. Then, 6α-hydroxyandrostane-3,17 dione 3 (1 g, 3.3 mmol, 1 eq.) was added to the solution at −40° C. after stirring at room temperature overnight the reaction mixture quenched with aq. 1M HCl (300 mL) was extracted with EtOAc (3×3 50 mL). The combined organic layers were dried over Na$_2$SO$_4$ and evaporated to dryness.

The crude material was dissolved in absolute EtOH (17 mL) then EDC hydrochloride (1.26 mg, 6.6 mmol, 2 eq.) and DMAP (50 mg, 0.3 mmol, 0.1 eq.) were added. The mixture was allowed to stir at room temperature for 3 h. The reaction diluted in EtOAc (150 mL) was washed with aq. 1M HCl (3×100 mL). The crude product was purified by flash chromatography over silica gel (Acetone:Pet.Sp 3:7) to obtain 910 mg (72%) of compound 8.

Spectroscopic Data for Compound 8:
$^1$H NMR (Chloroform-d) δ 5.07 (t, 1H, 3α-H), 4.10 (q, 2H, OCH$_2$), 3.47 (td, 1H, 6-H), 2.91 (d, 1H), 0.88 (s, 3H, CH$_3$), 0.85 (s, 3H, CH$_3$), 0.71 (m, 1H, 5-H).
$^{13}$C NMR (101 MHz, Chloroform-d) δ 173.67 (17-C), 139.60 (3α-C), 119.94 (3-C), 69.98 (6-C), 60.41 (OCH$_2$), 51.33 (5-C), 40.37 (CH$_3$), 13.92 (CH$_3$), 13.08 (CH$_3$).

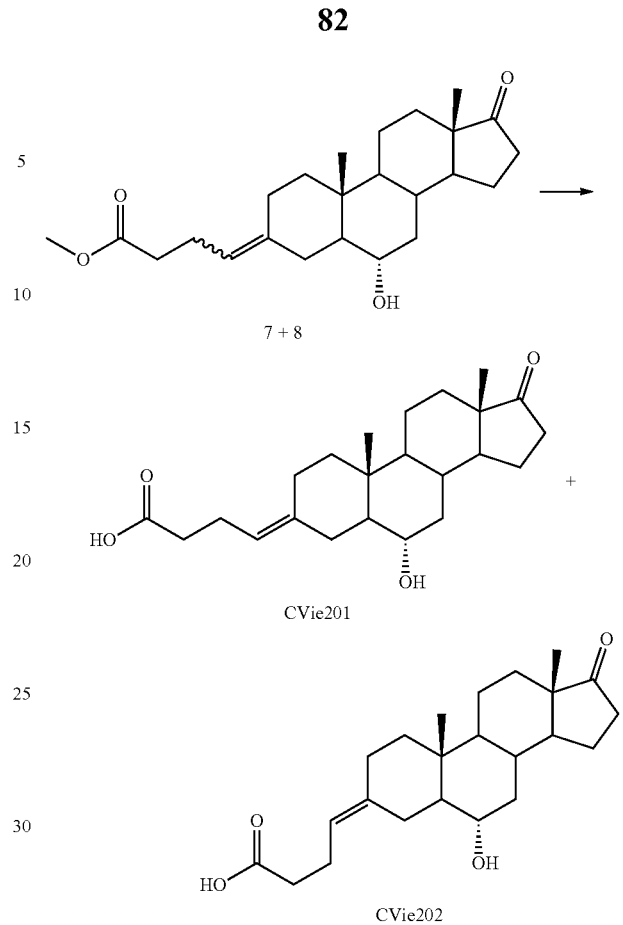

Final Hydrolysis of Methyl (or Ethyl) Esters

An aqueous solution of 1M LiOH (150 μL, 2.5 eq.) was added to a solution of the methyl esters 7 and 8 (25 mg, 0.06 mmol, 1 eq.) in THF (600 μL) and water (200 μL). After 2 h, the reaction was diluted with water (10 mL) and quenched by the addition of 1M HCl until the solution reached pH 1. The aqueous phase was extracted with EtOAc (3×15 mL). The combined organic layers were dried over Na$_2$SO$_4$ and evaporated to dryness. Crude was purified over flash chromatography (AcOEt:Pet.Sp. 7:3 1% HCOOH). Two white solid were obtained corresponding to the E (7 mg, 31%) and Z (12 mg, 54%) diastereoisomers (CVie201 and CVie202, respectively).

$^1$H NMR (Chloroform-d) δ 5.12 (bt, 1H, 3α-H), 3.51-3.42 (m, 1H, 6-H), 0.90 (s, 3H, CH$_3$), 0.86 (s, 3H, CH$_3$), 0.79-0.69 (m, 1H, 5-H).

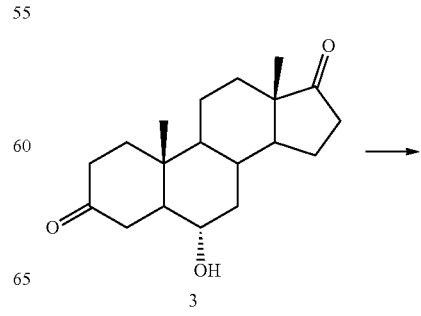

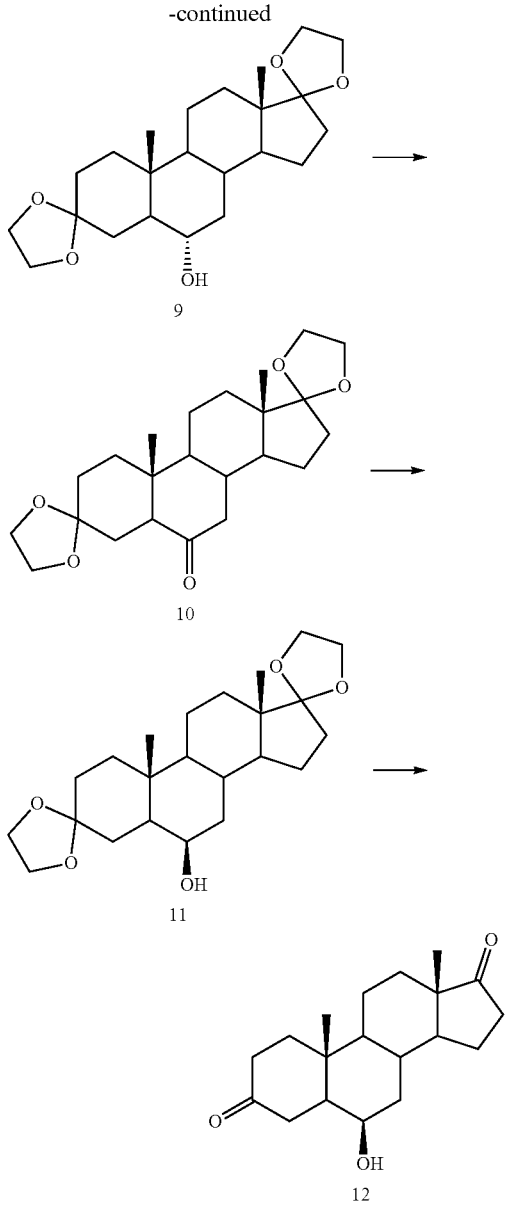

Synthetic Way to CVie 203 and 204: Synthesis of Intermediate Compound 12

To prepare CVie203 and CVie204, the precursor 12 was first produced from 6-α-3,17 androstanedione 3. The carbonyls of 6-α-3,17 androstanedione 3 were protected as diketals by reaction with ethylene glycol in combination with acid catalysis (p-tSA or camphosulfonic acid) in toluene, obtaining compound 9. Oxidation of compound 9 with PCC or other oxidants gave compound 10, which was then reduced with NaBH$_4$ or KBH4 to produce the protected alcohol 11 with the C6-hydroxyl group selectively in the β-configuration. Final cleavage of the cyclic diketals by acidic treatment as described in De Munari et al. (J. Med. Chem., 2003, 46(17):3644-54) in acetone afforded precursor 12.

Briefly, a solution of 6α-hydroxyandrostane-3,17-dione (1.5 g, 4.9 mmol, 1 eq), ethylene glycol (10.5 mL, 88 mmol, 36 eq) and PTSA (561 mg, 2.9 mmol, 0.6 eq) in toluene (160 mL) was stirred at reflux for 12 h with a Dean-Stark trap. After cooling to room temperature, the mixture was neutralized with aq. 5% NaHCO$_3$ solution. The organic layer was separated and washed with H$_2$O (2×40 mL), dried over Na$_2$SO$_4$, and evaporated to dryness to produce 3,3:17,17-Bis(ethylendioxy)androstane-6α-ol 9 as a white solid compound (1.9 g, 98%).

Spectroscopic data for 3,3:17,17-Bis(ethylendioxy)androstane-6α-ol 9

$^1$H NMR (DMSO-d6) δ4.25 (d, 1H, OH), 3.88-3.70 (m, 8H, OCH$_2$), 3.11 (m, 1H, 6-H), 0.74 (s, 3H, CH$_3$), 0.73 (s, 3H, CH$_3$).

PCC (148 mg, 0.69 mmol, 4 eq) was added to a solution of 3,3:17,17-bis(ethylendioxy)androstane-6α-ol (3 g, 14 mmol, 1 eq) 9 and sodium ascorbate (1.2 g, 14 mmol, 4 eq.) in dry CH$_2$C2 (87 mL) at 0°. The mixture was stirred overnight at room temperature. The mixture was washed with aq. 1M HCl (3×30 mL) and water (3×30 mL). The organic layer was dried over Na$_2$SO$_4$ and evaporated to dryness. Crude was purified by flash chromatography over a column of silica gel (eluent acetone:petroleum spirit 2:8). 3,3:17,17-Bis(ethylendioxy)androstane-6-one 10 was obtained as a white solid (1.53 g (96%)).

Spectroscopic data for 3,3:17,17-Bis(ethylendioxy)androstane-6-one 10

$^1$H NMR (Acetone-d6) δ 3.97-3.76 (m, 8H, CH$_2$O), 2.19 (dd, 1H, 16-Ha), 0.84 (s, 3H, CH$_3$), 0.75 (s, 3H, CH$_3$).

NaBH$_4$ (144 mg, 3 mmol, 1.2 eq) was added to a stirred suspension of 3,3:17,17-bis(ethylendioxy)androstane-6-one 10 (1 g, 2.5 mmol, 1 eq) in MeOH (13 mL) at 0° C. After 2 h at 0° C., H$_2$O (40 mL) was added dropwise. The mixture was extracted with EtOAc (3×40 mL). The combined organic extracts were dried over Na$_2$SO$_4$, filtered, and evaporated to dryness to give a white solid, which was 3,3:17,17-Bis(ethylendioxy)androstane-6β-ol 11 (915 mg, 92%).

Spectroscopic data for 3,3:17,17-Bis(ethylendioxy)androstane-6β-ol 11

$^1$H NMR (acetone-d6) δ 3.95-3.75 (m, 8H, OCH$_2$), 3.70 (m, 1H, 6-H), 3.33 (d, 1H, 6-OH), 1.05 (s, 3H, CH$_3$), 0.84 (s, 3H, CH$_3$).

PTSA (2.26 g, 11.5 mmol, 5 eq) was added in small portion over 5 minutes to a solution of 3,3:17,17-bis(ethylendioxy)androstane-6β-ol 11 (910 mg, 2.3 mmol, 1 eq) in acetone (46 mL). After stirring at room temperature for 1 h, the solution was quenched by addition of aq. 5% NaHCO$_3$ until pH 7. After stirring for 5 minutes, a white solid appeared. The volatiles were removed in vacuo. The suspension was extracted with CH$_2$Cl$_2$ (3×30 mL) and the combined organic extracts were washed with brine (40 mL), dried over Na$_2$SO$_4$, filtered, and evaporated. The obtained solid was stirred with n-hexane/EtOAc 8/2 (10 mL) for 45 minutes and then collected by filtration. The solid was dried 45° C. for 3 hours. 568 mg (81%) of a white solid was obtained (i.e., 6β-hydroxyandrostane-3,17-dione 12).

Spectroscopic data for 6β-hydroxyandrostane-3,17-dione 12

$^1$H NMR (DMSO-d6) δ 4.47 (d, 1H, OH), 3.57 (m, 1H, 6-H), 1.13 (s, 3H, CH$_3$), 0.81 (s, 3H, CH$_3$).

Conversion of 12 into Final CVie 203 and 204

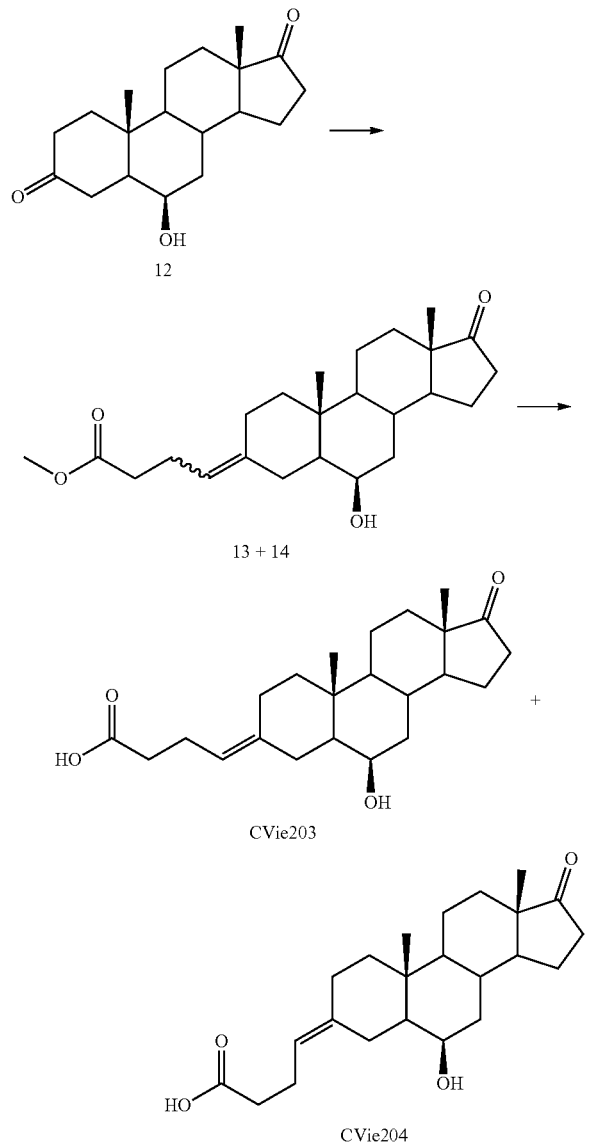

CVie203 and CVie204 were then obtained from precursor 12 via the Wittig reaction using the same procedures described above for CVie201 and CVie202. The configurations at the C3-C1' double bond were identified in the two isomers by means of NOESY experiments.

Briefly, NaH 60% in mineral oil (100 mg, 2.56 mmol, 8 eq.) was carefully added to dry DMSO (1 mL) under Ar atmosphere. The resulting solution was stirred at 60° C. for 20 minutes. After cooling at room temperature, (3-carboxypropyl)triphenylphosphonium bromide (550 mg, 1.28 mmol, 4 eq.) was added. A bright orange color appeared immediately. The solution was stirred for 2 h. Then, 6β-hydroxyandrostane-3,17-dione 12 (100 mg, 0.32 mmol, 1 eq.) was added to the mixture. The resulting solution was allowed to stir at room temperature for additional 4 h. The reaction mixture was diluted with EtOAc (25 mL) and washed with aq. 1M HCl (3×30 mL). The organic layer was dried over $Na_2SO_4$ and evaporated to dryness to obtain 25 mg of crude material.

The crude material was then dissolved in MeOH (1.5 mL). EDC hydrochloride (115 mg, 0.6 mmol, 2 eq.) and DMAP (5 mg, 0.03 mmol, 0.1 eq.) were added. The solution was stirred at room temperature for 3 h. After concentration in vacuo. The crude solid was dissolved in EtOAc (15 mL) and washed with aq. 1M HCl (3×10 mL). The crude product was purified by flash chromatography over silica gel (Acetone:Pet.Sp 3:7) to obtain a mixture of diastereoisomers 13 and 14 at 17% yield and 30% yield, respectively.

Spectroscopic Data for the Compound 13:

$^1$H NMR (400 MHz, Chloroform-d) δ 5.07 (bs, 1H, 3α-H), 3.85 (d, 1H, 6-H), 3.66 (s, 3H, $OCH_3$), 2.54-2.39 (m, 2H, 3γ-H), 1.10 (s, 3H, $CH_3$), 0.89 (s, 3H, $CH_3$), 0.80-0.69 (m, 1H, 5-H).

$^{13}$C NMR (101 MHz, Chloroform-d) δ 219.74 (17-C), 167.24 ($CO_2$), 140.38 (3-C), 119.60 (3α-C), 71.52 (6-C), 54.45 (5-C), 51.22 ($OCH_3$), 14.09 ($CH_3$), 13.86 ($CH_3$).

Spectroscopic Data for Compound 14

$^1$H NMR (400 MHz, Chloroform-d) δ 5.07 (s, 1H, 3α-H), 3.89 (d, 1H, 6-H), 3.66 (s, 3H, $OCH_3$), 2.46 (dd, 1H, 16-Ha), 1.10 (s, 3H, $CH_3$), 0.89 (s, 3H, $CH_3$), 0.79-0.64 (m, 1H, 5-H).

$^{13}$C NMR (101 MHz, Chloroform-d) δ 221.21 (17-C), 176.10 ($CO_2$), 140.33 (3-C), 119.39 (3α-C), 71.75 (6-C), 54.49 (5-C), 51.20 ($OCH_3$) 15.24 ($CH_3$), 13.87 ($CH_3$).

The reaction mixture was concentrated in vacuo and purified by flash chromatography (Eluent Acetone:petroleum spirit 3:7+0.1% $HCO_2H$) to obtain two different white solids (E)-4-(6beta-hydroxy-17-oxoandrostane-3-yliden)butyric acid (CVie203) and (Z)-4-(6beta-hydroxy-17-oxoandrostane-3-yliden)butyric acid (CVie204).

Spectroscopic Data for Compound CVie203:

$^1$H NMR (400 MHz, Acetone-$d_6$) δ 4.84 (bt, 1H, 3α-H), 3.55 (d, 1H, 6-H), 0.90 (s, 3H, $CH_3$), 0.61 (s, 3H, $CH_3$), 0.51 (ddd, 1H, 5-H).

$^{13}$C NMR (101 MHz, acetone-$d_6$) δ 218.86 (17-C), 173.42 ($CO_2$), 140.74 (3-C), 119.29 (3α-C), 70.18 (6-C), 14.74 ($CH_3$), 13.18 ($CH_3$).

Spectroscopic Data for Compound CVie204:

$^1$H NMR (400 MHz, Chloroform-d) δ 5.07 (s, 1H, 3α-H), 3.88 (s, 1H, 6-H), 1.08 (s, 3H, $CH_3$), 0.88 (s, 3H, $CH_3$), 0.72 (s, 1H, 5-H).

$^{13}$C NMR (101 MHz, acetone) δ 216.39 (17-C), 173.80 ($CO_2$), 135.48 (3-C), 113.80 (3α-C), 66.52 (6-C), 10.07 ($CH_3$), 8.70 ($CH_3$).

Production of CVie214, CVie215, and CVie217 Via Hydrogenation and Ester Hydrolysis

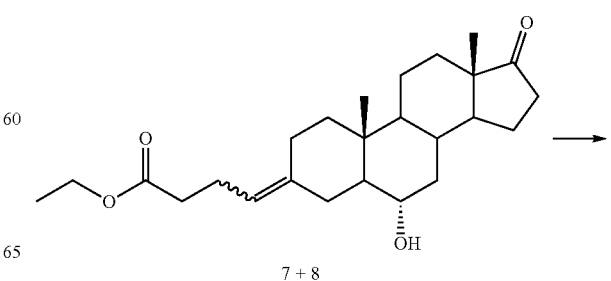

7 + 8

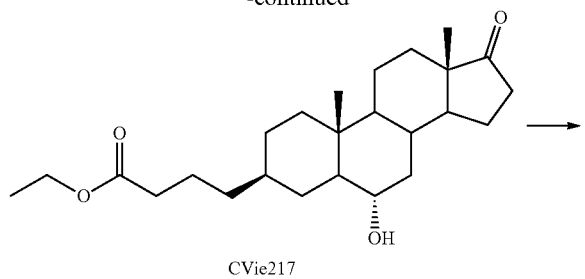

CVie217

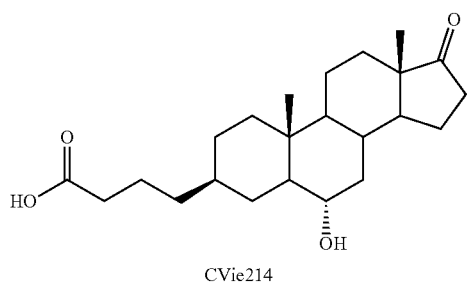

CVie214

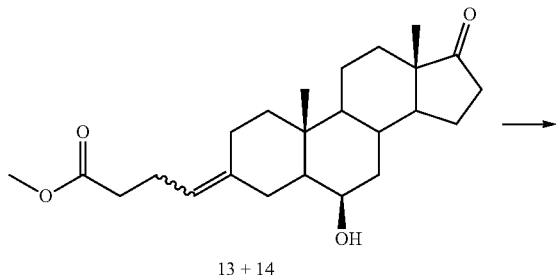

13 + 14

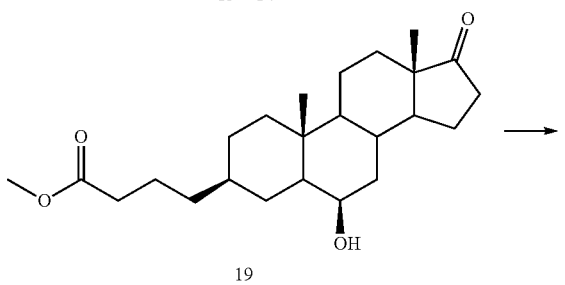

19

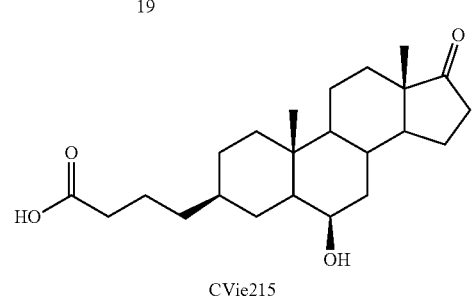

CVie215

Compound CVie217 was produced from the mixture of diastereomers 7+8 described above. Briefly, hydrogenation of the C3-C1' double bonds of the diastereomers was carried out in EtOAc using Pd—C catalysis. The resulting compound was CVie217. The configuration of the stereogenic center formed at C3 was identified by NOESY experiments. Compound CVie217 was then hydrolyzed with 1M LiOH or NaOH in THF to produce CVie214. Similarly, diastereomers 13+14 were hydrogenated in EtOAc using Pd—C catalysis to produce the ester compound 19, which was then hydrolyzed with 1M LiOH or NaOH in THF to produce CVie215.

Spectroscopic Data for Compound 19:
$^1$H NMR (400 MHz, Chloroform-d) δ 3.83 (bs, 1H, 6-H), 3.66 (bs, 3H, OCH$_3$), 2.44 (dd, 1H, 16-Ha), 2.28 (t, 2H, 3γ-H), 0.99 (s, 3H, CH$_3$), 0.88 (s, 3H, CH$_3$), 0.79-0.70 (m, 1H, 5-H).
$^{13}$C NMR (101 MHz, Chloroform-d) δ 221.43 (17-C), 174.25 (CO$_2$), 71.96 (6-C), 51.25 (OCH$_3$), 15.74 (CH$_3$), 13.86 (CH$_3$).

Spectroscopic Data for Compound CVie214:
$^1$H NMR (400 MHz, Chloroform-d) δ 3.43 (bt, 1H, 6-H), 2.44 (dd, 1H, 16Ha), 2.31 (t, 2H, 3γ-H), 0.84 (s, 3H, CH$_3$), 0.77 (s, 3H, CH$_3$).
$^{13}$C NMR (101 MHz, Chloroform-d) δ 221.35 (17-C), 179.11 (CO$_2$), 69.90 (6-C), 13.78 (CH$_3$), 13.37 (CH$_3$)

Spectroscopic Data for Compound CVie215:
$^1$H NMR (400 MHz, Chloroform-d) δ 3.85 (s, 1H, 6-H), 2.45 (dd, 1H, 16-Ha), 2.34 (t, 2H, 3γ-H), 1.00 (s, 3H, CH$_3$), 0.89 (s, 3H, CH$_3$), 0.74 (d, 1H, 5-H).
$^{13}$C NMR (101 MHz, Chloroform-d) δ 221.50 (17-C), 179.04 (CO$_2$H), 72.03 (6-C), 15.76 (CH$_3$), 13.87 (CH$_3$).

Spectroscopic Data for Compound CVie217:
$^1$H NMR (400 MHz, Chloroform-d) δ 4.09 (q, 2H, CH$_2$O), 3.40 (td, 1H, 6-H), 2.49-2.36 (dd, 1H, 16-Ha), 2.24 (t, 2H, 36-H), 0.83 (s, 3H, CH$_3$), 0.76 (s, 3H, CH$_3$).
$^{13}$C NMR (101 MHz, Chloroform-d) δ 220.91 (17-C), 173.77 (CO$_2$), 69.63 (6-C), 60.14 (CH$_2$O), 14.23 (CH$_3$), 13.76 (CH$_3$), 13.36 (CH$_3$).

Production of CVie213 and CVie216 by Via Wittig Reaction Followed by C═C Hydrogenation and Ester Hydrolysis

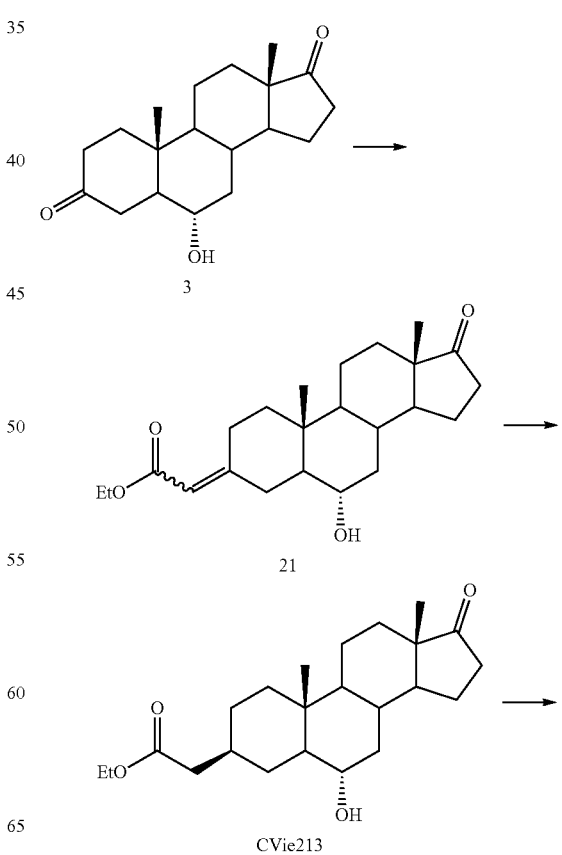

-continued

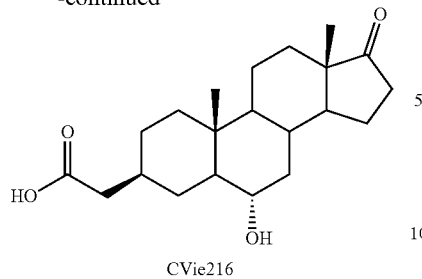

CVie216

Compound 6-α-3,17 androstanedione 3 was also used as the starting point for the synthesis of CVie213 and CVie216 via a Horner-Emmons reaction. First, triethylphosphonoacetate (6.5 mL, 33 mmol, 5 eq) was added carefully to a suspension of NaH 60% in mineral oil (1.3 g, 33 mmol, 5 eq) in DMF (200 mL) under Ar atmosphere at 0° C. The resulting solution was warmed at room temperature and stirred for 20 minutes. Then, 6-α-3,17 androstanedione 3 (2 g, 6.5 mmol, 1 eq) was added at 0° C. After stirring overnight at room temperature, the reaction was quenched by careful addition of $H_2O$ (100 mL) and extracted with $Et_2O$ (3×150 mL). The combined organic layers were dried over $Na_2SO_4$ and evaporated in vacuo. Crude was purified by flash chromatography over a column of silica gel (acetone:petroleum spirit 3:7) to produce 2.1 g (86%) of a clear oil mixture of two diastereoisomers (compounds 21).

Spectroscopic Data for Diastereoisomer Compounds 21:

$^1$H NMR (Chloroform-d) δ 5.60 (d, Hz, 1H, 3α-H), 4.08 (q, 2H, $CH_2O$), 3.45 (dq, 1H, 6-H), 2.41 (dd, 1H, 16-Ha), 0.90 (s, 3H, $CH_3$), 0.82 (s, 3H, $CH_3$), 0.77-0.66 (m, 1H, 5-H).

$^{13}$C NMR (101 MHz, Chloroform-d) δ 220.85 (17-C), 166.81 ($CO_2$), 161.87 (3-C), 113.75 (3α-C), 69.41 (6-C), 13.76 ($CH_3$), 13.00 ($CH_3$).

While under Ar atmosphere, 10% Pd—C (700 mg) was added to a degassed solution of diastereoisomer compounds 21 (2 g, 5.3 mmol, 1 eq) in EtOAc (200 mL). After three cycles of vacuum/hydrogen, the reaction was allowed to stir at room temperature overnight under $H_2$ atmosphere. After removal of hydrogen by vacuum/Ar cycle, the reaction mixture was filtered over CELITE®. The filtered solution was evaporated to dryness. The CVie213 product was obtained without purification at 1.8 g (90%). Further hydrolysis of CVie213 with 1M LiOH or NaOH in THF produced CVie216.

Spectroscopic Data for Compound CVie213:

$^1$H NMR (Chloroform-d) δ 4.12 (q, 2H, $OCH_2$), 3.38 (td, 1H, 6-H), 2.42 (dd, 1H, 16-Ha), 2.27 (t, 2H, 3α-$CH_2$), 0.82 (s, 3H, $CH_3$), 0.76 (s, 3H, $CH_3$).

$^{13}$C NMR (101 MHz, Chloroform-d) δ 221.03 (17-C), 172.93 ($CO_2$), 69.43 (6-C), 13.76 ($CH_3$), 13.32 ($CH_3$).

Spectroscopic Data for Compound CVie216:

$^1$H NMR (400 MHz, Chloroform-d) δ 3.43 (td, 1H, 6-H), 2.45 (dd, 1H, 16-Ha), 2.28 (t, 3α-H), 0.85 (s, 3H, $CH_3$), 0.80 (s, 3H, $CH_3$).

$^{13}$C NMR (101 MHz, acetone) δ 220.44 (17-C), 174.27 ($CO_2$), 68.57 (6-C), 12.99 ($CH_3$), 12.59 ($CH_3$).

Production of CVie218 and CVie219 Via Wittig Reaction Followed by C═C Hydrogenation and Ester Hydrolysis

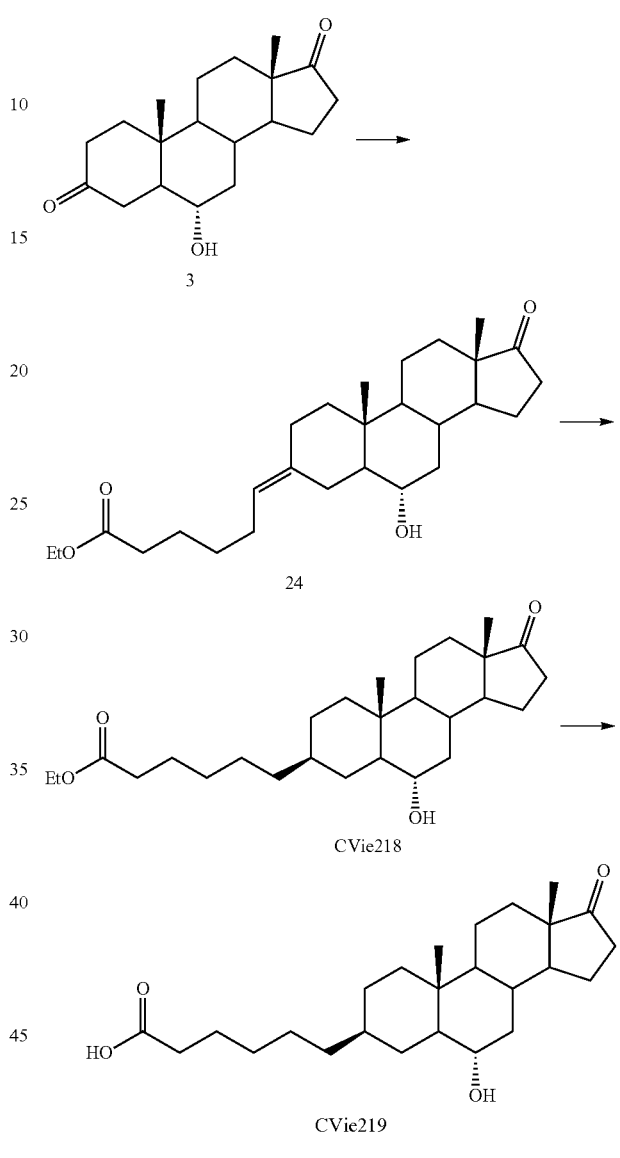

Similarly, reacting 6-α-3,17 androstanedione 3 with the proper triphenylphosphonium salt (e.g., 5-carboxytriphenylphosphonium bromide, LiHMDS, THF then EtOH (or MeOH)) produced compound 24. Next, catalytic hydrogenation of compound 24 using Pd—C catalysis in the presence of hydrogen produced CVie218, which included a $C_6$ chain at the C-3 position. Hydrolysis of CVie218 with 1M LiOH or NaOH in THF produced CVie219.

Spectroscopic Data for Compound CVie218:

$^1$H NMR (400 MHz, Chloroform-d) δ 4.15-4.05 (m, 2H, $OCH_2$), 3.40 (td, 1H, 6-H), 2.43 (dd, 1H, 16-Ha), 2.26 (td, 2H, 3ε-H), 0.84 (s, 3H, $CH_3$), 0.76 (s, 3H, $CH_3$).

$^{13}$C NMR (101 MHz, Chloroform-d) δ 220.91 (17-C), 173.87 ($CO_2$), 69.81 (6-C), 60.14 ($CH_2O$), 14.24 ($CH_3$), 13.79 ($CH_3$), 13.39 ($CH_3$).

Spectroscopic Data for Compound CVie219:

¹H NMR (400 MHz, Chloroform-d) δ 3.47-3.39 (bt, 1H, 6-H), 2.44 (dd, 1H, 17-Ha), 2.33 (t, 2H, 3ε-H), 0.85 (s, 3H, CH₃), 0.77 (s, 3H, CH₃).

¹³C NMR (101 MHz, Chloroform-d) δ 221.06 (17-C), 178.93 (CO₂), 69.91 (6-C), 13.80 (CH₃), 13.39 (CH₃).

Synthesis of Derivatives with Primary Amine Groups from Precursor 6 by Metathesis Reaction with Boc-Protected Amines Followed by Boc Deprotection

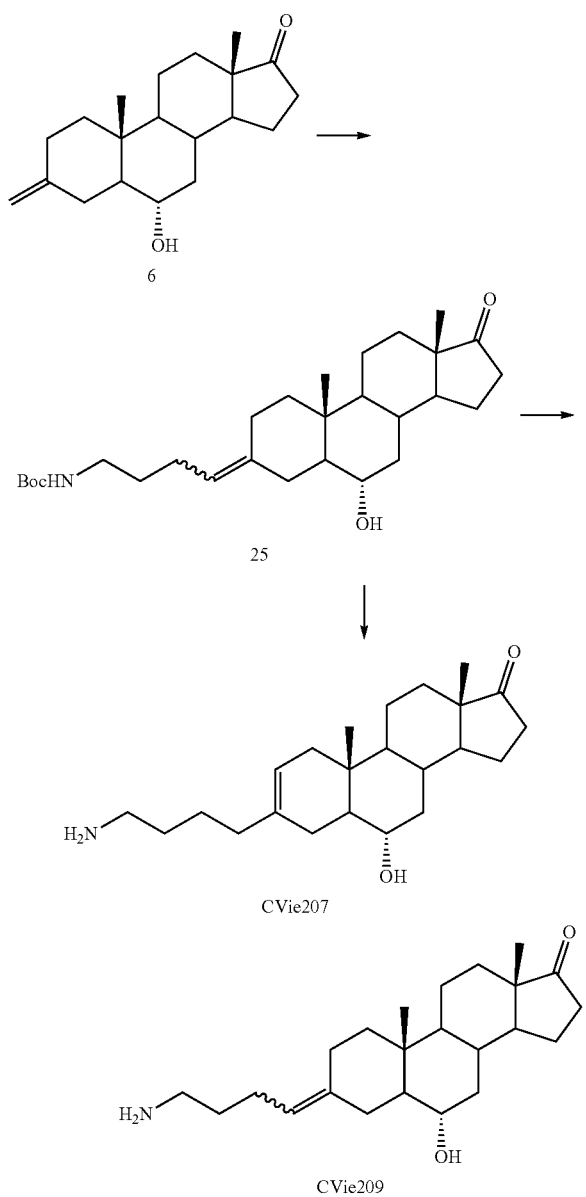

For the synthesis of the derivatives with a primary amine group as the X substituent in formula (I), a cross metathesis reaction was carried out on precursor 6 using the same experimental conditions described above for the synthesis of CVie201 and CVie202.

Briefly, a Hoveyda-Grubbs 2^nd generation catalyst was added to a solution of androstan-3-methylene-17-one 6 in DCM. Androstan-3-methylene-17-one 6 was then combined with an exo-methylene group with the appropriate Boc-protected amine (e.g., tert-butyl pent-4-en-1-yl carbamate or N-Boc-4-pentyne-1-amine) to produce diastereoisomers 25 (25% yield). Compound 25 (50 mg, 0.1 mmol, 1 eq) was treated with 500 µL of a 1:1 mixture TFA/DCM trifluoroacetic acid in DCM) and then stirred at room temperature to directly cleave the Boc group. After stirring at room temperature for 1 minute, the reaction was diluted with EtOAc (50 mL) and washed with saturated aq. NaHCO₃ (3×30 mL). The organic phase was dried over Na₂SO₄, filtered, and evaporated to dryness to produce (EZ)-3-(4-aminobutyl-iden]-6alpha-hydroxyandrostane-17-one (CVie209) as white solid (28 mg, 75%)

Spectroscopic Data for Diastereoisomer Mixture 25:

1H NMR (400 MHz, Chloroform-d) δ 5.18-5.03 (m, 1H, 3α-H), 3.46 (td, 1H, 6-H), 1.44 (s, 9H, t-Bu), 0.90 (d, J=1.8 Hz, 3H, CH₃), 0.86 (s, 3H, CH₃), 0.74 (m, 1H, 5-H).

Spectroscopic Data for CVie209:

¹H NMR (400 MHz, CD₃OD) δ 5.13 (d, 1H, 3α-H), 3.40 (tt, 1H, 6-H), 3.35-3.28 (m, 2H, 3γ-H), 0.96 (s, 3H, CH₃), 0.87 (s, 3H, CH₃), 0.83-0.70 (m, 1H, 5-H).

¹³C NMR (101 MHz, CD₃OD) δ 224.41 (17-C), 143.00 (3A-C), 142.68 (3αB-C), 124.31 (3αA-C), 124.02 (3αB-C), 72.75 (C-6), 16.70 (CH₃), 15.78 (CH₃).

Alternatively, reacting compound 25 with trimethylsilyl iodide in alcoholic solvent (e.g., MeOH) resulted in Boc cleavage accompanied by migration of the exocyclic double bond to produce CVie207, which has an endocyclic double bond between C2 and C3. Briefly, 1M TMSI in DCM (100 µL, 0.1 mmol, 1 eq.) was added to a solution of diastereoisomers 25 (50 mg, 0.1 mmol, 1 eq.) at room temperature. After stirring 2 h at the same temperature, the solvent was removed in vacuo. Methanol (2 mL) was added to the residue and left for 1 h at room temperature. After removal of the solvent in vacuo, CVie207 was obtained without further purification.

Spectroscopic Data for CVie207:

¹H NMR (400 MHz, CD₃OD) δ 5.36 (d, 1H, H-2), 3.44 (td, 1H, 6-H), 2.94 (t, 2H, 3γ-H), 2.45 (dd, 1H, 16-Ha), 0.88 (s, 3H, CH₃), 0.79 (s, 3H, CH₃).

¹³C NMR (101 MHz, CD₃OD) δ 222.35 (17-C), 134.89 (3-C), 119.69 (2-C), 70.31 (6-H), 12.75 (CH₃), 12.07 (CH₃).

Synthesis of Cyclic Amine Derivatives with Exocyclic Insaturations: CVie205, CVie206, CVie210 and CVie211

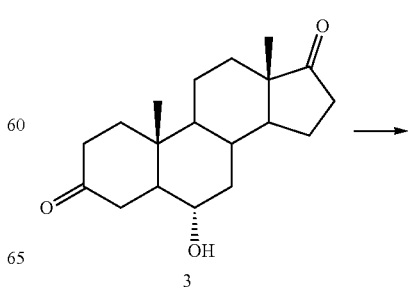

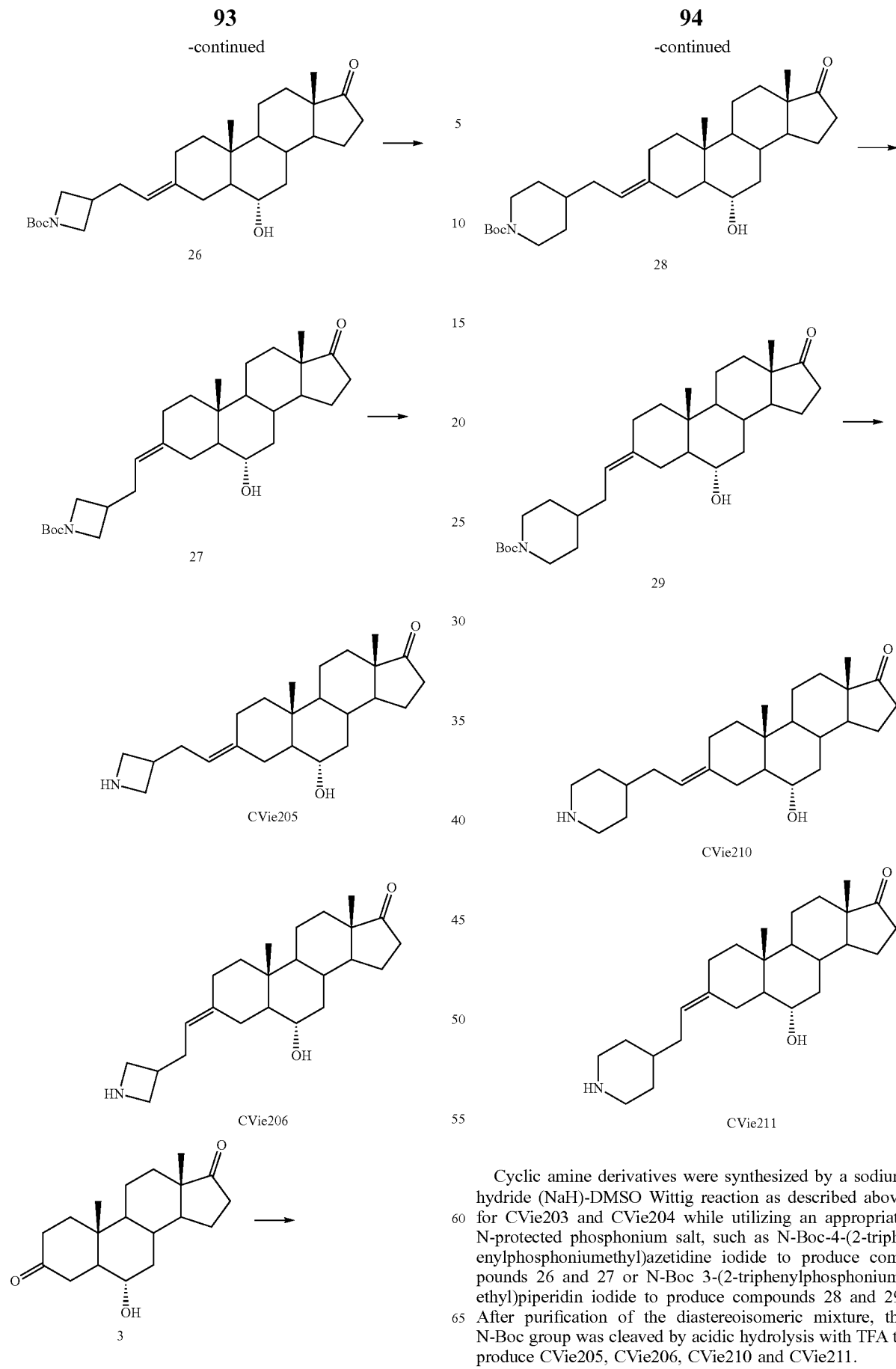

Cyclic amine derivatives were synthesized by a sodium hydride (NaH)-DMSO Wittig reaction as described above for CVie203 and CVie204 while utilizing an appropriate N-protected phosphonium salt, such as N-Boc-4-(2-triphenylphosphoniumethyl)azetidine iodide to produce compounds 26 and 27 or N-Boc 3-(2-triphenylphosphoniumethyl)piperidin iodide to produce compounds 28 and 29. After purification of the diastereoisomeric mixture, the N-Boc group was cleaved by acidic hydrolysis with TFA to produce CVie205, CVie206, CVie210 and CVie211.

Synthesis of CVie208 with an Endocyclic Insaturation (C=C Double Bond Migration During Boc Deprotection)

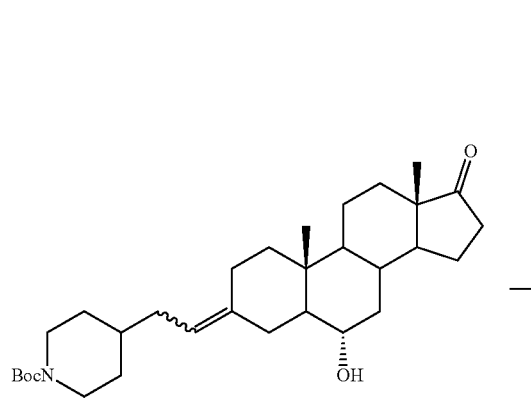

28 and 29

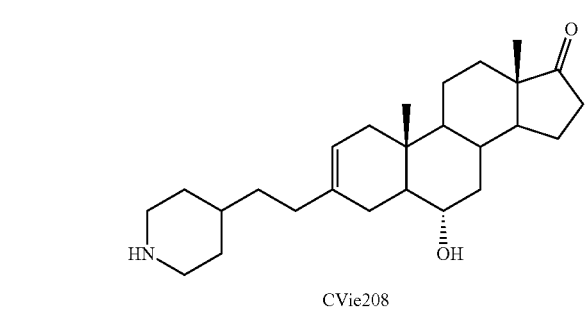

CVie208

Further treatment of compounds 28 and 29 with TMSI as described above for the synthesis of CVie207 produced CVie208.

Hydrogenation and Boc-Cleavage with TFA to Produce CVie212

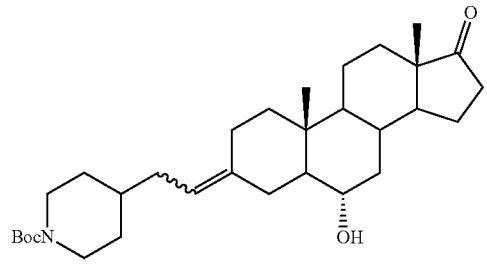

28 and 29

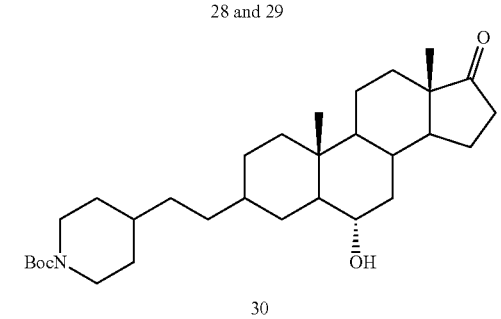

30

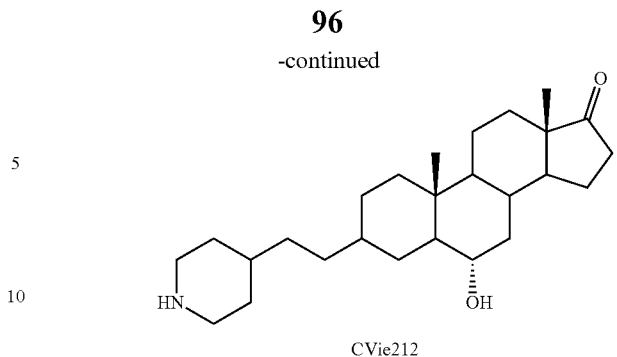

CVie212

Alternatively, catalytic hydrogenation ($H_2$, Pd—C, EtOAc) of the double bonds of compounds 28 and 29 to synthesize compound 30 followed by Boc cleavage with TFA in DCM produced CVie212.

Synthesis of compounds bearing a 6alpha-hydroxymethylandrostane-7,17-dione was achieved starting from the common intermediate 37. Compound 37 itself was synthesized starting from 4-androsten-3,17-dione 31, by protection of the two ketone moiety by cyclic acetal 32 and simultaneous migration of the double bond, oxidation of the allylic position by sodium dichromate 33, formation of the silyl enol ether 35, hydroxymethylation with $Me_3Al$ and formaldehyde (36), and final cleavage of acetals in acidic conditions. The synthesis is described in more detail in the following passages.

Synthesis of Compound 32: (20S,7R)-7,20-dimethyldispiro[1,3-dioxolane-2,5'-tetracyclo[8.7.0.0<2,7>0.0<11,15>]heptadecane-14',2"-1,3-dioxolane]-12-ene

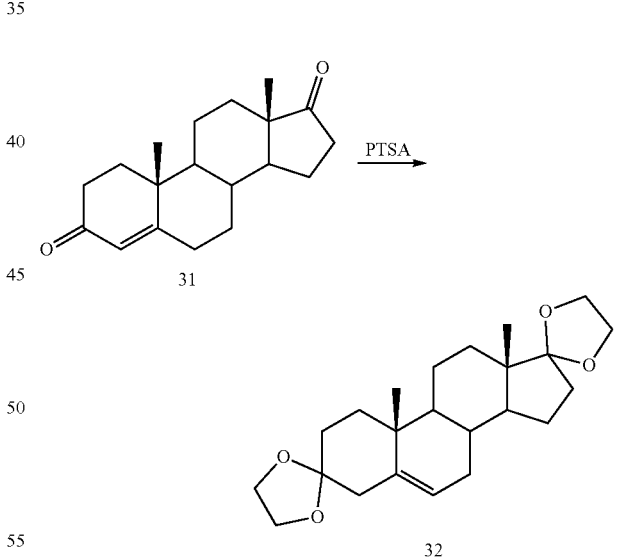

A mixture of androst-4-ene-3,17-dione 31 (400.0 g, 1.4 mol) and PTSA·$H_2O$ (13.3 g, 70.0 mmol) in ethylene glycol (8.0 L) was stirred at 100° C. until the reaction was clear. About 5.0 L of glycol was distilled under vacuum so that the boiling temperature was around 80-85° C. The mixture was cooled down to room temperature. The mixture was adjusted to pH ~9. Then, the mixture was poured into ice-water. The mixture was filtered, and the solid was washed with water, collected, and triturated with acetone to get crude compound 32 (469.0 g, 89%) as a yellow solid.

Synthesis of Compound 33: (20S,7R)-7,20-dimethyldispiro[1,3-dioxolane-2,5'-tetracyclo[8.7.0.0<2,7>0.0<11,15>]heptadecane-14',2''-1,3-dioxolane]-12-en-14-one

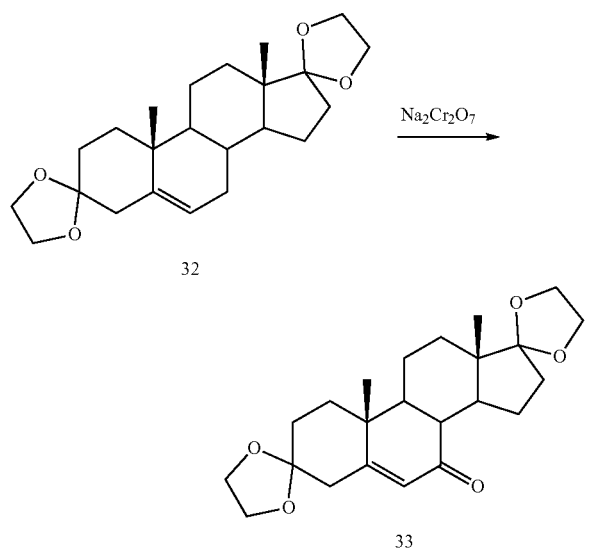

A mixture of compound 32 (440.0 g, 1.2 mol), HOSU (541.2 g, 4.7 mol) and Na$_2$Cr$_2$O$_7$·H$_2$O (527.5 g, 1.8 mol) in acetone (8.0 L) was vigorously stirred at 50° C. for 2 days. After cooling down to room temperature, the mixture was quenched with aq. Na$_2$SO$_3$ and stirred for 20 min. The mixture was poured into ice-water. The resulting mixture was stirred for 20 min and then filtered. The solid filtrate was washed with water, collected, and dried in vacuum to get crude compound 33 (390.0 g, 85%) as a yellow solid.

Synthesis of Compound 34: (7S,20S)-7,20-dimethyldispiro[1,3-dioxolane-2,5'-tetracyclo[8.7.0.0<2,7>0.0<11,15>]heptadecane-14',2''-1,3-dioxolane]-14-one

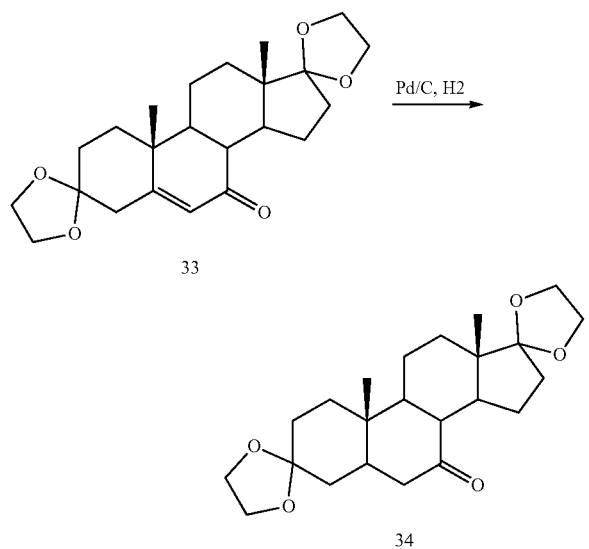

A mixture of compound 33 (50.0 g, 128.9 mmol) in EtOAc (1250 mL) was added to Pd/C (16.0 g). Then the mixture was stirred at room temperature overnight under H$_2$. TLC showed the reaction was completed. The mixture was filtered, concentrated, and purified by flash chromatography (PE/EA=2/1) to obtain compound 34 (25.0 g, 50.0%) as a white solid.

Spectroscopic data for (7S,20S)-7,20-dimethyldispiro[1,3-dioxolane-2,5'-tetracyclo [8.7.0.0<2,7>0.0<11,15>]heptadecane-14',2''-1,3-dioxolane]-14-one 34

$^1$H NMR (400 MHz, DMSO-d$_6$): δ 3.85-3.75 (m, 8H), 2.44-2.35 (m, 2H), 2.08-2.03 (m, 1H), 1.87-1.79 (m, 2H), 1.70-1.49 (m, 8H), 1.41-1.28 (m, 4H), 1.17-1.10 (m, 2H), 1.03 (s, 3H), 1.00-0.97 (m, 1H), 0.76 (s, 3H).

Synthesis of Compound 35: 1-((20S,7R)-7,20-dimethyldispiro[1,3-dioxolane-2,5'-tetracyclo[8.7.0.0<2,7>0.0<11,15>]heptadecane-14',2''-1,3-dioxolane]-13-en-14-yloxy)-1,1-dimethyl-1-silaethane

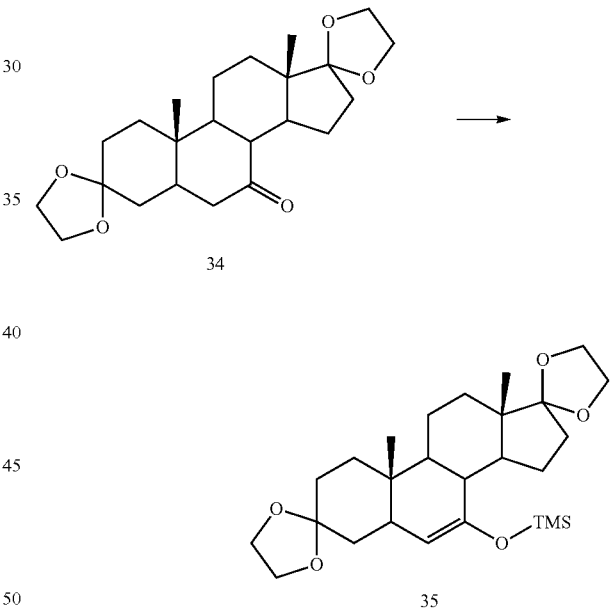

A mixture of compound 34 (20.0 g, 51.3 mmol) in dry THF (100.0 mL) was stirred at −78° C., and then 1.5 M LDA in toluene (205.2 mL, 307.8 mmol) was added dropwise. After stirring at the same temperature for 1 hr, Me$_3$SiCl (50.0 mL, 400.1 mmol) was added dropwise. After stirring at −70° C. for 3 hrs, the temperature was raised to −30° C. and triethylamine (33.5 g, 331.5 mmol) was added. After stirring at the same temperature for 1 hr, the mixture was warmed up to room temperature and water (200.0 mL) and EtOAc (100.0 mL) were added. The separated aqueous phase was extracted with EtOAc. The combined organic layers were washed with brine, dried over Na$_2$SO$_4$, filtered, and evaporated to dryness. The residue was purified by flash chromatography (PE/EA=2/1) to obtain compound 35 (14.3 g, 60.3%) as a white solid.

Synthesis of Compound 36: (13S,20S,7R)-13-(hydroxymethyl)-7,20-dimethyldispiro[1,3-dioxolane-2,5'-tetracyclo[8.7.0.0<2,7>0.0<11,15>]heptadecane-14',2"-1,3-dioxolane]-14-one

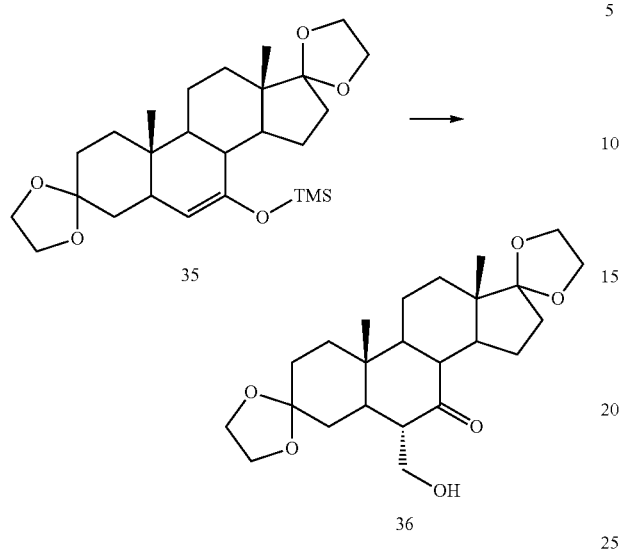

A mixture of 2,6-diphenylphenol (10.0 g, 27.6 mmol) in dry DCM (450.0 mL) was added dropwise to a solution of Me₃Al in toluene (41.4 mL, 82.9 mmol) while cooling with a ice/water bath so that the temperature did not exceed room temperature. After stirring at room temperature for 1 hr, the solution was cooled at 0° C., and a solution of trioxane (24.8 g, 276.0 mmol) in dry DCM (100.0 mL) was added dropwise. The light yellow solution was stirred for another 1 hr at 0° C. and then the temperature was cooled down to −78° C. A solution of compound 35 (10.0 g, 27.6 mmol) in dry DCM (125 mL) was added. After stirring at −78° C. for 1 h, the temperature was raised to −20° C. and the reaction mixture was stirred at that temperature overnight. 5% aq. NaHCO₃ (85.0 mL) was added at room temperature. The jelly mixture was filtered through a CELITE© pad washing thoroughly with DCM. The separated organic layer was washed with water and evaporated. About 1M TBAF in THF (24.0 mL) was added to the residue and the solution was stirred at room temperature for 1.5 h. The solution was washed with water, dried over Na₂SO₄, filtered, and evaporated to dryness. The residue was purified by flash chromatography to give compound 36 (6.5 g, 71.4%) as a yellow solid.

Synthesis of Compound 37: (6S,10R,13S)-6-(hydroxymethyl)-10,13-dimethyldecahydro-1H-cyclopenta[a]phenanthrene-3,7,17(2H,4H,8H)-trione

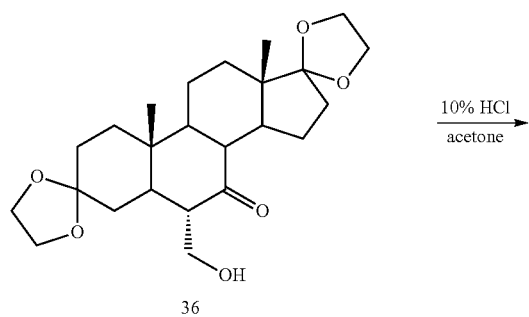

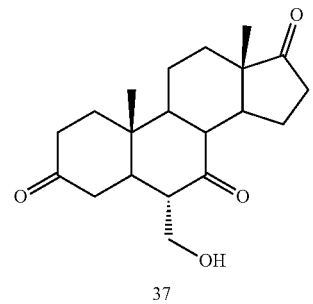

A mixture of compound 36 (8.0 g, 19.0 mmol) in acetone (100.0 mL) was added to 10% aq. HCl (50.0 mL). Then the mixture was heated to 70° C. for 1 h. TLC showed the reaction was completed. The mixture was quenched with 5% aq. NaOH and extracted with DCM (50.0 mL*2). The combined organic phases were washed with brine (50.0 mL), dried over Na₂SO₄, filtered, concentrated, and purified by flash chromatography (DCM/EA=4/1) to get the crude product, which was triturated with ether to get the pure product 37 (3.3 g, 52.4%) as a white solid.

Spectroscopic data for (6S,10R,13S)-6-(hydroxymethyl)-10,13-dimethyldecahydro-1H-cyclopenta[a]phenanthrene-3,7,17(2H,4H,8H)-trione 37

$^1$H NMR (400 MHz, DMSO-d₆): δ 4.14 (t, 1H), 3.63-3.59 (m, 1H), 3.50-3.47 (m, 1H), 2.74-2.69 (m, 1H), 2.42-2.27 (m, 5H), 2.15-1.93 (m, 3H), 1.87-1.79 (m, 1H), 1.68-1.59 (m, 3H), 1.54-1.44 (m, 2H), 1.32-1.06 (m, 7H), 0.81 (s, 3H).

LCMS [mobile phase: from 55% water (0.05% FA) and 45% CH₃CN (0.05% FA) to 55% water (0.05% FA) and 45% CH₃CN (0.05% FA) in 6.0 min, finally under these conditions for 0.5 min], purity is >90%, Rt=2.514 min; MS Calcd.: 332.2; MS Found: 333.2 [M+1]⁺.

Synthesis of Compound 38: (13S,14S,20S,7R)-13-(hydroxymethyl)-7,20-dimethyldispiro[1,3-dioxolane-2,5'-tetracyclo[8.7.0.0<2,7>0.0<11,15>]heptadecane-14',2"-1,3-dioxolane]-14-ol

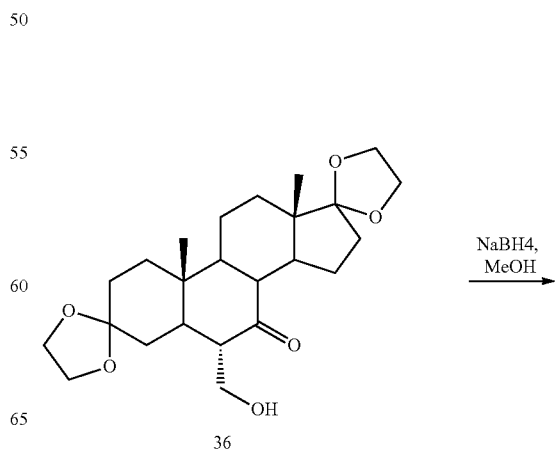

-continued

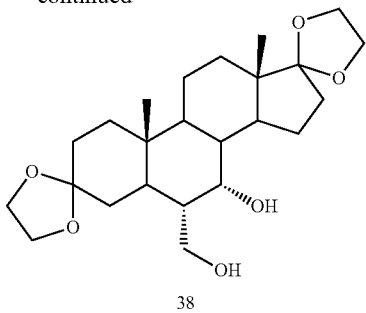

38

NaBH₄ (4.0 g, 104.8 mmol) was added slowly to a mixture of compound 36 (22.0 g, 52.4 mmol) in MeOH (1000.0 mL) at 0° C. Then the mixture was stirred at rt for 1 h. TLC showed the reaction was completed. The mixture was quenched with 5% aq. NaH₂PO₄ (220.0 mL) and extracted with DCM (300.0 mL*3). The combined organic phases were washed with brine (200.0 mL), dried over Na₂SO₄, filtered, concentrated, and purified by flash chromatography (DCM/EA=4/1) to get the crude product, which was triturated with ether to obtain the compound 38 (7.5 g, 34.1%) as a white solid.

Synthesis of Compound 39: (8S,9S,15S,2R)-9-hydroxy-8-(hydroxymethyl)-2,15-dimethyltetracyclo[8.7.0.0<2,7>0.0<11,15>]heptadecane-5,14-dione

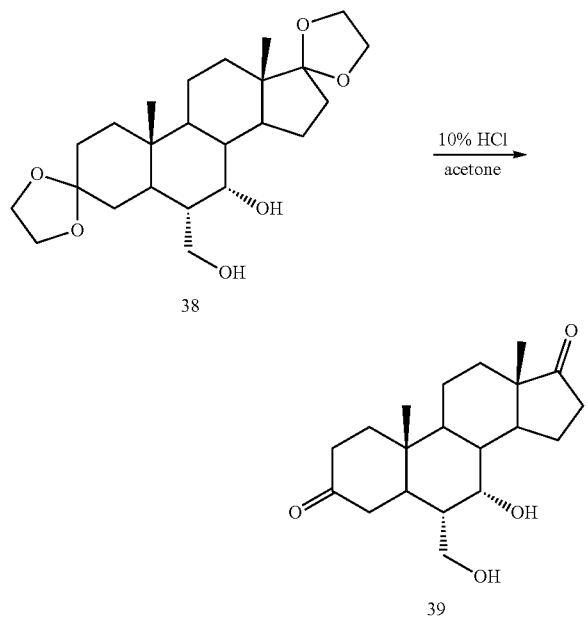

10% aq. HCl (35.0 mL) was added to a mixture of compound 38 (5.7 g, 13.5 mmol) in acetone (70.0 mL). Then, the mixture was heated to 70° C. for 1 h. TLC showed the reaction was completed. The mixture was quenched with 5% aq. NaOH and extracted with DCM (50.0 mL*2). The combined organic phases were washed with brine (50 mL), dried over Na₂SO₄, filtered, and concentrated. The residue was purified by flash chromatography (DCM/EA=4/1) to get the crude product, which was triturated with ether to obtain the pure product 39 (1.8 g, 40.0%) as a white solid.

Spectroscopic data for (8S,9S,15S,2R)-9-hydroxy-8-(hydroxymethyl)-2,15-dimethyl tetracyclo[8.7.0.0<2,7>0.0<11,15>]heptadecane-5,14-dione 39

¹H NMR (400 MHz, DMSO-d₆): δ4.37 (brs, 1H), 4.27 (d, J=4.8 Hz, 1H), 3.87-3.86 (m, 1H), 3.44-3.42 (m, 2H), 2.45-1.87 (m, 10H), 1.63-1.23 (m, 9H), 0.99 (s, 3H), 0.81 (s, 3H).

LCMS [mobile phase: from 55% water (0.05% FA) and 45% CH₃CN (0.05% FA) to 55% water (0.05% FA) and 45% CH₃CN (0.05% FA) in 6.0 min, finally under these conditions for 0.5 min], purity is >90%, Rt=2.515 min; MS Calcd.: 334.2; MS Found: 352.2 [M+18]⁺.

Synthesis of Compound 40: tert-butyl-(2-((6S,10R,13S)-6-(hydroxymethyl)-10,13-dimethyl-7,17-dioxododecahydro-1H-cyclopenta[a]phenanthren-3(2H,4H,10H)-ylidene)ethyl)azetidine-1-carboxylate

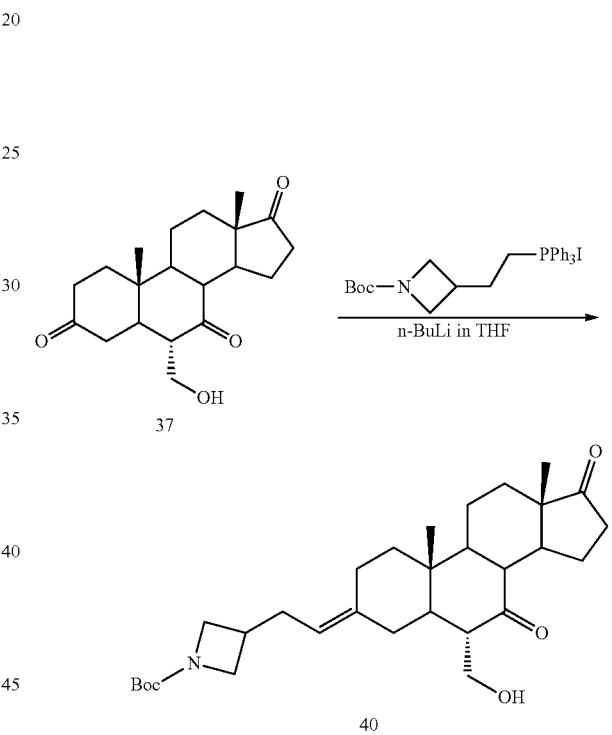

To a solution of phosphonium salt (2.57 g, 4.5 mmol) in THF (25 mL), a solution of n-BuLi in THF (2.5 M, 3.6 mL, 9.0 mmol) was added at −78° C. The mixture was stirred at 30° C. for 1 hour. Next, the compound 37 (500 mg, 1.5 mmol) was added to the mixture at −20° C. and then warmed to 30° C. for 2 hours. The mixture was quenched with sat.NH₄Cl (25 mL) and extracted with EtOAc (25 mL*3). The combined organic layers were concentrated and the residue was purified by column chromatography on silica gel (hexane/EtOAc=1/1) to give the crude compound. The compound was purified by reverse column to obtain pure compound 40 (60 mg, 8%) as a white solid.

Data for Compound 40:

LCMS column: C18; column size: 4.6*30 mm 5 µm; Dikwa Diamonsil plus; mobile phase: B(ACN): A (0.02% NH₄Ac+5% ACN); gradient (B %) in 3 min-5-95-POS; flow 1.5 mL/min, stop time 3 mins. Rt=1.820 min; MS Calcd.: 499, MS Found: 400 [M+H-Boc]⁺.

Synthesis of Compound 41: tert-butyl-3-(2-((3S,6S,10R,13S)-6-(hydroxymethyl)-10,13-dimethyl-7,17-dioxohexadecahydro-1H-cyclopenta[a]phenanthren-3-yl)ethyl)azetidine-1-carboxylate

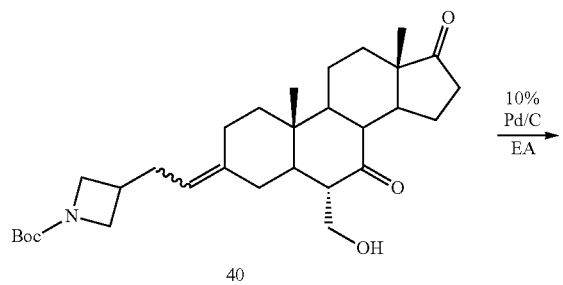

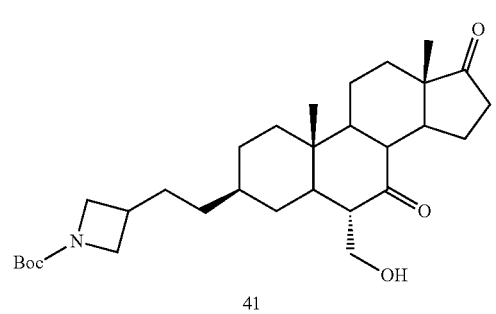

Pd/C (60 mg) was added to the solution of compound 40 (60 mg, 0.12 mmol) in EA (3 mL). Then, the mixture was stirred at room temperature overnight under H₂. The mixture was filtered and the filtrate was concentrated to produce compound 41 (52 mg, 86%) as a white solid.

LCMS column: C18; column size: 4.6*30 mm 5 μm; Dikma Diamonsil plus; mobile phase: B(ACN): A (0.02% NH₄Ac+5% ACN); gradient (B %) in 3 min-5-95-POS; flow 1.5 mL/min, stop time 3 mins. Rt=1.911 min; MS Calcd.: 501, MS Found: 402 [M+H-Boc]⁺.

Synthesis of CVie407: (3S,6S,10R,13S)-3-(2-(azetidin-3-yl)ethyl)-6-(hydroxymethyl)-10,13-dimethyl-dodecahydro-1H-cyclopenta[a]phenanthrene-7,17(2H,8H)-dione

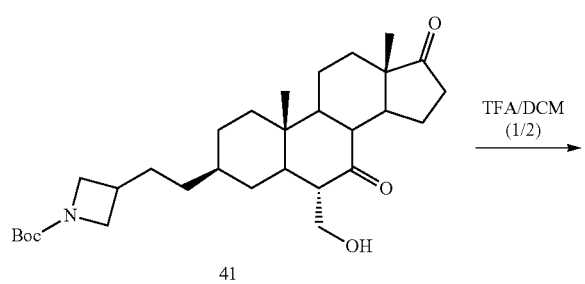

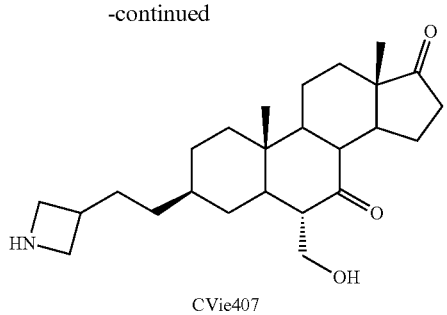

A solution of compound 41 (52 mg, 0.10 mmol) in TFA/DCM (1 mL/2 mL) was stirred at room temperature for 1 hour. The mixture was diluted with sat.NaHCO₃ to adjust to pH 8-9. The mixture was extracted with DCM (25 mL*3). The combined organic layers were concentrated and the residue was purified by prep-HPLC to produce compound Cvie407 (13 mg, 32%) as a white solid.

Spectroscopic Data for CVie407:
$^1$H NMR (CD₃OD, 400 MHz): δ 3.86-3.82 (m, 2H), 3.71-3.67 (m, 1H), 3.54-3.47 (m, 2H), 2.78-2.67 (m, 2H), 2.56-2.39 (m, 3H), 2.15-2.06 (m, 1H), 1.85-1.50 (m, 12H), 1.21-1.14 (m, 9H), 1.07-1.01 (m, 2H), 0.88 (s, 3H).

LCMS column: column: C18; column size: 4.6*50 mm; mobile phase: B (ACN): A (0.02% NH₄Ac); gradient (B %) in 6.5 min-5-95-POS; Rt=3.114 min; MS Calcd.: 401, MS Found: 402 [M+H]⁺.

Synthesis of Compound 42: tert-butyl-3-((E)-2-((6S,10R,13S)-6-(hydroxymethyl)-10,13-dimethyl-7,17-dioxododecahydro-1H-cyclopenta[a]phenanthren-3(2H,4H,10H)-ylidene)ethyl)azetidine-1-carboxylate

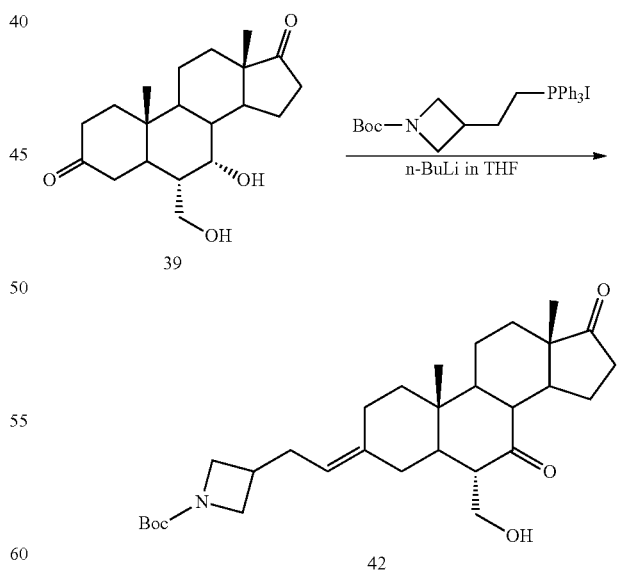

A solution of n-BuLi in THF (2.5 M, 0.7 mL, 1.80 mmol) was added to a solution of compound phosphonium salt (514 mg, 0.90 mmol) in THF (5 mL) at −78° C. The mixture was stirred at 40° C. for 1 hour. Then, compound 39 (100 mg, 0.30 mmol) was added to the mixture at 0° C. and then warmed to 40° C. overnight. The reaction was repeated for nine times. The mixture was quenched with sat.NH₄Cl (80 mL) and extracted with EtOAc (100 mL*3). The combined organic layers were concentrated and the residue was purified by prep-HPLC to produce compound 42 (20 mg, 1%) as a yellow solid.

LCMS column: C18; column size: 4.6*30 mm 5 μm; Dikwa Diamonsil plus; mobile phase: B (ACN): A (0.02% NH₄Ac+5% ACN); gradient (B %) in 3 min-5-95-POS; flow 1.5 mL/min, stop time 3 mins. Rt=1.945 min; MS Calcd.: 501, MS Found: 402 [M+H-Boc]⁺.

Synthesis of CVie403: (6S,10R,13S)-3-(2-(azetidin-3-yl)ethylidene)-6-(hydroxymethyl)-10,13-dimethyl-dodecahydro-1H-cyclopenta[a]phenanthrene-7,17(2H,8H)-dione

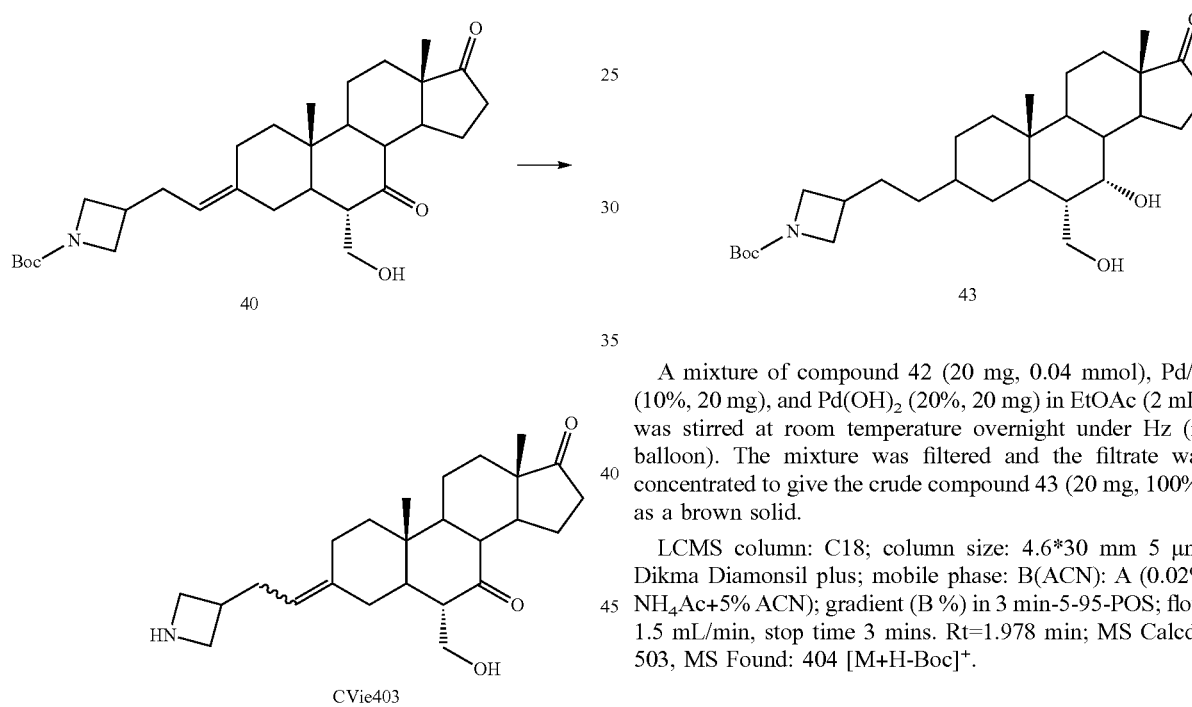

CVie403

The solution of compound 40 (130 mg, 0.26 mmol) in TFA/DCM (1 mL/2 mL) was stirred at room temperature for 1 hour. The mixture was basified with sat.NaHCO₃ to pH 8-9. The mixture was extracted with DCM (30 mL*3). The combined organic layer was concentrated and the residue was purified by prep-HPLC to produce compound CVie403 (13 mg, yield 13%) as a yellow solid.

Spectroscopic Data for CVie403:

¹H NMR (CD₃OD, 400 MHz): δ 5.00-4.96 (m, 1H), 3.92-3.81 (m, 3H), 3.66-3.62 (m, 1H), 3.54-3.52 (m, 2H), 2.77-2.73 (m, 1H), 2.67-2.61 (m, 2H), 2.49-2.43 (m, 2H), 2.38-2.29 (m, 2H), 2.23-2.18 (m, 2H), 2.06-1.96 (m, 2H), 1.83-1.76 (m, 2H), 1.71-1.61 (m, 3H), 1.51-1.35 (m, 3H), 1.18 (s, 3H), 1.12-1.05 (m, 2H), 0.98-0.90 (m, 1H), 0.80 (s, 3H).

LCMS column: Rt=3.964 min; MS Calcd.: 399, MS Found: 400 [M+H]⁺.

Synthesis of Compound 43: 3-(2-((6S,7S,10R,13S)-7-hydroxy-6-(hydroxymethyl)-10,13-dimethyl-17-oxohexadecahydro-1H-cyclopenta[a]phenanthren-3-yl)ethyl)azetidine-1-carboxylate

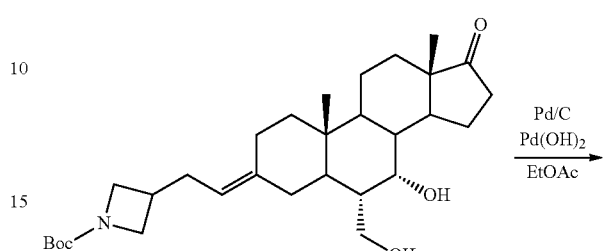

A mixture of compound 42 (20 mg, 0.04 mmol), Pd/C (10%, 20 mg), and Pd(OH)₂ (20%, 20 mg) in EtOAc (2 mL) was stirred at room temperature overnight under H₂ (in balloon). The mixture was filtered and the filtrate was concentrated to give the crude compound 43 (20 mg, 100%) as a brown solid.

LCMS column: C18; column size: 4.6*30 mm 5 μm; Dikma Diamonsil plus; mobile phase: B(ACN): A (0.02% NH₄Ac+5% ACN); gradient (B %) in 3 min-5-95-POS; flow 1.5 mL/min, stop time 3 mins. Rt=1.978 min; MS Calcd.: 503, MS Found: 404 [M+H-Boc]⁺.

Synthesis of CVie408: (6S,7S,10R,13S)-3-(2-(azetidin-3-yl)ethyl)-7-hydroxy-6-(hydroxymethyl)-10,13-dimethyltetradecahydro-1H-cyclopenta[a]phenanthren-17(2H)-one

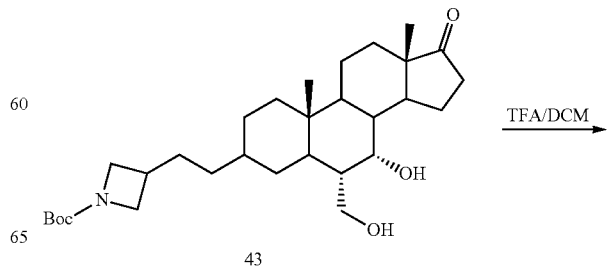

43

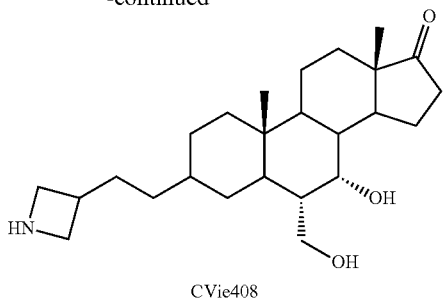

CVie408

A mixture of compound 43 (20 mg, 0.04 mmol) in TFA/DCM (1:1, 2 mL) was stirred at 0° C. for 30 minutes. The mixture was diluted with sat.NaHCO₃ to adjust to pH 8-9. The mixture was extracted with DCM (25 mL*3). The combined organic layers were dried over Na₂SO₄, filtered and concentrated. The residue was purified by prep-HPLC to produce compound CVie408 (6.4 mg, 40%) as a yellow solid.

Spectroscopic Data for CVie408:

¹H NMR (CD₃OD, 400 MHz): δ 4.08 (s, 1H), 3.84 (t, J=8.4 Hz, 1H), 3.77-3.68 (m, 2H), 3.52-3.48 (m, 2H), 2.81-2.73 (m, 1H), 2.52-2.44 (m, 1H), 2.18-2.06 (m, 2H), 1.86-1.71 (m, 4H), 1.69-1.59 (m, 6H), 1.52-1.43 (m, 2H), 1.39-1.30 (m, 4H), 1.24-1.15 (m, 4H), 1.12-1.04 (m, 1H), 0.95-0.92 (m, 1H), 0.90 (s, 3H), 0.87 (s, 3H).

LCMS column: column: C18; column size: 4.6*50 mm; mobile phase: B (ACN): A (0.02% NH₄Ac); gradient (B %) in 6.5 min-5-95-POS; Rt=3.078 min; MS Calcd.: 403, MS Found: 404 [M+H]⁺.

Synthesis of Compound 44: tert-butyl-3-(2-((6S,10R,13S)-6-(hydroxymethyl)-10,13-dimethyl-7,17-dioxododecahydro-1H-cyclopenta[a]phenanthren-3(2H,4H,10H)-ylidene)ethyl)pyrrolidine-1-carboxylate

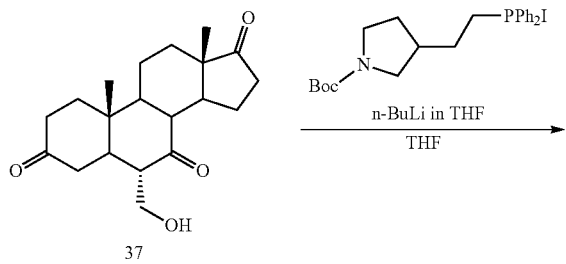

A solution of n-BuLi in THF (2.5M, 1.57 mL, 3.94 mmol) was added to a solution of compound phosphonium salt (1.5 g, 2.62 mmol) in THF (15 mL) at −78° C. The reaction mixture was stirred at 35° C. for 1 hour. Then, a solution of compound 37 (350 mg, 1.05 mmol) was added to the mixture at −20° C. and warmed to room temperature for 2 hours. The mixture was quenched with sat.NH₄Cl (25 mL) and extracted with EtOAc (25 mL*3). The combined organic layers were concentrated and the residue was purified by flash chromatography (hexane:EA=1:1) to give crude compound. Then the compound was purified by reverse column to obtain pure compound 44 (53 mg, 10%) as a white solid.

LCMS column: C18; column size: 4.6*30 mm 5 μm; Dikma Diamonsil plus; mobile phase: B (ACN): A (0.02% NH₄Ac+5% ACN); gradient (B %) in 3 min-5-95-POS; flow 1.5 mL/min, stop time 3 mins. Rt=2.017 min; MS Calcd.: 513, MS Found: 414 [M+H-Boc]⁺.

Synthesis of CVie402: (6S,10R,13S)-6-(hydroxymethyl)-10,13-dimethyl-3-(2-(pyrrolidin-3-yl)ethylidene)dodecahydro-1H-cyclopenta[a]phenanthrene-7,17(2H,8H)-dione

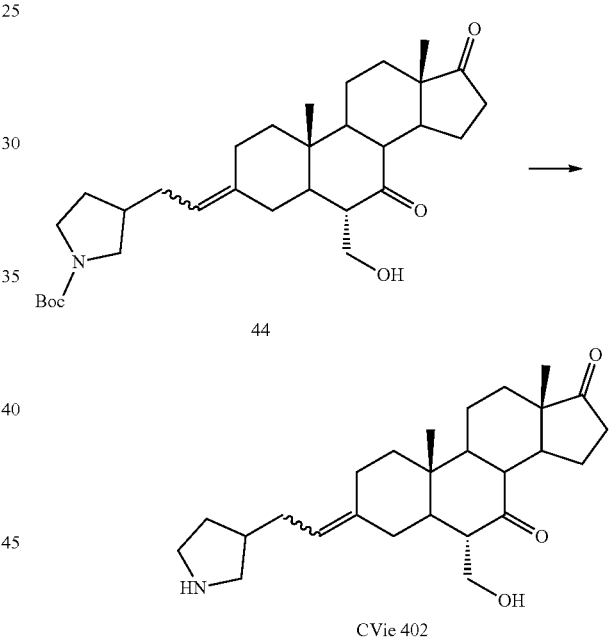

A solution of compound 44 (89 mg, 0.173 mmol) in TFA/DCM (1 mL/2 mL) was stirred at room temperature for 1 hour. The mixture was diluted with sat.NaHCO₃ to adjust pH=8-9. The mixture was extracted with DCM (25 mL*3). The combined organic layer was concentrated and the residue was purified by prep-HPLC to produce compound CVie402 (38 mg, 53%) as a white solid.

Spectroscopic Data for CVie402:

¹H NMR (CD₃OD, 400 MHz): δ 5.08-5.05 (m, 1H), 3.88-3.82 (m, 1H), 3.63-3.59 (m, 1H), 3.12-3.02 (m, 2H), 2.99-2.92 (m, 1H), 2.66-2.55 (m, 3H), 2.48-2.42 (m, 2H), 2.37-2.30 (m, 1H), 2.23-2.19 (m, 1H), 2.15-2.04 (m, 2H), 2.03-1.91 (m, 4H), 1.83-1.78 (m, 2H), 1.75-1.61 (m, 3H), 1.51-1.34 (m, 4H), 1.19-1.17 (m, 3H), 1.12-1.03 (m, 2H), 0.97-0.90 (m, 1H), 0.80 (s, 3H).

LCMS column: Rt=3.060 min; MS Calcd.: 413, MS Found: 414[M+H]⁺.

Synthesis of Compound 45: tert-butyl-3-(2-((3S,6S,10R,13S)-6-(hydroxymethyl)-10,13-dimethyl-7,17-dioxohexadecahydro-1H-cyclopenta[a]phenanthren-3-yl)ethyl)pyrrolidine-1-carboxylate

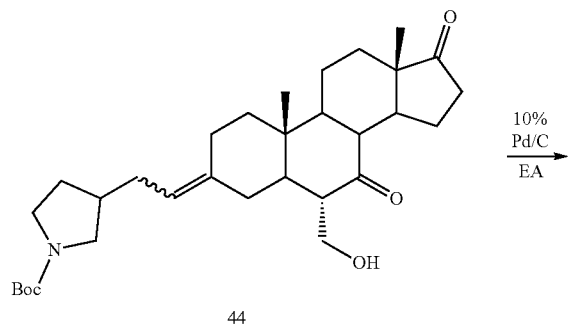

A solution of compound 44 (53 mg, 0.103 mmol) in EA (3 mL) was added to Pd/C (60 mg). Then, the mixture was stirred at room temperature overnight under H₂. The mixture was filtered and the filtrate was concentrated to produce compound 45 (50 mg, 94%) as a white solid.

LCMS column: C18; column size: 4.6*30 mm 5 μm; Dikma Diamonsil plus; mobile phase: B (ACN): A (0.02% NH₄Ac+5% ACN); gradient (B %) in 3 min-5-95-POS; flow 1.5 mL/min, stop time 3 mins. Rt=1.984 min; MS Calcd.: 515, MS Found: 416 [M+H-Boc]⁺.

Synthesis of CVie409: (3S,6S,10R,13S)-6-(hydroxymethyl)-10,13-dimethyl-3-(2-(pyrrolidin-3-yl)ethyl)dodecahydro-1H-cyclopenta[a]phenanthrene-7,17(2H,8H)-dione

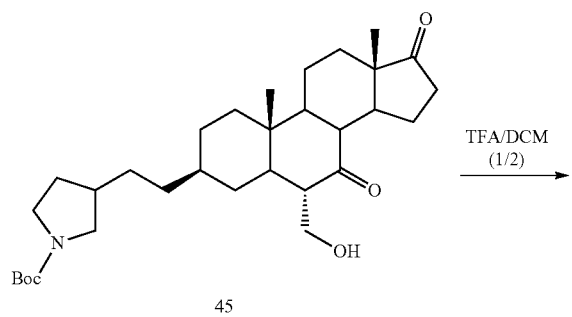

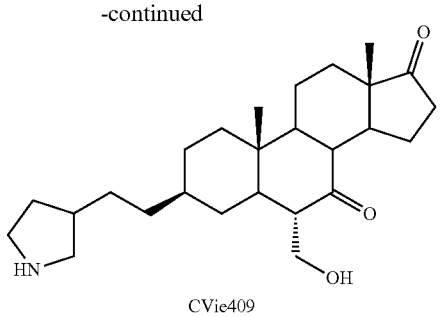

A solution of compound 45 (50 mg, 0.09 mmol) in TFA/DCM (1 mL/2 mL) was stirred at room temperature for 1 hour. The mixture was diluted with sat.NaHCO₃ to adjust to pH 8-9. The mixture was extracted with DCM (25 mL*3). The combined organic layers were concentrated and the residue was purified by prep-HPLC to produce compound CVie409 (12 mg, 32%) as a white solid.

Spectroscopic Data for CVie409:
¹H NMR (CD₃OD, 400 MHz): δ 3.87-3.82 (m, 1H), 3.70-3.64 (m, 1H), 3.28-3.24 (m, 1H), 3.21-3.16 (m, 1H), 3.11-3.04 (m, 1H), 2.72-2.62 (m, 2H), 2.57-2.51 (m, 1H), 2.47-2.39 (m, 2H), 2.17-2.05 (m, 3H), 1.85-1.70 (m, 5H), 1.66-1.49 (m, 8H), 1.38-1.34 (m, 2H), 1.25-1.19 (m, 6H), 1.14-1.10 (m, 2H), 0.88 (s, 3H).

LCMS column: column:C18; column size: 4.6*50 mm; mobile phase: B(ACN): A(0.02% NH₄Ac); gradient (B %) in 6.5 min-5-95-POS; Rt=3.180 min; MS Calcd.: 415, MS Found: 416 [M+H]⁺.

Synthesis of Compound 46: tert-butyl-3-(2-((6S,7S,10R,13S)-7-hydroxy-6-(hydroxymethyl)-10,13-dimethyl-17-oxododecahydro-1H-cyclopenta[a]phenanthren-3 (2H,4H,10H)-ylidene)ethyl)pyrrolidine-1-carboxylate

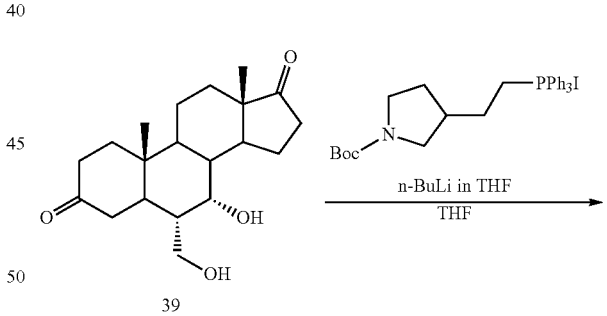

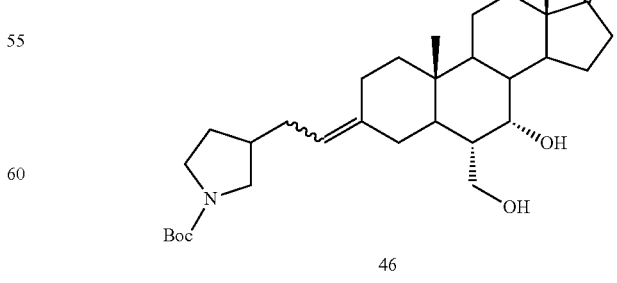

A solution of n-BuLi in THF (2.5M, 0.7 mL, 1.80 mmol) was added to a solution of compound phosphonium salt (527 mg, 0.90 mmol) in THF (5 mL) at −78° C. The reaction mixture was stirred at 35° C. for 1 hour. Then compound 39 (100 mg, 0.30 mmol) was added to the mixture at 0° C. and then warmed to 35° C. overnight. The reaction was repeated for four times. The mixture was quenched with sat.NH$_4$Cl (80 mL) and extracted with EtOAc (100 mL*3). The combined organic layers were concentrated and the residue was purified by prep-HPLC to give compound 46 (26 mg, 3%) as a white solid.

LCMS column: C18; column size: 4.6*30 mm 5 μm; Dikma Diamonsil plus; mobile phase: B (ACN): A (0.02% NH$_4$Ac+5% ACN); gradient (B %) in 3 min-5-95-POS; flow 1.5 mL/min, stop time 3 mins. Rt=2.000 min; MS Calcd.: 515, MS Found: 416 [M+H-Boc]$^+$.

Synthesis of Compound 47: tert-butyl-3-(2-((6S,7S, 10R,13S)-7-hydroxy-6-(hydroxymethyl)-10,13-dimethyl-17-oxohexadecahydro-1H-cyclopenta[a] phenanthren-3-yl)ethyl)pyrrolidine-1-carboxylate

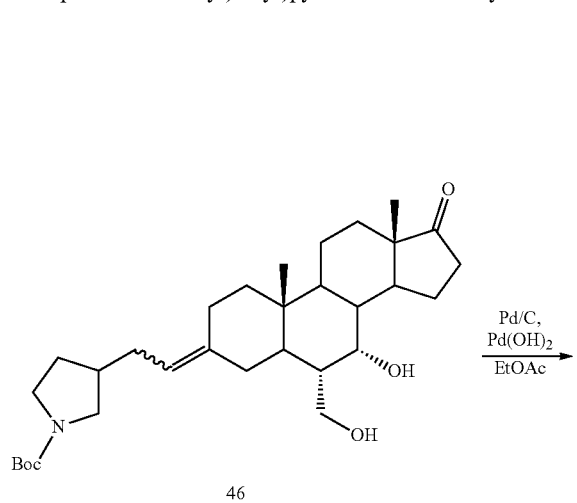

A mixture of compound 46 (26 mg, 0.05 mmol), Pd/C (10%, 30 mg), and Pd(OH)$_2$ (20%, 30 mg) in EtOAc (3 mL) was stirred at room temperature overnight under Hz (in balloon). The mixture was filtered and filtrate was concentrated to give the crude compound 47 (26 mg, 100%) as a yellow solid.

LCMS column: C18; column size: 4.6*30 mm 5 μm; Dikma Diamonsil plus; mobile phase: B (ACN): A (0.02% NH$_4$Ac+5% ACN); gradient (B %) in 3 min-5-95-POS; flow 1.5 mL/min, stop time 3 mins. Rt=2.059 min; MS Calcd.: 517, MS Found: 418 [M+H-Boc]$^+$.

Synthesis of CVie410: (6S,7S,10R,13S)-7-hydroxy-6-(hydroxymethyl)-10,13-dimethyl-3-(2-(pyrrolidin-3-yl)ethyl)tetradecahydro-1H-cyclopenta[a] phenanthren-17(2H)-one A solution of compound 47 (26 mg, 0.05 mmol) in TFA/DCM (1:2, 2 mL) was stirred at 0° C. for 1 hour. The mixture was diluted with sat.NaHCO$_3$ to adjust to pH 8-9. The mixture was extracted with DCM (20 mL*3). The combined organic layers were dried over Na$_2$SO$_4$, filtered and concentrated. The residue was purified by prep-HPLC to produce compound CVie410 (9 mg, 43%) as a yellow solid. Spectroscopic Data for CVie410:

$^1$H NMR (CD$_3$OD, 400 MHz): δ 3.95 (s, 1H), 3.64-3.57 (m, 2H), 3.12-3.07 (m, 1H), 3.04-2.96 (m, 1H), 2.93-2.89 (m, 1H), 2.48-2.44 (m, 1H), 2.38-2.32 (m, 1H), 2.05-1.93 (m, 4H), 1.69-1.57 (m, 5H), 1.55-1.46 (m, 4H), 1.37-1.33 (m, 4H), 1.25-1.18 (m, 5H), 1.08-0.90 (m, 3H), 0.82-0.80 (m, 1H), 0.77 (s, 3H), 0.75 (s, 3H).

LCMS column: column: C18; column size: 4.6*50 mm; mobile phase: B(ACN): A(0.02% NH$_4$Ac); gradient (B %) in 6.5 min-5-95-POS; Rt=3.139 min; MS Calcd.: 417, MS Found: 418 [M+H]$^+$.

Synthesis of Compound 48: tert-butyl-4-(2-((6S, 10R,13S)-6-(hydroxymethyl)-10,13-dimethyl-7,17-dioxododecahydro-1H-cyclopenta[a]phenanthren-3 (2H,4H,10H)-ylidene)ethyl)piperidine-1-carboxylate

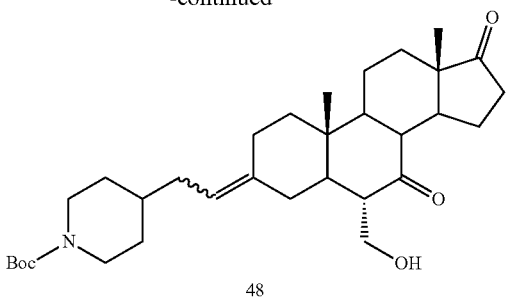

48

A solution of n-BuLi in THF (2.5 M, 2.90 mL, 7.20 mmol) was added to a mixture of compound phosphonium salt (2.16 g, 3.60 mmol) in THF (16 mL) at −78° C. The reaction mixture was stirred at 30° C. for 1 hour. Then compound 37 (400 mg, 1.20 mmol) was added to the mixture at −20° C. The mixture was stirred at −20° C. for 30 minutes and then warmed to 30° C. for 2 hours. The mixture was quenched with sat.NH$_4$Cl (15 mL) and extracted with EtOAc (30 mL*3). The combined organic layers were concentrated and the residue was purified by prep-HPLC to give the compound 48 (28 mg, 4%) as a yellow solid.

LCMS column: C18; column size: 4.6*30 mm 5 μm; Dikma Diamonsil plus; mobile phase: B (ACN): A (0.02% NH$_4$Ac+5% ACN); gradient (B %) in 3 min-30-95-POS; flow 1.5 mL/min, stop time 3 mins. Rt=2.013 min; MS Calcd.: 527, MS Found: 428 [M+H-Boc]$^+$.

Synthesis of CVie405: (6S,10R,13S)-6-(hydroxymethyl)-10,13-dimethyl-3-(2-(piperidin-4-yl)ethylidene)dodecahydro-1H-cyclopenta[a]phenanthrene-7,17(2H,8H)-dione

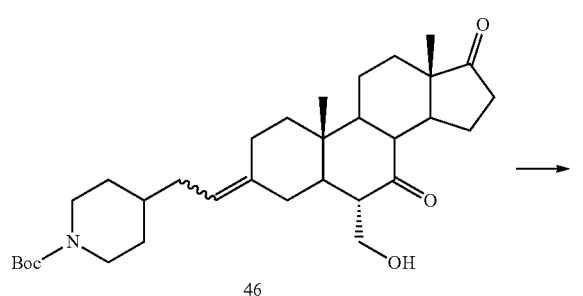

46

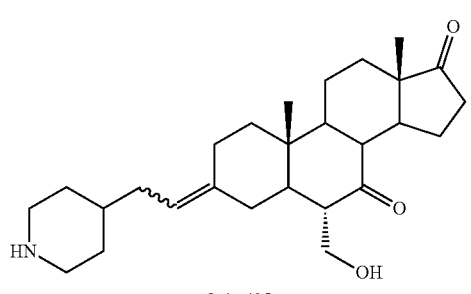

Cvie 405

A solution of compound 46 (80 mg, 0.152 mmol) in TFA/DCM (1 mL/2 mL) was stirred at room temperature for 30 minutes. The mixture was basified with sat.NaHCO$_3$ to pH=8-9. The mixture was extracted with DCM (25 mL*3). The combined organic layer was dried over Na$_2$SO$_4$, filtered and concentrated. The residue was purified by prep-HPLC to produce compound CVie405 (30 mg, 46%) as a yellow solid.

Spectroscopic Data for CVie405:

$^1$H NMR (CD$_3$OD, 400 MHz): δ 5.14 (t, J=7.2 Hz, 1H), 3.88-3.80 (m, 1H), 3.74-3.66 (m, 1H), 3.09-3.06 (m, 2H), 2.67-2.49 (m, 6H), 2.45-2.38 (m, 1H), 2.33-2.26 (m, 1H), 2.19-2.04 (m, 2H), 2.01-1.83 (m, 3H), 1.80-1.69 (m, 6H), 1.61-1.47 (m, 2H), 1.45-1.34 (m, 2H), 1.30-1.25 (m, 5H), 1.19-1.08 (m, 4H), 1.04-0.90 (m, 1H), 0.88 (s, 3H).

LCMS column: Rt=3.219 min; MS Calcd.: 427, MS Found: 428 [M+H]+.

Synthesis of Compound 49: tert-butyl-4-(2-((6S, 10R,13S)-6-(hydroxymethyl)-10,13-dimethyl-7,17-dioxohexadecahydro-1H-cyclopenta[a]phenanthren-3-yl)ethyl)piperidine-1-carboxylate

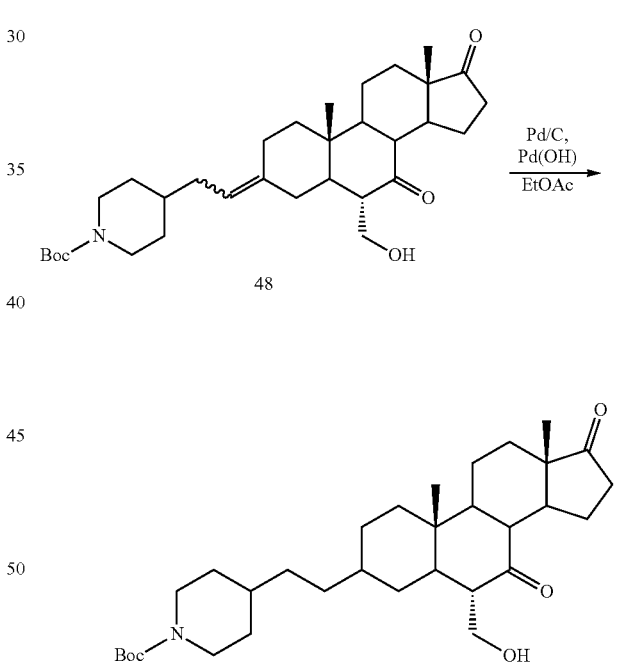

A mixture of compound 48 (28 mg, 0.05 mmol) and Pd/C (10%, 50 mg) in EtOAc (2 mL) was stirred at room temperature overnight under H$_2$ (in balloon). The mixture was filtered and the filtrate was concentrated to give the crude compound 49 (28 mg, 100%) as a yellow solid.

LCMS column: C18; column size: 4.6*30 mm 5 μm; Dikwa Diamonsil plus; mobile phase: B(ACN): A (0.02% NH$_4$Ac+5% ACN); gradient (B %) in 3 min-5-95-POS; flow 1.5 mL/min, stop time 3 mins. Rt=2.109 min; MS Calcd.: 529, MS Found: 430 [M+H-Boc]$^+$.

Synthesis of CVie411: (6S,10R,13S)-6-(hydroxymethyl)-10,13-dimethyl-3-(2-(piperidin-4-yl)ethyl)dodecahydro-1H-cyclopenta[a]phenanthrene-7,17(2H,8H)-dione

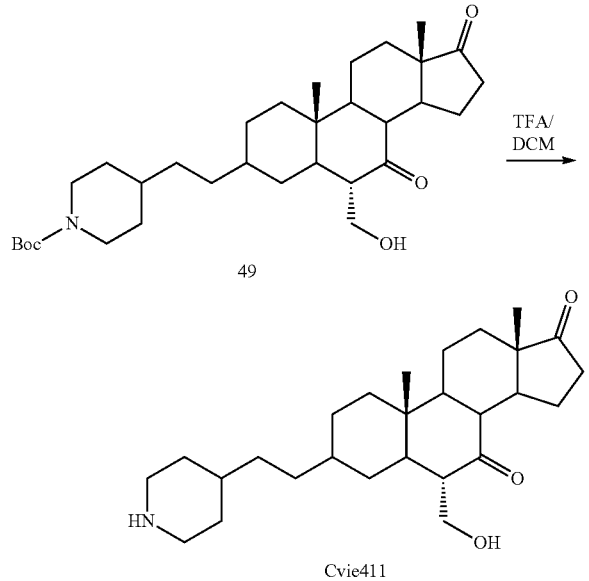 [SMILES: CC(C)(C)OC(=O)N1CCC(CCC2CC[C@]3(C)C4CC[C@]5(C)C(=O)CCC5C4C(=O)[C@H](CO)C3C2)CC1 ; C[C@]12CCC(CCC3CCNCC3)CC1[C@@H](CO)C(=O)C1C2CC[C@]2(C)C(=O)CCC12]

A solution of compound 49 (28 mg, 0.05 mmol) in TFA/DCM (1 mL/2 mL) was stirred at room temperature for 30 minutes. The mixture was diluted with sat. NaHCO$_3$ to adjust to pH 8-9. The mixture was extracted with DCM (25 mL*3). The combined organic layers were dried over Na$_2$SO$_4$, filtered and concentrated. The residue was purified by prep-HPLC to produce compound CVie411 (10 mg, 43%) as a yellow solid.

Spectroscopic Data for CVie411:
$^1$H NMR (CD$_3$OD, 400 MHz): δ 3.85-3.81 (m, 1H), 3.71-3.66 (m, 1H), 3.07-3.04 (m, 2H), 2.69 (t, J=11.2 Hz, 1H), 2.63-2.51 (m, 3H), 2.48-2.39 (m, 2H), 2.15-2.05 (m, 1H), 1.84-1.72 (m, 7H), 1.63-1.46 (m, 4H), 1.37-1.33 (m, 6H), 1.28-1.14 (m, 7H), 1.09-0.98 (m, 3H), 0.88 (s, 3H).

LCMS column: column: C18; column size: 4.6*50 mm; mobile phase: B (ACN): A (0.02% NH$_4$Ac); gradient (B %) in 6.5 min-5-95-POS; Rt=4.188 min; MS Calcd.: 429, MS Found: 430 [M+H]$^+$.

Synthesis of Compound 50: tert-butyl-4-(2-((6S,10R,13S)-6-(hydroxymethyl)-10,13-dimethyl-7,17-dioxododecahydro-1H-cyclopenta[a]phenanthren-3(2H,4H,10H)-ylidene)ethyl)piperidine-1-carboxylate

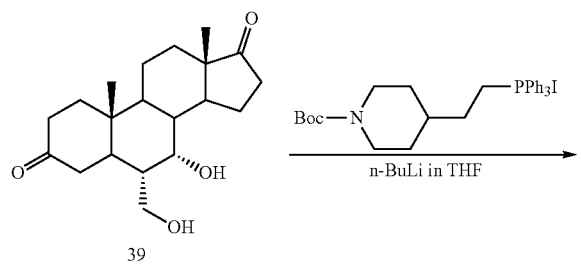

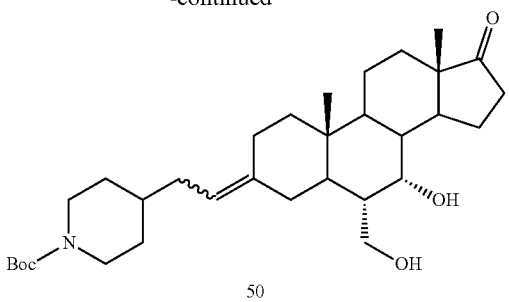

n-BuLi in THF (2.5 M, 0.70 mL, 1.80 mmol) was added to a solution of phosphonium salt (540 mg, 0.90 mmol) in THF (5 mL) at −78° C. The reaction mixture was stirred at 40° C. for 1 hour. Then, compound 39 (100 mg, 0.30 mmol) was added to the mixture at 0° C. and then warmed to 40° C. for 2 hours. The reaction was repeated for five times. The mixture was quenched with sat.NH$_4$Cl (80 mL) and extracted with EtOAc (100 mL*3). The combined organic layers were concentrated and the residue was purified by prep-HPLC to give the crude compound 50 (35 mg, 4%) as a white solid.

LCMS column: C18; column size: 4.6*30 mm 5 μm; Dikma Diamonsil plus; mobile phase: B(ACN): A (0.02% NH$_4$Ac+5% ACN); gradient (B %) in 3 min-5-95-POS; flow 1.5 mL/min, stop time 3 mins. Rt=2.104 min; MS Calcd.: 529, MS Found: 430 [M+H-Boc]$^+$.

Synthesis of Compound 51: tert-butyl-4-(2-((6S,7S,10R,13S)-7-hydroxy-6-(hydroxymethyl)-10,13-dimethyl-17-oxohexadecahydro-1H-cyclopenta[a]phenanthren-3-yl)ethyl)piperidine-1-carboxylate

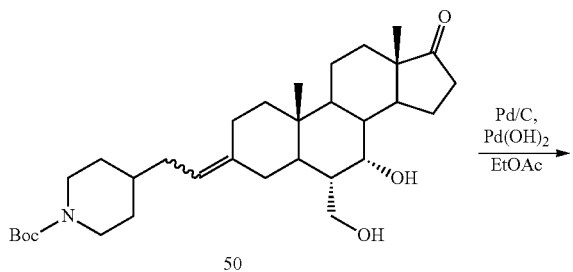

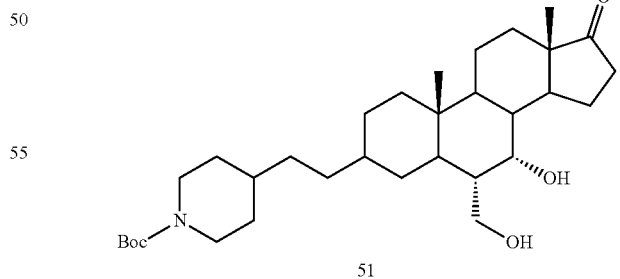

A mixture of compound 50 (35 mg, 0.07 mmol), Pd/C (10%, 40 mg), and Pd(OH)$_2$ (20%, 40 mg) in EtOAc (2 mL) was stirred at room temperature overnight under H$_2$ (in balloon). The mixture was filtered and the filtrated was concentrated to give the crude compound 51 (35 mg, 100%) as a brown solid.

LCMS column: C18; column size: 4.6*30 mm 5 µm; Dikma Diamonsil plus; mobile phase: B(ACN): A (0.02% NH₄Ac+5% ACN); gradient (B %) in 3 min-5-95-POS; flow 1.5 mL/min, stop time 3 mins. Rt=2.126 min; MS Calcd.: 531, MS Found: 432 [M+H-Boc]⁺.

Synthesis of CVie412: (6S,7S,10R,13S)-7-hydroxy-6-(hydroxymethyl)-10,13-dimethyl-3-(2-(piperidin-4-yl)ethyl)tetradecahydro-1H-cyclopenta[a]phenanthren-17(2H)-one

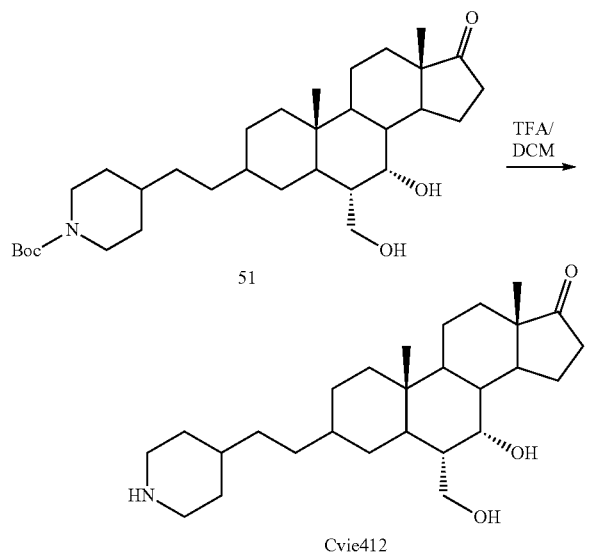

The solution of compound 51 (35 mg, 0.07 mmol) in TFA/DCM (1:2, 2 mL) was stirred at room temperature for 30 minutes. The mixture was diluted with sat. NaHCO₃ to adjust to pH 8-9. The mixture was extracted with DCM (25 mL*3). The combined organic layers were dried over Na₂SO₄, filtered and concentrated. The residue was purified by prep-HPLC to produce compound CVie412 (13 mg, 46%) as a yellow solid.

Spectroscopic Data for CVie412:
¹H NMR (CD₃OD, 400 MHz): δ 4.04 (s, 1H), 3.72-3.61 (m, 2H), 3.09-3.06 (m, 2H), 2.63 (t, J=11.6 Hz, 2H), 2.48-2.41 (m, 1H), 2.13-2.03 (m, 2H), 1.75-1.66 (m, 5H), 1.63-1.55 (m, 5H), 1.45-1.35 (m, 3H), 1.31-1.17 (m, 10H), 1.10-1.03 (m, 2H), 0.89 (s, 1H), 0.87 (s, 3H), 0.84 (s, 3H).

LCMS column: column size: 4.6*50 mm; mobile phase: B(ACN): A (0.02% NH₄Ac); gradient (B %) in 6.5 min-5-95-POS; Rt=3.203 min; MS Calcd.: 431, MS Found: 432 [M+H]⁺.

Synthesis of Compound 52: tert-butyl((E)-5-((6S,10R,13S)-6-(hydroxymethyl)-10,13-dimethyl-7,17-dioxododecahydro-1H-cyclopenta[a]phenanthren-3(2H,4H,10H)-ylidene)pentyl)(methyl)carbamate

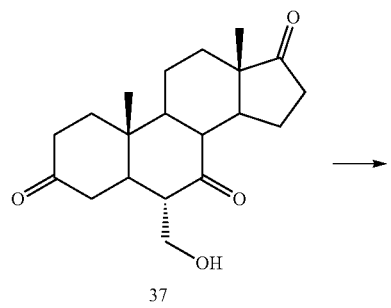

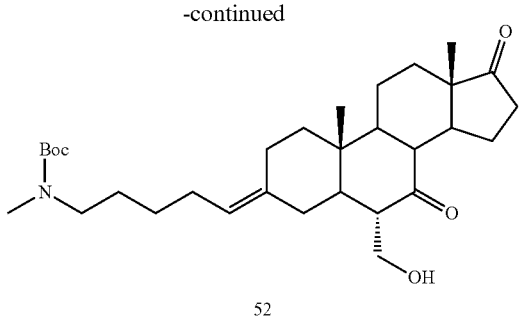

To a mixture of N-Boc-N-methyl-5-triphenylphosphoniumpentenamine iodide (4.26 g, 7.23 mmol) in THF (50 mL), n-BuLi (3.18 mL, 7.95 mmol) was added dropwise at −78 OC. The mixture was stirred at 0° C. for 20 min. Then, the mixture was cooled to −30° C. Compound 37 (800 mg, 2.41 mmol) was then added to the reaction mixture. The mixture was stirred at r.t overnight. The reaction mixture was quenched with H₂O and concentrated. The residue was purified by column chromatography on silica gel (PE/EtOAc=1/2) and then purified by prep-HPLC to produce compound 52 (36 mg, 200 mg) as colorless oil.

Spectroscopic Data for Compound 52:
¹H NMR (CD₃OD, 400 MHz): 5.16-5.12 (m, 1H), 3.89-3.85 (m, 1H), 3.77-3.73 (m, 1H), 3.22-3.19 (m, 2H), 2.83 (s, 3H), 2.75-2.60 (m, 2H), 2.60-2.50 (m, 2H), 2.46-2.41 (m, 1H), 2.33-2.27 (m, 1H), 2.15-2.02 (m, 4H), 1.90-1.79 (m, 2H), 1.77-1.71 (m, 3H), 1.60-1.52 (m, 4H), 1.50 (s, 9H), 1.45-1.42 (m, 1H), 1.34-1.29 (m, 2H), 1.26 (s, 3H), 1.24-1.21 (m, 1H), 1.19-1.05 (m, 2H), 1.05-0.99 (m, 1H).

Synthesis of CVie401: (6S,10R,13S,E)-6-(hydroxymethyl)-10,13-dimethyl-3-(5-(methylamino)pentylidene)dodecahydro-1H-cyclopenta[a]phenanthrene-7,17(2H,8H)-dione

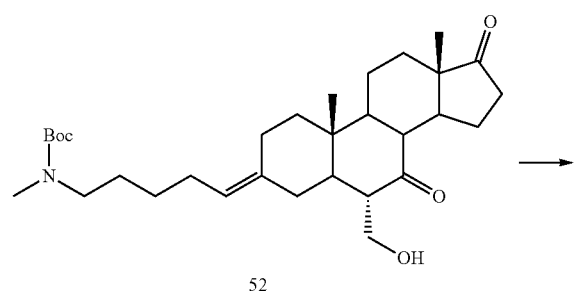

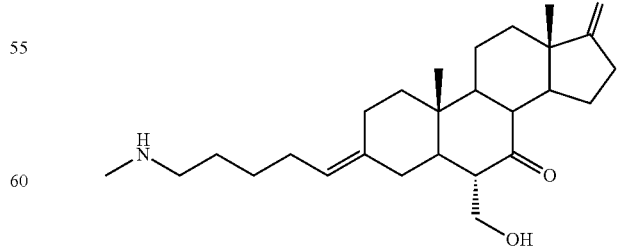

A mixture of compound 52 (60 mg, 0.116 mmol) in TFA/DCM (1 mL/2 mL) was stirred at room temperature overnight. Then, the mixture was concentrated and diluted with EtOAc, washed with sat.Na$_2$CO$_3$, dried over Na$_2$SO$_4$, filtered, and concentrated to produce compound CVie401 (38 mg, 79%) as yellow oil.

Spectroscopic data for CVie401:

$^1$H NMR (CD$_3$OD, 400 MHz): 5.36 (s, 1H), 3.89-3.86 (m, 1H), 3.71-3.67 (m, 1H), 2.80-2.77 (m, 2H), 2.73-2.67 (m, 1H), 2.55-2.39 (m, 6H), 2.15-2.01 (m, 4H), 1.92-1.85 (m, 1H), 1.77-1.69 (m, 4H), 1.65-1.45 (m, 7H), 1.38-1.25 (m, 6H), 1.19 (s, 3H), 0.89 (s, 4H).

LCMS: Rt=2.128 min, [M+1]$^+$=416.

Synthesis of Compound 53: tert-butyl(5-((6S,7S,10R,13S)-7-hydroxy-6-(hydroxymethyl)-10,13-dimethyl-17-oxododecahydro-1H-cyclopenta[a]phenanthren-3(2H,4H,10H)-ylidene)pentyl)(methyl)carbamate

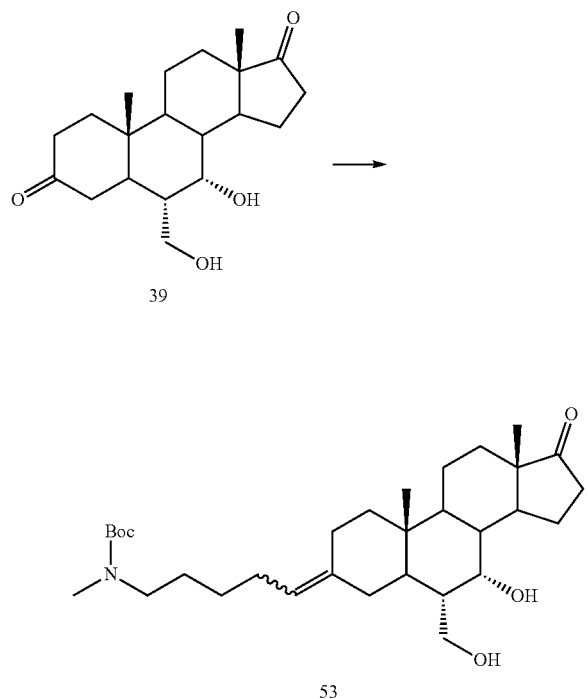

To a mixture of N-Boc-N-methyl-5-triphenylphosphoniumpentenamine iodide (4.39 g, 7.45 mmol) in THF (45 mL), a solution of nBuLi in THF (4.46 mL, 2.5 N, 11.16 mmol) was added dropwise at −78° C. Then, the mixture was stirred at OC for 20 min. The mixture was cooled to −50° C. and compound 39 (830 mg, 2.48 mmol) was added. The mixture was stirred at r.t overnight. The mixture was quenched with H$_2$O, concentrated and purified by column chromatography (PE/EtOAc=1/1) and then purified by prep-HPLC to give compound 53 (80 mg, 300 mg) as white solid.

Spectroscopic Data for Compound 53:

$^1$H NMR (CD$_3$OD, 400 MHz): 5.10-5.08 (m, 1H), 4.05 (s, 1H), 3.78-3.72 (m, 1H), 3.23-3.20 (m, 2H), 2.83 (s, 3H), 2.56-2.53 (m, 1H), 2.48-2.41 (m, 1H), 2.12-2.10 (m, 1H), 2.07-2.00 (m, 5H), 1.85-1.81 (m, 1H), 1.74-1.51 (m, 10H), 1.49 (s, 9H), 1.39-1.30 (m, 4H), 1.21-1.18 (m, 1H), 1.08-1.04 (m, 1H), 0.96 (s, 3H), 0.88 (s, 3H).

Synthesis of CVie406: (6S,7S,10R,13S)-7-hydroxy-6-(hydroxymethyl)-10,13-dimethyl-3-(5-(methylamino)pentylidene)tetradecahydro-1H-cyclopenta[a]phenanthren-17(2H)-one

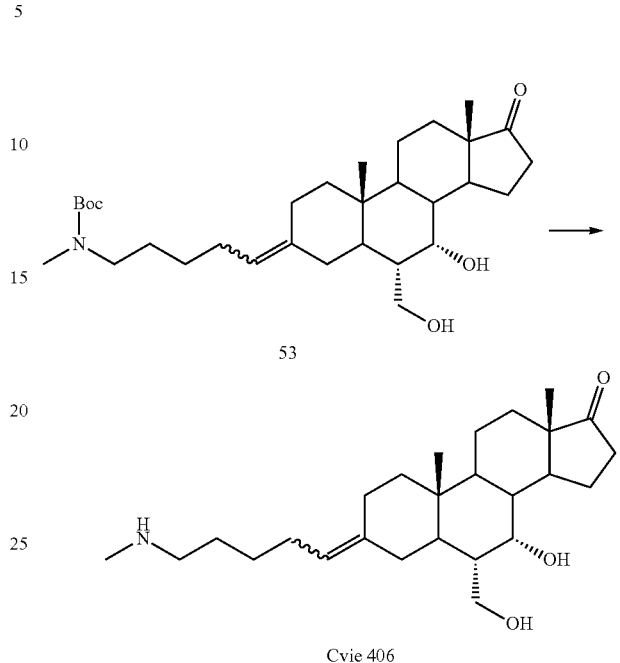

A solution of compound 53 (80 mg, 0.155 mmol) in TFA/DCM (1 mL/2 mL) was stirred at room temperature for 10 minutes. The mixture was basified with sat.NaHCO$_3$ to pH=8-9. The mixture was extracted with DCM (25 mL*2). The combined organic layer was dried over Na$_2$SO$_4$, filtered and concentrated. The residue was purified by prep-HPLC to give the compound CVie406 (60 mg, 94%) as a yellow solid.

LCMS column: Rt=0.370 min; MS Calcd.: 417, MS Found: 418[M+H]$^+$.

Example 2. General Procedures for Measuring Biological Activity

Example Animal Care

The investigation attains to the Guide of the Care and Use of Laboratory Animals published by the National Institute of Health (NIH publication no. 85-23, revised 1996) and to the guidelines for animal care endorsed by the participating institutions.

Measurements in Isolated Left Ventricular Cardiomyocytes

The compounds were characterized for their effect on (i) SR Ca$^{2+}$ uptake function and (ii) action potential (AP) in myocytes freshly dissociated from rat and guinea-pig ventricles, respectively, by retrograde coronary perfusion with enzymatic solution (Rocchetti M et al., J Pharmacol Exper Therap 2005, 313(1):207-215).

Statistical Analysis

Whole animal experiments: Data reported as mean t SD. Statistical analysis was performed by Student's t-test (paired t test).

Isolated myocyte experiments: Data are reported as mean f SE. Curves including multiple means were compared by two-way ANOVA for repeated measurements; drug-induced changes in overall curve steepness were defined according to significance of the "factor X group" interaction. Due to inadequate mono-exponential fit of Ca$^{2+}$ decay, $\tau_{decay}$ was not estimated in a few cells for which CaT data are reported; the sample size (N) reported in the corresponding figures. STV dependency on mean APD was quantified by linear regression. P<0.05 was regarded as statistically significant in all comparisons.

Example 3. In Vitro Screening of Compounds of Formula (I)

Inhibition of Dog Renal $Na^+/K^+$ ATPase Activity

As noted elsewhere herein, the compounds of the present invention are pure or predominantly pure SERCA2a stimulators. As such, these compounds will exhibit little to no inhibition of the enzymatic activity of the $Na^+/K^+$ ATPase. The compounds were thus tested for their inhibitory effect on the canine renal $Na^+/K^+$ ATPase enzyme.

Purification of renal $Na^+/K^+$ ATPase was performed according to the method described by Jorgensen (Methods Enzymol. 1988, 156:29-43). Kidneys were excised from 1-3 year-old male beagle dogs (WuXi AppTec, Suzhou Co., Ltd. 1318 Wuzhong Ave., Wuzhong District Suzhou, 215104 P.R. China) under pentobarbital anesthesia (Import Authorization from Italian Health Ministry 0009171-09/04/2015-DGSAF-COD_UO-P, 2015). Kidneys were sliced and the outer medulla was dissected and suspended (1 g/10 ml) in a sucrose-histidine solution containing 250 mM sucrose, 30 mM histidine, and 5 mM EDTA, pH 7.2. The tissue was homogenized by using an Ultra Turrax homogenizer. The sample was centrifuged at 6,000 g for 15 min. Next, the supernatant was decanted and centrifuged at 48,000 g for 30 min. The pellet was suspended in the sucrose-histidine buffer and incubated for 20 min with a sodium-dodecyl-sulphate (SDS) solution dissolved in a gradient buffer containing 25 mM imidazole and 1 mM EDTA, pH 7.5. The sample was layered on the top of a sucrose discontinuous gradient (10, 15, and 29.4%) and centrifuged at 60,000 g for 115 min. The pellet was suspended in the gradient buffer.

$Na^+/K^+$ ATPase activity was assayed in vitro by measuring the release of $^{32}P$ from $^{32}P$-ATP, as described (Ferrandi M. et al., Hypertension 1996, 28:1018-25). Increasing concentrations of the standard ouabain, or tested compound, were incubated with 0.3 μg of purified dog kidney enzyme for 10 min at 37° C. in 120 μl final volume of a medium containing 140 mM NaCl, 3 mM $MgCl_2$, 50 mM Hepes-Tris, 3 mM ATP, pH 7.5. Then, 10 μl of a solution containing 10 mM KCl and 20 nCi of $^{32}P$-ATP (3-10 Ci/mmol, Perkin Elmer) were added. The reaction was allowed to continue for 15 min at 37° C. and then stopped by acidification with 20% v/v ice-cold perchloric acid. $^{32}P$ was separated by centrifugation with activated Charcoal (Norit A, Serva) and the radioactivity was counted. The inhibitory activity was expressed as percent of the control samples carried out in the absence of ouabain, or tested compound. The concentration of compound causing 50% inhibition of the $Na^+/K^+$ ATPase activity ($IC_{50}$) was calculated by using a multiple parameter non-linear regression best fitting program (Kaleidagraph™, Sinergy Software).

Compounds CVie201, CVie202, CVie203, CVie204, CVie213, CVie214, CVie215, CVie216, CVie217, CVie218, and CVie219 did not inhibit the enzymatic activity of the purified $Na^+/K^+$ ATPase and the $IC_{50}$, expressed in μM, resulted >100 μM, as shown in Table 1. Compounds CVie205, Cvie206, CVie207, CVie208, CVie209, CVie210, CVie211, CVie212, CVie401, CVie402, CVie403, CVie404, CVie405, CVie406, CVie407, CVie408, CVie409, CVie410, CVie411, and CVie412 only modestly inhibited $Na^+/K^+$ ATPase (range of $IC_{50}$ between 0.8 and 24 μM) (Table 1).

Compounds have been compared with the reference drugs Digoxin ($IC_{50}$ 0.18 μM) and Istaroxime ($IC_{50}$ 0.14 μM) (Table 1).

TABLE 1

| Inhibition of dog renal $Na^+/K^+$ ATPase | |
|---|---|
| Compound | $IC_{50}$, μM |
| Digoxin | 0.18 |
| Istaroxime | 0.14 |
| CVie201 | >100 |
| CVie202 | >100 |
| CVie203 | >100 |
| CVie204 | >100 |
| CVie205 | 7 |
| CVie206 | 5.9 |
| CVie207 | 3.9 |
| CVie208 | 10.4 |
| CVie209 | 0.8 |
| CVie210 | 13.1 |
| CVie211 | 8.3 |
| CVie212 | 3.5 |
| CVie213 | >100 |
| CVie214 | >100 |
| CVie215 | >100 |
| CVie216 | >100 |
| CVie217 | >100 |
| CVie218 | >100 |
| CVie219 | >100 |
| CVie401 | 24.0 |
| CVie402 | 4.6 |
| CVie403 | 2.9 |
| CVie405 | 7.9 |
| CVie406 | 1.9 |
| CVie407 | 3.5 |
| CVie408 | 3.3 |
| CVie409 | 3.4 |
| CVie410 | 3.7 |
| CVie411 | 1.9 |
| CVie412 | 3.0 |

SERCA2a ATPase Activity in Heart-Derived SR Microsomes from Normal Quinea-Pig

The compounds disclosed herein were also tested for their ability to stimulate SERCA2a activity in SR microsomes derived from normal guinea-pig heart tissue over a range of concentrations from 1-200 nM. Two month-old guinea-pigs (350-450 g from Envigo, Udine, Italy) were used for the preparation of cardiac SERCA2a microsomes. Guinea-pigs were sacrificed under pentobarbital anesthesia. Left ventricles (LV) were quickly dissected and immediately frozen in liquid nitrogen. LV tissues were processed following the method described by Nediani C. et al. (J Biol Chem. 1996, 271:19066-7). The tissue was suspended in 4×volumes of a buffer containing 10 mM $NaHCO_3$, pH 7, 1 mM PMSF, 10 μg/ml aprotinin and leupeptin and then homogenized using an Ultra Turrax homogenizer. The sample was centrifuged at 12,000 g for 15 minutes. The obtained supernatant was filtered and centrifuged at 100,000 g for 30 min. Contractile proteins were extracted by suspending the pellet with 0.6 M KCl, 30 mM histidine, pH 7 and by further centrifugation at 100,000 g for 30 min. The final pellet was reconstituted with 0.3 M sucrose, 30 mM histidine, pH 7 and stored in aliquots at −80° C. until use.

SERCA2a activity was measured in vitro as $^{32}P$-ATP hydrolysis at different $Ca^{2+}$ concentrations (100-4000 nM) in the absence and presence of the tested compounds, as described (Micheletti R. et al., Am J Card 2007, 99:24A-32A). Increasing concentrations of each compound (ranging from 1 to 200 nM) were pre-incubated with 2 μg of SERCA2a enriched microsomes for 5 min at 4° C. in 80 μl of a solution containing 100 mM KCl, 5 mM $MgCl_2$, 1 μM A23187, 20 mM Tris, pH 7.5. Then, 20 µl of 5 mM Tris-ATP containing 50 nCi of $^{32}$P-ATP (3-10 Ci/mmol, Perkin Elmer) were added. The ATP hydrolysis was continued for 15 min at 37° C. and the reaction was stopped by acidification with 100 µl of 20% v/v ice-cold perchloric acid. $^{32}$P was separated by centrifugation with activated charcoal (Norit A, SERVA) and the radioactivity was measured. SERCA2a-dependent activity was identified as the portion of total hydrolytic activity inhibited by 10 µM cyclopiazonic acid (Seidler N W et al., J Biol Chem. 1989, 264:17816-23).

Dose-response curves were fitted by using a sigmoidal equation and the activity at the maximal velocity (Vmax) and the Kd for $Ca^{2+}$ were calculated (Synergy Software KaleidaGraph 3.6). The effect of the compounds in normal guinea-pig preparations was expressed as % decrease of Kd $Ca^{2+}$ (implying an increase of affinity for $Ca^{2+}$) of a control sample run in the absence of compound (Table 2). This effect indicates that the compounds increase SERCA2a activity in a physiological range of $Ca^{2+}$ concentrations (Rocchetti M et al., J Pharmacol Exp Ther. 2005, 313:207-15; Rocchetti M et al., J Pharmacol Exp Ther. 2008, 326:957-65; Ferrandi M et al., Br J Pharmacol 2013, 169:1849-1861). Data are mean±SD, n=number of experiments, *at least p<0.05.

At nanomolar concentrations, the tested compounds decreased SERCA2a Kd $Ca^{2+}$ of $Ca^{2+}$-dose response curves in microsomes from guinea-pig heart preparations (Table 2). These results indicated that the compounds increased SERCA2a activity in a physiological range of $Ca^{2+}$ concentrations and suggested a lusitropic effect. Istaroxime has been used as comparator indicating its ability to stimulate SERCA2a (Table 2). At variance with this, Digoxin failed to stimulate SERCA2a activity (Ferrandi M et al., Br J Pharmacol 2013, 169:1849-61; Rocchetti M et al., J Pharmacol Exp Ther 2005, 313:207-215).

TABLE 2

Effect of the tested compounds on SERCA2a Kd $Ca^{2+}$ in heart-derived SR microsomes from normal guinea-pig

| Compound | Concentration nM | Kd $Ca^{2+}$ (nM) mean ± SD | % decrease Kd vs control *p < 0.05 |
|---|---|---|---|
| Istaroxime | 0 | 562.9 ± 68.12 (n = 12) | 0 |
| | 1 nM | 524.1 ± 57.41 (n = 9) | −7% |
| | 10 nM | 464.3 ± 52.35 (n = 13) | −18%* |
| | 100 nM | 462.35 ± 59.12 (n = 13) | −18%* |
| CVie201 | 0 | 533.7 ± 51.4 (n = 7) | 0 |
| | 10 nM | 459.4 ± 57.1 (n = 6) | −14%* |
| | 100 nM | 454.1 ± 53.2 (n = 5) | −15%* |
| CVie202 | 0 | 466.3 ± 18.7 (n = 4) | 0 |
| | 10 nM | 448.0 ± 9.4 (n = 4) | −4% |
| | 100 nM | 435.6 ± 24.9 (n = 4) | −7% |
| | 200 nM | 437.0 ± 26.4 (n = 3) | −6% |
| CVie203 | 0 | 454.8 ± 27.9 (n = 5) | 0 |
| | 10 nM | 418.3 ± 36.5 (n = 5) | −8% |
| | 100 nM | 385.8 ± 33.3 (n = 5) | −15%* |
| | 200 nM | 392.9 ± 31.3 (n = 5) | −14%* |
| CVie204 | 0 | 435.3 ± 20.7 (n = 5) | 0 |
| | 100 nM | 493.4 ± 106.6 (n = 5) | +13% |
| | 200 nM | 423.8 ± 82.7 (n = 5) | −3% |
| CVie205 | 0 | 786.2 ± 56.9 (n = 5) | 0 |
| | 100 nM | 655.8 ± 56.6 (n = 5) | −16.7%* |
| | 200 nM | 683.1 ± 46.4 (n = 5) | −13.1%* |
| CVie206 | 0 | 786.2 ± 56.94 (n = 5) | 0 |
| | 100 nM | 678.2 ± 86.7 (n = 5) | −13.7%* |
| | 200 nM | 667.3 ± 55.57 (n = 5) | −15.1%* |
| CVie208 | 0 | 447.3 ± 62.9 (n = 5) | 0 |
| | 100 nM | 361.8 ± 72.2 (n = 5) | −19.1%* |
| | 200 nM | 350.1 ± 109.2 (n = 5) | −21.7% |

TABLE 2-continued

Effect of the tested compounds on SERCA2a Kd $Ca^{2+}$ in heart-derived SR microsomes from normal guinea-pig

| Compound | Concentration nM | Kd $Ca^{2+}$ (nM) mean ± SD | % decrease Kd vs control *p < 0.05 |
|---|---|---|---|
| CVie212 | 0 | 508.9 ± 123 (n = 11) | 0 |
| | 10 nM | 409 ± 121 (n = 7) | −19.6%* |
| | 100 nM | 406.1 ± 82.9 (n = 11) | −20.2%* |
| CVie213 | 0 | 490.6 ± 118.9 (n = 13) | 0 |
| | 10 nM | 431.5 ± 128.9 (n = 8) | −12% |
| | 100 nM | 377.9 ± 113.5 (n = 13) | −23%* |
| | 200 nM | 406.6 ± 123.5 (n = 9) | −17%* |
| CVie214 | 0 | 541.1 ± 45.7 (n = 5) | 0 |
| | 1 nM | 473.5 ± 40.4 (n = 5) | −13%* |
| | 10 nM | 466.5 ± 62.4 (n = 5) | −14%* |
| | 100 nM | 427.1 ± 48.9 (n = 5) | −21%* |
| | 200 nM | 408.7 ± 60.1 (n = 5) | −24%* |
| CVie215 | 0 | 568.4 ± 46.2 (n = 5) | 0 |
| | 1 nM | 530.0 ± 47.9 (n = 5) | −7% |
| | 10 nM | 459.2 ± 80.3 (n = 5) | −19%* |
| | 100 nM | 436.9 ± 74.1 (n = 5) | −23%* |
| CVie216 | 0 | 587.9 ± 54.0 (n = 5) | 0 |
| | 1 nM | 529.0 ± 75.8 (n = 5) | −10% |
| | 10 nM | 465.4 ± 73.4 (n = 5) | −21%* |
| | 100 nM | 442.9 ± 85.1 (n = 5) | −25%* |
| | 200 nM | 462.7 ± 76.3 (n = 5) | −21%* |
| CVie217 | 0 | 954.1 ± 145.99 (n = 7) | 0 |
| | 1 nM | 763.1 ± 102.57 (n = 5) | −20% |
| | 10 nM | 718.6 ± 141.93 (n = 5) | −24.7%* |
| | 100 nM | 763.8 ±119.89 (n = 5) | −20%* |
| | 200 nM | 673.6 ± 150.44 (n = 5) | −29.4%* |
| CVie218 | 0 | 725.15 ± 76.09 (n = 5) | 0 |
| | 1 nM | 705.13 ± 88.79 (n = 4) | −3% |
| | 10 nM | 676.84 ± 13.75 (n = 4) | −7%* |
| | 100 nM | 586.51 ± 50.49 (n = 5) | −19.1%* |
| | 200 nM | 618.51 ± 48.01 (n = 5) | −15%* |
| CVie219 | 0 | 577.87 ± 92.8 (n = 6) | 0 |
| | 1 nM | 517.1 ± 100.76 (n = 6) | −10.5% |
| | 10 nM | 485.25 ± 81.17 (n = 6) | −16%* |
| | 100 nM | 465.4 ± 61.14 (n = 6) | −19.5%* |
| | 200 nM | 478.73 ± 109.21 (n = 6) | −17.2%* |
| CVie407 | 0 | 428.4 ± 104.9 (n = 5) | 0 |
| | 100 nM | 390.3 ± 91.45 (n = 5) | −8.9% |
| | 200 nM | 428.3 ± 87.27 (n = 5) | 0% |
| CVie408 | 0 | 449.2 ± 67.99 (n = 4) | 0 |
| | 100 M | 356.3 ± 33.84 (n = 4) | −20.7%* |
| | 200 nM | 354.8 ± 66.94 (n = 4) | −21%* |
| CVie411 | 0 | 428.4 ± 104.8 (n = 5) | 0 |
| | 100 nM | 427.7 ± 76.59 (n = 5) | 0% |
| | 200 nM | 407.3 ± 111.03 (n = 5) | −4.9% |
| CVie412 | 0 | 449.2 ± 67.9 (n = 4) | 0 |
| | 100 nM | 363.5 ± 74.13 (n = 4) | −19.1% |
| | 200 nM | 361 ± 76.3 (n = 4) | −19.6%* |

Example 4. Studies on CVie214 and CVie216 in Isolated Ventricular Myocytes

SR $Ca^{2+}$ Uptake Function in Rat Ventricular Myocytes

To test the effects of the compounds in a model of diastolic dysfunction, Sprague Dawley male rats (150-175 g) were made diabetic by a single tail vein injection of streptozotocin (STZ 50 mg/kg, Sigma-Aldrich). STZ was freshly prepared in 0.1 M sodium citrate buffer at pH 4.5. Fasting glycaemia was measured after 1 week and rats with values >300 mg/dl were considered diabetic. Drug effects on SR $Ca^{2+}$ uptake function were evaluated in isolated left ventricular myocytes 9 weeks after STZ injection. Myocytes were incubated for at least 30 min in the presence of a specific drug to guarantee its cell membrane permeation. Statistical analysis was performed by a "group comparison" model.

Drug effects on SR $Ca^{2+}$ uptake rate were evaluated with a SR "loading protocol" specifically devised to rule out the contribution of the Na/Ca exchanger (NCX) and to assess the uptake rate starting at low levels of SR Ca$^{2+}$ loading. Under voltage-clamp conditions, intracellular Ca$^{2+}$ concentration was dynamically measured by epifluorescence (Fluo4-AM). Membrane current, whose time-dependent component mainly reflected I$_{CaL}$, was simultaneously recorded. The SR loading protocol consisted in emptying the SR by a brief caffeine pulse and then progressively refilling it by voltage steps activating Ca$^{2+}$ influx through the sarcolemmal Ca$^{2+}$ channel (I$_{CaL}$). NCX was blocked by omission of Na$^+$ from intracellular and extracellular solutions. The procedure is in agreement with published methods, with minor modifications (Rocchetti M et al., J Pharmacol Exper Therap 2005, 313:207-215).

Drug effects on SR Ca$^{2+}$ uptake were analyzed by considering multiple parameters: the rate at which 1) Ca$^{2+}$ transient (CaT) amplitude and 2) the Ca$^{2+}$ induced Ca$^{2+}$ release (CICR) gain increased during the loading protocol, reflecting the rate at which the SR refilled and the gain of the system, 3) the time constant of cytosolic Ca$^{2+}$ decay ($\tau_{decay}$) within each pulse, reflecting net Ca$^{2+}$ transport rate (by SERCA2a) across the SR membrane (a decrease in $\tau_{decay}$ corresponds to enhanced SR Ca$^{2+}$ uptake).

Specificity of the "loading protocol" in detecting SERCA2a activation was supported by the observation that it did not detect any effect of Digoxin, an inotropic agent blocking the Na$^+$/K$^+$ ATPase pump, but devoid of SERCA2a stimulatory effect (Rocchetti M et al., J Pharmacol Exp Ther 2005, 313:207-215; Alemanni M et al., JMCC 2011, 50:910-918).

CVie216 (1 μM) increased the rate of Ca$^{2+}$ transient (CaT) increment during SR reloading (FIG. 1A); this was associated with an increase in CICR gain (FIG. 1B) and a reduction in $\tau_{decay}$ (FIG. 1C).

Figure 2:
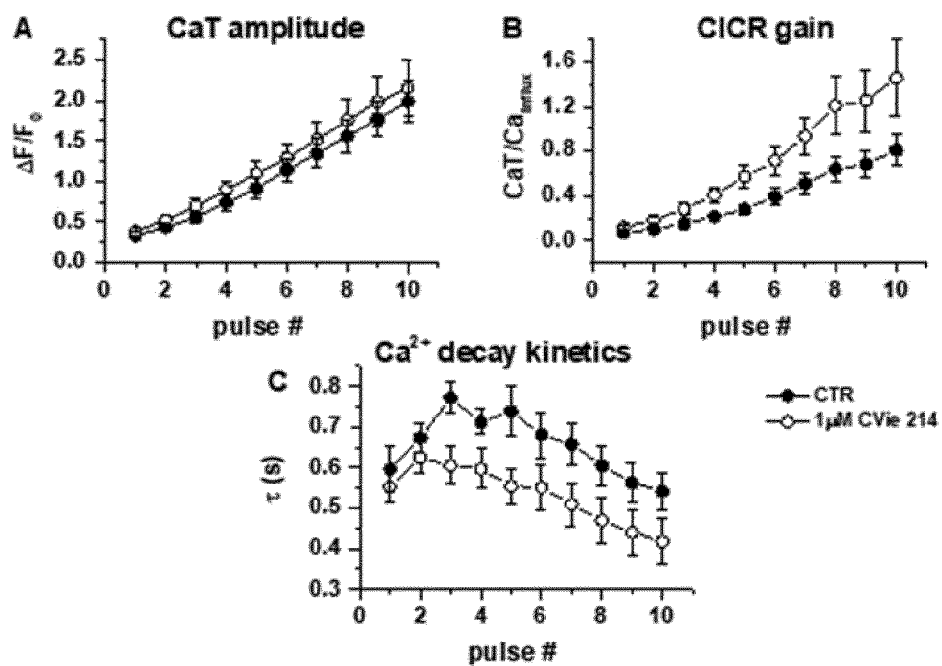
FIG. 2 shows the effects of 1 µM CVie214 on sarcoplasmic reticulum (SR) $Ca^{2+}$ uptake parameters in rat ventricular myocytes isolated from STZ rats (loading protocol). The SR $Ca^{2+}$ uptake parameters included $Ca^{2+}$ transient (CaT) amplitude (Panel A); $Ca^{2+}$-induced $Ca^{2+}$ release (CICR) gain (Panel B) and the time constant ($\tau$) of $Ca^{2+}$ decay (Panel C). Differences between curves in control (N=14) and CVie214 (N=11) were statistically significant in panel B (p<0.05) and close to significance in panel C (p=0.05).

CVie214 (1 μM) changed CaT parameters during SR loading protocol in a similar way to CVie216 (FIG. 2). CICR gain (FIG. 2B) and $\tau_{decay}$ (FIG. 2C) were affected by the drug as expected from SERCA2a enhancement. CVie214 failed to significantly increase the rate of CaT increment during SR reloading (FIG. 2A). However, the increment in CICR gain suggested that this may reflect concomitant I$_{CaL}$ inhibition, rather than negating the effect on SERCA2a.

The results in FIGS. 1 and 2 converge to indicate that CVie216 and CVie214 significantly increased Ca$^{2+}$ uptake by the SR. Under the experimental conditions applied, SR Ca$^{2+}$ uptake was entirely supported by SERCA2a; therefore, the results are consistent with SERCA2a activation by the two agents.

Action Potential Measurements

Cvie216 and Cvie214 effects on action potential parameters were evaluated at the concentration of 1 μM modulating SERCA2a in guinea-pig myocytes. The action potential (AP) contour provides a first-line estimate of the integrated function of membrane ion channels, and its changes may disclose ancillary actions—potentially resulting in untoward effects of the compound. To increase sensitivity of the AP contour as a reporter, effects on the rate-dependency of AP parameters were also tested, thus providing a multiparametric (more stringent) approach. AP were recorded in guinea-pig ventricular myocytes because the AP contour reproduces the human AP. Myocytes were incubated for at least 30 min in the presence of the drug to guarantee that effects were absent even after long exposure times. Statistical analysis was performed by a "group comparison" model.

APs were recorded in normal Tyrode's solution at 36.5° C. in guinea-pig ventricular myocytes. The following parameters were measured at 4 stimulation rates (0.5-1-2-4 Hz): diastolic membrane potential (E$_{diast}$), maximum depolarization velocity (dV/dt$_{max}$), action potential duration (APD at 90% of repolarization). Short term APD variability (STV) during steady-state pacing, an index of repolarization stability, was measured as the sum of absolute orthogonal deviations from the identity line in the APD$_n$fAPD$_{n+1}$ plot (Poincare plot) (Altomare C et al., Circulation A&E 2015, 8:1265-1275).

Figure 3:
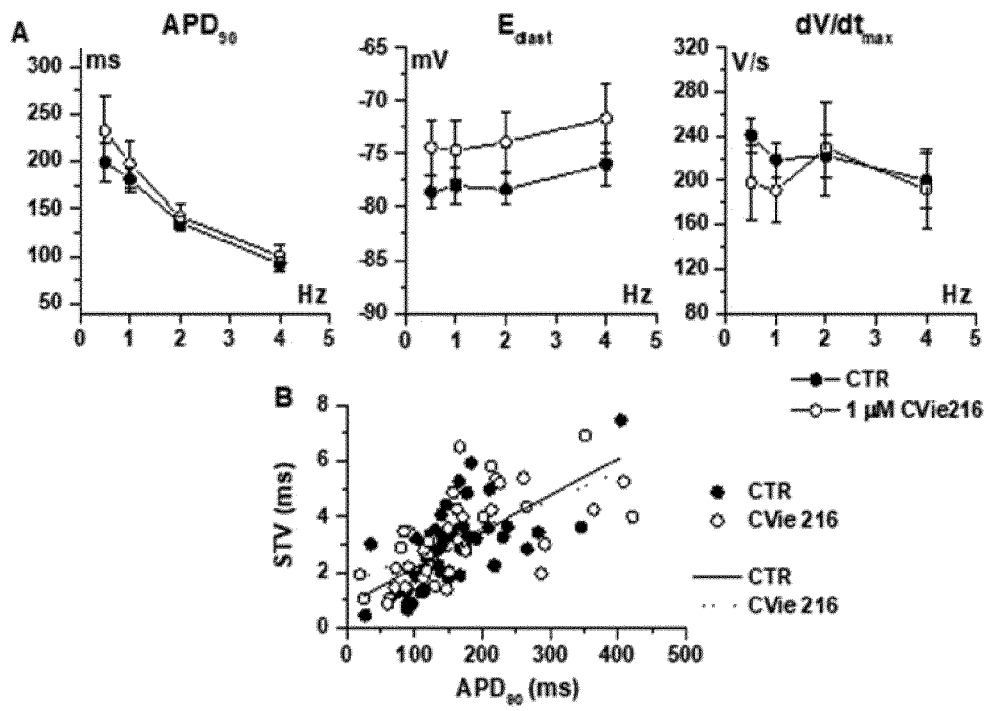
FIG. 3 shows the effect of CVie216 on action potential (AP) and short term variability (STV) of action potential duration (APD) at various stimulation rates (Hz) in guinea-pig ventricular myocytes. Shown in panels A, left to right, are the rate-dependency of action potential duration at 90% repolarization ($APD_{90}$) (left panel), diastolic membrane potential ($E_{diast}$) (middle panel), and maximum depolarization velocity ($dV/dt_{max}$) (right panel) under basal condition (CTR, closed circles; N>13) or in the presence of 1 µM CVie216 (open circles; N>11). The differences measured between the control group and the CVie216 group were not statistically significant for all parameters. In panel B, the linear correlation between STV and the mean $APD_{90}$ is shown for control (CTR, closed circles) and CVie216 (open circles) group. The data from all pacing rates were pooled in each group to extend STV evaluation to a wide APD range. Solid lines are linear fits of data points (control slope=0.013 vs CVie216 slope=0.009, NS) to indicate that CVie216 did not alter STV sensitivity to APD prolongation.

CVie216 (FIG. 3A) and CVie214 (FIG. 4A) at 1 μM did not affect action potential duration (APD$_{90}$), diastolic membrane potential (E$_{diast}$), the maximum depolarization velocity (dV/dt$_{max}$) and the rate-dependency of each AP parameter.

Figure 4:
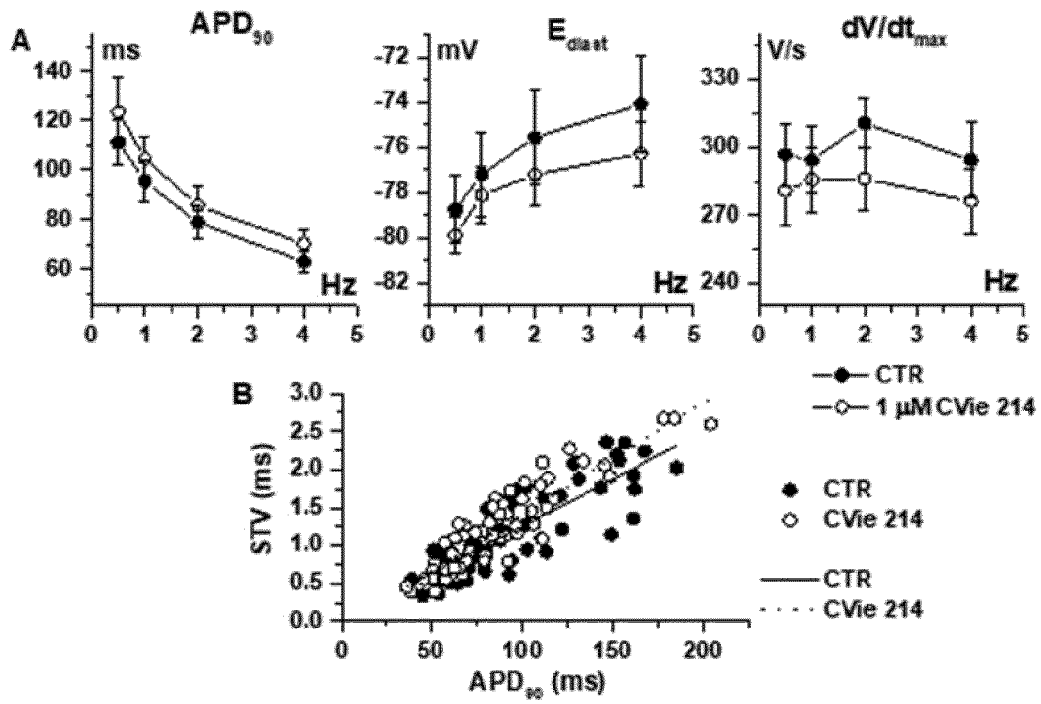
FIG. 4 shows the effect of CVie214 on action potential (AP) and short term variability (STV) of action potential duration (APD) at various stimulation rates (Hz) in guinea-pig ventricular myocytes. Shown in panels A, left to right, are the rate-dependency of action potential duration at 90% repolarization ($APD_{90}$) (left panel), diastolic membrane potential ($E_{diast}$) (middle panel), and maximum depolarization velocity ($dV/dt_{max}$) (right panel) under basal condition (CTR, closed circles; N>17) or in the presence of 1 µM CVie214 (open circles; N>17). The differences measured between the control group and the CVie214 group were not statistically significant for all parameters. In panel B, the linear correlation between STV and the mean $APD_{90}$ is shown for control (CTR, closed circles) and CVie214 (open circles) group. The data from all pacing rates were pooled in each group to extend STV evaluation to a wide APD range. Solid lines are linear fits of data points (control slope=0.012 vs CVie214 slope=0.014, NS) to indicate that CVie214 did not alter STV sensitivity to APD prolongation.

Short term APD variability (STV) is a marker of electrical instability and correlates with arrhythmogenic risk. STV is a function of mean APD; therefore, STV was measured at multiple pacing rates (0.5-1-2 and 4 Hz) to extend its evaluation to a wide APD range. STV and its dependency on mean APD were not significantly affected by both CVie216 (FIG. 3B) and CVie214 (FIG. 4B).

Altogether, the multiparametric approach used for action potential analysis stands for the absence of undesired drug effects on cardiac electrical activity. Thus, according to this analysis, CVie216 and Cvie214 exert SERCA2a modulation selectively (positive lusitropic drug), i.e. without affecting electrical activity and the membrane currents involved.

Example 5. In Vivo Studies on CVie214 and CVie216

Bioavailability in Rats

Bioavailability in rats was measured by Sundia MediTech Service, China. In particular, the bioavailability of CVie214-salt and CVie216-salt was measured in rats after an intravenous injection (i.v.) at 1 mg/kg and an oral administration (os) at 10 mg/kg. Plasma concentrations of the tested compounds CVie214-salt and CVie216-salt were measured at intervals from time 0 to time 24 h and detected by LC-MS method. F value (%) has been calculated and resulted to be 41.5% and 16.9% for CVie214-salt and CVie216-salt, respectively.

Acute Toxicity in the Mouse

The acute toxicity of the tested compound CVie214-salt and CVie216-salt have been determined in the mouse (Albino Swiss CD-1, body weight 30 g). Compounds have been orally administered or intravenously injected at increasing doses to identify the dose causing 50% mortality. Mortality occurred within 30 min after the administration and survival after 24 h.

The results for CVie214-salt and CVie216-salt acute toxicity are reported in Table 3. As comparison, the acute toxicity for the reference compounds Digoxin and Istaroxime were also included. Digoxin refers to literature data (www.lookchem.com, Reference for Digoxin intravenous: Afifi A M, Ammar E M. Pharmacological Research Communications. Vol. 6, Pg. 417, 1974; Reference for Digoxin oral: Archives Internationales de Pharmacodynamie et de Therapie. Vol. 153, Pg. 436, 1965) (Table 3).

TABLE 3

Acute toxicity (LD$_{50}$) of CVie214-salt and CVie216-salt in the mouse
Acute toxicity (mouse)

| Compound | LD$_{50}$ mg/kg | |
|---|---|---|
| Digoxin iv | 7.7 | data from |
| Digoxin os | 17.8 | literature |

TABLE 3-continued

Acute toxicity ($LD_{50}$) of CVie214-salt and CVie216-salt in the mouse

Acute toxicity (mouse)

| Compound | $LD_{50}$ mg/kg |
|---|---|
| Istaroxime iv | 29-32 |
| Istaroxime os | 200 |
| CVie214-salt iv | 300 |
| CVie214-salt os | >800 |
| CVie216-salt iv | >300 |
| CVie216-salt os | >700 |

Haemodynamics in Streptozotocin Diabetic Rats (Echocardiography 2M-Doppler-Tissue Doppler)

CVie214 and CVie216 were tested in a diabetic rat model. Briefly, rats were injected with streptozotocin (STZ). After 7-9 weeks from STZ injection, rats were submitted to transthoracic echocardiographic and Doppler evaluation performed under urethane anesthesia. Two-dimensionally guided M-mode recordings were used to obtain short-axis measurements of left ventricular end-diastolic diameter (LVEDD), left ventricular end-systolic diameter (LVESD), posterior (PW) and septal (SW) diastolic wall thickness according to the American Society of Echocardiography guidelines (Lang R M et al., Eur J Echocardiography 2006, 7:79-108). Fractional shortening was calculated as FS=(LVEDD−LVESD)/LVEDD. Relative wall thickness was calculated as PWTd+IVSTd/LVEDD. Mitral inflow was measured by pulsed Doppler at the tips of mitral leaflets from an apical 4-chamber view to obtain early and late filling velocities (E, A) and deceleration time of early filling velocity (DT). The deceleration slope was calculated as E/DT ratio. The mitral deceleration index was calculated as DT/E ratio. Tissue Doppler Imaging (TDI) was evaluated from the apical 4-chamber view to record septal mitral annular movements, i.e., peak myocardial systolic (s') and early and late diastolic velocity (e' and a').

After baseline hemodynamic measurements were taken, the rats were administered Digoxin, CVie214, CVie216 and compared to control. Digoxin, used as reference drug, was intravenously infused at 0.11 mg/kg/min for 15 min and echocardiographic parameters measured after 1 h. CVie214-salt and CVie216-salt were intravenously infused in STZ diabetic rats at 0.2 mg/kg/min and echocardiographic parameters were measured after 15 min and 30 min.

Tables 4-6 show the haemodynamic parameters in STZ diabetic rats for Digoxin, CVie214-salt, and Cvie216-salt. Data shown in Tables 4-6 are mean t SD; values with asterisk are statistically significant with at least $p<0.05$.

The data indicate that the streptozotocin diabetic rat model is characterized by a diastolic dysfunction compared to healthy control rats (control n=18 rats; STZ n=20 rats) (Table 4). In particular, STZ rats showed increased DT, DT/E and reduced E, DT/E, e', HR. CVie214-salt and CVie216-salt ameliorated diastolic function, deteriorated in STZ vs controls (Table 4), inducing a significant decrease of DT, DT/E and an increase of E/DT and e' associated with an improvement of SV and CO (Table 5-6). E/e' was significantly reduced after 30 min from CVie216-salt infusion (Table 6). Only CVie214 modestly, but significantly, increased s' and HR after 15 min (Table 5). Digoxin, taken as reference compound, ameliorated diastolic function, decreasing DT, DT/E and increasing E/DT, e' and systolic function (FS, s'), but did not affect overall cardiac function, such as SV and CO (Table 4).

TABLE 4

Hemodynamic parameters in control and STZ diabetic rats and effect of Digoxin IV infusion in STZ rats

| Function | Echo Parameters | control rats (n = 18) | STZ rats (n = 20) | STZ Before DIGO (n = 10) | STZ after 15 min DIGO 0.11 mg/kg/min (n = 10) |
|---|---|---|---|---|---|
| Systolic | FS | 53.1 ± 4.96 | 55.12 ± 7.02 | 47.62 ± 6.26 | 53.1 ± 5.6*6 |
|  | s' | 29.59 ± 4.9 | 21.74 ± 1.92* | 23.45 ± 2.98 | 26.03 ± 4.66* |
| Diastolic | E | 0.93 ± 0.06 | 0.84 ± 0.12* | 0.83 ± 0.09 | 0.92 ± 0.19 |
|  | A | 0.65 ± 0.17 | 0.599 ± 0.123 | 0.59 ± 0.15 | 0.79 ± 0.19* |
|  | E/A | 1.5 ± 0.35 | 1.44 ± 0.25 | 1.48 ± 0.36 | 1.20 ± 0.21* |
|  | DT | 54.6 ± 8.95 | 59.3 ± 5.32* | 53.4 ± 11.97 | 44.1 ± 10.29* |
|  | DT/E | 59.23 ± 10.24 | 70.61 ± 14.02* | 65.21 ± 16.8 | 50.18 ± 17.05* |
|  | E/DT | 17.41 ± 3.29 | 14.63 ± 2.64* | 16.53 ± 5.33 | 22.66 ± 9.56* |
|  | E/e' | 40.1 ± 5.67 | 40.75 ± 4.84 | 39.64 ± 2.85 | 38.95 ± 7.31 |
|  | e' | 23.46 ± 3.27 | 20.74 ± 2.22* | 20.96 ± 1.66 | 23.82 ± 2.87* |
|  | a' | 24.54 ± 5.86 | 22.9 ± 4.42 | 25.86 ± 6.29 | 29.78 ± 6.17* |
| OVERALL | CO | 178.9 ± 43.52 | 172.55 ± 45.53 | 138.5 ± 35.6 | 155.6 ± 45.7 |
|  | HR | 305.5 ± 43.3 | 244 ± 44.9* | 236 ± 39 | 257 ± 36 |
|  | SV | 0.59 ± 0.14 | 0.611 ± 0.17 | 0.59 ± 0.1 | 0.6 ± 0.12 |

FS %: fractional shortening, systolic function; E m/s: early filling velocity of mitral inflow; A m/s: late filling velocity of mitral inflow; E/A: index of LV function; DT ms: deceleration time of E wave; DT/E s2/m: mitral deceleration index; E/DT m/s2: deceleration slope; s' cm/s TDI: contraction velocity; e' cm/s TDI: early relaxation velocity; a' cm/s TDI: late relaxation velocity; E/e': index of LV filling pressure; CO ml/min: cardiac output; HR beat/min heart rate; SV ml/beat: stroke volume. *at least $p<0.05$ control vs STZ or STZ plus drug vs STZ before

TABLE 5

Hemodynamic parameters after CVie214-salt IV infusion of STZ diabetic rats

| Function | Echo Parameters | STZ Before CVie214 (n = 13) | STZ after 15 min CVie214 0.2 mg/kg/min (n = 13) | STZ after 30 min CVie214 0.2 mg/kg/min (n = 13) |
|---|---|---|---|---|
| Systolic | FS | 57.96 ± 7.25 | 58.1 ± 8.59 | 60.69 ± 8.36 |
|  | s' | 21.34 ± 2.16 | 22.45 ± 3.12* | 21.82 ± 2.81 |
| Diastolic | E | 0.78 ± 0.11 | 0.88 ± 0.15* | 0.91 ± 0.16* |
|  | A | 0.55 ± 0.12 | 0.65 ± 0.13* | 0.69 ± 0.11* |

TABLE 5-continued

Hemodynamic parameters after CVie214-salt IV infusion of STZ diabetic rats

| Function | Echo Parameters | STZ Before CVie214 (n = 13) | STZ after 15 min CVie214 0.2 mg/kg/min (n = 13) | STZ after 30 min CVie214 0.2 mg/kg/min (n = 13) |
|---|---|---|---|---|
| | E/A | 1.46 ± 0.37 | 1.36 ± 0.17 | 1.34 ± 0.21 |
| | DT | 53.9 ± 9.82 | 42.5 ± 10.19* | 42.15 ± 9.88* |
| | DT/E | 71.42 ± 19.17 | 49.52 ± 12.41* | 48.51 ± 16.44* |
| | E/DT | 15.14 ± 5.1 | 21.49 ± 5.8* | 23.18 ± 8.37* |
| | E/e' | 38.03 ± 3.58 | 37.49 ± 4.34 | 37.47 ± 4.48 |
| | e' | 20.38 ± 2.32 | 23.33 ± 2.62* | 24.24 ± 2.34* |
| | a' | 22.99 ± 5.68 | 29.13 ± 6.56* | 28.94 ± 5.32* |
| OVER-ALL | CO | 151.5 ± 29.32 | 177.23 ± 40.64* | 175.15 ± 33.96* |
| | HR | 241 ± 47 | 268 ± 54* | 252 ± 49 |
| | SV | 0.64 ± 0.14 | 0.68 ± 0.19 | 0.71 ± 0.16* |

TABLE 6

Hemodynamic parameters after CVie216-salt IV infusion of STZ diabetic rats

| Function | Echo Parameters | STZ Before CVie216 (n = 11) | STZ after 15 min CVie216 0.2 mg/kg/min (n = 11) | STZ after 30 min CVie216 0.2 mg/kg/min (n = 11) |
|---|---|---|---|---|
| Systolic | FS | 55.45 ± 9.96 | 56.29 ± 9.95 | 55.19 ± 7.32 |
| | s' | 21.83 ± 3.6 | 22.47 ± 2.45 | 22.68 ± 3.18 |
| Diastolic | E | 0.84 ± 0.15 | 0.90 ± 0.13* | 0.87 ± 0.09 |
| | A | 0.56 ± 0.14 | 0.66 ± 0.17* | 0.68 ± 0.15* |
| | E/A | 1.59 ± 0.4 | 1.42 ± 0.28* | 1.34 ± 0.27* |
| | DT | 58.45 ± 11.18 | 49.72 ± 12.56* | 47.46 ± 10.17* |
| | DT/E | 71.9 ± 19.32 | 56.52 ± 16.45* | 54.8 ± 12.84* |
| | E/DT | 15.51 ± 6.96 | 19.76 ± 8.27* | 19.38 ± 5.39* |
| | E/e' | 40.66 ± 5.48 | 39.08 ± 5.04 | 35.82 ± 3.92* |
| | e' | 20.71 ± 1.89 | 23.1 ± 1.96* | 24.48 ± 2.1* |
| | a' | 23.54 ± 6.03 | 25.85 ± 6.98* | 26.66 ± 6.94* |
| OVER-ALL | CO | 149.36 ± 33.4 | 165.45 ± 30.9* | 181.82 ± 23.75* |
| | HR | 223 ± 61 | 221 ± 50 | 225 ± 50 |
| | SV | 0.68 ± 0.09 | 0.76 ± 0.12* | 0.83 ± 0.15* |

Receptor Binding Assay

Radioligand binding to a panel of receptors was carried out by Eurofins on crude membrane preparations according to published procedures and by using appropriate reference standard (Eurofin, Taiwan, compound code CVie216-3 (1226840), study #TW04-0004235, quote #TW04-0004235-Q04, for Cvie Therapeutics Limited, Taiwan). CVie2,6-salt was tested at the concentration of 10 μM. No significant interaction was documented on a panel of receptors, as shown in Table 7.

TABLE 7

Receptor binding assay for Cvie216-salt

| Cat # | Assay name | Batch | Species | Rep | Conc | % inhib |
|---|---|---|---|---|---|---|
| 107480 | ATPase, Ca2+, skeletal muscle | 438642 | pig | 2 | 10 μM | −1 |
| 118040 | CYP450, 19 | 438644 | hum | 2 | 10 μM | 0 |
| 124010 | HMG-CoA Reductase | 438610 | hum | 2 | 10 μM | −4 |
| 140010 | Monoamine Oxidase MAO-A | 438645 | hum | 2 | 10 μM | 1 |
| 140120 | Monoamine Oxidase MAO-B | 438647 | hum | 2 | 10 μM | −2 |
| 143000 | Nitric Oxide Synthase, Endothelial (eNOS) | 438568 | bov | 2 | 10 μM | 2 |
| 107300 | Peptidase, Angiotensin Converting Enzyme | 438641 | rabbit | 2 | 10 μM | 7 |
| 164610 | Peptidase, Renin | 438648 | hum | 2 | 10 μM | 7 |
| 152000 | Phosphodiesterase PDE3 | 438611 | hum | 2 | 10 μM | −25 |
| 171601 | Protein Tyrosine Kinase, ABL1 | 438612 | hum | 2 | 10 μM | 13 |
| 176810 | Protein Tyrosine Kinase, Src | 438613 | hum | 2 | 10 μM | 2 |
| 200510 | Adenosine A1 | 438614 | hum | 2 | 10 μM | −1 |
| 200610 | Adenosine A2A | 438614 | hum | 2 | 10 μM | −1 |
| 203100 | Adrenergic α1A | 438615 | rat | 2 | 10 μM | 5 |
| 203200 | Adrenergic α1B | 438615 | rat | 2 | 10 μM | 6 |
| 203630 | Adrenergic α2A | 438616 | hum | 2 | 10 μM | −2 |
| 204010 | Adrenergic β1 | 438652 | hum | 2 | 10 μM | 2 |
| 204110 | Adrenergic β2 | 438571 | hum | 2 | 10 μM | −6 |
| 204600 | Aldosterone | 438617 | rat | 2 | 10 μM | −3 |
| 206000 | Androgen (Testosterone) | 438618 | hum | 2 | 10 μM | 6 |
| 210030 | Angiotensin AT1 | 438653 | hum | 2 | 10 μM | 1 |
| 210120 | Angiotensin AT2 | 438653 | hum | 2 | 10 μM | −6 |
| 214600 | Calcium Channel L-type, Dihydropyridine | 438620 | rat | 2 | 10 μM | −20 |
| 219500 | Dopamine D1 | 438660 | hum | 2 | 10 μM | 13 |
| 219700 | Dopamine D2s | 439024 | hum | 2 | 10 μM | −4 |
| 219800 | Dopamine D3 | 438660 | hum | 2 | 10 μM | 0 |
| 226010 | Estrogen ERα | 438622 | hum | 2 | 10 μM | −3 |
| 226050 | Estrogen ERβ | 438622 | hum | 2 | 10 μM | −6 |
| 226600 | GABA$_A$, Flunitrazepam, Central | 438624 | rat | 2 | 10 μM | 1 |
| 226500 | GABA$_A$, Muscimol, Central | 438623 | rat | 2 | 10 μM | 2 |
| 232030 | Glucocorticoid | 438626 | hum | 2 | 10 μM | −9 |
| 233000 | Glutamate, NMDA, Phencyclidine | 438627 | rat | 2 | 10 μM | −7 |
| 239610 | Histamine H1 | 438628 | hum | 2 | 10 μM | 12 |
| 241000 | Imidazoline I2, Central | 438629 | rat | 2 | 10 μM | 1 |
| 243000 | Insulin | 438654 | rat | 2 | 10 μM | 4 |

TABLE 7-continued

Receptor binding assay for Cvie216-salt

| Cat # | Assay name | Batch | Species | Rep | Conc | % inhib |
|---|---|---|---|---|---|---|
| 252710 | Muscarinic M2 | 438621 | hum | 2 | 10 μM | −20 |
| 252810 | Muscarinic M3 | 438661 | hum | 2 | 10 μM | −6 |
| 253010 | Muscarinic M5 | 438661 | hum | 2 | 10 μM | 0 |
| 258730 | Nicotinic Acetylcholine α3β4 | 438656 | hum | 2 | 10 μM | −3 |
| 260410 | Opiate μ (OP3, MOP) | 438616 | hum | 2 | 10 μM | 11 |
| 264500 | Phorbol Ester | 438624 | mouse | 2 | 10 μM | −7 |
| 265600 | Potassium Channel ($K_{ATP}$) | 438632 | ham | 2 | 10 μM | −11 |
| 265900 | Potassium Channel hERG | 438633 | hum | 2 | 10 μM | 0 |
| 299005 | Progesterone PR-B | 438638 | hum | 2 | 10 μM | 1 |
| 270300 | Ryanodine RyR3 | 438634 | rat | 2 | 10 μM | −10 |
| 271010 | Serotonin (5-Hydroxytryptamine) 5-HT1, non selective | 438668 | rat | 2 | 10 μM | 12 |
| 299007 | Sigma σ2 | 438662 | hum | 2 | 10 μM | 4 |
| 278110 | Sigma σ1 | 438636 | hum | 2 | 10 μM | 2 |
| 279510 | Sodium Channel, Site 2 | 438637 | rat | 2 | 10 μM | −5 |
| 204410 | Transporter, Norepinephrine (NET) | 438597 | hum | 2 | 10 μM | −4 |

Note:
bov = Bovine; ham = Hamster; hum = Human no items met criteria for significance >50% stimulation or inhibition

The invention claimed is:

1. A compound having a formula (I)

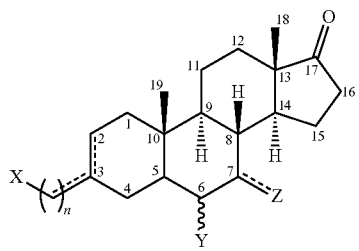

wherein:
X is selected from the group consisting of a carboxylic acid, carboxylic ester or a bioisoster thereof, primary alcohol, ester, and an amine group, wherein the bioisoster consists of a sulfate, sulfonic acid, phosphate, phosphonate, or a nitrogen-containing heterocyclic ring;
n is 1, 2, 3, 4, or 5;
a C3-C1' dashed line represents an optional exocyclic double bond C=C at position C3-C1';
a C2-C3 dashed line represents an optional endocyclic double bond C=C;
Y at C6 is a hydroxyl (OH) in the alpha- or beta-configuration or a hydroxymethyl ($CH_2OH$) in the alpha-configuration;
Z at C7 is a —H or —OH in an alpha-configuration or a ketone, wherein a dashed line represents an optional carbonyl group (C=O) at Z; or
a pharmaceutically acceptable salt, solvate, or hydrate thereof.

2. The compound of claim 1, wherein X is selected from the group consisting of a carboxylic acid, carboxylic ester, primary amine, secondary amine, and cyclic amine.

3. The compound of claim 1, wherein X is a carboxylic acid or a carboxylic ester.

4. The compound of claim 1, which is selected from the group consisting of:
(E)-4-(6alpha-hydroxy-17-oxoandrostane-3-yliden) butyric acid;
(Z)-4-(6alpha-hydroxy-17-oxoandrostane-3-yliden) butyric acid;
(E)-4-(6beta-hydroxy-17-oxoandrostane-3-yliden) butyric acid;
(Z)-4-(6beta-hydroxy-17-oxoandrostane-3-yliden) butyric acid;
(E)-3-[2-(azetidin-3-yl) ethyliden]-6alpha-hydroxyandrostane-17-one;
(Z)-3-[2-(azetidin-3-yl) ethyliden]-6alpha-hydroxyandrostane-17-one;
(E)-3-(4-aminobutyl)-6alpha-hydroxyandrost-2-ene-17-one hydroiodide;
3-[2-(piperidin-4-yl)ethyl]-6alpha-hydroxyandrost-2-ene-17-one hydroiodide;
(E,Z)-3-(4-aminobutyliden)6alpha-hydroxyandrostane-17-one;
(E)-3-[2-(piperidin-4-yl)ethyliden]-6alpha-hydroxyandrostane-17-one;
(Z)-3-[2-(piperidin-4-yl)ethyliden]-6alpha-hydroxyandrostane-17-one;
3beta-[2-(piperidin-4-yl)ethyl]-6alpha-hydroxyandrostane-17-one;
Ethyl (6alpha-hydroxy-17-ketoandrostane-3beta-yl) acetate;
4-(6alpha-hydroxy-17-oxoandrostane-3-yl) butyric acid;
4-(6beta-hydroxy-17-oxoandrostane-3-yl) butyric acid;
2-(6beta-hydroxy-17-oxoandrostane-3-yl) acetic acid;
Ethyl 4-(6alpha-hydroxy-17-oxoandrostane-3-yl) butyrate;
Ethyl 4-(6alpha-hydroxy-17-oxoandrostane-3-yl) caproate;
6-(6beta-hydroxy-17-oxoandrostane-3-yl) caproic acid;
(E,Z)-3-(5-N-methylaminopentyliden)-6alpha-hydroxymethylandrostane-7,17-dione;
(E,Z)-3-[2-(pyrrolidine-3yl) ethyliden]-6alpha-hydroxymethylandrostane-7,17-dione;
(E,Z)-3-[2-(azetidine-3-yl) ethyliden]-6alpha-hydroxymethylandrostane-7,17-dione;
(E,Z)-3-[2-(piperidin-4-yl)ethyliden]-6alpha-hydroxymethylandrostane-7,17-dione;
(E,Z)-3-(5-N-methylaminopentyliden)-6alpha-hydroxymethyl-7alpha-hydroxyandrostane-17-one;
3beta-[2-(azetidine-3-yl)ethyl]-6alpha-hydroxymethylandrostane-7,17-dione;

3beta-[2-(azetidine-3-yl)ethyl]-6alpha-hydroxymethyl-7alpha-hydroxyandrostane-17-one;
3beta-[2-(pyrrolidine-3yl)ethyl]-6alpha-hydroxymethyl-androstane-7,17-dione;
3beta-[2-(pyrrolidine-3yl)ethyl]6alpha-hydroxymethyl-7alpha-hydroxyandrostane-17-one;
3beta-[2-(piperidin-4-yl)ethyl]-6alpha-hydroxymethylandrostane-7,17-dione; and
3beta-[2-(piperidin-4-yl)ethyl]-6alpha-hydroxymethyl-7alpha-hydroxyandrostane-17-one.

5. The compound of claim 1, which is selected from the group consisting of:
(E)-4-(6alpha-hydroxy-17-oxoandrostane-3-yliden) butyric acid;
(Z)-4-(6alpha-hydroxy-17-oxoandrostane-3-yliden) butyric acid;
(E)-4-(6beta-hydroxy-17-oxoandrostane-3-yliden) butyric acid;
(Z)-4-(6beta-hydroxy-17-oxoandrostane-3-yliden) butyric acid;
Ethyl (6alpha-hydroxy-17-ketoandrostane-3beta-yl) acetate;
4-(6alpha-hydroxy-17-oxoandrostane-3-yl) butyric acid;
4-(6beta-hydroxy-17-oxoandrostane-3-yl) butyric acid;
2-(6beta-hydroxy-17-oxoandrostane-3-yl) acetic acid;
Ethyl 4-(6alpha-hydroxy-17-oxoandrostane-3-yl) butyrate;
Ethyl 4-(6alpha-hydroxy-17-oxoandrostane-3-yl) caproate; and
6-(6beta-hydroxy-17-oxoandrostane-3-yl) caproic acid.

6. The compound of claim 1, selected from the group consisting of 4-(6alpha-hydroxy-17-oxoandrostane-3-yl) butyric acid and 2-(6beta-hydroxy-17-oxoandrostane-3-yl) acetic acid.

7. The compound of claim 1, wherein the pharmaceutically acceptable salt is selected from chloride, bromide, sulfate, phosphate, nitrate, fumarate, succinate, oxalate, malate, tartrate, maleate, citrate, methanesulfate, and benzoate.

8. A pharmaceutical composition comprising the compound of claim 1, in combination with at least one pharmaceutically acceptable vehicle and/or excipient.

9. The pharmaceutical composition of claim 8, formulated for intravenous injection, intramuscular injection, enteral administration, parenteral administration, or inhalation.

10. The pharmaceutical composition of claim 8, formulated for oral administration.

11. The pharmaceutical composition of claim 8, administered at a dose of between about 1 mg/kg and about 20 mg/kg, or between about 1 mg/kg and about 10 mg/kg.

12. The pharmaceutical composition of claim 8, further comprising one or more additional therapeutically active ingredients selected from the group consisting of CE inhibitors, AIRBs, diuretics, $Ca^{2+}$ channel blockers, β-blockers, digitalis, NO donors, vasodilators, SERCA2a stimulators, neprilysin (NEP) inhibitors, myosin filament activators, recombinant relaxin-2 mediators, recombinant NP protein, activators of the soluble guanylate cyclase (sGC), and beta-arrestin ligand of angiotensin II receptor.

13. A method of treating an individual having heart failure, the method comprising the steps of:
(1) providing an individual having heart failure;
(2) administering to the individual a therapeutically effective amount of a pharmaceutical composition comprising (i) a pharmaceutically acceptable carrier and (ii) the compound of claim 1 or a pharmaceutically acceptable salt, solvate, or hydrate thereof; and
(3) measuring one or more parameters of heart function;
wherein the administering of the pharmaceutical composition results in an improvement in heart function.

14. The method of claim 13, wherein the compound is selected from the group consisting of:
(E)-4-(6alpha-hydroxy-17-oxoandrostane-3-yliden) butyric acid;
(Z)-4-(6alpha-hydroxy-17-oxoandrostane-3-yliden) butyric acid;
(E)-4-(6beta-hydroxy-17-oxoandrostane-3-yliden) butyric acid;
(Z)-4-(6beta-hydroxy-17-oxoandrostane-3-yliden) butyric acid;
(E)-3-[2-(azetidin-3-yl) ethyliden]-6alpha-hydroxyandrostane-17-one;
(Z)-3-[2-(azetidin-3-yl) ethyliden]-6alpha-hydroxyandrostane-17-one;
(E)-3-(4-aminobutyl)-6alpha-hydroxyandrost-2-ene-17-one hydroiodide;
3-[2-(piperidin-4-yl)ethyl]-6alpha-hydroxyandrost-2-ene-17-one hydroiodide;
(E,Z)-3-(4-aminobutyliden)-6alpha-hydroxyandrostane-17-one;
(E)-3-[2-(piperidin-4-yl)ethyliden]-6alpha-hydroxyandrostane-17-one;
(Z)-3-[2-(piperidin-4-yl)ethyliden]-6alpha-hydroxyandrostane-17-one;
3beta-[2-(piperidin-4-yl)ethyl]-6alpha-hydroxyandrostane-17-one;
Ethyl (6alpha-hydroxy-17-ketoandrostane-3beta-yl) acetate;
4-(6alpha-hydroxy-17-oxoandrostane-3-yl) butyric acid;
4-(6beta-hydroxy-17-oxoandrostane-3-yl) butyric acid;
2-(6beta-hydroxy-17-oxoandrostane-3-yl) acetic acid;
Ethyl 4-(6alpha-hydroxy-17-oxoandrostane-3-yl) butyrate;
Ethyl 4-(6alpha-hydroxy-17-oxoandrostane-3-yl) caproate;
6-(6beta-hydroxy-17-oxoandrostane-3-yl) caproic acid;
(E,Z)-3-(5-N-methylaminopentyliden)-6alpha-hydroxymethylandrostane-7,17-dione;
(E,Z)-3-[2-(pyrrolidine-3yl) ethyliden]-6alpha-hydroxymethylandrostane-7,17-dione;
(E,Z)-3-[2-(azetidine-3-yl) ethyliden]-6alpha-hydroxymethylandrostane-7,17-dione;
(E,Z)-3-[2-(piperidin-4-yl)ethyliden]-6alpha-hydroxymethylandrostane-7,17-dione;
(E,Z)-3-(5-N-methylaminopentyliden)-6alpha-hydroxymethyl-7alpha-hydroxyandrostane-17-one;
3beta-[2-(azetidine-3-yl)ethyl]-6alpha-hydroxymethylandrostane-7,17-dione;
3beta-[2-(azetidine-3-yl)ethyl]-6alpha-hydroxymethyl-7alpha-hydroxyandrostane-17-one;
3beta-[2-(pyrrolidine-3yl)ethyl]-6alpha-hydroxymethyl-androstane-7,17-dione;
3beta-[2-(pyrrolidine-3yl)ethyl]6alpha-hydroxymethyl-7alpha-hydroxyandrostane-17-one;
3beta-[2-(piperidin-4-yl)ethyl]-6alpha-hydroxymethylandrostane-7,17-dione; and
3beta-[2-(piperidin-4-yl)ethyl]-6alpha-hydroxymethyl-7alpha-hydroxyandrostane-17-one.

15. The method of claim 14 wherein the compound is selected from the group consisting of:
(E)-4-(6alpha-hydroxy-17-oxoandrostane-3-yliden) butyric acid;
(Z)-4-(6alpha-hydroxy-17-oxoandrostane-3-yliden) butyric acid;

(E)-4-(6beta-hydroxy-17-oxoandrostane-3-yliden) butyric acid;
(Z)-4-(6beta-hydroxy-17-oxoandrostane-3-yliden) butyric acid;
Ethyl (6alpha-hydroxy-17-ketoandrostane-3beta-yl) acetate;
4-(6alpha-hydroxy-17-oxoandrostane-3-yl) butyric acid;
4-(6beta-hydroxy-17-oxoandrostane-3-yl) butyric acid;
2-(6beta-hydroxy-17-oxoandrostane-3-yl) acetic acid;
Ethyl 4-(6alpha-hydroxy-17-oxoandrostane-3-yl) butyrate;
Ethyl 4-(6alpha-hydroxy-17-oxoandrostane-3-yl) caproate; and
6-(6beta-hydroxy-17-oxoandrostane-3-yl) caproic acid.

16. The method of claim 13, wherein the pharmaceutical composition is administered orally.

17. The method of claim 16, wherein the pharmaceutical composition is administered at a dose of between about 1 mg/kg and about 20 mg/kg, or between about 1 mg/kg and about 10 mg/kg.

18. The method of claim 13, wherein the pharmaceutical composition is administered intravenously.

19. The method of claim 18, wherein the pharmaceutical composition is administered at a dose of between about 0.125 mg/kg and about 10 mg/kg.

20. The method of claim 13, wherein the pharmaceutical composition comprises one or more additionally therapeutically active ingredients selected from the group consisting of ACE inhibitors, AIRBs, diuretics, $Ca^{2+}$ channel blockers, β blockers, digitalis, NO donors, vasodilators, SERCA2a stimulators, neprilysin (NEP) inhibitors, myosin filament activators, recombinant relaxin-2 mediators, recombinant NP protein, activators of the soluble guanylate cyclase (sGC), and beta-arrestin ligand of angiotensin II receptor.

21. The method of claim 13, wherein the individual is human.

* * * * *